(12) United States Patent
Black et al.

(10) Patent No.: US 8,774,199 B2
(45) Date of Patent: *Jul. 8, 2014

(54) FIBRE CHANNEL ARBITRATED LOOP BUFFERLESS SWITCH CIRCUITRY TO INCREASE BANDWIDTH WITHOUT SIGNIFICANT INCREASE IN COST

(75) Inventors: Alistair D. Black, Los Gatos, CA (US); Kurt Chan, Roseville, CA (US)

(73) Assignee: Broadcom Corporation, Irvine, CA (US)

( * ) Notice: Subject to any disclaimer, the term of this patent is extended or adjusted under 35 U.S.C. 154(b) by 1409 days.

This patent is subject to a terminal disclaimer.

(21) Appl. No.: 10/348,620

(22) Filed: Jan. 21, 2003

(65) Prior Publication Data
US 2003/0174720 A1 Sep. 18, 2003

Related U.S. Application Data

(62) Division of application No. 09/195,846, filed on Nov. 19, 1998, now Pat. No. 6,614,796.

(51) Int. Cl.
*H04L 12/28* (2006.01)
*H04J 3/02* (2006.01)
*H04L 12/46* (2006.01)
*H04L 12/40* (2006.01)
*H04N 21/434* (2011.01)

(52) U.S. Cl.
CPC ...... *H04L 12/4637* (2013.01); *H04L 12/40084* (2013.01); *H04N 21/4341* (2013.01)
USPC ........... 370/403; 370/406; 370/411; 370/462; 370/389; 370/535

(58) Field of Classification Search
CPC . H04L 12/417; H04L 12/403; H04L 12/4637; H04L 2012/421; H04L 12/413; H04L 12/40143; H04W 74/0816; H04W 74/0825; H04W 72/10; H04J 3/1682; H04N 21/4341; H04N 21/2368; H04Q 2213/036; H04Q 213/13036
USPC ......... 370/401–406, 462–465, 535–537, 389, 370/411
See application file for complete search history.

(56) References Cited

U.S. PATENT DOCUMENTS

| 692,892 A | 2/1902 | McKinney |
|---|---|---|
| 1,345,382 A | 7/1920 | McKibbin |

(Continued)

FOREIGN PATENT DOCUMENTS

| EP | 411789 A2 | 2/1991 |
|---|---|---|
| EP | 465090 A1 | 1/1992 |

(Continued)

OTHER PUBLICATIONS

Rickard, W., "Fibre Channel as a Network Backbone," Weston '94, Western Electronic Show and Convention, Anaheim; Sep. 27-29, 1994; pp. 653-659.

(Continued)

*Primary Examiner* — Steven H Nguyen
(74) *Attorney, Agent, or Firm* — McDermott Will & Emery LLP

(57) ABSTRACT

A switch, switched architecture and process for transferring data through an FCAL switch is disclosed. The switch uses multiple switch control circuits each coupled to one FCAL network and all connected to a crossbar switch. The switch control circuits are coupled together by a protocol bus for coordination purposes. Local conversations can occur on each FCAL loop and crossing conversations through the switch can occur concurrently. The OPN primitive is used to establish the connection before any data is transferred thereby eliminating the need for buffer memory in the switch control circuits. The destination address of each OPN is used to address a lookup table in each switch control circuit to determine if the destination node is local. If not, the destination is looked up and a connection request made on the protocol bus. If the remote port is not busy, it sends a reply which causes both ports to establish a data path through the backplane crossbar switch.

25 Claims, 75 Drawing Sheets

(56) References Cited

U.S. PATENT DOCUMENTS

| | | |
|---|---|---|
| 1,460,805 A | 7/1923 | Sway |
| 3,680,774 A | 8/1972 | Post et al. |
| 3,749,845 A | 7/1973 | Fraser |
| 4,064,583 A | 12/1977 | von der Eltz |
| 4,115,759 A | 9/1978 | Besenfelder |
| 4,218,756 A | 8/1980 | Fraser |
| 4,333,020 A | 6/1982 | Maeder |
| 4,395,774 A | 7/1983 | Rapp |
| 4,433,378 A | 2/1984 | Leger |
| 4,445,051 A | 4/1984 | Elmasry |
| 4,449,248 A | 5/1984 | Leslie et al. |
| 4,463,424 A | 7/1984 | Mattson et al. |
| 4,500,954 A | 2/1985 | Duke et al. |
| 4,519,068 A | 5/1985 | Krebs et al. |
| 4,545,023 A | 10/1985 | Mizzi |
| 4,575,682 A | 3/1986 | Aoyagi et al. |
| 4,590,550 A | 5/1986 | Eilert et al. |
| 4,599,526 A | 7/1986 | Paski |
| 4,620,180 A | 10/1986 | Carlton |
| 4,649,293 A | 3/1987 | Ducourant |
| 4,658,250 A * | 4/1987 | Nering et al. ............... 370/462 |
| 4,680,787 A | 7/1987 | Marry |
| 4,717,383 A | 1/1988 | Phillips et al. |
| 4,717,838 A | 1/1988 | Brehmer et al. |
| 4,721,866 A | 1/1988 | Chi et al. |
| 4,727,309 A | 2/1988 | Vajdic et al. |
| 4,737,975 A | 4/1988 | Shafer |
| 4,760,571 A | 7/1988 | Schwarz |
| 4,761,822 A | 8/1988 | Maile |
| 4,763,105 A | 8/1988 | Jenq |
| 4,763,319 A | 8/1988 | Rozenblit |
| 4,777,657 A | 10/1988 | Gillaspie |
| 4,791,324 A | 12/1988 | Hodapp |
| 4,794,649 A | 12/1988 | Fujiwara |
| 4,796,188 A | 1/1989 | Gale et al. |
| 4,799,215 A | 1/1989 | Suzuki |
| 4,804,954 A | 2/1989 | Macnak et al. |
| 4,806,796 A | 2/1989 | Bushey et al. |
| 4,807,257 A | 2/1989 | Schouhamer Immink et al. |
| 4,807,282 A | 2/1989 | Kazan et al. |
| 4,817,054 A | 3/1989 | Banerjee et al. |
| 4,817,082 A * | 3/1989 | Orsic |
| 4,817,115 A | 3/1989 | Campo et al. |
| 4,821,034 A * | 4/1989 | Anderson et al. ............. 370/380 |
| 4,850,009 A | 7/1989 | Zook et al. |
| 4,890,832 A | 1/1990 | Komaki |
| 4,894,792 A | 1/1990 | Mitchell et al. |
| 4,905,231 A | 2/1990 | Leung et al. |
| 4,910,713 A | 3/1990 | Madden et al. |
| 4,916,441 A | 4/1990 | Gombrich |
| 4,930,121 A | 5/1990 | Shiobara |
| 4,968,986 A | 11/1990 | Wagner |
| 4,969,206 A | 11/1990 | Desrochers |
| 4,970,406 A | 11/1990 | Fitzpatrick et al. |
| 4,977,611 A | 12/1990 | Maru |
| 4,992,755 A | 2/1991 | Seevinck et al. |
| 4,995,099 A | 2/1991 | Davis |
| 5,002,057 A | 3/1991 | Brady |
| 5,008,879 A | 4/1991 | Fischer et al. |
| 5,022,057 A | 6/1991 | Nishi et al. |
| 5,025,486 A | 6/1991 | Klughart |
| 5,029,183 A | 7/1991 | Tymes |
| 5,031,231 A | 7/1991 | Miyazaki |
| 5,033,109 A | 7/1991 | Kawano et al. |
| 5,041,740 A | 8/1991 | Smith |
| 5,055,659 A | 10/1991 | Hendrick et al. |
| 5,055,660 A | 10/1991 | Bertagna et al. |
| 5,079,452 A | 1/1992 | Lain et al. |
| 5,081,402 A | 1/1992 | Koleda |
| 5,084,669 A | 1/1992 | Dent |
| 5,085,927 A | 2/1992 | Dohrer |
| 5,087,099 A | 2/1992 | Stolarczyk |
| 5,115,151 A | 5/1992 | Hull et al. |
| 5,117,501 A | 5/1992 | Childress et al. |
| 5,119,502 A | 6/1992 | Kallin et al. |
| 5,121,121 A | 6/1992 | Grudkowski et al. |
| 5,121,408 A | 6/1992 | Cai et al. |
| 5,122,689 A | 6/1992 | Barre |
| 5,123,029 A | 6/1992 | Bantz et al. |
| 5,128,938 A | 7/1992 | Borras |
| 5,134,347 A | 7/1992 | Koleda |
| 5,142,573 A | 8/1992 | Umezawa |
| 5,148,061 A | 9/1992 | Hsueh et al. |
| 5,149,992 A | 9/1992 | Allstot et al. |
| 5,150,361 A | 9/1992 | Wieczorek et al. |
| 5,150,380 A | 9/1992 | Okanoue |
| 5,152,006 A | 9/1992 | Klaus |
| 5,153,878 A | 10/1992 | Krebs |
| 5,162,666 A | 11/1992 | Tran |
| 5,162,674 A | 11/1992 | Allstot et al. |
| 5,175,870 A | 12/1992 | Mabey et al. |
| 5,177,378 A | 1/1993 | Nagasawa |
| 5,179,721 A | 1/1993 | Comroe et al. |
| 5,181,200 A | 1/1993 | Harrison |
| 5,196,805 A | 3/1993 | Beckwith et al. |
| 5,202,901 A | 4/1993 | Chennakeshu et al. |
| 5,214,317 A | 5/1993 | Nguyen |
| 5,216,295 A | 6/1993 | Hoang |
| 5,216,671 A | 6/1993 | Nutter |
| 5,230,084 A | 7/1993 | Nguyen |
| 5,239,299 A | 8/1993 | Apple et al. |
| 5,239,662 A | 8/1993 | Danielson et al. |
| 5,241,542 A | 8/1993 | Natarajan et al. |
| 5,241,691 A | 8/1993 | Owen |
| 5,245,611 A | 9/1993 | Ling et al. |
| 5,247,541 A | 9/1993 | Nakai |
| 5,247,656 A | 9/1993 | Kabuo et al. |
| 5,249,220 A | 9/1993 | Moskowitz et al. |
| 5,249,302 A | 9/1993 | Metroka et al. |
| 5,265,238 A | 11/1993 | Canova, Jr. et al. |
| 5,265,270 A | 11/1993 | Stengel et al. |
| 5,272,467 A | 12/1993 | Krauleidies |
| 5,274,666 A | 12/1993 | Dowdell et al. |
| 5,276,680 A | 1/1994 | Messenger |
| 5,276,681 A * | 1/1994 | Tobagi et al. ................. 370/229 |
| 5,278,831 A | 1/1994 | Mabey et al. |
| 5,289,055 A | 2/1994 | Razavi |
| 5,289,469 A | 2/1994 | Tanaka |
| 5,291,516 A | 3/1994 | Dixon et al. |
| 5,293,639 A | 3/1994 | Wilson et al. |
| 5,296,849 A | 3/1994 | Ide |
| 5,297,144 A | 3/1994 | Gilbert et al. |
| 5,298,810 A | 3/1994 | Scott et al. |
| 5,301,196 A | 4/1994 | Ewen et al. |
| 5,304,869 A | 4/1994 | Greason |
| 5,313,501 A | 5/1994 | Thacker |
| 5,315,591 A | 5/1994 | Brent et al. |
| 5,323,392 A | 6/1994 | Ishii et al. |
| 5,329,192 A | 7/1994 | Wu et al. |
| 5,331,509 A | 7/1994 | Kikinis |
| 5,343,094 A | 8/1994 | Nguyen |
| 5,345,449 A | 9/1994 | Buckingham et al. |
| 5,349,649 A | 9/1994 | Iijima |
| 5,355,035 A | 10/1994 | Vora et al. |
| 5,355,453 A | 10/1994 | Row et al. |
| 5,361,397 A | 11/1994 | Wright |
| 5,363,121 A | 11/1994 | Freund |
| 5,373,149 A | 12/1994 | Rasmussen |
| 5,373,506 A | 12/1994 | Tayloe et al. |
| 5,377,182 A | 12/1994 | Monacos |
| 5,379,291 A | 1/1995 | Herzberg et al. |
| 5,390,206 A | 2/1995 | Rein et al. |
| 5,392,023 A | 2/1995 | D'Avello et al. |
| 5,392,044 A | 2/1995 | Kotzin et al. |
| 5,394,402 A | 2/1995 | Ross |
| 5,396,224 A | 3/1995 | Dukes et al. |
| 5,406,615 A | 4/1995 | Miller, II et al. |
| 5,406,643 A | 4/1995 | Burke et al. |
| 5,414,830 A | 5/1995 | Marbot |
| 5,418,837 A | 5/1995 | Johansson et al. |
| 5,420,529 A | 5/1995 | Guay et al. |
| 5,422,917 A | 6/1995 | Scott |
| 5,423,002 A | 6/1995 | Hart |
| 5,426,637 A | 6/1995 | Derby et al. |

(56) References Cited

U.S. PATENT DOCUMENTS

| | | |
|---|---|---|
| 5,428,636 A | 6/1995 | Meier |
| 5,430,845 A | 7/1995 | Rimmer et al. |
| 5,432,932 A | 7/1995 | Chen et al. |
| 5,434,518 A | 7/1995 | Sinh et al. |
| 5,437,329 A | 8/1995 | Brooks et al. |
| 5,440,560 A | 8/1995 | Rypinski |
| 5,440,752 A * | 8/1995 | Lentz et al. ............... 710/123 |
| 5,455,527 A | 10/1995 | Murphy et al. |
| 5,457,412 A | 10/1995 | Tamba et al. |
| 5,465,081 A | 11/1995 | Todd |
| 5,469,076 A | 11/1995 | Badyal et al. |
| 5,473,607 A | 12/1995 | Hausman et al. |
| 5,481,265 A | 1/1996 | Russell |
| 5,481,562 A | 1/1996 | Pearson et al. |
| 5,485,490 A | 1/1996 | Leung et al. |
| 5,488,319 A | 1/1996 | Lo |
| 5,495,186 A | 2/1996 | Kanazawa et al. |
| 5,495,475 A | 2/1996 | Franaszek et al. |
| 5,502,719 A | 3/1996 | Grant et al. |
| 5,510,734 A | 4/1996 | Sone |
| 5,510,748 A | 4/1996 | Erhart et al. |
| 5,519,695 A | 5/1996 | Purohit et al. |
| 5,519,698 A | 5/1996 | Lyles et al. |
| 5,519,707 A | 5/1996 | Subramanian et al. |
| 5,521,530 A | 5/1996 | Yao et al. |
| 5,521,948 A | 5/1996 | Takeuchi |
| 5,525,914 A | 6/1996 | Cao et al. |
| 5,526,361 A | 6/1996 | Hedberg |
| 5,528,584 A | 6/1996 | Grant et al. |
| 5,533,029 A | 7/1996 | Gardner |
| 5,535,252 A | 7/1996 | Kobayashi |
| 5,535,373 A | 7/1996 | Olnowich |
| 5,544,222 A | 8/1996 | Robinson et al. |
| 5,546,433 A | 8/1996 | Tran et al. |
| 5,548,230 A | 8/1996 | Gerson et al. |
| 5,548,231 A | 8/1996 | Tran |
| 5,548,238 A | 8/1996 | Zhang et al. |
| 5,550,491 A | 8/1996 | Furuta |
| 5,554,945 A | 9/1996 | Lee et al. |
| 5,561,655 A | 10/1996 | Gage et al. |
| 5,565,794 A | 10/1996 | Porter |
| 5,566,171 A | 10/1996 | Levinson |
| 5,566,177 A | 10/1996 | Bhandari et al. |
| 5,570,059 A | 10/1996 | Vora et al. |
| 5,570,356 A | 10/1996 | Finney et al. |
| 5,574,724 A | 11/1996 | Bales et al. |
| 5,574,756 A | 11/1996 | Jeong |
| 5,576,644 A | 11/1996 | Pelella |
| 5,579,346 A | 11/1996 | Kanzaki |
| 5,579,487 A | 11/1996 | Meyerson et al. |
| 5,583,456 A | 12/1996 | Kimura |
| 5,583,859 A | 12/1996 | Feldmeier |
| 5,584,048 A | 12/1996 | Wieczorek |
| 5,585,796 A | 12/1996 | Svensson et al. |
| 5,598,437 A | 1/1997 | Gourse |
| 5,598,541 A * | 1/1997 | Malladi ............... 710/106 |
| 5,600,267 A | 2/1997 | Wong et al. |
| 5,603,051 A | 2/1997 | Ezzet |
| 5,606,268 A | 2/1997 | Van Brunt |
| 5,610,745 A * | 3/1997 | Bennett ............... 398/52 |
| 5,614,843 A | 3/1997 | Mita et al. |
| 5,614,855 A | 3/1997 | Lee et al. |
| 5,617,421 A | 4/1997 | Chin et al. |
| 5,619,497 A * | 4/1997 | Gallagher et al. ............ 370/394 |
| 5,619,650 A | 4/1997 | Bach et al. |
| 5,625,308 A | 4/1997 | Matsumoto et al. |
| 5,628,055 A | 5/1997 | Stein |
| 5,630,061 A | 5/1997 | Richter et al. |
| 5,640,356 A | 6/1997 | Gibbs |
| 5,640,399 A | 6/1997 | Rostoker et al. |
| 5,652,308 A | 7/1997 | Merrill et al. |
| 5,656,954 A | 8/1997 | Kondoh et al. |
| 5,668,809 A | 9/1997 | Rostoker et al. |
| 5,675,583 A | 10/1997 | Bales et al. |
| 5,675,584 A | 10/1997 | Jeong |
| 5,675,585 A | 10/1997 | Bonnot et al. |
| 5,680,038 A | 10/1997 | Fiedler |
| 5,680,633 A | 10/1997 | Koenck et al. |
| 5,684,805 A | 11/1997 | Brown |
| 5,689,644 A * | 11/1997 | Chou et al. ............... 370/392 |
| 5,714,906 A | 2/1998 | Motamed et al. |
| 5,717,871 A | 2/1998 | Hsieh et al. |
| 5,724,361 A | 3/1998 | Fiedler |
| 5,726,588 A | 3/1998 | Fiedler |
| 5,732,339 A | 3/1998 | Auvray et al. |
| 5,732,346 A | 3/1998 | Lazaridis et al. |
| 5,739,703 A | 4/1998 | Okamura |
| 5,740,366 A | 4/1998 | Mahany et al. |
| 5,742,604 A | 4/1998 | Edsall et al. |
| 5,744,366 A | 4/1998 | Kricka et al. |
| 5,744,999 A | 4/1998 | Kim et al. |
| 5,748,020 A | 5/1998 | Mactaggart et al. |
| 5,748,612 A | 5/1998 | Stoevhase et al. |
| 5,748,631 A | 5/1998 | Bergantino et al. |
| 5,751,715 A | 5/1998 | Chan et al. |
| 5,754,549 A * | 5/1998 | DeFoster et al. ............... 370/405 |
| 5,754,792 A | 5/1998 | Shutoh et al. |
| 5,757,770 A | 5/1998 | Lagoutte et al. |
| 5,757,857 A | 5/1998 | Buchwald |
| 5,758,078 A | 5/1998 | Kurita et al. |
| 5,760,984 A | 6/1998 | Spurbeck et al. |
| 5,767,699 A | 6/1998 | Bosnyak et al. |
| 5,768,268 A | 6/1998 | Kline et al. |
| 5,777,987 A | 7/1998 | Adams et al. |
| 5,778,414 A | 7/1998 | Winter et al. |
| 5,783,953 A | 7/1998 | Bosnyak et al. |
| 5,789,989 A | 8/1998 | Paschal et al. |
| 5,796,727 A | 8/1998 | Harrison et al. |
| 5,798,658 A | 8/1998 | Werking |
| 5,802,258 A | 9/1998 | Chen |
| 5,802,287 A | 9/1998 | Rostoker et al. |
| 5,802,465 A | 9/1998 | Hamalainen et al. |
| 5,802,559 A | 9/1998 | Bailey |
| 5,802,576 A | 9/1998 | Tzeng et al. |
| 5,805,089 A | 9/1998 | Fiedler et al. |
| 5,805,927 A | 9/1998 | Bowes et al. |
| 5,808,483 A | 9/1998 | Sako |
| 5,821,809 A | 10/1998 | Boerstler et al. |
| 5,821,908 A | 10/1998 | Sreenivas |
| 5,826,027 A | 10/1998 | Pedersen et al. |
| 5,828,475 A | 10/1998 | Bennett et al. |
| 5,828,653 A | 10/1998 | Goss |
| 5,829,025 A | 10/1998 | Mittal |
| 5,831,981 A | 11/1998 | Tanimura et al. |
| 5,831,985 A * | 11/1998 | Sandorfi ............... 370/468 |
| 5,844,437 A | 12/1998 | Asazawa et al. |
| 5,848,109 A | 12/1998 | Marbot et al. |
| 5,848,251 A | 12/1998 | Lomelino et al. |
| 5,850,155 A | 12/1998 | Matsumoto |
| 5,852,629 A | 12/1998 | Iwamatsu |
| 5,859,548 A | 1/1999 | Kong |
| 5,859,669 A | 1/1999 | Prentice |
| 5,861,881 A | 1/1999 | Freeman et al. |
| 5,862,355 A * | 1/1999 | Logsdon ............... 710/116 |
| 5,875,465 A | 2/1999 | Kilpatrick et al. |
| 5,877,642 A | 3/1999 | Takahashi |
| 5,886,541 A | 3/1999 | Asato |
| 5,887,146 A | 3/1999 | Baxter et al. |
| 5,887,187 A | 3/1999 | Rostoker et al. |
| 5,887,642 A | 3/1999 | Thomas et al. |
| 5,892,382 A | 4/1999 | Ueda et al. |
| 5,892,922 A | 4/1999 | Lorenz |
| 5,892,932 A * | 4/1999 | Kim ............... 710/316 |
| 5,892,982 A | 4/1999 | Mitsuda et al. |
| 5,893,150 A | 4/1999 | Hagersten et al. |
| 5,893,153 A | 4/1999 | Tzeng et al. |
| 5,894,481 A | 4/1999 | Book |
| 5,903,176 A | 5/1999 | Westgate |
| 5,905,386 A | 5/1999 | Gerson |
| 5,907,298 A | 5/1999 | Kiriyama et al. |
| 5,908,468 A | 6/1999 | Hartmann |
| 5,909,127 A | 6/1999 | Pearson et al. |
| 5,909,686 A | 6/1999 | Muller et al. |
| 5,914,955 A | 6/1999 | Rostoker et al. |

(56) References Cited

U.S. PATENT DOCUMENTS

| | | | |
|---|---|---|---|
| 5,937,169 A | 8/1999 | Connery et al. | |
| 5,939,899 A | 8/1999 | Frommer et al. | |
| 5,940,771 A | 8/1999 | Gollnick et al. | |
| 5,945,585 A | 8/1999 | Hitz et al. | |
| 5,945,847 A | 8/1999 | Ransijn | |
| 5,945,858 A | 8/1999 | Sato | |
| 5,945,863 A | 8/1999 | Coy | |
| 5,951,637 A | 9/1999 | Kuzma | |
| 5,953,338 A | 9/1999 | Ma et al. | |
| 5,955,924 A | 9/1999 | Bryan et al. | |
| 5,961,631 A | 10/1999 | Devereux et al. | |
| 5,963,053 A | 10/1999 | Manohar et al. | |
| 5,969,556 A | 10/1999 | Hayakawa | |
| 5,970,070 A * | 10/1999 | Ho et al. | 370/462 |
| 5,970,110 A | 10/1999 | Li | |
| 5,974,508 A | 10/1999 | Maheshwari | |
| 5,977,800 A | 11/1999 | Iravani | |
| 5,978,379 A | 11/1999 | Chan et al. | |
| 5,978,849 A | 11/1999 | Khanna | |
| 5,987,507 A | 11/1999 | Creedon et al. | |
| 6,000,020 A | 12/1999 | Chin et al. | |
| 6,002,279 A | 12/1999 | Evans et al. | |
| 6,002,297 A | 12/1999 | Scheelen | |
| 6,008,670 A | 12/1999 | Pace et al. | |
| 6,014,041 A | 1/2000 | Somasekhar et al. | |
| 6,014,705 A | 1/2000 | Koenck et al. | |
| 6,016,082 A | 1/2000 | Cruz et al. | |
| 6,018,260 A | 1/2000 | Gabara | |
| 6,025,746 A | 2/2000 | So | |
| 6,026,075 A | 2/2000 | Linville et al. | |
| 6,028,454 A | 2/2000 | Elmasry et al. | |
| 6,037,841 A | 3/2000 | Tanji et al. | |
| 6,037,842 A | 3/2000 | Bryan et al. | |
| 6,038,226 A | 3/2000 | Ellersick et al. | |
| 6,038,254 A | 3/2000 | Ferraiolo et al. | |
| 6,040,710 A | 3/2000 | Nakauchi | |
| 6,061,351 A | 5/2000 | Erimli et al. | |
| 6,061,358 A | 5/2000 | Nelson et al. | |
| 6,061,742 A | 5/2000 | Stewart et al. | |
| 6,061,747 A | 5/2000 | Ducaroir et al. | |
| 6,064,626 A | 5/2000 | Stevens | |
| 6,065,087 A | 5/2000 | Keaveny et al. | |
| 6,073,132 A | 6/2000 | Gehman | |
| 6,081,162 A | 6/2000 | Johnson | |
| 6,081,215 A | 6/2000 | Kost et al. | |
| 6,085,278 A | 7/2000 | Gates et al. | |
| 6,094,074 A | 7/2000 | Chi et al. | |
| 6,097,722 A | 8/2000 | Graham et al. | |
| 6,098,064 A | 8/2000 | Pirolli et al. | |
| 6,104,068 A | 8/2000 | Forbes | |
| 6,104,214 A | 8/2000 | Ueda et al. | |
| 6,111,425 A | 8/2000 | Bertin et al. | |
| 6,111,859 A | 8/2000 | Godfrey et al. | |
| 6,114,843 A | 9/2000 | Olah | |
| 6,118,776 A * | 9/2000 | Berman | 370/351 |
| 6,121,808 A | 9/2000 | Gaudet | |
| 6,122,336 A | 9/2000 | Anderson | |
| 6,122,667 A | 9/2000 | Chung | |
| 6,128,305 A | 10/2000 | Hjalmtysson et al. | |
| 6,128,673 A | 10/2000 | Aronson et al. | |
| 6,133,773 A | 10/2000 | Garlepp et al. | |
| 6,134,268 A | 10/2000 | McCoy | |
| 6,141,376 A | 10/2000 | Shaw | |
| 6,141,705 A | 10/2000 | Anand et al. | |
| 6,151,647 A | 11/2000 | Sarat | |
| 6,151,662 A | 11/2000 | Christie et al. | |
| 6,157,623 A | 12/2000 | Kerstein | |
| 6,157,652 A * | 12/2000 | Henson et al. | 370/407 |
| 6,160,508 A | 12/2000 | Gustavsson et al. | |
| 6,160,813 A * | 12/2000 | Banks et al. | 370/422 |
| 6,167,077 A | 12/2000 | Ducaroir et al. | |
| 6,178,159 B1 | 1/2001 | He et al. | |
| 6,185,185 B1 | 2/2001 | Bass et al. | |
| 6,185,203 B1 | 2/2001 | Berman | |
| 6,188,339 B1 | 2/2001 | Hasegawa | |
| 6,192,048 B1 | 2/2001 | Nelson et al. | |
| 6,194,949 B1 | 2/2001 | Hogeboom | |
| 6,194,950 B1 | 2/2001 | Kibar et al. | |
| 6,201,443 B1 | 3/2001 | Tanji | |
| 6,202,125 B1 | 3/2001 | Patterson et al. | |
| 6,202,129 B1 | 3/2001 | Palanca et al. | |
| 6,209,020 B1 | 3/2001 | Angle et al. | |
| 6,212,194 B1 * | 4/2001 | Hsieh | 370/414 |
| 6,215,497 B1 | 4/2001 | Leung | |
| 6,219,379 B1 | 4/2001 | Ghosh | |
| 6,222,380 B1 | 4/2001 | Gerowitz et al. | |
| 6,223,239 B1 | 4/2001 | Olarig | |
| 6,223,270 B1 | 4/2001 | Chesson et al. | |
| 6,226,680 B1 | 5/2001 | Boucher et al. | |
| 6,243,386 B1 | 6/2001 | Chan et al. | |
| 6,247,060 B1 | 6/2001 | Boucher et al. | |
| 6,247,138 B1 | 6/2001 | Tamura et al. | |
| 6,247,139 B1 | 6/2001 | Walker et al. | |
| 6,255,898 B1 | 7/2001 | Ono et al. | |
| 6,262,594 B1 | 7/2001 | Cheung et al. | |
| 6,265,898 B1 | 7/2001 | Bellaouar | |
| 6,266,797 B1 | 7/2001 | Godfrey et al. | |
| 6,266,799 B1 | 7/2001 | Lee et al. | |
| 6,269,427 B1 | 7/2001 | Kuttanna et al. | |
| 6,275,880 B1 | 8/2001 | Quinlan et al. | |
| 6,278,298 B1 | 8/2001 | Hayakawa | |
| 6,279,035 B1 | 8/2001 | Brown et al. | |
| 6,289,406 B1 | 9/2001 | Chambers et al. | |
| 6,307,906 B1 | 10/2001 | Tanji et al. | |
| 6,314,488 B1 | 11/2001 | Smith | |
| 6,324,181 B1 * | 11/2001 | Wong et al. | 370/403 |
| 6,329,859 B1 | 12/2001 | Wu | |
| 6,332,179 B1 | 12/2001 | Okpisz et al. | |
| 6,334,153 B2 | 12/2001 | Boucher et al. | |
| 6,335,952 B1 | 1/2002 | Lee et al. | |
| 6,337,865 B1 | 1/2002 | Seto et al. | |
| 6,340,909 B1 | 1/2002 | Zerbe et al. | |
| 6,343,081 B1 | 1/2002 | Blanc et al. | |
| 6,345,301 B1 | 2/2002 | Burns et al. | |
| 6,349,098 B1 | 2/2002 | Parruck et al. | |
| 6,349,365 B1 | 2/2002 | McBride | |
| 6,356,944 B1 | 3/2002 | McCarty | |
| 6,366,225 B1 | 4/2002 | Ozdemir | |
| 6,366,583 B2 | 4/2002 | Rowett et al. | |
| 6,373,846 B1 | 4/2002 | Daniel et al. | |
| 6,374,361 B1 | 4/2002 | Lee et al. | |
| 6,377,571 B1 | 4/2002 | Tai | |
| 6,380,775 B1 | 4/2002 | Reynolds | |
| 6,385,201 B1 | 5/2002 | Iwata | |
| 6,389,479 B1 | 5/2002 | Boucher et al. | |
| 6,396,832 B1 * | 5/2002 | Kranzler | 370/360 |
| 6,396,840 B1 | 5/2002 | Rose et al. | |
| 6,397,042 B1 | 5/2002 | Prentice et al. | |
| 6,397,048 B1 | 5/2002 | Toda | |
| 6,404,525 B1 | 6/2002 | Shimomura et al. | |
| 6,424,194 B1 | 7/2002 | Hairapetian | |
| 6,424,624 B1 | 7/2002 | Galand et al. | |
| 6,426,947 B1 | 7/2002 | Banker et al. | |
| 6,427,173 B1 | 7/2002 | Boucher et al. | |
| 6,434,620 B1 | 8/2002 | Boucher et al. | |
| 6,438,651 B1 | 8/2002 | Slane | |
| 6,442,225 B1 | 8/2002 | Huang | |
| 6,452,601 B1 | 9/2002 | Marino et al. | |
| 6,456,672 B1 | 9/2002 | Uchiki et al. | |
| 6,459,681 B1 | 10/2002 | Oliva | |
| 6,463,092 B1 | 10/2002 | Kim et al. | |
| 6,466,098 B2 | 10/2002 | Pickering | |
| 6,470,029 B1 | 10/2002 | Shimizu | |
| 6,472,171 B1 | 10/2002 | Toman et al. | |
| 6,483,355 B1 | 11/2002 | Lee et al. | |
| 6,484,224 B1 | 11/2002 | Robins et al. | |
| 6,490,622 B1 | 12/2002 | Nagami et al. | |
| 6,493,343 B1 | 12/2002 | Garcia et al. | |
| 6,496,199 B1 | 12/2002 | Peng et al. | |
| 6,496,343 B2 | 12/2002 | Mahlein et al. | |
| 6,496,479 B1 | 12/2002 | Shionozaki | |
| 6,504,817 B2 | 1/2003 | Oldfield et al. | |
| 6,509,773 B2 | 1/2003 | Buchwald et al. | |
| 6,510,185 B2 | 1/2003 | Lee et al. | |

(56) References Cited

U.S. PATENT DOCUMENTS

| | | |
|---|---|---|
| 6,526,112 B1 | 2/2003 | Lai |
| 6,539,072 B1 | 3/2003 | Donnelly et al. |
| 6,549,597 B2 | 4/2003 | Ribo |
| 6,552,619 B2 | 4/2003 | Shastri |
| 6,556,640 B1 | 4/2003 | Baba |
| 6,560,290 B2 | 5/2003 | Ahn et al. |
| 6,560,305 B1 | 5/2003 | Croughwell |
| 6,564,267 B1 | 5/2003 | Lindsay |
| 6,574,708 B2 | 6/2003 | Hayter et al. |
| 6,597,689 B1 | 7/2003 | Chiu et al. |
| 6,597,691 B1 | 7/2003 | Anderson et al. |
| 6,601,200 B1 | 7/2003 | Delp et al. |
| 6,606,321 B1 | 8/2003 | Natanson et al. |
| 6,606,360 B1 | 8/2003 | Dunning et al. |
| 6,614,791 B1 | 9/2003 | Luciani et al. |
| 6,614,796 B1 | 9/2003 | Black et al. |
| 6,631,135 B1 | 10/2003 | Wojcik |
| 6,631,351 B1 | 10/2003 | Ramachandran et al. |
| 6,633,936 B1 | 10/2003 | Keller et al. |
| 6,633,967 B1 | 10/2003 | Duncan |
| 6,636,485 B1 | 10/2003 | Fijolek et al. |
| 6,636,906 B1 | 10/2003 | Sharma et al. |
| 6,640,248 B1 | 10/2003 | Jorgensen |
| 6,643,752 B1 | 11/2003 | Donnelly et al. |
| 6,654,817 B1 | 11/2003 | Huang |
| 6,658,599 B1 | 12/2003 | Linam et al. |
| 6,665,759 B2 | 12/2003 | Dawkins et al. |
| 6,681,283 B1 | 1/2004 | Thekkath et al. |
| 6,697,868 B2 | 2/2004 | Craft et al. |
| 6,697,931 B1 | 2/2004 | Jones et al. |
| 6,731,646 B1 | 5/2004 | Banks et al. |
| 6,744,782 B1 | 6/2004 | Itakura et al. |
| 6,757,291 B1 | 6/2004 | Hu |
| 6,757,746 B2 | 6/2004 | Boucher et al. |
| 6,757,748 B1 | 6/2004 | Hipp |
| 6,765,901 B1 | 7/2004 | Johnson et al. |
| 6,765,919 B1 | 7/2004 | Banks et al. |
| 6,766,389 B2 | 7/2004 | Hayter et al. |
| 6,775,328 B1 | 8/2004 | Segaram |
| 6,778,704 B1 | 8/2004 | Kawatani |
| 6,788,686 B1 | 9/2004 | Khotimsky et al. |
| 6,788,704 B1 | 9/2004 | Lindsay |
| 6,810,040 B1 | 10/2004 | Lee et al. |
| 6,816,932 B2 | 11/2004 | Cho et al. |
| 6,822,940 B1 | 11/2004 | Zavalkovsky et al. |
| 6,839,393 B1 | 1/2005 | Sidiropoulos |
| 6,845,403 B2 | 1/2005 | Chadalapaka |
| 6,856,658 B1 | 2/2005 | Baba et al. |
| 6,859,435 B1 | 2/2005 | Lee et al. |
| 6,862,296 B1 | 3/2005 | Desai |
| 6,862,621 B2 | 3/2005 | Takada et al. |
| 6,865,158 B2 | 3/2005 | Iwamoto |
| 6,874,054 B2 | 3/2005 | Clayton et al. |
| 6,886,049 B2 | 4/2005 | Wong |
| 6,888,532 B2 | 5/2005 | Wong et al. |
| 6,897,697 B2 | 5/2005 | Yin et al. |
| 6,900,670 B2 | 5/2005 | Hairapetian |
| 6,904,053 B1 | 6/2005 | Berman |
| 6,904,519 B2 | 6/2005 | Anand et al. |
| 6,911,855 B2 | 6/2005 | Yin et al. |
| 6,912,221 B1 | 6/2005 | Zadikian et al. |
| 6,912,603 B2 | 6/2005 | Kanazashi |
| 6,917,366 B1 | 7/2005 | West et al. |
| 6,927,606 B2 | 8/2005 | Kocaman |
| 6,937,080 B2 | 8/2005 | Hairapetian |
| 6,938,092 B2 | 8/2005 | Burns |
| 6,950,956 B2 | 9/2005 | Zerbe et al. |
| 6,952,431 B1 | 10/2005 | Dally et al. |
| 6,954,285 B2 | 10/2005 | Ogata et al. |
| 6,957,269 B2 | 10/2005 | Williams et al. |
| 6,965,262 B2 | 11/2005 | Zerbe |
| 6,971,006 B2 | 11/2005 | Krishna et al. |
| 6,976,205 B1 | 12/2005 | Ziai et al. |
| 6,981,087 B1 | 12/2005 | Heitkamp et al. |
| 6,982,583 B2 | 1/2006 | Yin et al. |
| 6,985,988 B1 | 1/2006 | Nsame |
| 6,996,070 B2 | 2/2006 | Starr et al. |
| 7,007,103 B2 | 2/2006 | Pinkerton et al. |
| 7,009,985 B2 | 3/2006 | Black et al. |
| 7,038,516 B2 | 5/2006 | Hairapetian |
| 7,039,147 B2 | 5/2006 | Donnelly et al. |
| 7,042,914 B2 | 5/2006 | Zerbe et al. |
| 7,062,568 B1 | 6/2006 | Senevirathne et al. |
| 7,133,940 B2 | 11/2006 | Blightman et al. |
| 7,149,266 B1 | 12/2006 | Imamura et al. |
| 7,181,531 B2 | 2/2007 | Pinkerton et al. |
| 7,185,266 B2 | 2/2007 | Blightman et al. |
| 7,187,723 B1 | 3/2007 | Kawanabe |
| 7,190,676 B2 | 3/2007 | Anderson, Sr. |
| 7,212,534 B2 | 5/2007 | Kadambi et |
| 7,215,169 B2 | 5/2007 | Hairapetian |
| 7,227,834 B1 | 6/2007 | Barton et al. |
| 7,227,918 B2 | 6/2007 | Aung et al. |
| 7,239,636 B2 | 7/2007 | Kadambi et al. |
| 7,328,300 B2 | 2/2008 | Bennett |
| 7,346,701 B2 | 3/2008 | Elzur et al. |
| 7,362,769 B2 | 4/2008 | Black et al. |
| 7,363,415 B2 | 4/2008 | Chu |
| 7,366,190 B2 | 4/2008 | Black et al. |
| 7,376,755 B2 | 5/2008 | Pandya |
| 7,382,790 B2 | 6/2008 | Warren et al. |
| 7,385,972 B2 | 6/2008 | Black et al. |
| 7,397,788 B2 | 7/2008 | Mies et al. |
| 7,397,800 B2 | 7/2008 | Elzur |
| 7,400,639 B2 | 7/2008 | Madukkarumukumana et al. |
| 7,411,959 B2 | 8/2008 | Elzur |
| 7,411,960 B1 | 8/2008 | Langley et al. |
| 7,430,171 B2 | 9/2008 | Black et al. |
| 7,433,326 B2 | 10/2008 | Desai et al. |
| 7,450,500 B2 | 11/2008 | Black et al. |
| 7,471,691 B2 | 12/2008 | Black et al. |
| 7,472,156 B2 | 12/2008 | Philbrick et al. |
| 7,515,612 B1 | 4/2009 | Thompson |
| 7,586,850 B2 | 9/2009 | Warren et al. |
| 7,593,470 B2 | 9/2009 | Segaram |
| 7,633,949 B2 | 12/2009 | Zadikian et al. |
| 2001/0026553 A1 | 10/2001 | Gallant et al. |
| 2001/0032265 A1 | 10/2001 | Tanaka |
| 2001/0037397 A1 | 11/2001 | Boucher et al. |
| 2002/0018444 A1 | 2/2002 | Cremin et al. |
| 2002/0031086 A1 | 3/2002 | Welin |
| 2002/0034222 A1 | 3/2002 | Buchwald et al. |
| 2002/0039395 A1 | 4/2002 | Buchwald et al. |
| 2002/0051142 A1 | 5/2002 | Ogata et al. |
| 2002/0078265 A1 | 6/2002 | Frazier et al. |
| 2002/0085562 A1 | 7/2002 | Hufferd et al. |
| 2002/0087723 A1 | 7/2002 | Williams et al. |
| 2002/0089927 A1 | 7/2002 | Fischer et al. |
| 2002/0095519 A1 | 7/2002 | Philbrick et al. |
| 2002/0103988 A1 | 8/2002 | Dornier |
| 2002/0110087 A1 | 8/2002 | Zelig et al. |
| 2002/0130692 A1 | 9/2002 | Hairapetian |
| 2002/0174253 A1 | 11/2002 | Hayter et al. |
| 2002/0190770 A1 | 12/2002 | Yin et al. |
| 2002/0194400 A1 | 12/2002 | Porterfield |
| 2003/0001646 A1 | 1/2003 | Hairapetian |
| 2003/0016628 A1 | 1/2003 | Kadambi et al. |
| 2003/0021229 A1 | 1/2003 | Kadambi et al. |
| 2003/0038809 A1 | 2/2003 | Peng et al. |
| 2003/0046330 A1 | 3/2003 | Hayes |
| 2003/0046418 A1 | 3/2003 | Raval et al. |
| 2003/0051128 A1 | 3/2003 | Rodriguez et al. |
| 2003/0061505 A1 | 3/2003 | Sperry et al. |
| 2003/0067337 A1 | 4/2003 | Yin et al. |
| 2003/0079033 A1 | 4/2003 | Craft et al. |
| 2003/0084185 A1 | 5/2003 | Pinkerton |
| 2003/0105977 A1 | 6/2003 | Brabson et al. |
| 2003/0107996 A1 | 6/2003 | Black et al. |
| 2003/0108050 A1 | 6/2003 | Black et al. |
| 2003/0108058 A1 | 6/2003 | Black et al. |
| 2003/0108060 A1 | 6/2003 | Black et al. |
| 2003/0108061 A1 | 6/2003 | Black et al. |
| 2003/0118040 A1 | 6/2003 | Black et al. |
| 2003/0140124 A1 | 7/2003 | Burns |

(56) References Cited

U.S. PATENT DOCUMENTS

| | | |
|---|---|---|
| 2003/0169753 A1 | 9/2003 | Black et al. |
| 2003/0172342 A1 | 9/2003 | Elzur |
| 2003/0174720 A1 | 9/2003 | Black et al. |
| 2003/0174721 A1 | 9/2003 | Black et al. |
| 2003/0174722 A1 | 9/2003 | Black et al. |
| 2003/0198251 A1 | 10/2003 | Black et al. |
| 2003/0204631 A1 | 10/2003 | Pinkerton et al. |
| 2003/0204634 A1 | 10/2003 | Pinkerton et al. |
| 2003/0227908 A1 | 12/2003 | Scoggins et al. |
| 2004/0019652 A1 | 1/2004 | Freimuth et al. |
| 2004/0042458 A1 | 3/2004 | Elzu |
| 2004/0042464 A1 | 3/2004 | Elzur et al. |
| 2004/0042483 A1 | 3/2004 | Elzur et al. |
| 2004/0042487 A1 | 3/2004 | Ossman |
| 2004/0044798 A1 | 3/2004 | Elzur et al. |
| 2004/0062245 A1 | 4/2004 | Sharp et al. |
| 2004/0062275 A1 | 4/2004 | Siddabathuni |
| 2004/0081186 A1 | 4/2004 | Warren et al. |
| 2004/0085972 A1 | 5/2004 | Warren et al. |
| 2004/0085994 A1 | 5/2004 | Warren et al. |
| 2004/0093411 A1 | 5/2004 | Elzur et al. |
| 2004/0107304 A1 | 6/2004 | Grun |
| 2004/0133713 A1 | 7/2004 | Elzur |
| 2004/0227544 A1 | 11/2004 | Yin et al. |
| 2005/0027911 A1 | 2/2005 | Hayter et al. |
| 2005/0160139 A1 | 7/2005 | Boucher et al. |
| 2005/0165980 A1 | 7/2005 | Clayton et al. |
| 2005/0184765 A1 | 8/2005 | Hairapetian |
| 2005/0185654 A1 | 8/2005 | Zadikian et al. |
| 2005/0216597 A1 | 9/2005 | Shah et al. |
| 2005/0278459 A1 | 12/2005 | Boucher et al. |
| 2006/0165115 A1 | 7/2006 | Warren et al. |
| 2006/0176094 A1 | 8/2006 | Hairapetian |
| 2006/0227917 A1 | 10/2006 | Buchwald et al. |
| 2007/0170966 A1 | 7/2007 | Hairapetian |
| 2007/0171914 A1 | 7/2007 | Kadambi et al. |
| 2007/0237163 A1 | 10/2007 | Kadambi et al. |
| 2008/0025315 A1 | 1/2008 | Elzur |
| 2008/0095182 A1 | 4/2008 | Elzur et al. |
| 2008/0151922 A1 | 6/2008 | Elzur et al. |
| 2008/0205421 A1 | 8/2008 | Black et al. |
| 2008/0276018 A1 | 11/2008 | Hayter et al. |
| 2008/0293869 A1 | 11/2008 | Obrecht |
| 2009/0074408 A1 | 3/2009 | Black et al. |
| 2009/0128380 A1 | 5/2009 | Hairapetian |

FOREIGN PATENT DOCUMENTS

| | | |
|---|---|---|
| EP | 483439 A1 | 5/1992 |
| EP | 488328 A2 | 6/1992 |
| EP | 548551 A1 | 6/1993 |
| EP | 650260 A1 | 4/1995 |
| EP | 692892 A2 | 1/1996 |
| EP | 0 719 011 A2 | 6/1996 |
| EP | 719011 A2 | 6/1996 |
| EP | 821505 A1 | 1/1998 |
| EP | 858190 A2 | 8/1998 |
| EP | 909035 A2 | 4/1999 |
| EP | 1006697 A2 | 6/2000 |
| EP | 1039718 A2 | 9/2000 |
| EP | 1206075 A2 | 5/2002 |
| EP | 1280302 A2 | 1/2003 |
| EP | 1345382 A2 | 9/2003 |
| EP | 1357721 A2 | 10/2003 |
| EP | 1460804 A2 | 9/2004 |
| EP | 1460805 A2 | 9/2004 |
| EP | 1460806 A2 | 9/2004 |
| EP | 1537695 A2 | 6/2005 |
| FR | 2725573 A1 | 4/1996 |
| GB | 2314473 A | 12/1997 |
| JP | 5-268009 | 10/1993 |
| JP | 8-251101 | 9/1996 |
| JP | 10-022794 | 1/1998 |
| JP | 10-313333 | 11/1998 |
| JP | 11-088301 | 3/1999 |
| JP | 11-243420 | 9/1999 |
| JP | 2000-078206 A | 3/2000 |
| JP | 2000-183955 A | 6/2000 |
| JP | 2001-45092 | 2/2001 |
| JP | 2001-313717 A | 11/2001 |
| WO | WO-81/01780 A1 | 6/1981 |
| WO | WO-90/07243 A1 | 6/1990 |
| WO | WO-91/03876 A1 | 3/1991 |
| WO | WO-95/23472 A1 | 8/1995 |
| WO | WO-96/10866 A1 | 4/1996 |
| WO | WO-97/28505 A1 | 8/1997 |
| WO | WO-99/00948 A1 | 1/1999 |
| WO | WO-00/30322 A2 | 5/2000 |
| WO | WO-00/52879 A2 | 9/2000 |
| WO | WO-00/56013 A2 | 9/2000 |
| WO | WO-00/56113 A1 | 9/2000 |
| WO | WO-01/28150 A2 | 4/2001 |
| WO | WO-01/65788 A2 | 9/2001 |
| WO | WO-01/84702 A2 | 11/2001 |
| WO | WO-01/86910 A1 | 11/2001 |
| WO | WO-02/35784 A1 | 5/2002 |
| WO | WO-02/71616 A2 | 9/2002 |
| WO | WO-03/079612 A1 | 9/2003 |
| WO | WO-2004/021627 | 3/2004 |

OTHER PUBLICATIONS

Ravindran, G., et al., "A Comparison of Blocking and Non-Blocking Packet Switching Techniques in Hierarchical Ring Networks," IEICE Transactions on Information and Systems, vol. E79-D, No. 8; Aug. 1996; pp. 1130-1138.

Fibre Channel Physical and Signaling Interface (FC-PH) Rev. 4.3, X3.230-199x, X3T11/Project 755D/Rev 4.3, (Jun. 1, 1994), pp. 478.

Fibre Channel, Physical and Signalling Interface—2 (FC-PH-2) Rev. 7.4, X3.297-1996, X3T11/Project 901D/Rev 7.4, (Sep. 10, 1996), pp. 187.

Fibre Channel, Fabric Loop Attachment (FC-FLA) Rev. 2.7, TR-20-199x, T11/Project 1235-DT/Rev 2.7, (Aug. 12, 1997), pp. 136.

American National Standard for Information Technology-Fibre Channel-Arbitrated Loop (FC-AL), ANSI INCITS 272-1996 (R2001), (formerly ANSI X3.272-1996 (R20001)), (Apr. 8, 1996), pp. 102.

Ex Parte Quayle Action received for U.S. Appl. No. 10/345,707, mailed on Jul. 21, 2006, 9 pages.

Ex Parte Quayle Action received for U.S. Appl. No. 10/345,707, mailed on Nov. 28, 2006, 6 pages.

Final Office Action received for U.S. Appl. No. 10/345,707, mailed on Oct. 15, 2007, 5 Pages.

Non-Final Office Action Received for U.S. Appl. No. 10/345,707, mailed on Apr. 24, 2007, 6 Pages.

Supplemental Notice of Allowability received for U.S. Appl. No. 10/345,707, mailed on Jul. 22, 2008, 4 Pages.

Notice of Allowance received for U.S. Appl. No. 10/348,642, mailed on Dec. 20, 2007, 6 Pages.

Non-Final Office Action received for U.S. Appl. No. 10/349,739, mailed on Dec. 31, 2008, 8 Pages.

Non-Final Office Action received for U.S. Appl. No. 10/349,739, mailed on Sep. 14, 2007, 8 Pages.

Non-Final Office Action received for U.S. Appl. No. 10/349,739, mailed on Jul. 23, 2008, 5 Pages.

Non-Final Office Action received for U.S. Appl. No. 10/349,739, mailed on May 2, 2007, 7 Pages.

Final Office Action received for U.S. Appl. No. 10/349,739, mailed on Feb. 1, 2008, 10 Pages.

Response to Non-Final Office Action (Dated Dec. 31, 2008) received for U.S. Appl. No. 10/349,739, filed Jun. 1, 2009, 16 Pages.

Response to Final Office Action (Dated Aug. 1, 2008) received for U.S. Appl. No. 10/348,721, filed Oct. 14, 2008, 21 Pages.

Non-Final Office Action received for U.S. Appl. No. 10/348,721, mailed on Mar. 5, 2008, 10 pages.

Non-Final Office Action received for U.S. Appl. No. 10/348,721, mailed on Feb. 18, 2009, 9 pages.

Final Office Action received for U.S. Appl. No. 10/348,721, mailed on Sep. 20, 2007, 9 pages.

(56) References Cited

OTHER PUBLICATIONS

Final Office Action received for U.S. Appl. No. 10/348,721, mailed on Aug. 1, 2008, 11 pages.
Response to Final Office Action (Dated Sep. 20, 2007) received for U.S. Appl. No. 10/348,721, filed on Nov. 21, 2007, 12 pages.
Response to Non-Final Office Action (Dated Apr. 6, 2007) received for U.S. Appl. No. 10/348,721, filed on Jul. 6, 2007, 85 pages.
Response to Non-Final Office Action (Dated Mar. 5, 2008) received for U.S. Appl. No. 10/348,721, v on May 5, 2008, 19 pages.
Response to Final Office Action (Dated Aug. 1, 2008) and subsequent Advisory Action (Dated Nov. 19, 2008) received for U.S. Appl. No. 10/348,721, filed on Jan. 1, 2009, 12 pages.
Notice of Allowance received for U.S. Appl. No. 10/348,997, mailed on Jul. 9, 2008, 7 pages.
Non-Final office Action received for U.S. Appl. No. 10/348,997, mailed on Apr. 5, 2007, 9 pages.
Non-Final Office Action received for U.S. Appl. No. 10/348,997, mailed on Feb. 15, 2008, 8 pages.
Final Office Action received for U.S. Appl. No. 10/348,997, mailed on Aug. 2, 2007, 9 pages.
Final Office Action received for U.S. Appl. No. 10/349,377, mailed on Jul. 14 2009, 7 pages.
Response to Final Office Action (May 29, 2008), received for U.S. Appl. No. 10/349,377, filed on Aug. 5, 2008, 19 pages.
Response to Non Final Office Action (Dec. 31, 2007) received for U.S. Appl. No. 10/349,377, filed on Mar. 4, 2008, 21 pages.
Response to Final Office Action (Oct. 16, 2007) received for U.S. Appl. No. 10/349,377, filed on Dec. 4, 2007, 8 pages.
Response to Non Final Office Action (Apr. 30, 2007) received for U.S. Appl. No. 10/349,377, filed on Jul. 30, 2007, 14 pages.
Response to Non-Final Office Action (Dated Dec. 30, 2008), received for U.S. Appl. No. 10/349,377, filed Jun. 1, 2009, 8 pages.
Non-Final Office Action received for U.S. Appl. No. 12/149,373, mailed on Jun. 3, 2009, 17 pages.
Notice of Allowance received for U.S. Appl. No. 10/348,648, mailed on Feb. 1, 2008, 8 pages.
Non-Final Office Action received for U.S. Appl. No. 10/348,648, mailed on Feb. 16, 2007, 9 pages.
Final Office Action Received for U.S. Appl. No. 10/348,648, mailed on Jul. 18, 2007, 5 pages.
Ex Parte Quayle Action received for U.S. Appl. No. 10/348,648, mailed on Sep. 28, 2007, 5 pages.
Response to Ex Parte Quayle Action (Jul. 21, 2006) received for U.S. Appl. No. 10/345,707, filed Sep. 14, 2006, 9 pages.
Response to Ex Parte Quayle Action (Nov. 28, 2006), Received for U.S. Appl. No. 10/345,707, filed Jan. 29, 2007, 16 pages.
Response to Non-Final-Office Action (Apr. 24, 2007), received for U.S. Appl. No. 10/345,707, filed Jul. 24, 2007, 16 pages.
Response to Final Office Action (Oct. 15, 2007), received for U.S. Appl. No. 10/345,707, filed Dec. 4, 2007, 14 pages.
Non Final Office Action received from U.S. Appl. No. 10/345,707, mailed on Dec. 31, 2007, 11 pages.
Response to Non-Final Office Action (Dec. 31, 2007), received for U.S. Appl. No. 10/345,707, filed Mar. 4, 2008, 14 pages.
Non Final Office Action received for U.S. Appl. No. 10/348, 642, mailed on Aug. 15, 2006, 8 pages.
Response to Non-Final Office Action (Aug. 15, 2006), received for U.S. Appl. No. 10/348,642, filed Nov. 7, 2006, 101 pages.
Final Office Action received for U.S. Appl. No. 10/348,642, mailed on Jan. 19, 2007, 11 pages.
Response to Final Office Action (Jan. 19, 2007), received for U.S. Appl. No. 10/348,642, filed Mar. 16, 2007, 15 pages.
Non Final Office Action received from U.S. Appl. No. 10/348,642, mailed on Jul. 11, 2007, 6 pages.
Response Non-Final-Office Action (Jul. 11, 2007), received for U.S. Appl. No. 10/348,642, filed Oct. 11, 2007, 8 pages.
Response to Non Final Office Action (Apr. 5, 2007), received for U.S. Appl. No. 10/348,997, filed Jun. 5, 2007, 85 pages.
Response to Advisory action (Apr. 17, 2008) received for U.S. Appl. No. 10/348,687, filed Apr. 29, 2008, 7 pages.

Response to Final Office Action (Aug. 2, 2007), received for U.S. Appl. No. 10/348,997, filed Oct. 2, 2007, 12 pages.
Response to Non-Final Office Action (Dated Feb. 15, 2008) received for U.S. Appl. No. 10/348,997, filed Apr. 16, 2008, 14 pages.
Non Final Office Action received for U.S. Appl. No. 10/348,687, mailed on Mar. 8, 2007, 9 pages.
Response to Non Final office action (Mar. 8, 2007) received for U.S. Appl. No. 10/348,687, filed Jun. 8, 2007, 18 pages.
Final Office Action received for U.S. Appl. No. 10/348,687, mailed on Sep. 4, 2007, 8 pages.
Response to Final Office Action (Sep. 4, 2007), received for U.S. Appl. No. 10/348,687, filed Oct. 29, 2007, 14 pages.
Final Office Action received for U.S. Appl. No. 10/348,687, mailed on Feb. 1, 2008, 9 pages.
Response to Final Office Action (Feb. 1, 2008), received for U.S. Appl. No. 10/348,687, filed Apr. 1, 2008, 13 pages.
Ex Parte Quayle Action received for U.S. Appl. No. 10/348,687, mailed on Jul. 25, 2008, 4 pages.
Response to Ex Parte Quayle Action (Jul. 25, 2008), received for U.S. Appl. No. 10/348,687, filed Aug. 19, 2008, 3 pages.
Response to Non-Final Office Action (Feb. 16, 2007), received for U.S. Appl. No. 10/348,648, filed May 16, 2007, 80 pages.
Response to Final Office Action (Jul. 18, 2007), received for U.S. Appl. No. 10/348,648, filed Sep. 18, 2007, 10 pages.
Response to Ex Parte Quayle Action (Sep. 28, 2007) received for U.S. Appl. No. 10/348,648, filed Nov. 28, 2007, 10 pages.
Non Final Office Action received for U.S. Appl. No. 10/349,045, mailed on Nov. 30, 2004, 10 pages.
Response to Non Final Office Action (Nov. 30, 2004), received for U.S. Appl. No. 10/349,045, filed Feb. 28, 2005, 14 pages.
Final Office Action received for U.S. Appl. No. 10/349,045, mailed on Jun. 1, 2005, 9 pages.
Response to Final Office Action (Jun. 1, 2005), received for U.S. Appl. No. 10/349,045, filed Jul. 22, 2005, 8 pages.
Non Final Office Action received for U.S. Appl. No. 10/348,721, mailed on Apr. 6, 2007, 9 pages.
Response to Non Final Office Action (Feb. 8, 2009), received for U.S. Appl. No. 10/348,721, filed Jul. 20, 2009, 12 pages.
Response to Non Final Office Action (May 2, 2007), received for U.S. Appl. No. 10/349,739, filed on Jul. 2, 2007, 11 pages.
Response to Non Final Office Action (Sep. 14, 2007), received for U.S. Appl. No. 10/349,739, filed Nov. 16, 2007, 11 pages.
Response to Final Office Action (Feb. 1, 2008). received for U.S. Appl. No. 10/349,739, filed Mar. 13, 2008, 25 pages.
Response to Non-Final Office Action (Jul. 23, 2008), received for U.S. Appl. No. 10/349,739, filed Sep. 23, 2008, 16 pages.
Final Office Action received for U.S. Appl. No. 10/349,739, mailed on Jul. 2, 2009, 7 pages.
Final office Action received for U.S. Appl. No. 10/349,377, mailed on May 29, 2008, 9 pages.
Final Office Action received for U.S. Appl. No. 10/349,377, mailed on Oct. 16, 2007, 7 pages.
Non-Final Office Action received for U.S. Appl. No. 10/349,377, mailed on Apr. 30, 2007, 7 pages.
Non-Final Office Action Received for U.S. Appl. No. 10/349,377, mailed on Dec. 30, 2008, 7 pages.
Non-Final Office Action received for U.S. Appl. No. 10/349,377, mailed on Dec. 31, 2007, 7 pages.
Notice of Allowance Received for U.S. Appl. No. 10/349,045, mailed on Aug. 18, 2005, 4 Pages.
Advisory Action received for U.S. Appl. No. 10/348,642, mailed on Apr. 2, 2007, 3 Pages.
Response to Advisory action (Apr. 2, 2007), received for U.S. Appl. No. 10/348,642, filed Apr. 18, 2007, 10 Pages.
Advisory Action received for U.S. Appl. No. 10/348,721, mailed on Nov. 19, 2008, 3 Pages.
Notice of Allowance Received for U.S. Appl. No. 10/348,687, mailed on Oct. 8, 2008, 4 Pages.
Advisory Action received for U.S. Appl. No. 10/348,997, mailed on Oct. 19, 2007, 3 Pages.
Advisory Action received for U.S. Appl. No. 10/348,687, mailed on Nov. 8, 2007, 3 Pages.

(56) References Cited

OTHER PUBLICATIONS

Response to Advisory Action (Nov. 8, 2007), received for U.S. Appl. No. 10/348,687, filed Nov. 14, 2007, 2 Pages.
Advisory action received for U.S. Appl. No. 10/348,687, mailed on Apr. 17, 2008, 3 Pages.
Advisory Action Received for U.S. Appl. No. 10/349,739, mailed on Apr. 17, 2008, 2 Pages.
Non-Final Office Action Received for U.S. Appl. No. 09/195,846, mailed on Apr. 1, 2002, 12 Pages.
Notice of Allowance Received for U.S. Appl. No. 09/195,846, mailed on Dec. 3, 2002, 20 pages.
Response to Non-Final Office Action (Dated Apr. 1, 2002) received for U.S. Appl. No. 09/195,846, filed on Sep. 2, 2002, 36 pages.
Advisory Action Received for U.S. Appl. No. 10/348,721, mailed on Dec. 12, 2007, 3 pages.
Response to Final Office Action (Dated Feb. 1, 2008) and the subsequent Advisory Action (Dated Apr. 17, 2008) received for U.S. Appl. No. 10/349,739, filed on May 1, 2008, 21 pages.
Response to Final Office Action (Dated Sep. 20, 2007) and the subsequent Advisory Action (Dated Dec. 12, 2007) received for U.S. Appl. No. 10/348,721, filed on Dec. 13, 2007, 2 pages.
Advisory Action Received for U.S. Appl. No. 10/349,377, mailed on Aug. 22, 2008, 3 pages.
Response to Final Office Action (Dated May 29, 2008) and the subsequent Advisory Action (Dated Aug. 22, 2008) received for U.S. Appl. No. 10/349,377, filed on Aug. 28, 2008, 4 pages.
Notice of Allowability Received for U.S. Appl. No. 10/345,707, mailed on Jun. 2, 2008, 8 pages.
Response after Notice of Allowance (Rule 312) received for U.S. Appl. No. 09/195,846, filed on Jan. 20, 2003, 7 pages.
Response to Advisory Action (Dated Oct. 19, 2007) received for U.S. Appl. No. 10/348,997, filed on Dated Oct. 19, 2007, 7 pages.
Emulex Corporation'S Answer, Affirmative Defenses and Counterclaims, Case No. SACV 09-1058-NS (ANx), Nov. 4, 2009, 30 pages.
Amendment Submitted/Entered with Filing of CPA/RCE regarding U.S. Appl. No. 10/349,377 mailed Feb. 27, 2010.
Final Rejection regarding U.S. Appl. No. 10/349,377 mailed Jan. 28, 2010.
Examiner Interview Summary Record (PTOL-413) regarding U.S. Appl. No. 10/349,377 mailed Dec. 8, 2009.
Amendment Submitted/Entered with Filing of CPA/RCE regarding U.S. Appl. No. 10/349,739 mailed Feb. 27, 2010.
Final Rejection regarding U.S. Appl. No. 10/349,739 mailed Jan. 28, 2010.
Examiner Interview Summary Record (PTOL-413) regarding U.S. Appl. No. 10/349,739 mailed Dec. 8, 2009.
Amendment/Req. Reconsideration-After Non-Final Reject regarding U.S. Appl. No. 10/348,721 mailed Feb. 5, 2010.
Examiner Interview Summary Record (PTOL-413) regarding U.S. Appl. No. 12/149,373 mailed Dec. 9, 2009.
Amendment/Req. Reconsideration-After Non-Final Reject regarding U.S. Appl. No. 12/149,373 mailed Dec. 3, 2009.
Preliminary Amendment regarding U.S. Appl. No. 12/292,440 mailed Feb. 11, 2010.
Ex Parte Quayle Action regarding U.S. Appl. No. 10/345,707 mailed on Jul. 21, 2006.
Ex Parte Quayle Action regarding U.S. Appl. No. 10/345,707 mailed on Nov. 28, 2006.
Examiner Interview Summary Record regarding U.S. Appl. No. 10/345,707 mailed on Nov. 28, 2006.
Amendment Submitted/Entered with Filing of CPA/RCE regarding U.S. Appl. No. 10/349,377 mailed on Nov. 13, 2009.
Examiner Interview Summary Record regarding U.S. Appl. No. 10/349,377 mailed on Dec. 8, 2009.
Advisory Action regarding U.S. Appl. No. 10/349,739 mailed on Apr. 17, 2008.
Amendment/Req. Reconsideration-After Non-Final Reject regarding U.S. Appl. No. 10/349,739 mailed on Jun. 1, 2009.
Amendment Submitted/Entered with Filing of CPA/RCE regarding U.S. Appl. No. 10/349,739 mailed on Nov. 13, 2009.
Non-Final Rejection regarding U.S. Appl. No. 10/348,721 mailed on Nov. 5, 2009.
Pre-Brief Conference request regarding U.S. Appl. No. 10/348,997 mailed on Oct. 29, 2007.
Amendment/Req. Reconsideration-After Non-Final Reject regarding U.S. Appl. No. 10/348,997 mailed on Nov. 28, 2007.
Pre-Brief Appeal Conference decision regarding U.S. Appl. No. 10/348,997 mailed on Dec. 14, 2007.
Amendment/Req. Reconsideration-After Non-Final Reject regarding U.S. Appl. No. 12/149,373 mailed on Dec. 3, 2009.
Non-Final Rejection regarding U.S. Appl. No. 10/349,067 mailed on Apr. 6, 2007.
Amendment/Req. Reconsideration-After Non-Final Rejection regarding U.S. Appl. No. 10/349,067 mailed on Jul. 6, 2007.
Final Rejection regarding U.S. Appl. No. 10/349,067 mailed on Sep. 26, 2007.
Amendment After Final regarding U.S. Appl. No. 10/349,067 mailed on Nov. 26, 2007.
Notice of Allowance regarding U.S. Appl. No. 10/349,067 mailed on Dec. 10, 2007.
312 Examiner Approval regarding U.S. Appl. No. 09/195,846 mailed on Feb. 10, 2003.
Ex-Parte Quayle Action regarding U.S. Appl. No. 08/786,891 mailed on Feb. 22, 1999.
Ex-Parte Quayle Response regarding U.S. Appl. No. 08/786,891 mailed on Mar. 20, 1999.
Notice of Allowance regarding U.S. Appl. No. 08/786,891 mailed on Jun. 8, 1999.
Notice of Allowance regarding U.S. Appl. No. 09/395,644 mailed on Jul. 31, 2000.
Office Action regarding U.S. Appl. No. 09/395,644 mailed on Mar. 2, 2000.
Office Action Reply regarding U.S. Appl. No. 09/395,644 mailed on Jul. 2, 2000.
"Local Area Network Switch Frame Lookup Techniquefor Increased Speed and Flexibility", 700 IBM Technical Disclosure Bulletin vol. 38, No. 7, Armonk, NY, US, (Jul. 1995),pp. 221-222.
Chemarin, Alain et al., "A High-Speed CMOS Circuit for 1.2-Gb/S 16 x 16 ATM Switching", 8107 IEEE Journal of Solid-State Circuits, vol. 27, No. 7, NewYork, US, (Jul. 1992), 1116-1120.
Cisco Systems, Inc., "Catalyst 8500 CSR Architecture", White paper XP-002151999, (1998), 1-19 pages.
Denzel, W. E., et al., "A Flexible Shared-Buffer Switch for ATM at Gb/s Rates", Computer Networks and ISDN Systems, North Holland Publishing, Amsterdam, NL, vol. 24 (4), XP000600212; ISSN 01697552,(1995), 611-624.
Kondoh, Harufusa et al., "A 622-Mb/s 8 x 8 ATMSwitch Chip Setwith Shared Multibuffer Architecture", 8107 IEEE Journal of Solid-State Circuits, vol. 28, No. 7, NewYork, US, (Jul. 1993), pp. 808-814.
Lee, Liang-Teh et al., "A High Speed Factorial Style Memory Switch Architecture", IEICE Transactions on Communications, Institute of Electronics Information and Comm. Eng., Tokyo, Japan, vol. E81-B (2), XP000178251; ISSN 0916-8516, (Feb. 1, 1998), 164-174.
Lin, Yu-Sheng et al., "Queue Management for shared buffer and shared multi-buffer ATM switches", Department of electronics engineering & institute of electronics, National ChiaoTung University, Hsinchu, Taiwan, R.O.C.,(Mar. 24, 1996), pp. 688-695.
Tanenbaum, A. S., "Computer Networks", Prentice-Hall Int., USA, XP-002147300, Sec.5.2-Sec.5.3, Routing Algorithms and Congestion Control Algorithms,(1998), pp. 309-320.
"Alacritech Ships Industry's First Gigabit Ethernet Accelerator" Press Release, Oct. 22, 2001, 3 pages.
"B-IDSN ATM layer cell transfer performance," ITU-T Recommendation I.356, Oct. 1996, 54 pages.
"Catalyst 8500 CSR Architecture," Cisco Systems, 1998, White Paper XP-002151999, pp. 1-19.
"Congestion Management for the ISDN Frame Relaying Bearer Service," CCITT Recommendation I.370, 1991, 12 pages.
"Fibre Channel—Arbitrated Loop (FC-AL)" 2001, American National Standard ANSI INCITS 272-1996 (R2001), 102 pages.

(56) References Cited

OTHER PUBLICATIONS

"Fibre Channel Arbitrated Loop (FC-AL) Rev. 4.5," Jun. 1, 1995 American National Standard ANSI X3.272-199x, X3T11/Project 960D/ Rev. 4.5.
"Fibre Channel Fabric Loop Attachment (FC-FLA) Rev. 2.7" Aug. 12, 1997. American National Standard ANSI TR-20-199x, T11/Project 1235-DT/Rev. 2.7, 136 pages.
"Fibre Channel Physical and Signaling Interface (FC-PH) Rev. 4.3" Jun. 1, 1994, American National Standard Ansi X3.230-199x, X3T11/Project 755D/Rev. 4.3, 478 pages.
"Fibre Channel Physical and Signalling Interface—2 (FC-PH-2) Rev. 7.4," Sep. 10, 1996American National Standard ANSI X3.297-1996, X3T11/Project 901D/Rev 7.4, 187 pages.
"Integrated Services Digital Network (ISDN) Digital Subscriber Signalling System No. 1 (DSS 1)—Signalling Specifications for Frame Mode Switched and Permanent Virtual Connection Control and Status Monitoring," ITU-T Recommendation Q.933, Oct. 1995, 119 pages.
"Interface between Data Terminal Equipment (DTE) and Data Circuit-terminating Equipment (DCE) for public networks providing frame relay data transmission service by dedicated circuit, Amendment 3: Frame discard priority, service classes, NSAP signaling and protocol encapsulation," ITU-T Recommendation X.36 Amendment 3, Sep. 1998, 25 pages.
"Interface between Data Terminal Equipment (DTE) and Data Circuit-terminating Equipment (DCE) for public networks providing frame relay data transmission service by dedicated circuit," ITU-T Recommendation X.36 , Mar. 2000, 161 pages.
"Interface Between Data Terminal Equipment (TDE) and Data Circuit-Terminating Equipment (DCE) for Terminals Operating in the Packet Mode and Connected to Public Data Networks by Dedicated Circuit," ITU-T Recommendation X.25, Mar. 1993, 162 pages.
"Interface Between Data Terminal Equipment (TDE) and Data Circuit-Terminating Equipment (DCE) for Public Data Networks Providing Frame Relay Data Transmission Service by Dedicated Circuit," ITU-T Recommendation X.36, Apr. 1995, 61 pages.
"Interface Between Data Terminal Equipment (TDE) and Data Circuit-Terminating Equipment (DCE) for Public Data Networks Providing Frame Relay Data Transmission Service by Dedicated Circuit, Amendment 1: Switched Virtual Circuit (SVC) signaling and refinements of Permanent Virtual Circuit (PVC) signalling" ITU-T Recommendation X.36, Amendment 1, Oct. 1996, 81 pages.
"ISDN Data Link Layer Specification for Frame Mode Bearer Services," CCITT Recommendation Q.922, 1992, 112 pages.
"Local Area Network Switch Frame Lookup Technique for Increased Speed and Flexibility," IBM Technical Disclosure Bulletin, Jul. 1995, vol. 38, No. 7, pp. 221-222.
"The Frame Relay Forum PVC User-to-Network Interface (UNI) Implementation Agreement FRF 1.2," Frame Relay Forum Technical Committee, Jul. 2000, 24 pages.
"The Frame Relay Forum SVC User-to-Network Interface (UNI) Implementation Agreement FRF 4. 1," Frame Relay Forum Technical Committee, Jan. 2000, 36 pages.
"Transmission Control Protocol—DARPA Internet Program Protocol Specification," Information Sciences Institute, Sep. 1981, RFC 793, 89 pages.
3G TS 23.228 V2.0.0 (Mar. 2001) 3rd Generation Partnership Project, Technical Specification Group Services and System Aspects; IP Multimedia (IM) Subsystem—Stage 2, 127 pages.
Agazzi, et al., "DSP-Based Equalization for Optical Channels—Feasibility of a LVSI Implementation," Broadcom, IEEE 802.3ae Meeting , Sep. 2000, 39 pages.
Agazzi, et al., "Interim Observations on Multimode Optical Channels," Broadcom, IEEE 802.3ae Equalization Ad Hoc, Nov. 5, 2000, 29 pages.
Agazzi, et al., "Measurement of Non-Stationarity of 10-Gb/s Multimode Fiber Links," Nov. 24, 2000, 5 pages.
Agazzi, et al., "Measurements of DMD-Challenged Fibers at 3.125Gb/s." Broadcom, IEEE 802.3ae Equalization Ad Hoc, Jan. 10, 2001, 33 pages.
Agazzi, O., "A Link Model for Equalized Optical Receivers," Broadcom, IEEE 802.3ae Equalization Ad Hoc, Mar. 11, 2001, 30 pages.
Alacritech, Hardware Installation Guide Alacritech 100x4 Quad-Port Server Adapter Alacritech 100x2 Dual-Port Server Adapter Alacritech 100x1 Single-Port Server Adapter, 2000-2002, 19 pages.
Alacritech, User's Guide Alacritech 100x4 Quad-Port Server Adapter Alacritech 100x2 Dual-Port Server Adapter, 2000, 46 pages.
Alacritech, User's Guide Alacritech 100x4 Quad-Port Server Adapter Alacritech 100x2 Dual-Port Server Adapter Alacritech 100x1 Single-Port Server Adapter, 2000, 50 pages.
Allam, et al., "Dynamic Current Mode Logic (DyCML), A New Low-Power High-Performance Logic Family," IEEE Custom Integrated Circuits Conference, 2000, pp. 421-424.
Allam, et al., "Low Power CMOS Logic Families," IEEE Computer Society, 1999, pp. 419-422.
Allstot, D., "Low Noise Digital Logic Techniques," IEEE, 1991, T13-1.1.
Allstot, et al, "Analog Logic Techniques Steer Around the Noise," IEEE, Circuits and Designs, Sep. 1993, pp. 18-21.
Allstot, et al., "Current-Mode Logic Techniques for Cmos Mixed-Mode ASIC's," IEEE Custom Integrated Circuits Conference, 1991, pp. 25.2.1-25.2-4.
Allstot, et al., "Folded Source-Coupled Logic vs. CMOS Static Logic for Low-Noise Mixed-Signal ICs," IEEE Transactions on Circuits and Systems-I: Fundamental Theory and Applications, Sep. 1993, vol. 40, No. 9, pp. 553-563.
Ang, "An Evaluation of an Attempt at Offloading TCP/IP Protocol Processing onto an i960-based iNIC," Hewlett Packard Company, Jan. 2001.
Annamalai, K., "Multi-Ported PCI-to_PCI Bridge Chip," IEEE, 1997, pp. 426-433.
Apostolov, et al., "Network Interface Modules for Microprocessor Relays Integration into a Substation Automation System," Developments in Power System Protection, Mar. 1997, pp. 309-312.
ARM 710T Datasheet, Jul. 1998, Document No. ARM DDI 0086B, 150 pages.
ATAC, et al., "Crossbar Switch Backplane and its Application," Fermi National Accelerator Laboratory, Nov. 1988, Fermilab-Conf-88/166.
Atkinson, et al., "A Single Chip Radio Transceiver for DECT," IEEE, 1997, pp. 840-.
Bailey, et al., "TCP ULP Framing Protocol (TUF) draft-ietf-tsvwg-tcp-ulp-frame-01" Transport Area Working Group, May 2002, 30 pages.
Baker, et al., CMOS Circuit Design, Layout, and Simulation, IEEE Press 1998, Chapter 16, BiCMOS Logic Gates, pp. 313-330.
Baumert, et al., "A Monolithic 50—200 MHz CMOS Clock Recover and Retiming Circuit," IEEE Custom Integrated Circuits Conference, 1989.
Baumgartner, et al., "The User Programmability of a Multimedia Workstation for Fast Packet Networks," Global Telecommunications Conference, 1988, pp. 1-6, vol. 1.
Broadcom BCM5500 Product Brief, 1999.
Broadcom BCM8010 Product Brief, 2000.
Buhanan, D., "CML and flip TAB join forces in the DPS 88's micropackages," Electronics, Nov. 1982, pp. 93-96.
Buonadonna, et al., "Queue-Pair IP: A Hybrid Architecture for System Area Networks," Intel Corporation, Mar. 2002, 12 pages.
Cao, et al., "OC-192 Receiver in Standard 0.18 µm CMOS," IEEE International Solid State Circuits Conference 2002, Session 15, Gigabit Communications, Paper 15.2—Visuals Supplement.
Cao, et al., "OC-192 Receiver in Standard 0.18 µm CMOS," IEEE International Solid State Circuits Conference 2002, Session 15, Gigabit Communications, Paper 15.2.
Cao, et al., "OC-192 Transmitter and Receiver in Standard 0.18-µm CMOS," IEEE Journal of Solid State Circuits, Dec. 2002, vol. 37, No. 12, p. 1768-1780.
Chang, et al., "A 2-Gb/s Asymmetric Serial Link for High-Bandwidth Packet Switches," 1997, 9 pages.
Chang, K., "Design of a CMOS Asymmetric Serial Link," A Dissertation submitted to Stanford University, Aug. 1999, 134 pages.

(56) References Cited

OTHER PUBLICATIONS

Chase, "End-System Optimizations for High-Speed TCP," http://www.cs.duke.edu/ari/publications/end-system.pdf, 2000, 9 pages.
Chemarin, et al., "A High Speed Cmos Circuit for 1.2-Gb/s 16x16 ATM Switching," IEEE Journal of Solid State Circuits, Jul. 1992, vol. 27, No. 7, pp. 116-1120.
Chen, et al., "A 1.25Gb/s, 460mW CMOS Transceiver for Serial Data Communication," IEEE International Solid State Circuits Conference 1997, Session 15, Serial Data Communications, Paper FP 15.3.
Chen, et al., "A Single-Chip 266Mb/s CMOS Transmitter/Receiver for Serial Data Communications," IEEE International Solid State Circuits Conference 1993, Session 6, Broadband Data Communications, Paper TA 6.3.
Cherkasova, et al., "Designing Fibre Channel Fabrics," IEEE 1996, pp. 346-351.
Cherkasova, et al., "Fibre Channel Fabrics: Evaluation and Design," Proceedings of the 29th Annual Hawaii International Conference on System Sciences, 1996, pp. 53-62.
Chu, "A Comparison of CMOS Circuit Techniques: Differential Cascode Voltage Switch Logic Versus Conventional Logic," IEEE Journal of Solid State Circuits, Aug. 1987, vol. SC-22, No. 4, pp. 528-532.
Comer, D., "A CMOS Phase Detector for Mixed Signal ASIC Application," 6th Annual IEEE Intenatonakl Asic Conference and Exhibit, 1993, pp. 232-234.
Conroy, et al., "An 8-b 85-MS/s Parallel Pipeline A/D Converter in 1-μm CMOS," IEEE Journal of Solid-State Circuits, Apr. 1993, vol. 28, No. 4, pp. 447-455.
Cooper, et al., "Protocol Implementation on the Nectar Communication Processor," Computer Communication Review, 1990, vol. 20, No. 4, pp. 135-144.
Current, K., "Current-Mode CMOS Multiple-Valued Logic Circuits," IEEE Journal of Solid-State Circuits, Feb. 1994, vol. 29, No. 2, pp. 95-.
Dally, et al., "Transmitter Equalization for 4Gb/s Signalling," Proc. of Hot Interconnects 1996, Stanford University, 10 pages.
Dally, et al., Digital Systems Engineering, Cambridge University Press, 1998, pp. 199, 205, 531, 539, 544, 547, 548, 563, 594, 604, 605, 616.
Dally, W., "Virtual-Channel Flow Control," IEEE Transactions on Parallel and Distributed Systems, Mar. 1992, vol. 3, No. 2, pp. 194-205.
Denzel, et al., "A Flexible shared-buffer switch for ATM at GB/s rates," Computer Networks and ISDN Systems, 1995, vol. 27, pp. 611-624.
Djahanshahi, et al., "High-Speed ECL-Compatible Serial I/O in 0.35 μm CMOS," IEEE 1998, pp. 59-.
Dunkels, A., "Minimal TCP/IP implementation with proxy support," SICS Technical Report, Feb. 2001.
Dunlop, et al., "A 9 Gbit/s Bandwidth Multiplexer/Demultiplexer CMOS Chip," Symposium on VLSI Circuits Digest of Technical Papers, 1992, pp. 68-69.
Dunlop, J., "Techniques for the integration of packet voice and data on IEEE 802.3 LANs," Computer Communications, Oct. 1989, vol. 12, No. 5, pp. 273-280.
Ellersick, et al., "A Serial Link Transceiver Based on 8GSample/s A/D and D/A Converters in 0.25 μm CMOS," 2001 IEEE International Solid State Circuits Conference, Session 4, High Speed Digital Interfaces, 4.1.
Ellersick, et al., "GAD: A 12-GS/s SMOS 4-bit A/D Converter for an Equalized Multi-Level Link," 1999 Symposium on VLSI Circuits Digest of Technical Papers, pp. 49-54.
Elmasry, M. "Nanosecond NMOS VLSI Current Mode Logic," IEEE Journal of Solid-State Circuits, Apr. 1982, vol. SC-17, No. 2, pp. 411-414.
Elrabaa, et al., "Multiemitter BiCMOS CML Circuits," IEEE Journal of Solid State Circuits, Mar. 1992, vol. 27, No. 3, pp. 454-458.
Elrabaa, et al., "Optimization of Digital BiCMOS Circuits, An Overview," IEEE 1992, pp. 571-574.

Elz, et al., "Serial Number Arithmetic," http://tools.ietf.org/html/rfc1982, Aug. 1996.
Emulex Corporation's Answer, Affirmative Defences and Counterclaims, Broadcom Corp v. Emulex Corp, Case 8:09-cv-01058-JVS-AN, Nov. 4, 2009, 30 pages.
Ewen, et al., "CMOS circuits for Gb/s serial data communication," IBM J Res Develop, Jan./Mar. 1995, vol. 39, No. 12, pp. 73-81.
Ewen, et al., "Single-Chip 1062Mbaud CMOS Transceiver for Serial Data Communication," IEEE International Solid State Circuits Conference, 1995, Session 2, Data Communications, Paper WP 2.1.
Farjad-Rad, "A 0.3 μm CMOS 8-Gb/s 4-PAM Serial Link Tranceiver," 1999 Symposium on VLSI Circuits—Digest of Technical Papers, 1999 <http://vlsiweb.stanford.edu/papers/rfr_vlsi_99.pdf>.
Farjad-Rad, et al., "A 0.4 μm CMOS 10-Gb/s 4-PAM Pre-Emphasis Serial Link Transmitter," IEEE Journal of Solid State Circuits, May 1999, vol. 34, No. 5, pp. 580-585.
Ferrari, et al., "A Scheme for Teal-Time Channel Establishment in Wide-Area Networks," IEEE Journal on Selected Areas in Communications, Apr. 1990, vol. 8, No. 3, pp. 368-379.
Fettweis, et al., "Parallel Viterbi Algorithm Implementation: Breaking the ACS-Bottleneck," IEEE Transactions on Communications, Aug. 1989, vol. 37, No. 8, pp. 785-790.
Fiedler, et al., "A 1.0625Gbps Transceiver with 2x-Oversampling and Transmit Signal Pre-Emphasis," IEEE International Solid State Circuits Conference, 1997, Session 15, Serial Data Communications, Paper FP 15.1.
Fiedler, et al., "A CMOS Pulse Density Modulator for High-Resolution A/D Converters," IEEE Journal of Solid State Circuits, Dec. 1984, vol. SC-19, No. 6, pp. 995-996.
Fischer, J., "CiNIC—Calpoly Intelligent NIC," Thesis California Polytechnic San Luis Obispo, Jun. 2001, 148 pages.
Fraser, A., "Datakit—A Modular Network for Synchronous and Asynchronous Traffic," International Conference on Communications, Jun. 1979, pp. 20.1.1-20.1.3.
Frazier, H., "The 902.3z Gigabit Ethernet Standard," IEEE Network, May/Jun. 1998, pp. 6-7.
Friedman, et al., "A Baseband Processor for IS-54 Cellular Telephony," IEEE Journal of Solid-State Circuits, May 1996, vol. 31, No. 5, pp. 646-655.
Fu, et al., "A Digital Background Calibration Technique for Time-Interleaved Analog-to-Digital Converters," IEEE Journal of Solid State Circuits, 1998, pp. 1904-1912.
Giaretta, et al., "Adaptive Equalization of DMD Challenged Multimode Fiber at 1300 nm," IEEE P802.3ae Plenary, Mar. 11, 2011.
Fujimori, et al., "A 90-dB SNR 2.5-MHz Output-Rate ADC Using Cascaded Multibit Delta-Sigma Modulation at 8X Oversampling Ratio," IEEE Journal of Solid State Circuits, Dec. 2000, vol. 35, No. 12, pp. 1820-1828.
Fujimori, et al., "A 90-dB SNR, 2.5-MHz Output-Rate ADC Using Cascaded Multibit ΔΣ Modulation at 8X Oversampling Ratio," IEEE International Solid State Circuits Conference, 2000, Session 20, Oversampling Converters, Paper WA 20.3.
Fukaishi, et al., "A 2.125-Gb/s BiCMOS Fiber Channel Transmitter for Serial Data Communications," IEEE Journal of Solid State Circuits, Sep. 1999, vol. 34, No. 9, pp. 1325-1330.
Fukaishi, et al., "A 2.125-Gb/s BiCMOS Fiber Channel Transmitter for Serial Data Communications," IEEE BCTM 8.2, 1998, pp. 140-143.
Fukaishi, et al., "A 4.25-Gb/s CMOS Fiber Channel Transceiver with Asynchronous Tree-Type Demultiplexer and Frequency Conversion Architecture," IEEE Journal of Solid State Circuits, Dec. 1998, vol. 33, No. 12, pp. 2139-2147.
Gallatin, et al., "Trapeze/IP: TCP/IP at Near-Gigabit Speeds," The Usenix Association, 1999.
Gerla, et al., "Flow Control: A Comparative Survey," IEEE Transactions on Communications, Apr. 1980, vol. COM-28, No. 4, pp. 553-574.
Green, et al., "OC-192 Transmitter in Standard 0.18 μm CMOS," IEEE International Solid State Circuits Conference 2002, Session 15, Gigabit Communications, Paper 15.1—Visuals Supplement.

(56) References Cited

OTHER PUBLICATIONS

Green, et al., "OC-192 Transmitter in Standard 0.18 μm CMOS," IEEE International Solid State Circuits Conference 2002, Session 15, Gigabit Communications, Paper 15.1.
Guizani, M., "pc-Compatible Optical Data Acquisition Unit," IMTC, May 1994, 4 pages.
Haagens, et al., "TCP ULP Message Framing iSCSI Framing," Dec. 15, 2000, 20 pages.
Haagens, R., "TCP ULP Message Framing iSCSI Framing," May 10, 2001, 26 pages.
Hairapetian "Multibit Sigma-Delta Modulator with Reduced Sensitivity to DAC Nonlinearity," Electronics Letters, May 23, 1991, vol. 27, No. 17, pp. 990-991.
Hairapetian, A. "An 81-MHz IF Receiver in CMOS," IEEE Journal of Solid State Circuits, Dec. 1996, vol. 31, No. 12.
Hairapetian, et al., "Low-Temperature Mobility Measurements on CMOS Devices," IEEE Transactions on Electron Devices, Aug. 1989, vol. 36, No. 8, pp. 1448-1455.
Hansen, et al., "Clock-and Data-Recovery IC with Demultiplexer for a 2.5 GB/S ATM Physical Layer Controller," IEEE 1996, pp. 125-128.
Hanyu, et al., "Low-Power Multiple Valued Current Mode Integrated Circuit with Current Source Control and Its Application," IEEE 1997, pp. 413-418.
Harrold, S., An Introduction to GaAs IC Design, Prentice Hall, 1993, pp. 43-45, 63.
Hauenschild, et al., "A 100Gb/s BiCMOS Clock and Data Recovering 1:4 Demultiplexer in a Standard Plastic Package with External VCO," IEEE International Solid State Circuits Conference, 1996, Session 12, Serial Data Communications, Paper FP 12.5.
Haug, et al., "RS/6000 7044 Model 170 Technical Overview and Introduction," IBM, Feb. 24, 2000, 16 pages.
Heimsch, et al., "Merged CMOS/Bipolar Current Switch Logic (MCSL)," IEEE Journal of Solid State Circuits, Oct. 1989, vol. 24, No. 5, pp. 1307-.
Heller, et al., "Cascode Voltage Switch Logic: A Differential CMOS Logic Family," IEEE International Solid State Circuits Conference, 1984, Session 1, Custom and Semi-Custom Design Techniques, Paper WAM 1.3.
Hine, et al., "A Compact, Terabit-Class ATM Switching Fabric Using a 20-Gb/s Subnetwork LSI and Free-Space Optical Connections," XVI World Telecom Congress Proceedings, 1997, Interactive Session 2, System Architecture, pp. 223-229.
Hodges, et al., Analysis and Design of Digital Integrated Circuits, McGraw-Hill Book Company, 1983, pp. 271-283.
Ida, et al', "A 4-Gbits/s GaAs 16:1 Multiplexer/1:16 Demultiplexer LSI Chip," IEEE Journal of Solid State Circuits, Aug. 1989, vol. 24, No. 4, pp. 928-932.
IEEE 802.3ae 10Gb/s Task Force May 2000 Interim Meeting Agenda.
IEEE Link Task Force Autodetect: Specification for NWay Autodetect, Version 1.0, Apr. 10, 1994 National Semiconductor, 60 pages.
IEEE Standards for Local and Metropolitan Area Networks: Supplements to Carrier Sense Multiple Access with Collision Detection (CSMA/CD) Access Method and Physical Layer Specifications—Specification for 802.3 Full Duplex Operatoin and Physical Layer Specification for 100 Mb/s Operation on Two Pairs of Category 3 or Better Balanced Twisted Pair Cable (100BASE-T2), 1997, 325 pages.
Iravani, et al., "Clock and Data Recovery for 1.25 Gb/s Ethernet Transceiver in 0.35 μm CMOS," IEEE Custom Integrated Circuits Conference, 1999, pp. 261-264.
Ishida, et al., "A 10-GHz 8-b Multiplexer/Demultiplexer Chip Set for the SONET STS-192 System," IEEE Journal of Solid State Circuits, Dec. 1991, vol. 26, No. 12, pp. 1936-1943.
Jenq, Y., "Digital Spectra of Nonuniformly Sampled Signals" A Robust Sampling Time Offset Estimation Algorithm for Ultra High-Speed Waveform Digitizers Using Interleaving IEEE Transactions on Instrumentation and Measurement, Feb. 1990, vol. 39, No. 1.
Kadambi, et al., Gigabit Ethernet: Migrating to High Bandwidth LANs, Prentice Hall, 1998, pp. 1-364.
Kaiserswerth, M., "The Parallel Protocol Engine," IEEE/ACM Transactions on Networking—TON , vol. 1, No. 6, pp. 650-663, 1993.
Kanno, et al., "Fiber-Optic Subcarrier Multiplexing Video Transport Employing Multilevel QAM," IEEE Journal on Selected Areas of Communications, Sep. 1990, vol. 8, No. 7, pp. 1313-1319.
Kasper, B., "Equalization of Multimode Optical Fiber Systems," The Bell System Technical Journal, Sep. 1982, vol. 61, No. 7, pp. 1367-1389.
Kasturia, et al., "Techniques for High-Speed Implementation of Nonlinear Cancellation," IEEE Journal on Selected Areas in Communications, Jun. 1991, vol. 9, No. 3, 7 pages.
Katevenis, et al., "Atlas I: a single-chip, gigabit ATM switch with HIC/HS links and multilane lane back-pressure," Microprocessors and Microsystems, 1998, vol. 21, pp. 481-490.
Katsu, et al., "A GaAs Monolithic Frequency Divider Using Source Coupled FET Logic," IEEE Electron Device Letters, Aug. 1982, vol. EDL-3, No. 8, pp. 197-199.
Katsu, et al., "A Source Coupled FET Logic—A New Current-Mode Approach to GaAs Logics," IEEE Transactions on Electron Devices, Jun. 1985, vol. ED-32, No. 6, pp. 1114-1118.
Kim, et al., "A 30 MHz High-Speed Analog/Digital PLL in 2 μm CMOS," IEEE International Solid State Circuits Conference, Feb. 1990, Session 6: High Speed Analog, TAM 6.4.
Kim, et al., "A 30-MHz Hybrid Analog/Digital Clock Recovery Circuit in 2- μm CMOS," IEEE Journal of Solid State Circuits, Dec. 1990, vol. 25, No. 6.
Kim, et al., "An 800Mbps Multi-Channel CMOS Serial Link with 3x Oversampling," IEEE Custom Integrated Circuits Conference, 1995.
Kisei, et al., "CMOS Source-Coupled Logic for Mixed-Mode VLSI," IEEE 1990.
Klose, et al., "Process-Optimization for sub-30ps BICMOS Technologies for Mixed ECL/CMOS Applications," IEEE, 1991, 4.2.1.
Kondoh, et al., "A 622-Mb/s 8x8 ATM Switch Chip Set with Shared Multibuffer Architecture," IEEE Journal of Solid State Circuits, Jul. 1993, vol. 28, No. 7, pp. 808-814.
Koufopavlou, et al., "Parallel TCP for High Performance Communication Subsystems" IEEE Global Telecommunications Conference, Dec. 1992, pp. 1395-1399.
Kurisu, et al., "2.8 Gb/s 176 mW Byte-Interleaved and 3.0 Gb/s 118 mW Bit-Interleaved 8:1 Multiplexers," IEEE International Solid State Circuits Conference, 1996, Session 7, ATM/Sonet, Paper FA 7.5.
Kurose, et al., Computer Networking: A Top-Down Approach Featuring the Internet, Addison Wesley Longman, 2001, pp. 453-465 and 13-29.
La Rue, et al., Gigabit Complementary HFET Communication Circuits: 16:1 Multiplexer, 1:16 Demultiplexer and 16x16 Crosspoint Switch, IEEE International Solid State Circuits Conference, 1996, Session 7, ATW/Sonet, Paper FA 7.6.
Lao, et al., "45 Gbit/s AIGaAs/GaAs HEMT multiplexer IC," Electronics Letters, Mar. 1997, vol. 33, No. 7, pp. 589-590.
Larsson, P., "A 2-1600MHz 1.2-2.5V CMOS Clock-Recovery PLL with Feedback Phase-Selection and Averaging Phase-Interpolation for Jitter Reduction," IEEE International Solid State Circuits Conference, 1999, Session 20, Paper WA 20.6.
Lee, et al., "A CMOS Serial Link for Fully Duplexed Data Communication," IEEE Journal of Solid State Circuits, Apr. 1995, vol. 30, No. 4, pp. 353-364.
Lee, et al., "A High Speed Factorial Style Memory Switch Architecture," IEICE Trans. Commun., Feb. 1998, vol. E81-B, No. 2, pp. 164-174.
Lenosky, et al., "Five Gb/s Multimode DMD at 850 nm: Real-Time Data and Equalizer Simulations," Mar. 11, 2011, 13 pages.
Lenosky, et al., "Measurements of DMD-Challenged Fibers at 850nm and 2Gb/s Data Rate," IEEE 802.3ae—Equalization Ad Hoc Group, Jan. 10, 2001, 21 pages.
Lenosky, T., "A Unified Method of Calculating PMD-induced Pulse Broadening," IEEE 802.3ae Ad Hoc Meeting, Nov. 5, 2000, 8 pages.

(56) References Cited

OTHER PUBLICATIONS

Leung, et al., "A set of Operating System Mechanisms to Support Multi-Media Applications," Digital Communications, 1988, pp. 71-76.

Leung, et al., "The Connector and Active Devices Mechanisms for Constructing Multimedia Applications," Proceedings of the 2nd Workshop on Workstation Operating Systems, 1989, pp. 68-72.

Lin, et al., "Performance of High-Speed Network I/O Subsystems: Case Study of a Fibre Channel Network," Supercomputing, Nov. 1994.

Lin, et al., "Queue Management for Shared Buffer and Shared Multi-buffer ATM Switches," Infocom Mar. 1996, pp. 688-695.

Luderer, et al., "A Virtual Circuit Switch as the Basis for Distributed Systems," Computer Communication Review, 1981, vol. 11, No. 4, pp. 164-179.

Maclean, et al., "An Outboard Processor for High Performance Implementation of Transport Layer Protocols," IEEE Global Telecommunications Conference, Dec. 1991, pp. 1728-1732.

Madhavan, et al., "Low-power 2.5 Gbit/s VCSEL driver in 0.5 µm CMOS technology," Electronics Letters, Jan. 1998, vol. 34 No. 2, pp. 178-179.

Malavalli, et al., "Distributed Computing with Fibre Channel Fabric," IEEE 1992m pp. 269-274.

Malavalli, K., "Fibre Channel Classes of Service for Data Transport," Brocade Communication Systems, Inc., 1997.

Maleki, et al., "Enhanced Source-Coupled Logic for Mixed-Mode VLSI Circuits," IEEE Transactions on Circuits and Systems—II Analog and Digital Signal Processing, Jun. 1992, vol. 39, No. 6, pp. 399-402.

Martin, et al., "Current-Mode Differential Logic Circuits for Low Power Digital Systems," IEEE 1997, pp. 183-186.

Messerschmitt, D. "Frequency Detectors for PLL Acquisition in Timing and Carrier Recovery," IEEE Transactions on Communications, Sep. 1979, vol. COM-27, No. 9, pp. 1288-1295.

Messerschmitt, D., "Synchronization in Digital System Design," IEEE Journal on Selected Areas in Communications, Oct. 1990, vol. 8, No. 8, pp. 1404-1449.

Mizuno, et al., "A GHz MOS Adaptive Pipeline Technique Using MOS Current-Mode Logic," IEEE Journal of Solid-State Circuits, Jun. 1996, vol. 31, No. 6, pp. 784-791.

Mohamadi, F., "A 10 Gbps (4x3.125 GBd) Transceiver", http://grouper.ieee.org/groups/802/3/ae/public/may00/mohamadi_1_0500.pdf, Feb. 2010.

Momtaz, et al., "A Fully Integrated Sonet OC-48 Transceiver in Standard CMOS," IEEE Journal of Solid State Circuits, Dec. 2001, vol. 36, No. 12, pp. 1964-1973.

Montessoro, et al., "A New Approach for Future Network Architectures Design," Proceedings of SSFRR 2001, International Conference on Advances in Infrastructure for Electronic Business, Science and Education on the Internet, Aug. 2001, Paper #1.

Mu, et al., "A 285 MHz 6-port Plesiochronous Router Chip with Non-Blocking Cross-Bar Switch," Symposium on VLSI Circuits Digest of Technical Papers, 1996, pp. 136-137.

Mudd, et al., "Very High Speed ECL/CML Gate Arrays with Submicron Structures," IEEE Colloquium on Sub-Micron Silicon Engineering, May 1989.

Musicer, et al., "MOS Current Mode Logic for Low Power, Low Noise Cordic Computation in Mixed-Signal Environments," Proceedings of the 2000 International Symposium on Low Power Electronics and Design, Jul. 2000, pp. 102-107.

Musicer, J., "An Analysis of MOS Current Mode Logic for Low Power and High Performance Digital Logic," Research Project, University of California at Berkeley, May 2000.

Nambu, et al., "A 1.8 ns. Access, 550MHz 4.5Mb CMOS SRAM," IEEE International Solid State Circuits Conference, 1998, Session 22, SRAM, Paper SP 22.7.

Navarro, et al., "Design of an 8:1 MUX at 1.7 Gbit/s in 0.8 µu CMOS Technology," Proceedings of the 8th Great Lakes Symposium on VLSI, Feb. 1998.

Nayfeh, et al., "Exploring the Design Space for a Shared-Cache Multiprocessor," IEEE 1994, pp. 166-175.

Newman, et al., "Flow Labelled IP: A Connectionless Approach to ATM," IEEE 1996, pp. 1251-1260.

Ng, et al., "CMOS Current Steering Logic for Low-Voltage Mixed-Signal Integrated Circuits," IEEE Transactions on Very Large Scale Integration (VLSI) Systems, Sep. 1997, vol. 5, No. 3, pp. 301-308.

Noureddine, et al., "Selective Back-Pressure in Switched Ethernet LANs," Global Telecommunications Conference—Globecom '99, 1999, pp. 1256-1263.

Ocheltree, et al., "A Comparison of Fibre Channel and 802 MAC Services," Proceedings 18th Conference on Local Computer Networks, Sep. 1993, pp. 238-246.

Oerder, et al., "VLSI Implementation of Synchronization Algorithms in a 100 MBit/s Digital Receiver," Globecom '90: IEEE Global Telecommunications Conference and Exposition, 1990, pp. 0589-0593.

Order Regarding Markman/Claim Construction Hearing, *Broadcom Corp v. Emulex Corp*, Case 8:09-cv-01058-JVS-AN, Document 261, Filed Dec. 17, 2010, 24 pages.

Oshima, et al., "A Single CMOS SDH Termination Chip for 622Mb/s STM-4C," IEEE International Solid State Circuits Conference, 1994, Session 10, Optical Communication, Paper TP 10.4.

Pedersen, et al., "A CMOS to 100K ECL Interface Circuit," IEEE International Solid State Circuits Conference, Feb. 1989, Session 15: High Speed Digital Circuits, Paper No FAM 15.3.

Pentium Processor Family User's Manual, vol. 1: Pentium Processor Family Data Book, Intel, 1994.

Personick, S., "Baseband Linearity and Equalization in Fiber Optic Digital Communication Systems," The Bell System Technical Journal, Sep. 1973, vol. 53, No. 7, pp. 1175-1195.

Petraglia, et al., "Analysis of Mismatch Effects Among A/D Converters in a Time-Interleaved Waveform Digitizer," IEEE Transactions on Instrumentation and Measurement, Oct. 1991, vol. 40, No. 3, pp. 831-835.

Pfennings, et al., "Differential Split-Level CMOS Logic for Subnanosecond Speeds," IEEE Journal of Solid State Circuits, Oct. 1985, vol. SC-20, No. 5, pp. 1050-1055.

Pinkerton, J. "The Case for RDMA," RDMA Consortium, May 2002.

Pope, et al., "Tip of the Week: Net-interface accelerators can help or hinder," Network Systems Design Line, Feb. 26, 2007, http://www.networksystemsdesignline.com/showArticle.jhtml;jsessionid=RWQOHQ3 . . . .

Quigley, et al., "Current Mode Transceiver Lofgic, (CMTL) for Reduced Swing CMOS, Chip to Chip Communication," IEEE 1993, pp. 452-455.

Raghavan, et al., "A Gigabyte-er-Second Parallel Fiber Optic Network Interface for Mutlimedia Applications," IEEE Network, Jan./Feb. 1999, pp. 20-28.

Rajagopal, et al., "IP and ARP over Fibre Channel," Network Working Group, Jun. 1999, Standards Track, 63 pages.

Ravindran, et al., "A Comparison of Blockign and Non-Blocking Packet Switching Techniques in Hierarchical Ring Networks," IEICE Transactions on Information and Systems, vol. E79-D, No. 8, Aug. 1996, pp. 1130-1138.

Rau, et al., "Clock/Data Recovery PLL Using Half-Frequency Clock," IEEE Journal of Solid State Circuitds, Jul. 1997, vol. 32, No. 7, pp. 1156-1159.

Raut, A., "Verification of a Transport Offload Engine," Thesis, Dec. 2002, University of Hawaii, 95 pages.

Research Solutions—Order Update, May 2010 Order # 1299453 (email).

Research Solutions—Order Update, May 2010, Order #1299454, 1299455 (email).

Rickard, W., "Fibre Channel Backbone -5 (FC-BB-5) Rev. 2.00", INCITS xxx-200x T11/Projected 1871-D/Rev. 2.00., (Jun. 4, 2009),180.

Rickard, W., "Fibre Channel as a Network Backbone," Weston '94. Western Electronic Show & Convention, Anaheim, CA Spet 1994, pp. 653-659.

Runge, et al., "5 Gbit/s 2:1 multiplexer fabricated in 0.35 µm CMOS and 3 Gbit/s 1:2 demultiplexer fabricated in 0.5 µm CMOS technology," Electronics Letters, Sep. 1999, vol. 35, No. 19, pp. 1631-1633.

(56) References Cited

OTHER PUBLICATIONS

Sachs, et al., "Fibre Channel and Related Standards," IEEE Communications Magazine, Aug. 1996.
Saez, et al., "Design Guidelines for CMOS Current Steering Logic," IEREE International Symposium on Circuits and Systems, Jun. 1997, pp. 1872-1875.
Sanchez, M., "Iterations in TCP/IP—Ethernet Network Optimization," Thesis, California Polytechnic State University, Jun. 1999, 169 pages.
Sansen, et al., Analog Circuit Design: Most RF Circuits, Sigma-Delta Converters and Translinear Circuits, Kluwer Academic Publishers, 1996.
Sapuntzakis, et al., "The case for RDMA," Internet Draft, Dec. 2000 http://suif.standard.edu/~csapuntz/draft-csapuntz-caserdma-oo.txt_, 13 pages.
Satran, et al., "iSCSI", IPS Internal Draft, Jan. 2002.
Satran, J. "Design Team Memo," Jul. 10, 2000, https://www.research.ibm.com/haifa/satran/ips/iSCSI-RDMA-memo.txt.
Savoj, et al., "A 10-Gb/s CMOS Clock and Data Recovery Circuit," 2000Symposium on VLSI Circuits Digest of Technical Papers, pp. 136-139.
Schmitt, et al., "*A Low Voltage CMOS Current Source,*" *1997 International Symposium on Low Power Electronics and Design*, 1997 pp. 110-113.
Schreier, et al., "Multibit Bandpass Delta-Sigma Modulators Using N-Path Structures," IEEE, 1992, pp. 593-596.
Seaman, et al., Integrated Service Mappings on IEEE 802 Networks, Network Working Group, May 2000, Standards Track, 17 pages.
Seifert, R., Gigabit Ethernet: Technology and Applications for High-Speed LANs, Addison Wesley, 1998, pp. 1-410.
Shivam, et al., "EMP: Zero-copy OS-bypass NIC-driven Gigabit Ethernet Message Passing," Proceedings of the 2001 ACM/IEEE conference on Supercomputing, 2001.
Sidiropoulos, et al., "A Semi-Digital DLL with Unlimited Phase Shift Capability and 0.08-400MHz Operating Range," International Solid State Circuits Conference, 1997, Paper SA 20.2.
Sidiropoulos, S., "High Performance Inter-Chip Signalling," Technical Report No. CSL-TR-98-760, Apr. 1998, 127 pages.
Sim, et al., "840 Mb/s CMOS Demultiplexed Equalizing Transceiver for DRAM-to-Processor Communication," 1999 Symposium on VLSI Circuits Digest of Technical Papers, pp. 23-24.
Somasekhar, et al., "Differential Current Switch Logic: A Low Power DCVS Logic Family," IEEE Journal of Solid-State Circuits, Jul. 1996, vol. 31, No. 7, pp. 981-991.
Suzuki, et al., "Synonym Hit RAM; A 500MHz 1.5ns CMOS SRAM Macro with 576b Parallel Comparison and Panty Check Functions," IEEE International Solid State Circuits Conference, 1998, Session 22, SRAM, Paper SP 22.1.
Tanabe, et al., "0.18-µm CMOS 10-Gb/s Multiplexer/Demultiplexer ICs Using Current Mode Logic with Tolerance to Threshold Voltage Function," IEEE Journal of Solid State Circuits, Jun. 2001, vol. 36, No. 6, pp. 988-996.
Tanabe, et al., "A 10Gb/s Demultiplexer IC in 0.18 µm CMOS Using Current Mode Logic with Tolerance to the Threshold Voltage Fluctuation," IEEE International Solid State Circuits Conference, 2000, Session 3, Paper MP 3.7.
Tanabe, et al., "A Single Chip 2.4Gb/s CMOS Optical Receiver IC with Low Substarte Crosstalk Preamplifier," IEEE International Solid State Circuits Conference, 1998, Session 19, Multi-Gigahertz Serial Data, Paper SA 19.2.
Tanenbaum, A., Computer Networks 3rd Edition, Prentice Hall, 1996, pp. 556-558.
Teow, K., "Definitions of Managed Object for Fabric Element in Fibre Channel Standard," Network Working Group, May 2000, Standards Track, 48 pages.
The ATM Forum Technical Committee "Traffic Management Specification," Mar. 1999, Version 4.1 AF-TM-0121.000.
Thompson, et al., "A 300-MHz BiCMOS Serial Data Transceiver," IEEE Journal of Solid State Circuits, Mar. 1994, vol. 29, No. 3, pp. 185-192.

Turner, et al., "A Network Architecture Packet for Integrated Services," Globecom '93: IEEE Global Telecommunications Conference, Dec. 1983, pp. 45-50.
Varvarigos, et al., "The Ready-to-Go Virtual Circuit Protocol: A Loss-Free Protocol for Multigigabit Networks Using Fifo Buffers," IEEE/ACM Transactions on Networking, Oct. 1997, vol. 5, No. 5, pp. 705-718.
Vixel Corporation, "Mercury Low Level Documentation," Rev. 2, Mar. 1998, 32 pages.
Vorenkamp, et al., "Analog Interface for 10 Gb/s Ethernet," Broadcom, Mar. 2000.
Wang, et al., "Performance Analysis of an Echo-Cancellation Arrangement that Compensates for Frequency Offset in the Far Echo," IEEE Transactions on Communications, Mar. 1988, vol. 36, No. 3, pp. 364-372.
Widmer, et al., "Single-Chip 4 X 500-MBd CMOS Transceiver," IEEE Journal of Solid-State Circuits, Dec. 1996, vol. 31, No. 12, pp. 2004-2014.
Widmer, et al., "Single-Chip 4x500Mbaud CMOS Transceiver," IEEE International Solid State Circuits Conference, 1996, Session 7, ATM/Sonet, paper FA 7.7.
Wilkinson, B., "On Crossbar Switch and Multiple Bus Interconnection Networks with Overlapping Connectivity," IEEE Transactions on Computers, Jun. 1992, vol. 41, No. 6, pp. 738-746.
Williamson, et al., "Effects of Crosstalk in Demultiplexers for Photonic Analog-to-Digital Converters," Journal of Lightwave Technology, Feb. 2001, vol. 19, No. 2, pp. 230-.
Winters, et al., "Reducing the Effects of Transmission Impairments in Digital Fiber Optic Systems," IEEE Communications Magazine, Jun. 1993, pp. 68-.
Wright, et al., TCP/IP Illustrated, vol. 2 The Implementation, Addison-Wesley, 1995, pp. 790-840.
Xiao, et al., "Parallel Routing Table Computation for Scalable IP Routers," Michigan State University, 1998, pp. 144-158.
Yamashina, et al., "A Low-Supply Voltage GHz MOS Integrated Circuit for Mobile Computing Systems," IEEE Symposium on Low Power Electronics, 1994, pp. 80-81.
Yamashina, et al., "An MOS Current Mode Logic (MCML) Circuit for Low-Power Sub-GHz Processors," IEICE Trans Electron, Oct. 1992, vol. E75-C, No. 10, pp. 1181-1187.
Yamashina, et al., "An MOS Current Mode Logic (MCML) Circuit for Low-Power GHz Processors," NEC Res & Develop, Jan. 1995, vol. 36, No. 1, pp. 54-63.
Yang, et al., "A 0.8-µm CMOS 2.5 Gb/s Oversampling Receiver and Transmitter for Serial Links," IEEE Journal of Solid State Circuits, Dec. 1996, vol. 31, No. 2, pp. 2015-2023.
Yee, et al., "An Integratable 1-2.5Gbps Low Jitter CMOS Transceiver with Built in Self Test Capability," 1999 Symposium on VLSI Circuits Digest of Technical Papers, pp. 45-46.
Yeh, et al., "Introduction to TCP/IP Offload Engine (TOE)," Version 1, Apr. 2002.
Yuen, et al., "An ECL Gate Array with 2.5 GHz Embedded PLL," IEEE 1993, pp. 199-202.
Yeung, et al., "A 2.4 Gb/s/pin Simultaneous Bidirectional Parallel Link with Per Pin Skew Compensation," IEEE International Solid State Circuits Conference, 2000, Session 15, Paper 15.5.
Yoon, et al., "Front-End CMOS Chipset for Fiber-Based Gigabit Ethernet," IEEE, 1998, pp. 188-191.
Yoshida, et al., "Low-power-consumption 10-Gbps GaAs 8:1 Multiplexer/1:8 Demultiplexer," IEEE 1997, pp. 113-116.
Zhang, et al., "RSVP: A New Resource Reservation Protocol," IEEE Communications Magazine, May 2002, pp. 116-127 (Originally published in IEEE Network Magazine, Sep. 1993, vol. 7, No. 5).
Johnson, et al., "Improved Doppler Tracking and Correction for Underwater Acoustic Communications," IEEE International Conference on Acoustic Speech and Signal Processing, 1997, pp. 575-578.
Olmos, et al., "Design and Implementation of a Wide-Band Real-Time Mobile Channel Emulator," IEEE Transactions on Vehicular Technology, May 1999, vol. 48, No. 3.
Saez, et al., "CMOS Current Steering Logic: Toward a Matured Technique for Mixed-Mode Applications," IEEE 1997 Custom Integrated Circuits Conference, pp. 349-352.

\* cited by examiner

ROUTING ALGORITHM

| VALUE | STATE | DESCRIPTION |
|---|---|---|
| 0x00 | LPSM_MON | MONITORING STATE DATA FROM THE LOCAL RECEIVE PORT IS BYPASSED ONTO THE LOCAL LOOP. |
| 0x01 | LPSM_BSY | LOCAL CONVERSATION HAS BEEN DETECTED BY EITHER RECEIVING A LOCALLY ADDRESSED OPN OR AN RRDY PRIMITIVE. |
| 0x02 | LPSM_ARB | ARBITRATION STATE REMOTE REQUEST HAS INITIATED UNFAIR ARBITRATION OF THE LOCAL LOOP. |
| 0x03 | LPSM_RELOPN | GRANT HAS BEEN RECEIVED FROM REMOTE DESTINATION AND OPN IS BEING RELEASED ONTO THE TRANSMIT DATA BUS. |
| 0x04 | LPSM_OPN | LOCALLY TRAPPED OPN. WAITING FOR STATUS FROM THE PORTMUX INDICATING EITHER LOCAL AL_PD OR REMOTE GRANT/DENY. |
| 0x05 | LPSM_CON | CONNECTED STATE EITHER CONNECTED AS TARGET (FROM ARB) OR INITIATOR FROM (OPN/RELOPN). |
| 0x06 | LPSM_CLSING | RECEIVED CLS FROM LOCAL NL-PORT. WAITING FOR REMOTE CLS. |
| 0x07 | LPSM_CLSED | RECEIVED CLS FROM REMOTE NL-PORT. WAITING FOR LOCAL CLS. |
| 0x08 | LPSM_LIP | RECIEVED LIP. WAITING FOR BACKPLANE HUB TOKEN IN ORDER TO SAFELY COLLAPSE INTO HUB MODE. |

| VALUE | STATE | DESCRIPTION |
|---|---|---|
| 0x09 | LPSM_HUB | HUB MODE PORT 0 BACKPLANE RECEIVE PORT NAILED TO HUB CHANNEL PORT 1 DAISY CHAINED BETWEEN PORT 0 AND PORT 2. PORT 2 TRANSMIT CHANNEL IS NAILED TO HUB CHANNEL. |
| 0x0a | LPSM_LOCKED | INTERMEDIATE STATE BETWEEN HUB MODE AND SWITCH MODE. LOCAL LOOP IS LOCKED WITH ARB(0). |
| 0x0b | LPSM_BRDCST | BROADCAST DETECTED. WAITING FOR BROADCAST DATA FROM BROADCAST SERVER. |
| 0x0c | LPSM_WAIT | WAIT STATE USED FOR CLS SEQUENCE IN DUAL-SIMPLEX. |
| 0x0d | LPSM_GENCLS | SYNTHESIZE CLS PRIMITIVE. |
| 0x0e | LPSM_RCVCLS | WAIT FOR CLS FROM LOCAL NL-PORT DURING ARTIFICIALLY GENERATED CLOSE SEQUENCE. |
| 0x0f | LPSM_BSYOPN | RELEASE TRAPPED OPN WHEN IT HAS BEEN DETERMINED THAT AL-PD IS LOCAL. |

PREFERRED LPSM STATE MACHINE STATES

FIG. 11

| INPUT WORD | PRESENT STATE | | |
|---|---|---|---|
| | ARB(F7) | ARB(F0) | IDLE |
| ARB(F7) | ARB(F7) | ARB(F0) | ARB(F7) |
| ARB(F0) | ARB(F0) | ARB(F0) | ARB(F0) |
| ARB(x) | ARB(F7) | ARB(F7) | ARB(F7) |
| IDLE | IDLE | IDLE | IDLE |

SOURCE LOOP FILL WORD GENERATION

FIG.12

| INPUT WORD | PRESENT STATE | |
|---|---|---|
| | ARB(F0) | IDLE |
| ARB(F7) | ARB(F0) | IDLE |
| ARB(F0) | IDLE | IDLE |
| ARB(x) | ARB(F0) | ARB(F0) |
| IDLE | IDLE | IDLE |

DESTINATION LOOP FILL WORD GENERATION

FIG.13

CONNECT REQUEST

| 17 | 11 | 5 | 3 | 1 |
|---|---|---|---|---|
| REQUESTOR ID | RESPONDER ID | LCL | PRI | 00 |

CONNECT RESPONSE

| 17 | 11 | 5 | 1 |
|---|---|---|---|
| REQUESTOR ID | RESPONDER ID | BP CHNL | 00 |

RESPONDER CHANNEL IDLE

| 17 | 11 | 5 | 1 |
|---|---|---|---|
| RESPONDER ID | RESPONDER ID | BP CHNL | 10 |

| 17 | 11 | 5 | 1 |
|---|---|---|---|
| RESPONDER ID | RESPONDER ID | 0000 | 11 |

FIG.14D

CAM UPDATE (HUB MODE)

| 17 | 7 | 1 |
|---|---|---|
| AL_PD | DEST PID | 11 |

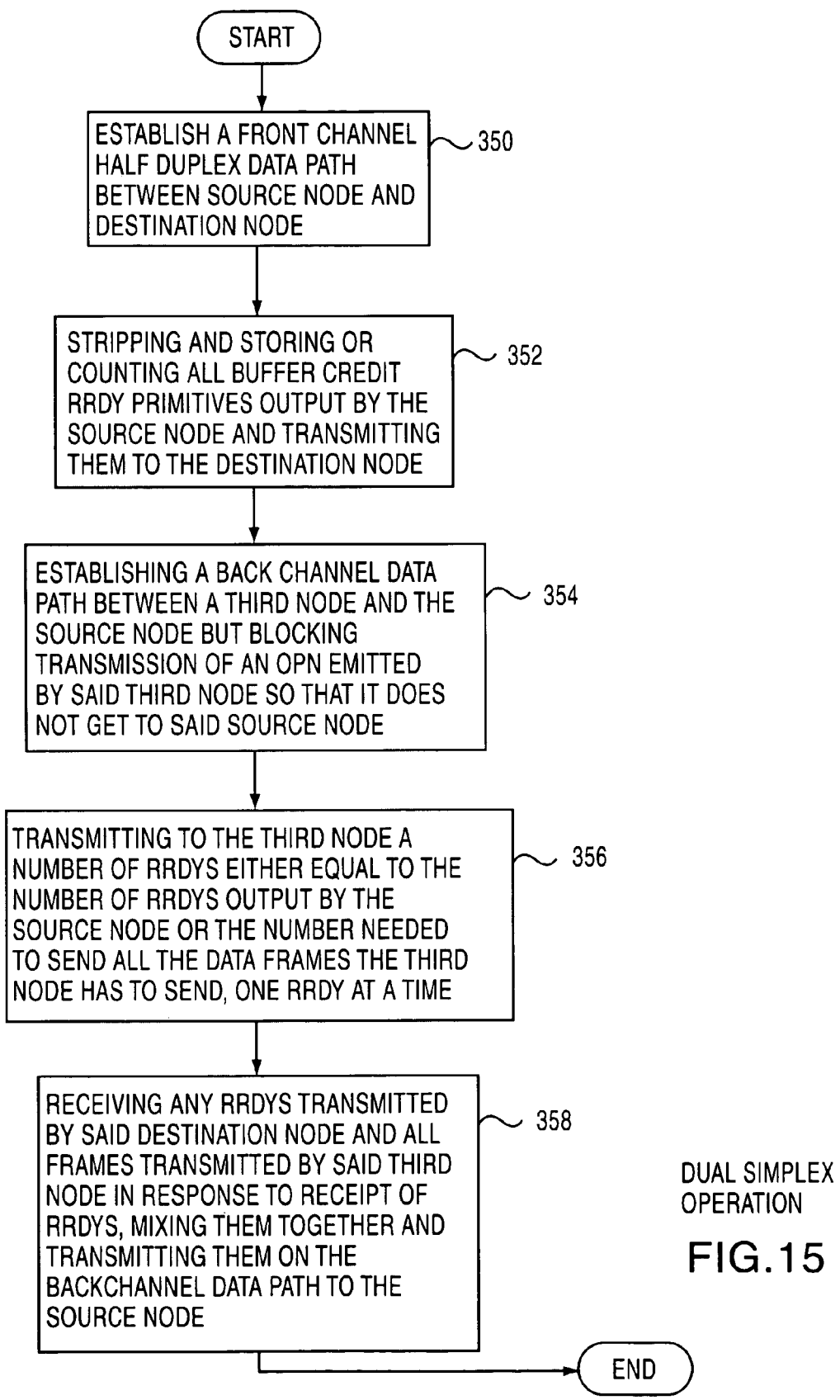

Signals Status

| SIGNAL | SCOPE | DEFAULT | RESET | STATUS |
|---|---|---|---|---|
| issue | OUT | | | COMB |
| reclaim | OUT | | | COMB |
| bkchnlconn | INT | | | COMB |
| credit_avail | INT | | | COMB |
| creditmgr_d | INT | | | COMB |
| frame | INT | | | COMB |

Declarations wire [1:0] creditmgr_d;
wire credit_avail;
wire frame;
wire bkchnlconn;

Concurrent Statements assign bkbroiler = bkchnlconn;
assign credit_avail = rxrdy_avail;
assign frame = swrx_sof;

//
// Assign output values.
//
assign #outdly issue = creditmgr_q ==CRDT_ISSUE;
assign #outdly reclaim= creditmgr_q == CRDT_RECLAIM;

Process Declarations

Global Actions

FIG.17C

Concurrent Statements

```
always @(posedge lclk) begin
  enable_q <= enable_d;
  live_q <= live_d;
end always @(posedge lclk)
   req_adr_q <= req_adr_d;         // finished discovery process assign enable_d = ~rst & (nwrdclk ? enable : enable_q);
assign live_j = (enable_d & ~enable_q) & lockmaster;
assign live_k = rst | done | lip;
assign live_d = (live_q | live_j) & ~live_k;
assign done = (opnsm_q == OSM_GETADR) & (last | ~enable);

assign req_adr_d = ~rst & nwrdclk &
      (((opnsm_q == OSM_IDLE) & live_j) |
       ((opnsm_q == OSM_WAIT) & cls) |
       ((opnsm_q == OSM_RCVCLS) & cls));

//
// Output decodes.
//
assign #outdly busy   = opnsm_q != OSM_IDLE;
assign #outdly gapwait = opnsm_d == OSM_WAIT;
assign #outdly cmd_opn = opnsm_q == OSM_OPN;
assign #outdly clr_adr = (opnsm_q == OSM_IDLE) & live_j;
assign #outdly req_adr = reg_adr_q;

assign start = live_j;
```

FIG.18C

Declarations wire [2:0] opnsm_i;
wire live_j;
reg enable_q;
reg live_q;
wire enable_d;
wire live_k;
wire live_d;
wire done;
reg req_adr_q;
wire req_adr_d;
wire opnsm_d;
wire start;

Signals Status

| SIGNAL | SCOPE | DEFAULT | RESET | STATUS |
|---|---|---|---|---|
| busy | OUT | | | COMB |
| clr_adr | OUT | | | COMB |
| cmd_opn | OUT | | | COMB |
| gapwait | OUT | | | COMB |
| req_adr | OUT | | | COMB |
| done | INT | | | COMB |
| enable_d | INT | | | COMB |
| enable_q | INT | enable_d | | COMB |
| live_d | INT | | | COMB |
| live_j | INT | | | COMB |
| live_k | INT | | | COMB |
| live_q | INT | live_d | | COMB |
| opnsm_d | INT | | | COMB |
| opnsm_i | INT | | | COMB |
| req_adr_d | INT | | | COMB |
| req_adr_q | INT | req_adr_d | | COMB |
| start | INT | | | COMB |

FIG.18D

Declarations

```
reg   select_q;
wire  select_d;
wire  select_ev;
reg   start_q;
wire  start_d;
reg   window_q;
wire  window_d;
wire  window_ev;
wire  [2:0] state_d;
wire  [2.0] state_i;
wire  start;
wire  clocktick;
```

Concurrent Statements

```
  always @(posedge lclk)
    select_q <= select_d;

always @(posedge lclk)
    start_q <= start_d;

always @(posedge lclk)
    window_q <= window_d;

assign select_d = select;
assign select_ev = select & ~select_q & enable & ~cascade & ~bypass;

assign start_d = ~rst & (select_ev | start_q) & ~nwrdclk;

assign window_d = rst ? 1'b0 : nwrdclk ? window : window_q;
assign window_ev = window & ~window_q;

assign start = start_q | select_ev;
assign clocktick = window_ev;

//
// Assign output variable.
```

FIG.19C

//
assign hold = ( state_q ! = TKNSM_IDLE);

Signals Status

| SIGNAL | SCOPE | DEFAULT | RESET | STATUS |
|---|---|---|---|---|
| hold | OUT | | | COMB |
| clocktick | INT | | | COMB |
| select_d | INT | | | COMB |
| select_ev | INT | | | COMB |
| select_q | INT | select_d | | COMB |
| start | INT | | | COMB |
| start_d | INT | | | COMB |
| start_q | INT | start_d | | COMB |
| state_d | INT | | | COMB |
| state_i | INT | | | COMB |
| window_d | INT | | | COMB |
| window_ev | INT | | | COMB |
| window_q | INT | window_d | | COMB |

Process Declarations

Global Actions

FIG.19D

Declarations
wire [2:0] rxconsm_d;
wire rxdcls;
wire opn;
wire localcls;

Concurrent Statements

//
// Assign outputs.
//
assign #outdly rxcon_idle = rxconsm_q == RXCL_IDLE;
assign #outdly rxcon_opn = rxconsm_q == RXCL_OPN;
assign #outdly rxcon_conn = rxconsm_q == RXCL_CONN;
assign #outdly rxcon_gencls = rxconsm_q == RXCL_GENCLS;
assign #outdly rxcon_fwdcls = rxconsm_q == RXCL_FWDCLS;
assign #outdly rxcon_rcvcls = rxconsm_q == RXCL_RCVCLS;

assign #outdly rxcon_nxt_idle = rxconsm_d == RXCL_IDLE;

assign rxdcls = dsrxdcls;
assign opn = swrx_opn;
assign localcls = lpsm_clsing;

Signal Status

| SIGNAL | SCOPE | DEFAULT | RESET | STATUS |
| --- | --- | --- | --- | --- |
| rxcon_conn | OUT | | | COMB |
| rxcon_fwdcls | OUT | | | COMB |
| rxcon_gencls | OUT | | | COMB |
| rxcon_idle | OUT | | | COMB |
| rxcon_nxt_idle | OUT | | | COMB |
| rxcon_opn | OUT | | | COMB |
| rxcon_rcvcls | OUT | | | COMB |
| localcls | INT | | | COMB |
| opn | INT | | | COMB |
| rxconsm_d | INT | | | COMB |
| rxdcls | INT | | | COMB |

FIG.20D

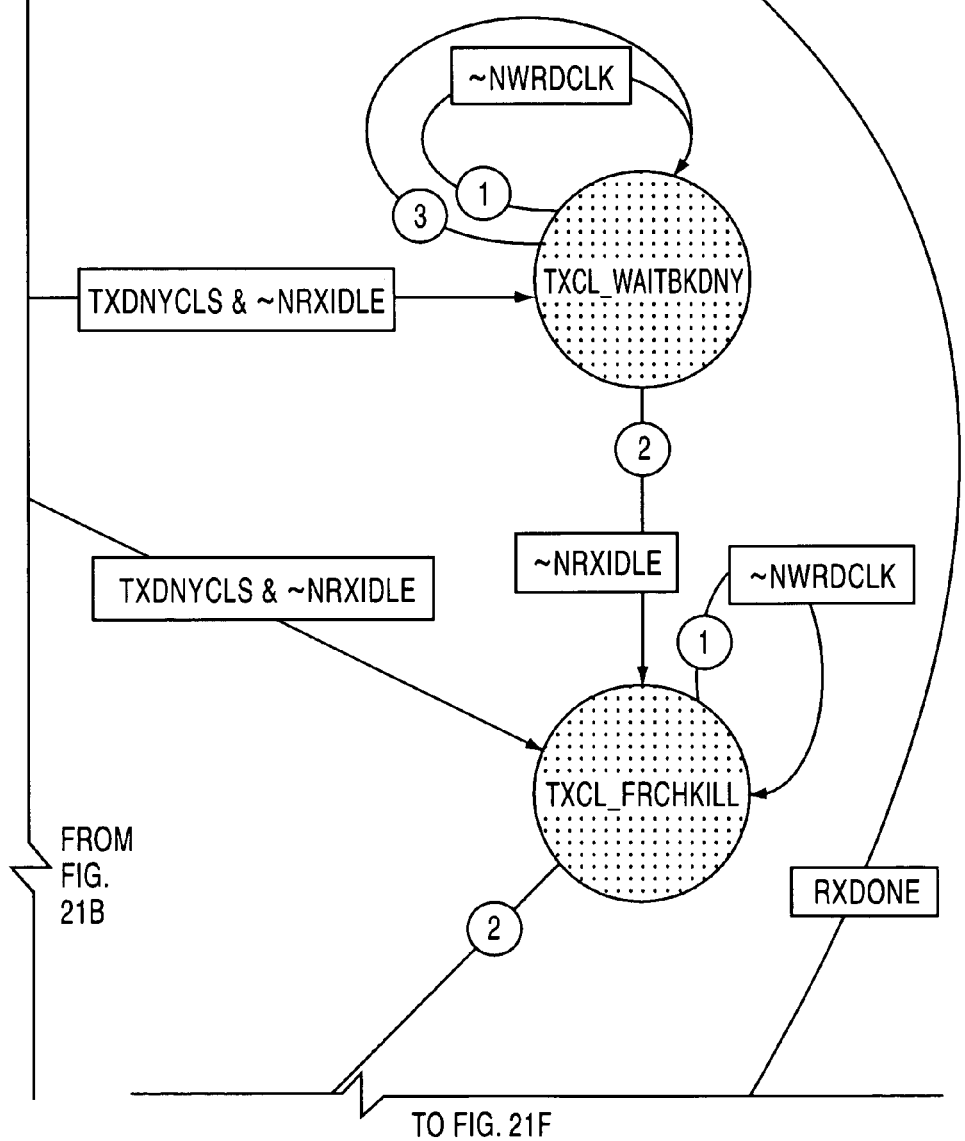

Concurrent Statements

```
// wire  [3:0]  txconsm_d;

/*
  assign txconsm_d = txconsm_f(txconsm_q, rst, nwrdclk, en_bkchnl,
                    rxcncted, localcls, txdnycls, txpcls,
                    lpclsed, rxdone, nrxidle);

always @(posedge lclk)
  txconsm_q <= txconsm_d;
*/

//
// Assign outputs.
// assign #outdly txcon_idle     = txconsm_q == TXCL_IDLE;
assign #outdly txcon_conn     = txconsm_q == TXCL_CONN;
assign #outdly txcon_waitboth = txconsm_q == TXCL_WAITBOTH;
assign #outdly txcon_txdone   = txconsm_q == TXCL_TXDONE;
assign #outdly txcon_rxdone   = txconsm_q == TXCL_RXDONE;
assign #outdly txcon_genclsing = txconsm_q == TXCL_GENCLSING;
assign #outdly txcon_waitbkdny = txconsm_q == TXCL_WAITBKDNY;
assign #outdly txcon_genclsed = txconsm_q == TXCL_GENCLSED;
assign #outdly txcon_waitbkcls = txconsm_q == TXCL_WAITBKCLS;
assign #outdly txcon_fwdcls   = txconsm_q == TXCL_FWDCLS;
assign #outdly txcon_waitlcl  = txconsm_q == TXCL_WAITLCL;
assign #outdly txcon_done     = txconsm_q == TXCL_DONE;
assign #outdly txcon_frchkill = txconsm_q == TXCL_FRCHKILL;
```

FIG.21G

Signals Status

| SIGNAL | SCOPE | DEFAULT | RESET | STATUS |
|---|---|---|---|---|
| txcon_conn | OUT | | | COMB |
| txcon_done | OUT | | | COMB |
| txcon_frchkill | OUT | | | COMB |
| tcxon_fwdcls | OUT | | | COMB |
| txcon_genclsed | OUT | | | COMB |
| txcon_genclsing | OUT | | | COMB |
| txcon_idle | OUT | | | COMB |
| txcon_rxdone | OUT | | | COMB |
| txcon_txdone | OUT | | | COMB |
| txcon_waitbkcls | OUT | | | COMB |
| txcon_waitbkdny | OUT | | | COMB |
| txcon_waitboth | OUT | | | COMB |
| txcon_waitlcl | OUT | | | COMB |

FIG.21H

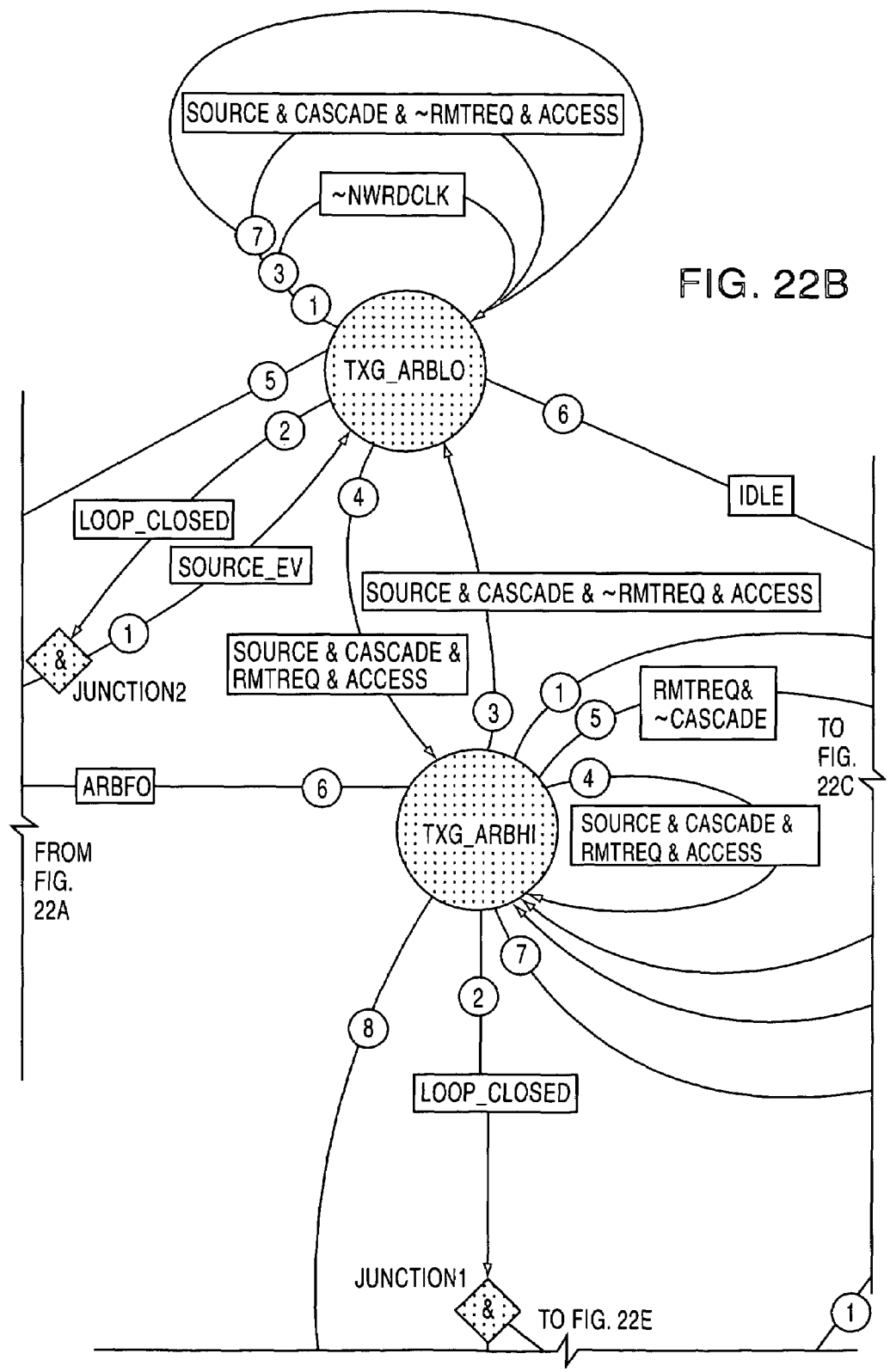

Concurrent Statements

```
//
// Assign outputs.
//
assign #outdly txcfw_arblo = txinstate_q == TXG_ARBLO;
assign #outdly txcfw_arbhi = txinstate_q == TXG_ARBHI;
assign #outdly txcfw_arbf0 = txinstate_q == TXG_ARBF0;
assign #outdly txcfw_idle = txinstate_q == TXG_IDLE;
```

Signals Status

| SIGNAL | SCOPE | DEFAULT | RESET | STATUS |
|---|---|---|---|---|
| txcfw_arbf0 | OUT | | | COMB |
| txcfw_arbhi | OUT | | | COMB |
| txcfw_arblo | OUT | | | COMB |
| txcfw_idle | OUT | | | COMB |

FIG.22G

Declarations wire step;
wire hold;

Concurrent Statements assign step = tokeno_in;
assign hold = token_hold;

//
// Output variables.
//
assign #outdly inc = token_state == INCR;
assign #outdly tokeno_out = token_state ! = HOLD;

Signals Status

| SIGNAL | SCOPE | DEFAULT | RESET | STATUS |
|---|---|---|---|---|
| inc | OUT | | | COMB |
| tokeno_out | OUT | | | COMB |
| hold | INT | | | COMB |
| step | INT | | | COMB |

Process Declarations

Global Actions

FIG. 23A

Concurrent Statements assign hack_char = hack_rrdy_char;

assign #outdly rrdy = state_q == SWTX_D10_2;
assign #outdly cls = state_q == SWTX_D21_5;
assign #outdly opn = state_q == SWTX_D17_4_AS;
assign #outdly opn_ad = state_q == SWTX_D17_4_AD;

Signals Status

| SIGNAL | SCOPE | DEFAULT | RESET | STATUS |
|---|---|---|---|---|
| cls | OUT | | | COMB |
| opn | OUT | | | COMB |
| opn_ad | OUT | | | COMB |
| rrdy | OUT | | | COMB |
| hack_char | INT | | | COMB |

Declarations wire hack_char;

Global Actions

Process Declarations

FIG.24C

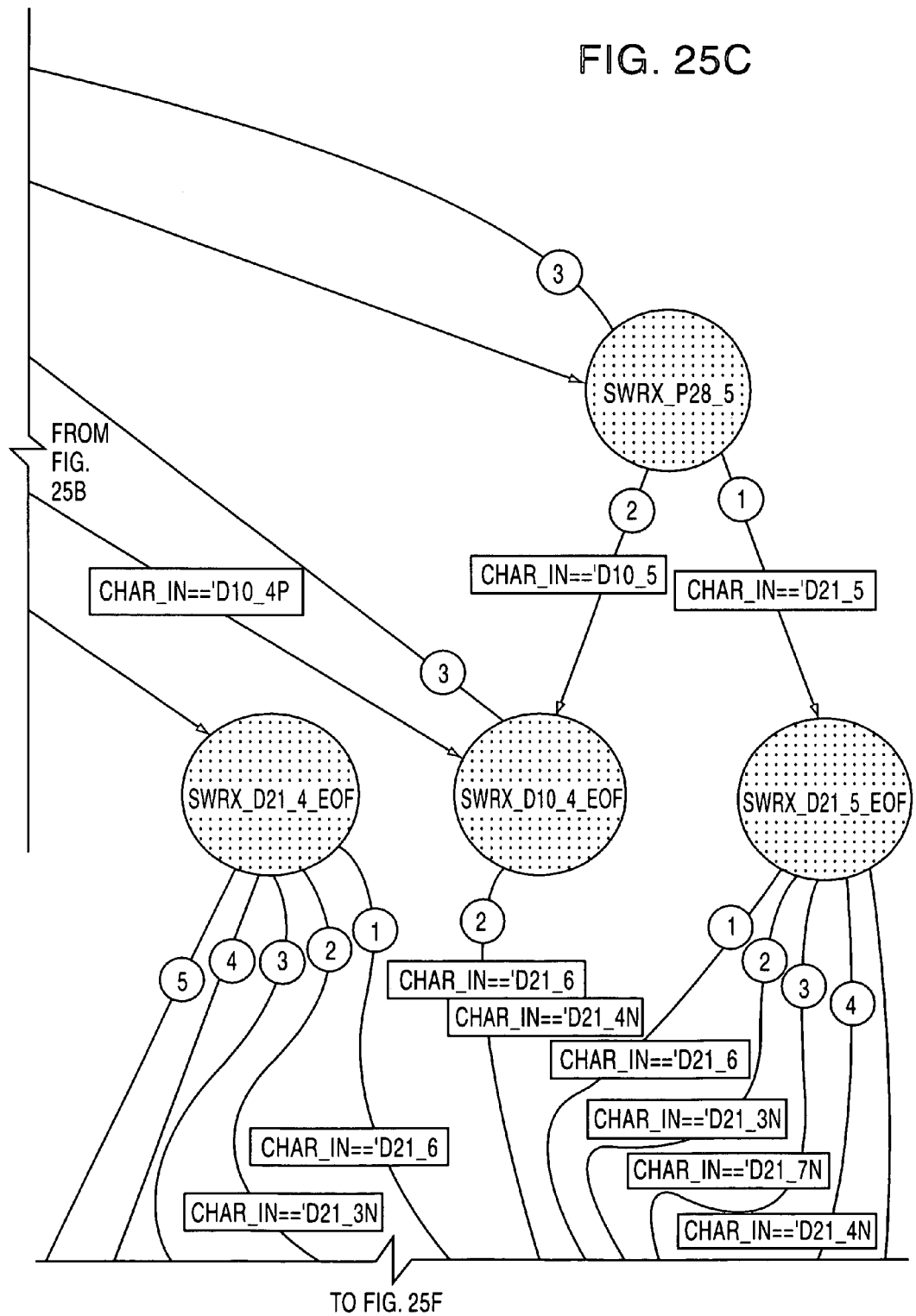

Global Actions
Process Declarations

Declarations
// wire [4:0] state_d;
wire [9:0] hack_char;

Signals Status

| STATUS | SCOPE | DEFAULT | RESET | STATUS |
|---|---|---|---|---|
| arb | OUT | | | COMB |
| cls | OUT | | | COMB |
| eof | OUT | | | COMB |
| lip | OUT | | | COMB |
| opn | OUT | | | COMB |
| rrdy | OUT | | | COMB |
| sof | OUT | | | COMB |
| hack_char | INT | | | COMB |

Concurrent Statements
// assign state_d = swrx_f(state_q, rst, char_in, hack_rrdy_char);

assign hack_char = hack_rrdy_char;

assign #outdly sof = state_q == SWRX_SOF;
assign #outdly eof = state_q == SWRX_EOF;
assign #outdly rrdy[2] = swrx_f == SWRX_D21_4_RRDY;
assign #outdly rrdy[1] = state_q == SWRX_D21_4_RRDY;
assign #outdly rrdy[0] = state_q == SWRX_RRDY;
assign #outdly arb[2] = swrx_f == SWRX_D20_4_ARB;
assign #outdly arb[1] = state_q == SWRX_D20_4_ARB;
assign #outdly arb[0] = state_q == SWRX_ARB;
assign #outdly opn[2] = swrx_f ==SWRX_D17_4_OPN;
assign #outdly opn[1] = state_q == SWRX_D17_4_OPN;
assign #outdly opn[0] = state_q == SWRX_OPN;
assign #outdly cls[2] = swrx_f ==SWRX_D5_4_CLS;
assign #outdly cls[1] = state_q == SWRX_D5_4_CLS;
assign #outdly cls[0] = state_q == SWRX_CLS;
assign #outdly lip[1] = swrx_f == SWRX_LIP;
assign #outdly lip[0] = state_q == SWRX_LIP;

FIG.25G

Declarations
//reg opntrpsm_q;
//reg opntrpsm_f;
//wire opntrpsm_d;
wire lip;
wire lptx_opn;
wire lptx_opnr;
wire enable;

Concurrent Statements
// hold opn in hub mode
// wire    opntrpsm_d;                    // hold opn in hub mode
/*
assign opntrpsm_d = opntrpsm_f(opntrpsm_q, rst, lipall,
            lprx_opn,lprx_cls, swrx_opn, sawbrdcst,
            do_opntrp);
*/
//
// Assign outputs.
//
assign #outdly otrp_idle = opntrpsm_q == OTRP_IDLE;
assign #outdly otrp_opn = opntrpsm_q == OTRP_OPN;
assign #outdly otrp_hit = (opntrpsm_q == OTRP_OPN) &
            (opntrpsm_d == OTRP_IDLE) & lprx_cls;
assign #outdly otrp_miss = (opntrpsm_q == OTRP_OPN) &
            (opntrpsm_d == OTRP_IDLE) & lprx_opn;
assign lip = lipall
assign lptx_opn = swrx_opn;
assign lptx_opnr = sawbrdcst;
assign enable = do_opntrp;

Global Actions

Process Declarations

Signals Status

| SIGNAL | SCOPE | DEFAULT | RESET | STATUS |
|---|---|---|---|---|
| otrp_hit | OUT | 0 | | COMB |
| otrp_idle | OUT | 0 | | COMB |
| otrp_miss | OUT | 0 | | COMB |
| otrp_opn | OUT | 0 | | COMB |
| enable | INT | 0 | | REG |
| lip | INT | 0 | | REG |
| lptx_opn | INT | 0 | | REG |
| lptx_opnr | INT | 0 | | REG |

FIG.26A

Concurrent Statements
assign swstate = lpsm_swstate;
assign hlstate = lpsm_hlstate;
assign idle = lprx_idle;
assign rrdy = lprx_rrdy;
assign arb0 = lprx_arbhi;
assign lip = lprx_lip;
assign opnr = hold_opnr;
assign opn = hold_opn;
assign rxcls = lprx_cls;
assign rxcls_q = lprx_cls_q;
assign holdcls = hold_cls;
assign sntcls = rxfwcls;
/*
assign lpstate_d = lpstate_f(lpstate_q, rst,
                               nwrdclk, lpsm_swstate, lpsm_hlstate,
                               plisten,
                               switch_req, lock_req, lockmaster,
                               disco, disco_done, panic_in,
                               bypass, bcasten, campempty,
                               flushdone,
                               lprx_idle, lprx_rrdy, lprx_arbhi, lprx_lip,
                               hold_opnr, hold_opn,
                               lprx_cls, lprx_cls_q, hold_cls, rxfwcls,
                               rxdcls, gclsing, gclsed,
                               txdone,
                               localdest,
                               lclgnt,
                               lcldny,
                               rmtreq,
                               txconidl, lpwait);

FIG.27E

```
always @(posedge lclk)
  lpstate_q<= lpstate_d;
*/
assign lpsm_swstate_o = ~lpstate_q[4] | (lpstate_q == LPSM_SWLOCKING);
assign lpsm_hlstate_o = lpstate_q[4] & lpstate_q[3] &
            ~((lpstate_q == LPSM_HUBLOCKED) &
            (~lockmaster | bypass));
assign #outdly lpsm_swstate = lpsm_swstate_o;
assign #outdly lpsm_hlstate = lpsm_hlstate_o;
assign #outdly lpstate_changed = lpstate_f!= lpstate_q;
assign flushcount_clr == rst |
            ((lpstate_f == LPSM_HUBFLUSH) &
            (lpstate_q == LPSM_HUBLOCKED))|
            ((lpstate_f == LPSM_SWFLUSH) &
            (lpstate_q == LPSM_SWLOCKED));
assign flushdone = (& flushcount_q);
assign flushdone_d = flushcount_clr ? 5'h00 : flushdone ? flushcount_q :
            flushcount_q + 1;
//
// Assign output values.
//
assign #outdly lpstate   = lpstate_q;
assign #outdly lpsm_mon  = lpstate_q == LPSM_MON;
assign #outdly lpsm_bsy  = lpstate_q == LPSM_BSY;
assign #outdly lpsm_arb  = lpstate_q == LPSM_ARB;
assign #outdly lpsm_relopn = lpstate_q == LPSM_RELOPN;
```

FIG.27F

BUFFERED FCAL SWITCH

FIBRE CHANNEL ARBITRATED LOOP BUFFERLESS SWITCH CIRCUITRY TO INCREASE BANDWIDTH WITHOUT SIGNIFICANT INCREASE IN COST

This application is a divisional of a patent application entitled FIBRECHANNEL ARBITRATED LOOP BUFFERLESS SWITCH CIRCUITRY TO INCREASE BANDWIDTH WITHOUT SIGNIFICANT INCREASE IN COST, Ser. No. 09/195,846, filed Nov. 19, 1998, and now U.S. Pat. No. 6,614,796, which is hereby incorporated by reference in its entirety for all purposes. The applicants wish to drop their claim to priority in the parent case under 35 U.S.C Section 120 to U.S. patent application entitled FIBRE CHANNEL LEARNING BRIDGE, LEARNING HALF BRIDGE, AND PROTOCOL, Ser. No. 08/786,891, filed Jan. 23, 1997, and now U.S. Pat. No. 5,978,379.

FIELD OF USE

Fibre Channel networks are known loop configuration networks that have a plurality of known type nodes such as servers, printers, disk arrays etc. all connected together by the loop. Such networks use a unique protocol involving a plurality of 40 bit primitives that are used to arbitrate for loop control, to establish connections and to carry out flow control for data transfers of frames of data. The flow control inherent to the Fibre Channel Arbitrated Loop network (hereafter FCAL nets) protocol has the advantage of eliminating the need for the nodes to have extensive buffering capabilities since the destination node controls the amount of data it receives by transmission of an RRDY primitive to the source node each time the destination node is ready to receive another frame.

Fibre Channel networks emerged as a family of interconnection topologies to increase bandwidth over fast-wide SCSI networks and to increase the number of server and storage elements that can be connected to 126 over the 16 device limit of SCSI. Advantages of FCAL include that devices may be farther apart (up to 10 km) and more numerous and that the size of data transfers is very large compared to the overhead that is required to set up every transfer. This makes FCAL very efficient and more attractive than less efficient protocols such as TCP/IP over Ethernet and SCSI over a bus connection.

Hub based network topologies are generally desirable because they overcome certain limitations on the number of nodes that can be coupled to a network by breaking it up into segments coupled by the hub. Many Ethernet networks use hubs as do token ring networks. Hubs in FCAL networks receive packets from a source node on an input line coupled to the source node and rebroadcast the packet on an output line coupled to the next node which rebroadcasts the packet to the next node and so on. The rebroadcast by subsequent nodes in the chain wastes computing resources. Switched topologies work differently in that packets are not rebroadcast, but instead are connected directly to the line coupled to the destination node thereby eliminating processing by other nodes which are not the destination to receive and rebroadcast messages not destined for that node.

Despite their advantages, a significant problem in FCAL networks is delay and this delay increases as the network scales up in size. Each meter of cable contributes 5 ns of delay. Further, each node contains an elasticity buffer or FIFO to absorb the differences between incoming and outgoing data rates. Data passing through a node enroute to its destination passes through the nodes elasticity buffer and suffers a typical delay of 3 words. Typically, disk clusters are 10 drives to a cluster with each drive being one node and imposing its own delay. If there are 10 clusters coupled to a server, this would represent typically 5.3 microseconds of delay in transition of each primitive and data frame travelling around the loop. In other words, this delay is imposed on each loop tenancy. In an I/O operation, there are typically 4 tenancies for a write to disk, each involving 3 "round trips": ARB, OPN-RRDY and Data/CLS (see ANSI standard X3T10 FCP which is hereby incorporated by reference). Thus, 12 delays would be suffered by each command transaction. On a 100 node loop, this translates to approximately 64 microseconds of delay per command.

The command overhead of modern disk drives is around 200 microseconds and falling. The delay per command coupled to the command overhead of the drive imposes a significant penalty on performance of approximately 32%. For random access benchmarks with small I/O payloads typical of database queries, the performance penalty becomes more pronounced. The problem manifests itself as the inability of the server to achieve more I/O operations per second, regardless of how many more disk drives are added to the system.

Spatial reuse provided by switches or hubs which allow concurrent loop tenancies is one way of reducing the delay problem. The IBM serial storage architecture in the prior art is one method of providing spatial reuse.

Connection oriented switched topologies were tried in early Fibre Channel Fabric networks to attempt to overcome the delay problems of loops by cutting down the number of nodes each primitive and data frame passes through in getting from source to destination and providing spatial reuse. These early fabric switches were complicated, expensive and slow, all of these characteristics being found quite undesirable by artisans of FCAL networks. In the early FC Fabric switches, an entire frame of data with a header that indicated the destination node to which the frame was directed was sent to the switch for purposes of requesting a connection. These early switch designs had microprocessors which were used to implement several layers of software architecture to receive the frame, pass it up through various layers of processing to find the frame boundaries, crack the frame open, determine its destination address and then attempt to find the destination node and make the switching connection. The entire frame of data had to be buffered during this process of attempting to find the destination and make the proper connection. It was possible in this early design that the connection was never made, because, for example, the destination node was busy with another conversation. The switch would then have to send a message back to the source that no connection was made and to try again later. Because of limited buffer space in the switch, the data in the original frame might need to be overwritten by other data from a frame of data embodying another request. In such a case, the switch would have to send another message to the source saying, "Sorry, I lost your data. Execute error recovery protocol." Error recovery protocols further complicated the operation and construction of such systems. If a connection is made, the switch receives another frame of data back from the destination. This frame also must be received, have its boundaries detected and must be cracked open to examine its contents to see if the destination is saying, "Yes, I am available for a connection." This type of switch proved to be unworkable and FCAL loops became the standard interconnect for disks and servers.

Prior art Fibre Channel switches are commercially available from Ancor and Brocade Communications which provide spatial reuse and efficient link utilization. The FL_ports connected to these switches also address physical delays as they pertain to FCAL. However, these switches require link rate frame buffering to accomplish their performance levels, and also operate on the entire 24-bit address contained in the FC frame. In contrast, the invention described herein uses zero buffering and an 8-bit address decode for a much more efficient and inexpensive design.

Many network switched topologies that use entire frames of data to request a connection through the switch suffer these same drawbacks. The need for error recovery protocols arise because of the potential for lost data arising from the fact that only limited amount of memory can be put in the switch at realistic costs, and in heavy traffic situations, the memory may be exhausted and some portion thereof may have to be rewritten with new data before the original data is delivered. Memory is expensive, takes up space and complicates the design.

Examples of other network topologies other than Fibre Channel Fabric that suffer these same drawbacks are the 1 Gigabit Ethernet® and ATM protocol networks now in public use.

The Fibre Channel Arbitrated Loop (FCAL) topology emerged as a way of providing simple, low-cost connectivity to more nodes over a shared media than could be provided in point-to-point topologies without the requirement for an expensive fabric switch. FCAL networks allow up to 126 node ports to be coupled by a shared media using a simple protocol without the need for a separate fabric switch. Unlike the switched fabric topology which has a centralized approach to routing, FCAL networks distribute the routing function to each loop port. This reduces the cost of achieving interconnection since the loop functionality represents a relatively small addition to the normal port functionality that has to be present anyway. However, FCAL networks suffer the disadvantage that the number of concurrent interconnections possible is smaller than in switched fabric networks because FCAL networks are fully blocking topologies such that only two pairs of nodes on the loop can communicate at any particular time. All other nodes have to wait until the first pair are done communicating before the loop is available for another pair to communicate. The address space is also limited to 126 nodes. Another problem with FCAL topologies is that traffic originating from a source node had to travel through each intermediary node on the loop portion between the source node and a destination node. Since each node imposed a delay, the overall bandwidth was decreased since each loop tenancy involved a protocol wherein OPN, RRDY and CLS primitives and data frames had to travel through all these intermediary nodes in order to complete the loop tenancy. Since no other pair of nodes could communicate until the loop tenancy was complete, the delays in transmission imposed by each node on each portion of the protocol decreased overall bandwidth and throughput.

In an attempt to further increase bandwidth and concurrency without the extremely high cost of fabric switches, combinations of FCAL loops with smaller fabric switches have been devised. This allows the cost per port of the fabric switch to be amortized over the total number of ports including those coupled to the subloops coupled to the switch.

The problem with the approach of coupling multiple FCAL loops together by a fabric switch is that each FCAL subloop must be coupled to the fabric switch by a complicated port called an FL_port. These are ports which must be able to understand the FCAL loop protocol on one side of the port and interface it with the very different and substantially more complex fabric switch packet switching protocol on the other side of the port while also having bridging functionality. Such FL_ports must have protocol layers that understand each protocol and can do packet routing and communicate with each other.

Further, FL_ports are expensive to build. This is because of the inordinate amount of buffer memory that is needed in the front end of the FL_port to reconstruct the sequences of packets contained in one FCAL tenancy. Modern day connectionless fabric switch protocols are pure packet switching while FCAL loop tenancy protocols are single conversations which tend to be like a simple switched circuit and contain many packets. That is, the FCAL loop tenancy protocol starts with an OPN primitive directed to a destination node which responds with an RRDY directed to the source. These primitives set up switches in the nodes so that the source and destination nodes talk directly to each other through the loop segment between them and the intervening nodes by sending one or more frames of data until a CLS primitive is sent which ends the conversation.

In contrast, the packet switching done by an FL_port on the switch backplane side is not nearly this simple. The packet switching protocol requires the FCAL frames output by a source node to be treated as many individual packets. Those packets must be routed to the correct destination FL_port and reassembled there without loss of data and launched on the FCAL loop on which the destination port is resident. Thus, FL_ports will receive packets from the fabric switch side and data frames and primitives from the FCAL loop side and must have the memory and intelligence to convert between the two protocols.

In the treatise Kemble, *Arbitrated Loop*, Chap. 1, pp. 18-19, FIG. 12, Published by Connectivity Solutions, Tucson, Ariz. (1996), ISBN 0-931836-82-4, Kemble proposes a "Smart Hub" conceptual network. This network is comprised of a plurality of FCAL loops coupled together by a smart hub which has the intelligence to provide independent operations within each loop. When a source node wants to exchange data with a destination node, it arbitrates for its local loop and attempts to establish a loop connection with the destination. If the destination is local, the smart hub simply acts as a repeater. If the destination port is not local, the smart hub intercepts the attempt to establish a loop connection, acquires access to the proper destination loop and establishes the loop connection between the source and destination loops acting like a bridge. Thus one loop can talk to another without affecting activity which is purely local to the other loops not involved in the connection, but the other loops cannot set up simultaneous connections to nodes on other loops during the tenancy across the smart hub of the first cross-boundary connection between the two loops already connected across the smart hub. This type arrangement cannot satisfy the need for a fast switch which is affordable and provides the ability for multiple pairs of ports to communicate simultaneously across the switch.

As a response to the limitations on concurrency present in conventional FCAL topologies, the assignees of the present invention devised a network topology using intelligent hubs each of which had routing intelligence and each of which had its own subloop coupled to a plurality of conventional L_port nodes of a type used in conventional FCAL topologies. Each hub was coupled to each other hub by a broadcast data path and a return data path. By watching the addresses in the OPN primitives and the flow of primitives, the hubs were able to deduce the location of the source and destination nodes and cut out all subloops and nodes thereon that were not necessary for communication between the source and destination nodes thereby decreasing unnecessary delay in completing each loop tenancy and increasing bandwidth. Further, some concurrency was supported in that tenancies between source and destination nodes on the same subloop could be completed simultaneously on each subloop, thereby further increasing throughput. This technology is described in U.S. Pat. No. 5,751,715 which is hereby incorporated by reference.

The assignee of the invention has also filed a co-pending patent application on a learning bridge for FCAL topologies such that two or more FCAL loops can be coupled together by bridges. The bridges have the intelligence to examine the destination addresses of OPN primitives received from their local loops and watch the primitives of loop tenancies and the loops from which they came and to learn the locations of various nodes on the loops to which they are coupled. Each bridge then forwards OPN primitives from one loop to another if the destination node is on a different loop than the source node, but keeps the OPN local to the same loop as the source is on using a local bypass data path if the destination and source nodes are on the same loop. This provides the ability for concurrent loop tenancies to be occurring on the two loops coupled to the bridge, although only one loop tenancy per loop is allowed at any particular time. This technology is described in the parent application incorporated by reference herein.

Despite these improvements over standard FCAL topologies provided by the assignee, there is still a need for further improvements in concurrency without the increased cost and increased protocol complexity of fabric switches. What is needed is a way to achieve the high concurrency and bandwidth of fabric switch topologies without the high cost thereof. Therefore, a need has arisen for a relatively simple, FCAL switch which has little or no buffer memory needed therein and which is capable of establishing connections very fast. Fundamentally, what the prior art is missing is a switch which can couple multiple FCAL loops together with high concurrency and the speed of a fabric switch that uses N_ports and which couples FCAL loops together without the expense, complexity, memory demands and slowness of fabric switches that use FL_ports (FL_ports can support fast switching, but the amount of memory needed makes the cost prohibitive). This switch, in an ideal world, would have multiple ports, each of which is coupled to an FCAL loop or an NL node and provide concurrency such that each port can talk to any other port at any time the other port is not already tied up in another loop tenancy.

SUMMARY OF THE INVENTION

Two important attributes of all species within genus of the invention are: first, the use of the destination address in an FCAL OPN primitive (hereafter referred to as an OPN) instead of a frame header of a frame of data to find the destination node and establish the connection through the switch; and, second, using the normal flow control primitives of the FCAL protocol for hold back purposes to eliminate the need for large buffer memories in the switch and so as to implement a switching protocol to stream complete data frames from source to destination without storing any data frames in the switch, and without any packetizing, and without any segmentation and reassembly processing, and without any error recovery protocols to retransmit dropped frames. Any species that shares these two characteristics is within the preferred genus of the invention. This preferred genus qualifies for class 2 Fibre Channel operation where frames cannot be dropped because the flow control nature of the switch prevents frames from ever being dropped because they are only transmitted when the destination node has indicated it can receive them. The preferred genus can also be operated in class 3 Fibre Channel operation where it is permissible to drop frames and upper level protocols do error recovery for dropped frames even though the switch never drops frames.

A separate second genus of FCAL switches, suitable for Class 3 Fibre Channel operation only, still uses the destination address in the OPN to find the remote port but uses buffers instead of hold back flow control to complete the transaction to busy remote ports. Specifically, species within this genus will use the destination address of the OPN from the source node to find the location of the remote port. Then the status of that port will be checked. If the status is available, a connection request will cause a connection to be set up between the source node and the destination node via a source port connected to the source node and a destination port connected to the destination node. The buffer comes into play when the destination port is busy. In this situation, in the first genus described above, the normal primitives of the FCAL protocol are used for flow control to prevent the source node from transmitting any frames of data until the destination port becomes available. In the second genus defined in this paragraph, a buffer big enough to hold one or more complete frames of data is included in the front end of each switch chip, or multiple buffers each big enough to store a frame of data are included with each switch chip front end. Each of these buffers will serve as an auxiliary switch port and have its own connection to the backplane in some species or a single shared connection to the backplane through a multiplexer can be used. The preferred species uses multiple buffers each with its own connection to the backplane in addition to a connection directly from the switch port to the backplane for direct connections without buffering. In some species, a single shared buffer or multiple shared buffers on the backplane or in some central location may be used.

In this second genus, the way the buffers are used is for the source port to generate an RRDY sua sponte when it finds from a check of the scoreboard that the destination port is busy. The RRDY is sent to the source node and causes it to output a frame of data. This frame of data is stored in the switch port's buffer. Then a message is sent to the destination port indicating that the auxiliary buffer of the switch port is holding a frame of data for the destination port. This auxiliary buffer ID is added to the camp list for the destination port. When the destination port becomes available, a message is sent back on the protocol bus indicating that the destination port is now available and naming the backplane channel to use. A connection through the backplane is then established to this channel by the auxiliary buffer connection circuitry and the destination port, and the data in the auxiliary buffer is transmitted. If the switch port has multiple auxiliary buffers, they each have their own IDs and, preferably, each has its own switching circuitry to make a connection to the backplane.

In this second genus, each auxiliary buffer has circuitry coupled to the return path to recognize RRDYs transmitted back by the destination node and to count them (or store them) and to wait for a connection between the source port and the RRDY counting circuit if the connection is not continuous such as in some cases where multiple buffers are present in each switch port. These stored RRDYs (or self generated in the case of a count only) can be transmitted to the source node in the case of full duplex or mixed with frames from a third node in the case of a dual simplex connection and transmitted to the source node. Each source port also has shared circuitry for each FCAL net which recognizes incoming RRDYs from the source node and counts them or stores them. These source node generated RRDYs can be transmitted to the destination node in the case of full duplex or transmitted to a third node in the case of dual simplex.

Returning to consideration of the first genus, the normal buffer by buffer accounting and the hold back, handshaking nature of the FCAL loop protocol with large data frames makes this genus of switches possible and also very efficient.

The FCAL OPN primitive is a small 40 bit quantity which includes a code indicating it is an OPN primitive and includes a destination address, and an optional source address if the OPN is full duplex. Receipt of the OPN starts the process carried out by the switch of finding the destination and causes establishment of the connection or a notification to the source that the connection could not be established before any data frame is ever transmitted to the switch. This lack of transmission of any large data frame before establishment of the connection means that the switching circuits connected to each FCAL loop coupled to the overall switch structure do not need to have buffer memories to store the data while the connection is being made or the fact that a connection is not possible is established. This allows for greatly simplified hardware. This means lower costs and greater density of ports per chip. This cost advantage is a significant improvement over prior art approaches.

The major subclass of embodiments taught herein uses a plurality of ports for connection to individual FCAL loops, and a crossbar switch which couples the ports together and which can implement any number of separate data transfer channels under control of the ports with the port using the destination address information in the OPN primitives to determine whether or not a connection through the backplane from one port to another is needed. In the preferred species, the ports are integrated circuits with many ports on one chip and a portion of a distributed crossbar switch also integrated on the chip to selectively couple the integrated circuit to one of the backplane data path channels. Each port is essentially a learning bridge front end with an interface to the crossbar switch on the backend.

Fairness is provided, in the preferred embodiment, by a fairness token which circulates to all the ports and which, when held by a particular port, gives that port "high priority status". This means that if an OPN comes in to a port with the fairness token in its possession and the destination node is on a remote port, the high priority status of that port means that it can "camp" on the remote port and wait for it to be available and it is guaranteed access to the destination node no matter how busy it is. Since the fairness token circulates, no port will ever be starved from communication with a busy node.

Different variations or species within the subclass are taught. Distinctions between species within the subclass are based upon: the way the destination node is found; the way in which the first port coupled to the source node signals the second, remote port that there is traffic waiting for one of the NL nodes to which it is coupled; whether the crossbar switch is central or distributed; whether the complete routing table is stored in each port or there is a single separate routing table, or whether there are partial routing tables stored in each port; whether a scoreboard is used or not to determine the status of a remote node; and, if a scoreboard is used, whether it is distributed with a copy in each port or centralized and shared by all ports. All these variations between species and combinations of variations are equivalent to each other even though each has its own peculiar advantages and disadvantages.

As an example of variations between species within the inventive genus defined above consider the following. Location of the destination node can be by any of several means since the OPN includes the destination address therein. In one embodiment, the destination address from the OPN is used to address a lookup table which outputs data as to which loop the destination node is on and to which switch chip or port coupled to the destination loop the switching connection should be made. This embodiment has the advantage that all the connection information is immediately available. This allows the connection to occur more rapidly. The disadvantage of this species is that the look up table is larger and each port must carry a full copy of the routing table.

One alternative embodiment uses a destination location process wherein the destination address of the OPN from the source node is used to address a lookup table (hereafter LUT) which only outputs a single bit indicating, in one logic state, that the destination node is "local", i.e., on the same FCAL network as the source node, or indicating, in the opposite logic state, that the destination node is not on the local loop. If the destination is not local, the destination address is broadcast as a location request to the other switch chips coupled to the other FCAL networks connected to the switch. Each of the other switch chips then checks its local LUT using the destination address to determine if it has the destination node on its loop. The switch chip that has the destination node finds this out from data returned from its local LUT and then sends a message to the switch chip coupled to the loop having the source node telling it to where the connection is to be made and whether the connection can be made, i.e., the loop upon which the destination node is not busy in another conversation and is available for the connection. The advantage of this species is a smaller routing lookup table may be used in each port. The disadvantage is the requirement of more message traffic between chips resulting in slower response.

An example of an FCAL switch within the genus of the invention is a bufferless switch for coupling to a plurality of FCAL nets and having a crossbar switch and FCAL loop interface port circuits structured to use the OPN and RRDY primitives of the FCAL protocol for hold back flow control to eliminate the need for a buffer with the ports and crossbar switch structured to provide multiple simultaneous loop tenancies.

One embodiment for a protocol within the genus of protocols which define the rules to set up a connection through an FCAL switch within the genus of the invention between a source node and a destination node and transfer data therebetween is:

1) in a source node, arbitrating for and winning control of a first FCAL net and transmitting an OPN primitive thereon, the OPN primitive having a destination address of a destination node therein;

2) receiving and latching at a first port of an FCAL switch the OPN primitive from the source node coupled to the first port by the first FCAL net;

3) using the destination address in the OPN primitive as a search key to search a routing table to find the location of a destination node having the destination address in the OPN or the ID of a port coupled by an FCAL net to the destination node, or both, and, if the destination node is coupled to the first port, passing the OPN primitive to the destination node via the first port via a local bypass data path coupling an input of the first port to an output of the first port coupled to the first FCAL net, but, if the destination node is coupled to a second port other than the first port, controlling a crossbar switch to establish a data path between the first and second ports and determining if the second port is available, and, if so, sending the OPN primitive to the second port indicating traffic is waiting to be sent to said destination node and latching the OPN in said second port;

4) in the second node, arbitrating for control of a second FCAL net coupled to the second port;
5) when control of the second FCAL net is won following said arbitration, forwarding the OPN to the destination node;
6) receiving an RRDY primitive or a CLS primitive from the destination node in the second port and transmitting the primitive so received to the source node through a connection established across crossbar switch, and through the first port and the first FCAL net; and
7) for each RRDY received by the source node, transmitting a frame of data to the destination node through the first FCAL net, the first port, the data path through the crossbar switch, the second port and the second FCAL net without ever storing it in a buffer in the switch, and continuing to pass data frames and primitives between the source and destination nodes, until a CLS primitive is transmitted by either the source node or the destination node, and then closing the data path through the crossbar switch and relinquishing control of the first and second FCAL nets.

The preferred subclass of the switch utilizes the concepts of the learning bridge taught in the parent application incorporated by reference herein for front end circuitry coupled to the FCAL net with backend circuitry which is coupled to a crossbar switch. The bridging front end uses the destination address in the OPN to decide whether or not to connect the front end circuitry to the back end circuitry. The crossbar switch implements a plurality of completely separate data paths through the switch each of which can couple two ports together. The provision of multiple separate data paths through the crossbar switch eliminates any bottlenecks which could occur if a multiplexed data bus were to be substituted for the crossbar switch. It is within the genus of the invention however to substitute a multiplexed bus for the crossbar switch using any form of multiplexing.

Thus, the switch apparatus genus could be generally described as including multiple species, each comprised of a plurality of half bridges, each with a front end for connecting to an FCAL loop and a backend coupled to either a crossbar switch or a multiplexed bus along with suitable control circuitry to use the destination addresses in OPN primitives to determine whether a connection between two ports through the crossbar switch or multiplexed bus is necessary and, if necessary, for establishing the connection.

In the preferred embodiment, each half bridge is one port. In the preferred embodiment, the half bridges are implemented as integrated circuits with a multiplicity of half bridges on every chip with each half bridge building its own routing table by a passive learning process. An alternative embodiment uses an active discovery process to build the routing table.

The switch architecture can be thought of as a multi-port switch with a stack of learning half bridges substituted for each FL_port of a prior art fabric switch, with each half bridge on each layer being coupled to its own local FCAL loop or single NL node. The other side of each half bridge is connected to the high speed crossbar switch in the preferred embodiment so that it can be connected to the other half bridges. The crossbar switch can be thought of as a stack of separate layers of separate high speed backplane data paths connecting all the half bridges together by way of a switching network between the high speed backplane data path layers. The switching network functions to establish selective connections between layers and can be controlled such that any bridge on any layer can talk to any other bridge on any other layer. This allows multiple concurrent connections across the switch between a plurality of pairs of source nodes on one loop and a plurality of pairs of destination nodes on other loops or source and destination nodes coupled individually to half bridges. The switch architecture allows simultaneous purely local loop tenancies on any FCAL net coupled to any particular half bridge so long as another node on the FCAL net is not involved in a loop tenancy which involves communication across the switch from one port on one FCAL net to another port on another FCAL net.

Flow control using the OPN primitive only to establish connections across the switch is used to eliminate the need for large amounts of memory. As a result, the switch is capable of operating at a high throughput rate, but neither the half bridges nor the crossbar switches has the amount of memory of an FL_port of a fabric switch that would be required to make the fabric switch capable of operating at the same throughput rate.

Another significant advantage of the invention is that the nodes on the individual FCAL nets can be conventional NL node designs which already exist. An NL node is a node on an FCAL net which understands and can implement the FCAL flow controlled loop connection protocol between source and destination nodes to transfer data using OPN, RRDY and CLS primitives and large data frames. Because the embodiments of the switches described herein are all compatible with conventional NL nodes, the genus of switches described herein has the advantage that when the network is upgraded, only the switch needs to be upgraded and all the nodes can remain the same thereby saving substantial expense to the customer.

Dual simplex capability is also taught to improve the throughput of any network of FCAL nets coupled by any type of switch. Dual simplex capability allows a source node on a first FCAL net which is transmitting data on a front channel connection to a destination node on a second FCAL net through a switch connection to simultaneously receive data via a back channel connection from a third node on a third FCAL net. This is advantageous to improve throughput because in many cases, destination nodes to which data has been transmitted have no data to transmit back to the source node that sent them the data while other nodes do have data to be transmitted to the source node.

Dual simplex capability is accomplished in all species within the genus of the invention to further increase throughput. It is accomplished by three basic steps, illustrated in FIG. 15:
1) establishing a front channel half duplex data path between a source node and destination node on different FCAL nets (step 350) and stripping and storing or counting any buffer credit RRDY primitives output by the source node and not transmitting them to the destination node (step 352);
2) establishing a back channel data path between a third node and said source node but not transmitting to said source node any OPN primitive emitted by said third node (step 354), and transmitting a number of RRDYs either equal to the number of RRDYs output by said source node or the number of RRDYs needed by said third node to send all the data it has to said source node before closing said back channel connection (step 356), transmission of said RRDYs being one at a time—any excess RRDYs not used by the third node are saved for use by another third node in a subsequent dual simplex back channel connection; and
3) receiving any RRDYs transmitted by said destination node and mixing them in with data frames and/or primitives transmitted on the back channel by the third node so as to exercise flow control on transmissions of data frames from the source node to said destination node (step 358).

BRIEF DESCRIPTION OF THE DRAWINGS

FIG. 11 is a table describing and naming each state in the loop port state machines of each port of each switch chip.

FIG. 12 is a table of the source port fill word generation for various input words and states.

FIG. 13 is a table of the destination port fill word generation for various input words and states.

FIGS. 14A through 14E are diagrams of the five different message formats on the protocol bus.

FIG. 15 is a generic flow diagram illustrating the minimum basic steps each species in the genus of the invention would have to carry out to implement dual simplex operation.

DETAILED DESCRIPTION OF THE PREFERRED AND ALTERNATIVE EMBODIMENTS

The published Fibre Channel Arbitrated Loop standards memorialized in the following ANSI standards are hereby incorporated by reference: X3.230-1994 describing the physical and signalling interface; X3.297-1996 describing the physical and signalling protocol; X3.272-1996 describing the general FCAL protocol and TR-20-199X, T11 Project 1235-DT, Fibre Channel Fabric Loop Attachment (FC-FLA).

Figure 1:
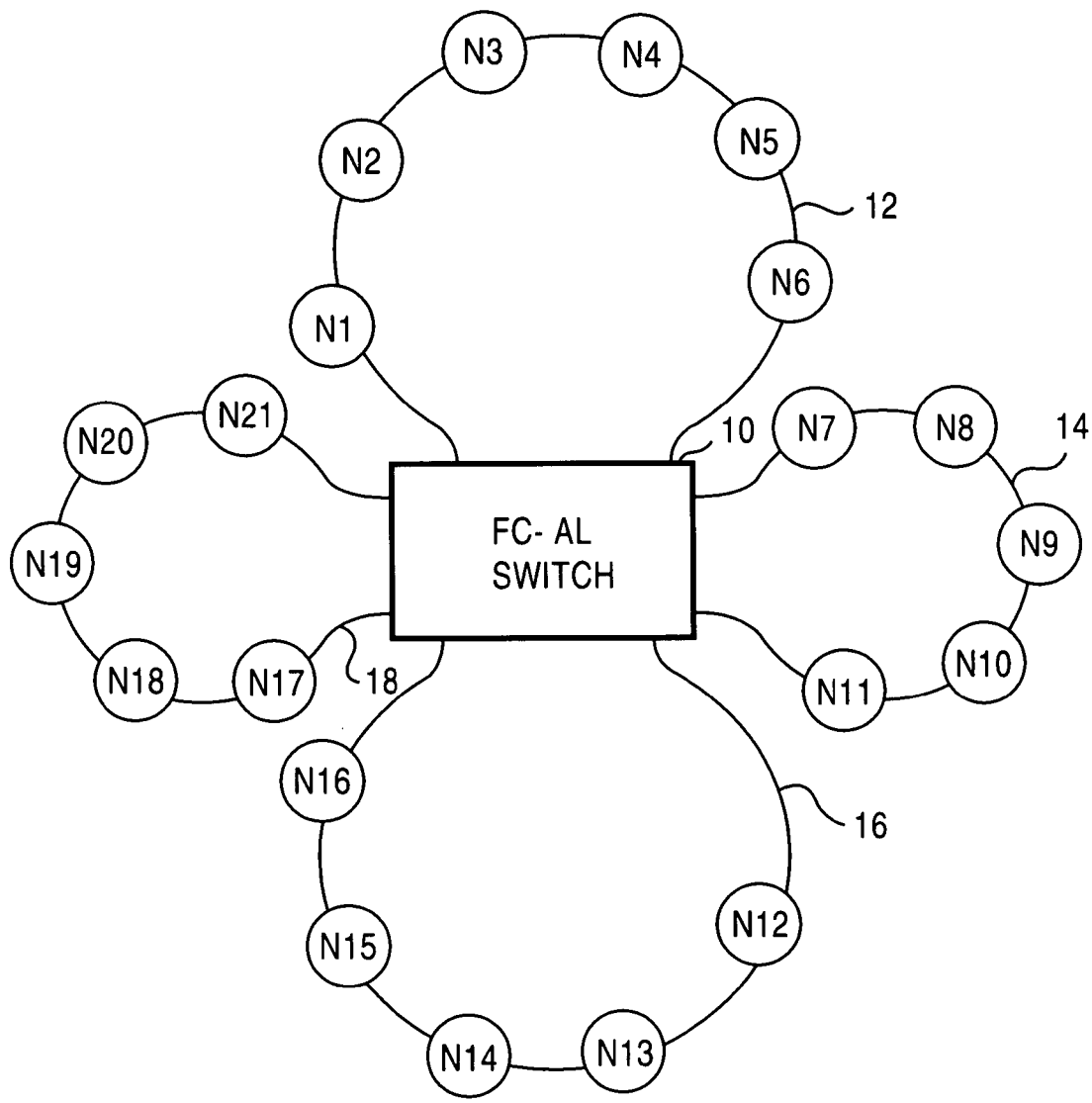
FIG. 1 is a drawing of one example of an FCAL switched architecture according to the teachings of the invention.

Referring to FIG. 1, there is shown one embodiment of a switched FCAL architecture. FCAL switch 10 is coupled to four FCAL networks (hereafter sometimes referred to as FCAL nets) 12, 14, 16 and 18 in this example. Each FCAL net can have one or more NL nodes thereon. Each of the four FCAL networks is coupled to a plurality of NL nodes which have conventional structure and which can carry out FCAL arbitration, data transfer and flow control operations on the FCAL networks. Each node is assigned an address from one of the 127 possible FCAL addresses.

In FIG. 1, each node is given a number symbolizing its address designated in the figure by N and a number inside the circle symbolizing the node.

The function of the switch 10 is to increase total throughput of the system by allowing concurrent conversations to be occurring between pairs of NL nodes, and by doing so in a manner that is not limited by any restriction against "crossing conversations" in the switch itself. A new standard for FCAL topology proposed by IBM involves counterrotating, separate FCAL rings with nodes coupled to both counterrotating rings. This allows concurrent conversations to occur, but the conversations cannot "cross", i.e., it is illegal in this protocol for both conversations to require the same segment of an FCAL as part of the data path for the conversation. "Conversation", as that term is used herein, means a data transfer between two different nodes. The function of the switch 10 according to the teachings of the invention is to allow as many concurrent conversations as possible except that no two source nodes can be talking to different destination nodes on the same FCAL network. In other words, each of FCAL networks 12, 14, 16 and 18 is limited to only one conversation at a time even though data flow from multiple conversations may be simultaneously be flowing through switch 10. This is done by establishing "virtual channels" for each conversation through the switch using separate data paths (or multiplexing techniques in some embodiments). The physical configuration of the switch 10 is not currently believed to be important so long as it uses the destination address in each OPN from a source node to control setting up a separate data path through the switch for transfer of data between that source node and a destination node and uses flow control primitives of the FCAL protocol to control the flow of data such that the switch does not need to have a buffer memory big enough to hold an entire FCAL frame.

The fact that only 127 addresses are possible is an inherent limitation of the FCAL protocol but it is also an advantage in the following way. Because there are only 127 possible addresses, no microprocessor is needed in the switch. With a manageable address space, the location of the destination node can be determined by looking up the destination addresses using a state machine and a lookup table in each switch control circuit coupled to an FCAL network. The lack of a microprocessor both makes the switch faster and cheaper.

In the topology of FIG. 1, each FCAL network 12, 14, 16 and 18 has a one Gigabit/second data throughput capacity. Therefore, the maximum throughput of the system shown would be 4 Gigabits/second if each of the FCAL networks 12, 14, 16 and 18 had a purely local conversation occurring thereon.

Figure 2:
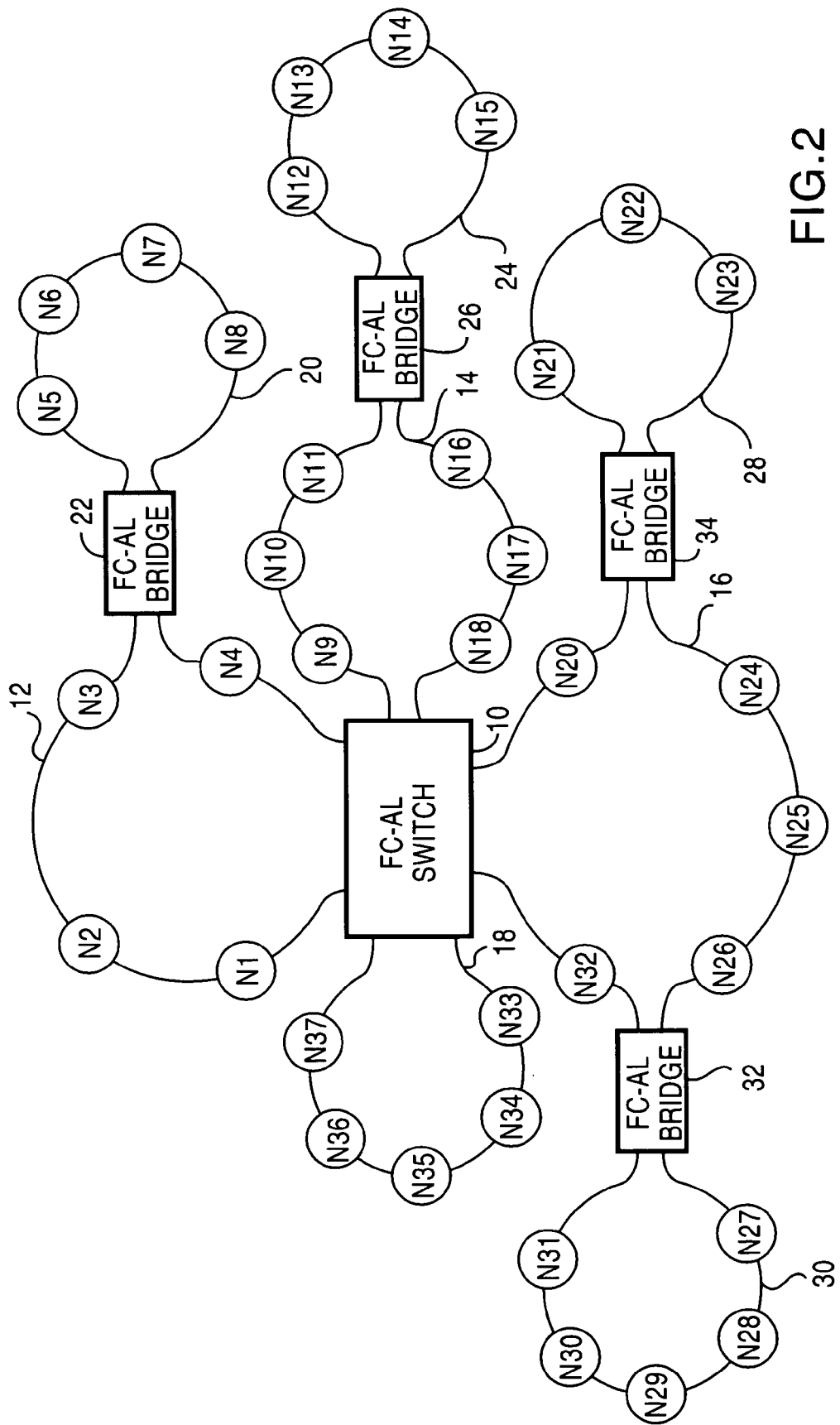
FIG. 2 is a drawing of another example of an FCAL switched architecture according to the teachings of the invention having multiple subloops within some of the FCAL coupled to the switch.

One way that the FCAL switched architecture according to the teachings of the invention can increase throughput is to allow multiple local conversations to occur on each FCAL network through use of bridges. An example of a topology that can take advantage of this feature is shown in FIG. 2. There, switch 10 is coupled to FCAL networks 12, 14, 16 and 18. However, FCAL network 12 is divided into two FCAL subnetworks 12 and 20 by FCAL bridge 22, and FCAL network 14 is divided into two FCAL subnetworks 14 and 24 by FCAL bridge 26. Likewise, FCAL network 16 is divided into three FCAL subnetworks 16, 28 and 30 by FCAL bridges 32 and 34. FCAL bridges 22, 26, 34 and 32 can have the construction detailed in co-pending U.S. patent application entitled FIBRE CHANNEL LEARNING BRIDGE, LEARNING HALF BRIDGE, AND PROTOCOL, Ser. No. 08/786,891, Filed Jan. 23, 1997, the contents of which are hereby incorporated by reference. The maximum throughput in the topology of FIG. 2 would occur when each subloop was having a purely local conversation. In the topology of FIG. 2 with 8 subloops, the maximum throughput would be 8 Gigabits/second.

Figure 3:
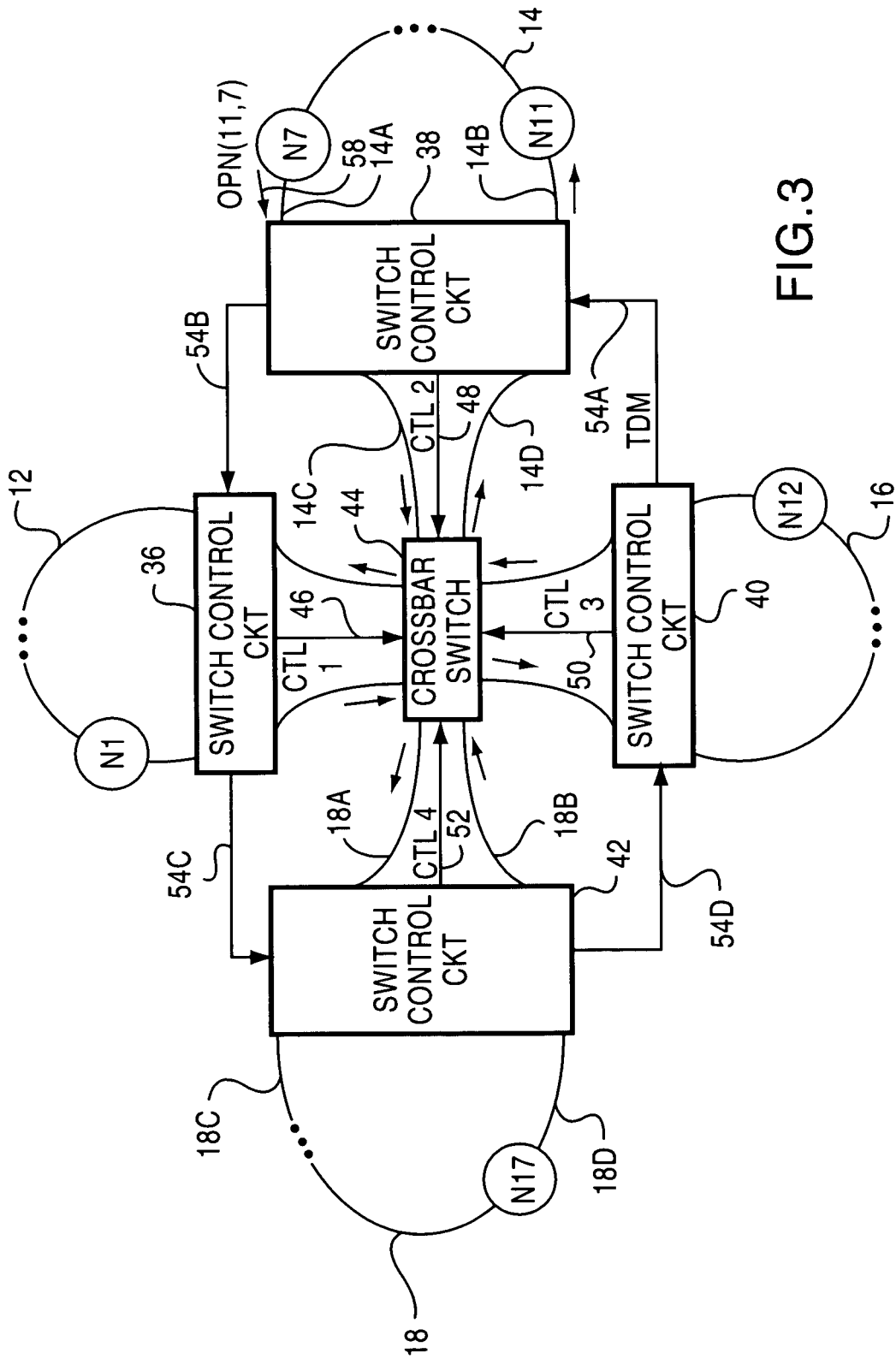
FIG. 3 is a block diagram of the preferred switched FCAL architecture.

FIG. 3 is a high level block diagram of the internals of the FCAL switch 10 for the preferred embodiment using a crossbar switch 44 to make the switched electrical connections between FCAL networks 12, 14, 16 and 18. Each of the FCAL networks 12, 14, 16 and 18 is coupled to its own switch control circuit, i.e., switch control circuits 36, 38, 40 and 42, respectively. The switch control circuits 36, 38, 40 and 42 are distinguished from switch control circuits of prior art switch designs by the fact that none of them have buffer memory therein large enough to store an entire frame of data or enough memory to carry out the packetization process of prior art switch designs.

The function of the switch control circuits 36, 38, 40 and 42 is to transmit primitives and data involved in FCAL arbitration, data transfer and flow control to the appropriate loop segment, do bypass switching when a conversation is completely local so as to bypass the crossbar switch 44, to collectively locate the destination nodes when OPNs are received, and to send appropriate control signals to the crossbar switch once the destination node has been located so as to connect the appropriate FCAL networks together to complete the conversation.

The crossbar switch 44 has 4 inputs and 4 outputs with 1 input and 1 output for each FCAL. The crossbar switch serves to make a data path through the appropriate switch control circuit to the input and output of one FCAL having the source node thereon to the output and input, respectively of another FCAL having the destination node thereon through the appropriate switch control circuit so as to provide a channel through which the conversation between the source node and the destination node may proceed. The crossbar switch must be able to simultaneously connect the input and output of another FCAL having another source node thereon to the output and input, respectively of yet another FCAL having another destination node thereon to provide a data path or channel for a second concurrent conversation. This concept is extended for as many pairs of FCAL as are connected to the switch. The particular connections that are made are controlled by enable signals on control buses 46, 48, 50 and 52. These enable signals are generated by the switch control circuits based upon the locations of the destination nodes for the concurrent conversations. Any crossbar switch that can perform the above described function will suffice providing it can support the necessary data rate and traffic volume.

The switch control circuits 36, 38, 40 and 42 are coupled by a protocol bus 54. In some embodiments, this protocol bus may be multiplexed using any multiplexing scheme such as TDMA. In other embodiments, crossbar switch 44 can be omitted and a TDMA bus substituted with timeslot assignments taking the place of assignments of particular backplane channels through the crossbar switch and messages on the protocol bus updating all switch ports with information about which timeslots are in use and which timeslots are available.

Figure 4:
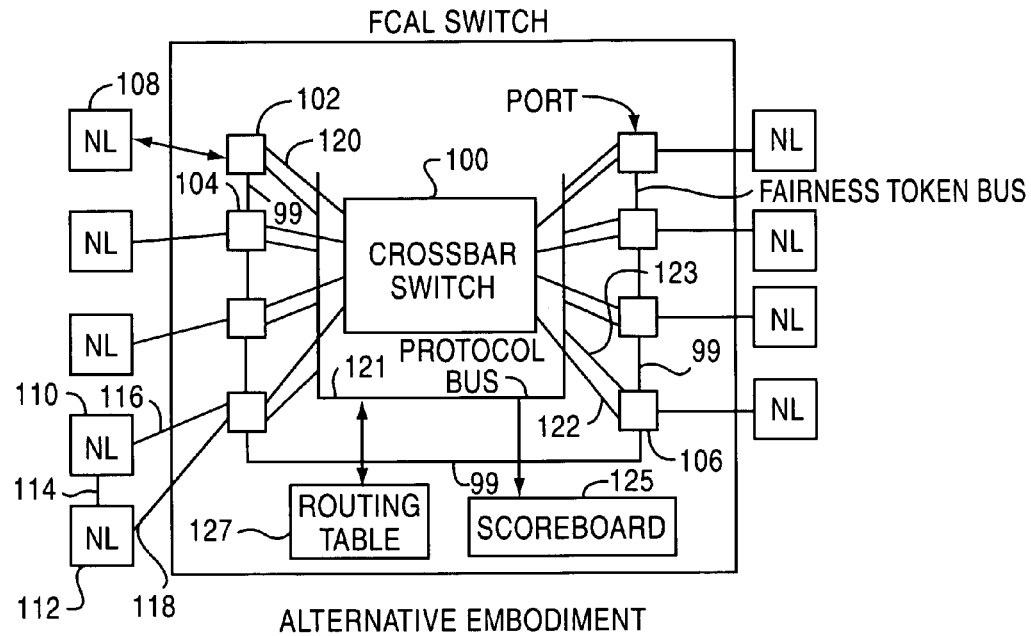
FIG. 4 is a block diagram of the general preferred architecture of a switch to couple a plurality of FCAL nets to provide spatial reuse.

Referring to FIG. 4, there is shown a block diagram of the general architecture of the preferred Fibre Channel switch. The switch is comprised of a crossbar switch 100 coupled to a plurality of learning half bridges such as are represented typically by blocks 102, 104 and 106. Each learning half bridge has a port having an input and an output for coupling to separate input and output wires or fibers of the Fibre Channel link. The Fibre Channel link of each port can be coupled to an individual NL port such as block 108 or an FCAL net such as is represented by NL ports 110 and 112 and links 114, 116 and 118. An FCAL net can have one or more NL nodes on it, so even the connection to the single node 108 is an FCAL net using a Fibre Channel protocol as those terms are used in the claims.

Each learning half bridge in the switch can have a similar front end structure and mode of operation as that described in the parent application Ser. No. 08/786,891, filed Jan. 23, 1997 which is incorporated by reference herein, but preferably has the structure described below in FIG. 7. The "front end" structure refers to the circuitry that is coupled to the port and any Fibre Channel link connected thereto. Each learning bridge port circuit (hereafter sometimes referred to as a port) is coupled to a 50 Mhz 24 bit protocol bus 121. Link 123 represents this connection between port 106 and the protocol bus. The protocol bus is where each port posts its transactions indicating its local FCAL net is busy or has become available so as to update that port's status information in a local copy of scoreboard table 125 in memory. In the preferred embodiment, each port maintains a synchronized local copy of the scoreboard table and the contents are written to the scoreboard by learning from messages posted on the protocol bus. "Synchronized" means all copies of the scoreboard have the same information at all times to avoid "fatal embrace" scenarios (fatal embraces are discussed in the parent bridge case).

Figure 5:
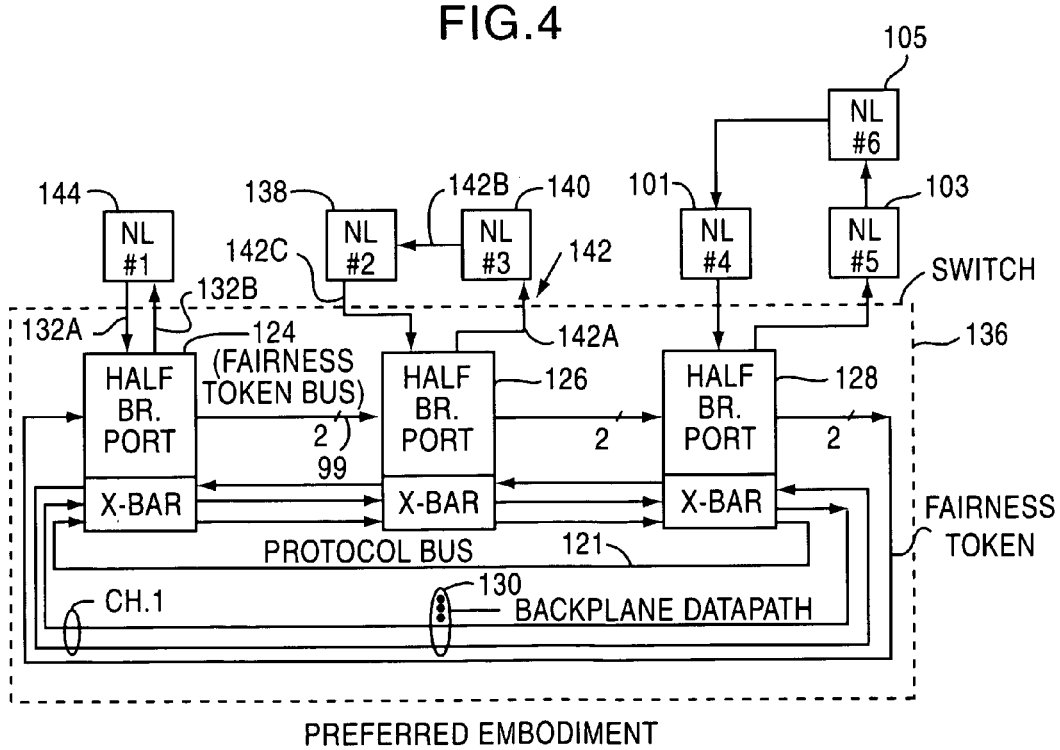
FIG. 5 is a block diagram of the specific preferred "switch slice" architecture of a switch to couple a plurality of FCAL nets to provide spatial reuse with multiple port circuits and a portion of the crossbar switch integrated on each switch chip.

In the alternative embodiment of FIG. 4, the scoreboard 125 and routing table 127 are shown as central shared circuits, but in the preferred embodiment of FIG. 5, every port circuit 124, 126 and 128 has its own copy of the scoreboard table and a routing table. The protocol bus is also the communication path used by a first port when an OPN to a remote destination node comes in to send a request for a connection to a second port coupled to the destination node. The connection request is sent on the protocol bus after the first port checks the scoreboard and determines that the second port is available. The request causes the second port to begin arbitrating for control of its local FCAL net. The scoreboard contains circuitry to read messages on said protocol bus and use the information therein regarding the identity of the sending port and the status codes in the message to update the status entry for the sending port. The structure of this circuitry is not critical, and anything that can perform this function will suffice.

Each learning half bridge includes a streaming back end which drives a bidirectional port such as ports 120 and 122 coupled to the crossbar switch. This streaming backend allows large strings of data to be sent all the way from the source node to the destination node as a stream without the need to buffer any of it. The structure of the streaming backend and the half bridge front end is such that hold back flow control is used so that no frames are stored—they just stream all the way from the source to the destination under buffer by buffer accounting using primitives for buffer management in the nodes themselves and not in the switch. As a result, no frames are ever dropped and there is no need for buffer management in the switch itself nor any need for dropped frame error recovery protocols in the switch or nodes.

In sharp contrast, in the connectionless fabric switches of the prior art for both FCAL nets and other protocols, the conventional wisdom is that the essence of the problem is in buffer management. It is actually possible in the prior art fabric switches in the FCAL net environment to drop frames because of congestion related to traffic problems. When a frame is dropped, a complex error recovery protocol needs to be executed in the nodes (node can mean computer, disk drive or other computing machine coupled to the network) involved to retransmit the dropped frame, or the entire I/O transaction. The error recovery protocol is costly in terms of overhead, and many I/O applications on the nodes are not designed to gracefully handle dropped frames thereby creating the possibility of errors and increasing the complexity of the nodes in requiring error recovery protocol software to exist in the node. The acknowledged, connectionless class of service in Fibre Channel (Class 2) does not eliminate or reduce the frequency of dropped frames. the only advantage is that class 2 has negative acknowledgements to the source node from the fabric or destination node if/when any frames are dropped. The only advantage is that this negative acknowledgement may provide more timely notification of dropped frames. It does not improve the intrinsic reliability of FC networks.

In the invention, the hold back flow control which is part of the FCAL protocol is used to advantage to eliminate the need for buffer memory in the switch. Thus, in the invention, frames are not held in buffer memory, so they cannot ever be dropped because of congestion. The "hold back flow control" used by the invention prevents data from ever being transmitted from the source until the switch is ready to stream it to its destination. Therefore, there is no need for any complicated error recovery protocols in the switch or in the nodes and no need for massive amounts of memory in the switch. This is only possible in the Fibre Channel protocol where the possibility of using hold back flow control exists by virtue of the use of primitives and buffer by buffer accounting. There is no low level flow control in ATM or 1 GB Ethernet protocols. Those protocols have X-on and X-off flow control on a higher level of the ISO level. This X-on and X-off flow control is "embedded" in the data characters, in contrast to Fibre Channel where buffer-to-buffer flow control is external to any data or frames. In FCAL, the OPN primitive signals when a source node has data to send, and the destination node then signals with a RRDY primitive sent back to the source saying it has reserved space to receive a frame. One and only one frame is then sent and no other frames are sent until the source receives another RRDY primitive from the destination node. This use of primitives and reserved space and buffer by buffer accounting is the meaning of hold back flow control which is used in the invention.

The lack of buffer memory in the half bridges makes them highly compact and susceptible to full integration since memory is a large consumer of die area. The ability to integrate multiple half bridges on a single integrated circuit die reduces the cost per port to a substantially lower cost than for a corresponding number of FL_ports.

Figure 7:
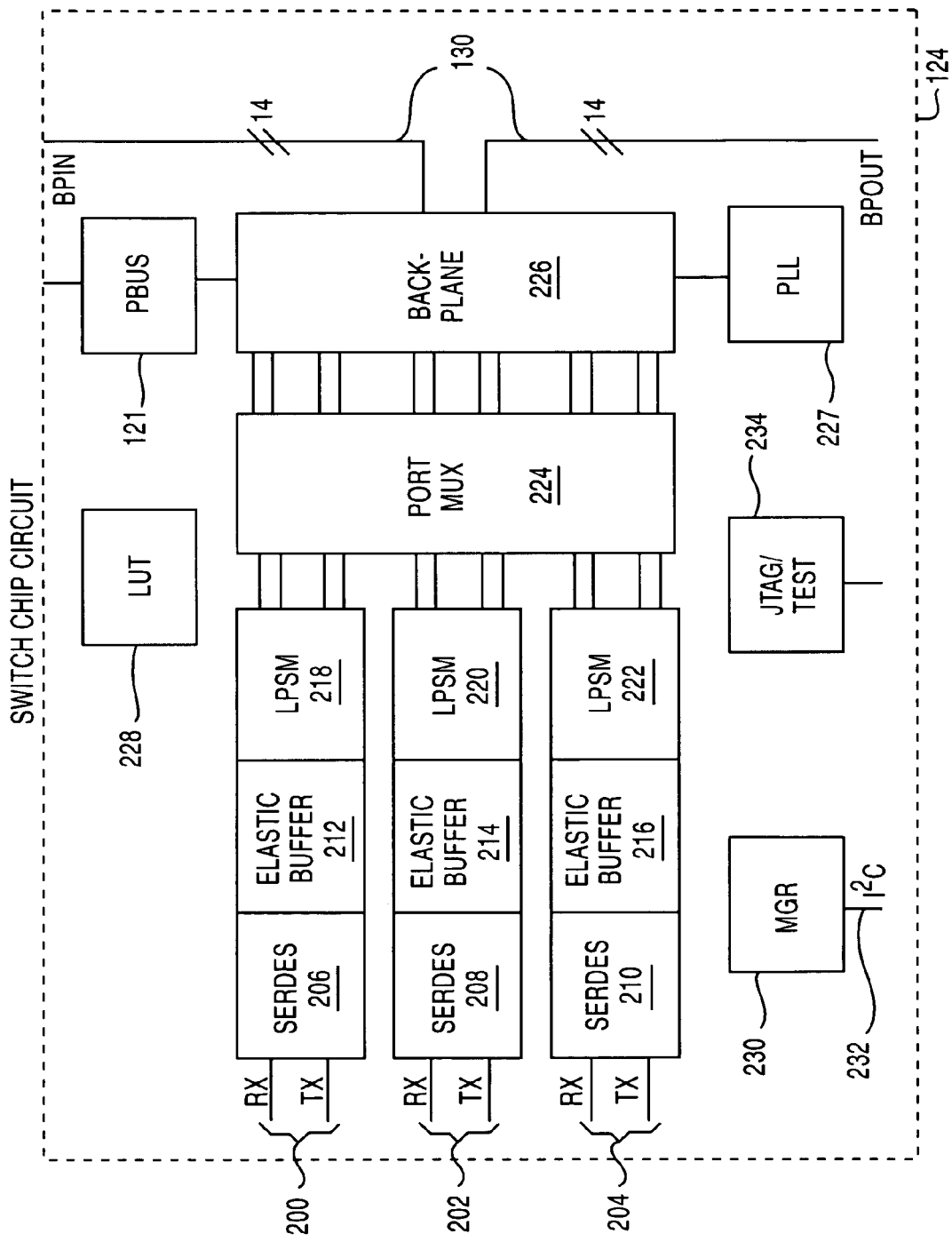
FIG. 7 is a block diagram of the preferred architecture of each switch chip in the FCAL switch system.

Prior art switch designs typically had a crossbar switch chip coupled to a plurality of switch module chips each of which had a substantial amount of the die area consumed by buffer memory cells. Thus two separate chip designs were necessary to implement a switch. In the architecture of the invention since part of the crossbar switch and the port circuitry for several ports are on one IC die, only one chip design is necessary to implement a switch. The various portions of the distributed crossbar switch on different chips, when coupled together, form one complete crossbar switch. This crossbar switch has 14 backplane channels, but they are not all available because each switch port chip also includes access circuitry to the backplane channels. If only two switch port chips having the architecture of FIG. 7 are coupled together, the amount of backplane access circuitry present is not enough to access all 14 backplane channels. The number of backplane channels that can be accessed with the available access circuitry defines a concept of "available bandwidth". As the number of switch port chips coupled together grows, the amount of available backplane access circuitry grows so that the number of backplane channels available grows, i.e., the available bandwidth grows which is as it should be because traffic volume is increasing with an increasing number of ports. In other words, each switch port chip is a network slice and a network can be fabricated with as many ports as needed, and the crossbar switch will automatically grow in available bandwidth in proportion to the number of ports adequately to handle the increased traffic.

FIG. 5 illustrates the actual architecture of the preferred species of the separate channels backplane subclass of switches. Each block 124, 126 and 128 represents an integrated switch chip having a plurality of ports (learning half bridges) and a portion of the crossbar switch thereon. The function of each of the half bridge ports is to provide switching capability between networks connected using the Fibre Channel physical layer and the Fibre Channel Arbitrated Loop transmission layer protocol. A point-to-point backplane data path 130 comprised of a plurality of channels through the distributed crossbar switch carries data from port to port. Each channel has a conductor in both directions. Each channel is a separate one gigabit per second data path which is selectively coupled by the crossbar switch to the two ports involved in a loop tenancy and is not shared by any other ports at that time. In one example of an architecture in accordance with the preferred embodiment, there are 14 switchable channels for a total of 28 Gbits/sec of bandwidth. The function of the backplane data path 130 combined with the crossbar switch is to carry multiple conversations of data between ports simultaneously.

Since each of the switch chips 124, 126 and 128 contains a plurality of independent ports, spatial reuse and concurrency is achieved in the architecture of the invention in three ways: first, any purely local conversations between source and destination nodes on the same FCAL net can simultaneously occur on all FCAL nets without consuming either switch chip or backplane bandwidth; second, any conversations between different FCAL nets coupled to the same switch chip can occur purely within each switch chip without consuming any bandwidth on the backplane bus; and, third, the multiple backplane data paths allow multiple simultaneous conversations between nodes on FCAL nets coupled to different switch chips. For a first example, with 36 ports coupled to 36 FCAL nets, a peak achievable bandwidth of 72 Gbits/sec is achievable with no backplane channel utilization representing 36 simultaneous local full-duplex conversations. The peak bandwidth through the switch is equal to 2 Gbits/sec per backplane channel (1 GB/sec send and 1 GB/sec receive), plus an additional 2 Gbits/sec for each purely local conversation that can be simultaneously serviced. Thus, with 14 backplane channels all in use and 36 ports coupled to 36 FCAL nets with all ports not coupled to one of the 14 backplane channels having local conversations ongoing, the total traffic volume is 28 GB/sec through the switch plus 22×2 GB/sec equaling 44 GB/sec for a total of 28+44=72 GB/sec.

In an exemplary embodiment of an FCAL switch using the teachings of the invention, each switch chip has 3 ports and there are 12 switch chips for a total of 36 ports in this embodiment. Each switch chip supports 14 backplane channels such that up to 14 remote full-duplex conversations through the switch 136 can be supported by 28 ports coupled to the 14 backplane data paths plus 8 purely local full-duplex conversations between the remaining 8 ports for an aggregate peak bandwidth of 44 Gbits/sec. Port and backplane contention will reduce the total bandwidth below this peak, but average throughput and arbitration latency of a switched system will still be faster than an arbitrated FCAL net of the same size. Spatial reuse provided by a switch allows applications which make use of concurrent conversations to use FCAL local loops and a switch to overcome the one loop tenancy at a time limitation of pure Fibre Channel Arbitrated Loop networks without a switch.

Each switch chip is coupled to a fairness token bus 99, which, in the preferred embodiment, takes the form of a two wire bus. A fairness token circulates to all ports on this bus enabling a "round robin" fairness algorithm. Each port has circuitry to receive the fairness token, hold it for a short time and forward it to the next port so that the token reaches all ports eventually. Each port has a priority level assigned to it that is used in arbitration within the switch of multiple access requests to a busy destination node. When the fairness token is in the possession of a port, that port has the highest priority level and is guaranteed access. When a port has the highest priority level, it can "camp" on a busy remote port, and be guaranteed that it will be given access when the port is available. When access has been granted, the token is forwarded. This prevents starvation of any port from communication with a busy node.

In the preferred embodiment, data path 130 is comprised of metallic data paths on the printed circuit board on which the port chips are mounted couples the outputs of each crossbar switch portion of one of the port chips to the input of the crossbar switch portion of another port chip. Each bridge portion has three inputs and three outputs (one input and output for each of the three half bridges on each chip) for FCAL net primitives and frame data. Each pair of one input and one output is called a port and can be coupled to a single NL node or an FCAL net.

Note that the distributed nature of the crossbar switch and the full integration of the ports with the crossbar switch makes the architecture of the switch modular and easily expandable. That is, the architecture represents a sliceable architecture which can be built into as large a switch with as many ports as is necessary limited only by the maximum number of permissible addresses in the FCAL address space of 128 nodes. Integration of the ports with a crossbar switch slice on the same chip allows switches to be built with as few as two switch chips or many more because the crossbar switch is scaleable and because each chip can be coupled by its portion of the crossbar switch to any one of the plurality of separate backplane channels. Prior art fabric switches had separate, nonscaleable circuits for the crossbar switch. This meant that the crossbar switch had to be built as complex as was necessary to handle up to the maximum number of ports. If fewer than the maximum number of ports were used, a large part of the prior art crossbar switch capacity was wasted. In contrast, in the invention, because of the full integration of all necessary circuitry onto one chip including a portion of the crossbar switch, the crossbar switch is scaleable, and all sizes of switches are easily constructed and quite affordable because of the inexpensive, fully integrated construction with no buffer memory and no complicated error recovery protocols.

Dual Simplex

FCAL NL nodes are capable of duplex communications in that they can send data at the same time they are receiving data. The problem that conventional FCAL nets and fabric FL port based switches fail to address is the fact that typically the destination node in more highly populated FCAL nets is less likely to have data for the source node but other nodes may have data for the source node which they cannot send since the source node is tied up in a conversation with the destination node. Thus, there is a waste of bandwidth. Typically, node adapter cards that interface a computer or disk drive to the FCAL net cannot re-shuffle their transmit queues in order to find a frame destined for the current source node and move it to the top of the transmit queue. Thus, head end blocking usually occurs and causes a full duplex connection to be effectively simplex. In a 100 mbyte/sec link for example, NL nodes can simultaneously burst out at 100 mbyte/sec while they are simultaneously bursting in at the same rate. If the destination node has no data to send to the source node, the 100 mbyte/sec of burst in bandwidth of the source node is wasted in conventional fabric switches with FL ports.

In conventional FCAL nets, the protocol requires that nodes must reserve all resources required for a duplex conversation even in cases where there is only traffic in one direction. This means, in the context of FIG. 5, node 101 can be sending data to node 103 but node 103 is required by the rules of the protocol to be sending data only to node 101 during the same loop tenancy. This is true even though it may have no data to send to node 101 and even though it may have data to send to node 105. Likewise, if the switch of FIG. 5 followed the normal FCAL protocol, if node 138 had frames to send to node 103, node 103 would be restricted to sending data only to node 138 even if node 103 had no data for node 138 but did have data for node 140.

This waste of bandwidth is remedied by the provision of dual simplex conversations across the switch of the invention. The ports and crossbar switch of the invention allow dual simplex conversations across the switch but not within any local loop coupled to a port. Simply put, dual simplex capability allows nodes other than the destination node to send data frames to the source node while that source node is sending data to its destination node. In the example of FIG. 5, a dual simplex connection for two separate one-way conversations could occur as follows. Suppose, node 138 has data to send to node 103 but node 103 does not have any data for node 138. Suppose also, node 144 has data for node 138. With the dual simplex capability of the invention, node 138 can send its data to node 103 while simultaneously receiving data from node 144.

Dual simplex capability is accomplished in all species within the genus of the invention by three basic steps, illustrated in FIG. 15:

1) establishing a front channel half duplex data path between a source node and destination node on different FCAL nets (step 350) and stripping and storing or counting any buffer credit RRDY primitives output by the source node and not transmitting them to the destination node (step 352);

2) establishing a back channel data path between a third node and said source node if said source node is dual simplex capable but not transmitting to said source node any OPN primitive emitted by said third node (step 354), and transmitting a number of RRDYs either equal to the number of RRDYs output by said source node or the number of RRDYs needed by said third node to send all the data it has to said source node before closing said back channel connection (step 356)—transmission of said RRDYs being one at a time—any excess RRDYs not used by the third node are saved for use by another third node in a subsequent dual simplex back channel connection; and 3) receiving any RRDYs transmitted by said destination node and mixing them in with data frames and/or primitives transmitted on the back channel by the third node so as to exercise flow control on transmissions of data frames from the source node to said destination node (step 358).

In the preferred species of switch within the genus, the following steps are carried out to implement dual simplex data exchanges:

1) in a port of the switch coupled to an FCAL net, receiving a full duplex OPN(Dest, Src) from a source node designating a destination node address, Dest, and a source node address, Src, and converting the full duplex format OPN(Dest, Src) to a simplex or half duplex format OPN (Dest, Dest) and establishing a "front channel" connection through the crossbar switch to the destination node (in the preferred embodiment, conversion from full to half occurs if and only if a configuration bit is set in each port to allow dual simplex, and, if set to allow it, always converts all full duplex OPNs to half duplex OPNs even if no dual simplex connections are expected—in alternative embodiments, conversion from full to half duplex always occurs and is not configurable and in other embodiments, dual simplex is never allowed);

2) storing at least the source node address in the port of the switch coupled to the source node, hereafter referred to as the source port;

3) stripping buffer credit RRDYs output by the source node and not transmitting the RRDYs output by the source node to the destination node of the front channel connection, and either storing or counting the RRDYs output by the source node and making them available to a third node to send data to the source node either by transmitting stored RRDYs output by the source node one at a time to the third node or by conveying the number of RRDYs output by the source node to a third port coupled to the third node and synthesizing in the third node a number of RRDYs equal to the value of the count and sending the RRDYs to the third node one at a time (the preferred embodiment does not store the RRDYs—it just counts them and regenerates them in the source port when needed for transmission to a third node);

4) updating status data in a "scoreboard" memory of each port to indicate which busy ports are coupled to source nodes of front channel connections and thus are available to receive frames in dual simplex communication from third nodes—the scoreboard memory is a memory that stores status data such as whether or not a port is busy, and, if busy, whether it is coupled to the source node of the conversation it is engaged in and is thus open to receive data from a third node in a dual simplex communication;

5) establishing a "back channel" connection through the crossbar switch from the third node to the source node and transmitting an OPN from the third node to the source switch port—then the stored source node address in the source port is compared to the destination node address of the OPN transmitted from the third node and allowing dual simplex communication to proceed on the back channel if the addresses match, but blocking dual simplex communication with this particular third node if the addresses do not match by sending a CLS primitive to the third node;

6) in the event dual simplex communication is allowed, deleting the OPN from the third node and never transmitting it to the source node, and releasing stored RRDYs to the third node (either one at a time or all at once) thereby allowing the third node to start sending data frames to the source node; and 7) thereafter data frames are transmitted by the third node to the source port with one data frame transmitted in response to each RRDY received by the third node— these data frames are mixed with RRDYs received from the destination node via the front channel connection— the combined data frames and RRDYs are transmitted to the source node via the back channel connection.

The "back channel" is the data path going into the source node along with a connection through the switch ports and backplane if necessary to couple the third node to the source node and is the channel used by a third node to send dual simplex data frames into the source node.

The format conversion mentioned above converts the OPN (Dest, Src) received from the source node 138 into an OPN (Dest, Dest). This conversion occurs as the OPN is propagated through the source port before it is sent to the remote port coupled to the destination node. Conversion of the OPN primitive format to OPN(Dest, Dest) and taking away the buffer credits from the destination node converts the normal full duplex loop tenancy to a half duplex or simplex loop tenancy where data flows in only one direction from the source node to the destination node and the destination node cannot send any frames back to the source.

Borrowing the buffer credit transmitted by the source node and giving it to another node that has data to send to the source node is important to dual simplex capability. In the specific example being considered, it means that any RRDY primitives output by source node 138 that would otherwise give destination node 103 one or more buffers of credit for return data are, instead, stripped by the source port before the OPN is transmitted to the remote port, and stored so that they may be given to node 144 after a simplex back channel connection is established. Specifically, suppose source node 138 transmitted OPN(103, 138) RRDY RRDY. Port 126 would convert this to OPN(103, 103) and transmit it to switch port 128 when the connection through the backplane between switch ports 126 and 128 has been established in any of the ways described herein. Port 126 would latch the two RRDYs or increment a counter of buffer credits to a count of two and give them to node 144 one by one after a back channel connection was established between node 144 and node 138.

Swallowing or deleting the back channel OPN from the third node in the source port is important to dual simplex because it prevents the source node from receiving it and becoming confused. Because of the structure of the FCAL protocol, it is a protocol violation if a node receives an OPN, and that node has already established a previous connection. However, when a node has opened another node, it is expecting possible data frames to be sent back to it from the destination node on the back channel (the part of the loop not being used for outgoing data from the source to the destination). Thus, if a node other than the destination node has frames to send to the source node, the following things happen. First, the third node sends an OPN. The port coupled to the third node uses the destination address in the OPN to look up the ID of the port coupled to the destination node. This search results in output from the routing table of the ID of the source port coupled to the source node in the original forward channel transmission. This ID is then used to search the scoreboard memory to determine the status of the source port. The source port sent a message to the scoreboard memory on the protocol bus updating the status entry in the scoreboard memory for the source port to busy when the source port established the front channel connection. In one alternative embodiment, this busy status will be found when the scoreboard is consulted, but that will not deter the third port from posting a connection request message on the protocol bus requesting connection to the source port. The source port will determine if it has any stored buffer credit and grant the request if it does by posting a reply message on the protocol bus naming the backplane channel to use. The third port and the source port then both connect to the named backplane channel.

There are several alternative embodiments for establishing the back channel simplex connection through the backplane. One involves updating all the scoreboards of all ports with information as to which source node address is coupled to any port which is indicated in the scoreboard as having a busy status and is thus available for dual simplex. In this alternative embodiment, the source port posts a message to the protocol bus to update all scoreboards in every port to indicate that although it is busy, it is coupled to the source node of the loop tenancy and is thus available to receive data in a dual simplex mode. In this alternative embodiment, the third port checks its scoreboard, and if it determines that its destination node has the same address as the source node coupled to the source port, it then sends a connection request message. If it determines from the scoreboard data that the source port is not dual simplex capable, it does not send a connection request message.

In the preferred embodiment each switch port which utilizes dual simplex is only coupled to one node, because the switch ports are not expensive. In this preferred embodiment, the scoreboards are not updated with data indicating the address of the node connected to the source port so as save memory space in the scoreboards and traffic on the protocol bus. In the preferred embodiment, the third node simply transmits a connect request on the protocol bus naming the source port. The source port then determines if it is dual simplex capable by checking its own scoreboard for data indicating whether it is dual simplex capable and determines if its camp list is full. If it dual simplex capable and its camp list is not full, it grants all connection requests. It then picks a backplane channel for the back channel connection and sends a response message on the protocol bus to the third node. Both the third node and the source node then establish a connection on the identified channel and the third node sends its OPN. The destination address in the OPN is then compared by the source port to the address of the source node using the latched OPN received from the source node.

If there is no match, the source port generates a CLS and sends it to the third port. If there is a match, dual simplex mode is allowed, the OPN from the third port is quashed, and the stored RRDYs are sent to the third port from the source port, one RRDY at a time up to the number of RRDYs stored. In some alternative embodiments, the RRDYs are not actually stored but are counted and the count is maintained. This starts the transmission of data frames from the third node. The arrival of a data frame from the third node triggers release of another RRDY from the source port if another RRDY is available at the source port for release. These data frames are received by the source port and transmitted on the back channel to the source node. Any intervening nodes pass the data frames through because they do not control the loop. Any subsequent RRDYs output by the source node are intercepted by the source port and transmitted on the backplane channel to the third port to cause the third node to transmit a data frame for each RRDY so intercepted. When a CLS is received from the third node, any remaining stored RRDYs are preserved for use as buffer credit for the next third node that wishes to send data to the source node. The job of managing buffer credit falls to the state machine in every port in the preferred embodiment.

Another embodiment for the source port to determine if it is dual simplex capable is to send post a message on the protocol bus instructing any port that has an OPN send the destination address of the OPN to the source port for comparison to the source node address. If there is a match, a reply message is posted directing the port to use a specified backplane channel and both the third port and the source port connect to that channel. The transaction then proceeds as above.

The dual simplex process essentially tricks the link layer of the software of the source node into thinking the incoming frames are from the destination node, when they are actually from the third node. Since the frames internally contain all the information needed to get the data therein to the right place in the source node, no harm is done because the frames pass through the link layer and the upper layers of software read the frames and use them properly. However if an OPN from the third node were to arrive on the back channel, the link layer of conventional NL nodes becomes confused because it knows the source node just opened some other node and is not supposed to be receiving any OPNs until the current loop tenancy is terminated.

The source port also mixes these frames of data from the third node in with RRDY primitives transmitted from the destination node of the original loop tenancy on the FCAL net back channel. Each time the source node receives an RRDY from the destination node, it outputs another frame of data to its destination node. The mixing in of RRDYs from the destination node with the frames of data from the third node on the FCAL net backchannel causes the source node to continue outputting data frames bound for the destination node.

Closing a dual simplex connection properly to avoid deadlock and sequence errors is important. The state machine of any port coupled to a source node and facilitating a dual simplex transaction (elsewhere herein sometimes referred to as a dual simplex port or source port) must insure that when a CLS is output by the source node that the CLS is not forwarded to the destination node until the third node has finished transmissions on the back channel and output its own CLS. Further, the state machine of any port coupled to a source node and facilitating a dual simplex transaction must not wait for a CLS in the case where access to the source node is denied to a third node because of the lack of any RRDYs transmitted by the source node to avoid possible deadlock. Thus, the state machine in a dual simplex port must therefore have the following behaviors as illustrated in the following discussion of four possible dual simplex close scenarios.

1) A CLS is received from the source port—the CLS is replicated by the source port and sent to both the third port and the destination port. The third port transmits the CLS to the third node which handshakes with its own CLS which is returned to the source port. The source port deletes the CLS from the third node but remembers that it has arrived and releases the back channel connection. The CLS reaches the destination port and the destination node. The destination node handshakes by emitting its own CLS which is transmitted back to the source port and to the source node which closes. The source port drops the front channel connection.

2) A CLS is received from the third node—the source port deletes the CLS so that it does not get forwarded to the source node and sends a CLS generated in the source port back to the third port, and then drops the back channel connection to the third port. The third port forwards the CLS to the third node. Any new third port can then initiate a new dual simplex connection.
3) Destination node transmits a CLS—the CLS is received at the source port and held by the source port. A copy of the CLS is transmitted to the third port which transmits it to the third node. The third node closes under normal FCAL close protocol and handshakes by transmitting a CLS to the source port. The source port transmits the CLS to the source node which closes under normal FCAL close protocol rules and handshakes by transmitting a CLS to the source port. That CLS is forwarded by the source port to the destination port which forwards it to the destination node. The source port then drops both the front and back channel connections simultaneously.
4) Destination node transmits a CLS—the CLS is received at the source port and held by the source port. A copy of the CLS is transmitted to the third port which transmits it to the third node. The source node closes under normal FCAL close protocol and handshakes by transmitting a CLS to the source port. The source port holds the CLS from the source node until a CLS is received from the third node. Upon receipt of a CLS from the third node, a CLS generated in the source port is simultaneously transmitted to the destination port and the source node. The source port then drops both the front and back channel connections simultaneously.

Specific Dual Simplex Example

As a specific example of dual simplex in the context of FIG. 5 using a scoreboard which indicates dual simplex capability, refer to FIGS. 16A to 16D which are a flowchart of the processing carried out by the ports to implement dual simplex communication. In this example, suppose node 138 want to send data to node 101. Suppose also that node 144 wants to send data to node 138. Node 138 generates an OPN(101, 138), RRDY, RRDY and transmits these three primitives to port 126 (step 360). Port 126 converts the OPN to a simplex OPN(101, 101) and stores the original OPN including both the source and destination addresses of the OPN and stores the two RRDYs (steps 362 and 364). Port 126 looks up destination address 101 in the routing table and finds it is connected to port 128 (step 366). The scoreboard table is consulted, and port 128 is found to be available (step 368). Port 126 posts a message on the protocol bus 121 requesting port 128 to initiate arbitration for its local loop and pick a backplane channel (step 368). Port 128 wins control of its loop and sends a reply message naming the backplane channel 1 for use (step 370). Ports 126 and 128 send commands to their portions of the distributed crossbar switches to connect to backplane channel 1 (step 372). Port 126 forwards the OPN(101, 101) to port 128 as soon as node 128 is available and it passes straight through port 128 without delay to node 101 (step 374). The two RRDY primitives of buffer credit transmitted by node 138 and intended for node 101 are stripped off the transmission to node 101 by port 126 and maintained as a count in the source port for award by regeneration and transmission to another node that wants to ship frames to node 138. Node 101 replies with an RRDY (step 376). This RRDY is transmitted back on backplane channel 1 to port 126 where, as described below, it is mixed in with data frames from a third node (node 144) that is transmitting data frames in dual simplex mode to node 138 so as to keep the source node 138 outputting new frames to the destination node 101.

In the embodiment considered here, port 126 posts a message to the protocol bus to update all scoreboards that it is busy but is available for dual simplex connections. This message can be based upon the fact either that the source node knows by watching traffic or comparing source node addresses on its local FCAL net to the AL-PS value in the original OPN, that it is connected to a source node of the front channel and is capable receiving dual simplex transmissions, or its configuration bit indicates dual simplex connections are allowed. This message on the protocol bus would result in update of all scoreboards (step 380). Node 114 then arbitrates for and wins control of its FCAL net and generates an OPN (138, 144). Port 124 receives this OPN, stores it (and converts it to half duplex in the preferred embodiment) and uses the destination node address 144 to search the routing table (step 384). This returns the ID of port 126. This ID is used by port 124 to search its scoreboard table. Port 124 finds port 126 in its routing table, finding from its scoreboard that port 126 is busy but dual simplex capable (step 386) and posting a connection request on protocol bus 121 requesting a connection to source port 126 (step 388). This would result in a connect response reply message from port 126 granting the request and naming backplane channel 2 for use (step 390). Both ports 124 and 126 would connect to channel 2 (step 392), port 124 would send its OPN(138, 144) to port 126 (step 394) which would cause port 126 to compare the destination address 138 to the source node address (step 396), find a match, quash the OPN and forward one RRDY to port 124 via channel 2 (step 400). The backchannel transaction would proceed until buffer credit ran out, or third node had no more data frames to send or a CLS was sent by either node 138 or 144 (step 402).

In the preferred embodiment, port 124 would simply post a connection requests which would automatically be granted by port 126 with a reply message saying use backplane channel 2. Ports 124 and 126 would both connect to backplane channel 2, and port 124 would send its OPN(138, 144) to port 126. Port 126 would compare the source address it latched from the original OPN, which is 138, to the destination address of the OPN received from node 124, which is also 138, and find a match. Port 126 would quash the OPN(138, 144) and transmit one RRDY back to port 124 which would reach node 144 and result in transmission of one frame of data. That frame of data would pass through backplane channel 2, port 126 and the back channel path and reach node 138. Port 126 would then send the remaining RRDY to port 124 which would result in another frame of data being transmitted. Any further RRDYs transmitted by node 138 would be latched or counted and sent to port 124 in the normal course of flow control, or if node 144 sent a CLS, the RRDYs stored by port 126 would be saved for grant to another third node until such time as the original loop tenancy was terminated with a CLS from either the source node or destination node.

In alternative embodiments, the port 126 can determine whether it is capable of dual simplex by a sending a message to port 124 asking for the destination address from the OPN (138, 144) and then compare this destination address to the latched source address from the original OPN(101, 138). If there is a match, sending a reply message saying, "Use backplane channel X and send me your OPN" whereupon the transaction proceeds as defined above. If there is no match, generating a CLS and sending it to the third port or sending a message that causes the third port to generate a CLS and send it to the third node.

Returning to the main example, port 126 mixes RRDYs received from node 101 on the front channel connection with data frames received from node 144 and sends the combined data stream to the source node over the back channel of the FCAL net coupled to the source port (step 404). This keeps source node 138 outputting data frames to destination node 101.

There are three scenarios for closing the dual simplex data paths. An example of each will be discussed in the next three paragraphs.

Suppose source node 138 issues a CLS (step 406). In that case, source port 126 duplicates the CLS and forwards it to destination port 128 and third port 124 simultaneously (step 408). The third node 144 replies with its own CLS which is forwarded to port 126 (step 410). Port 126 discards the CLS received from third node 144 but notes that it has arrived and both ports 124 and 126 relinquish their back channel connections through the backplane (step 410). When the CLS reaches destination node 101, it replies with its own CLS back to source node 138, and ports 126 and 128 relinquish their front channel connections (step 412).

Now suppose third node 144 issues a CLS (step 414). In this case, the CLS is transmitted to source port 126 which deletes the CLS (it is not sent to the source node 138—step 416), and ports 124 and 126 each relinquish their back channel connection through the backplane (step 418). Any new third node can initiate a new dual simplex connection.

Finally, suppose destination node 101 issues a CLS (step 420). Source port 126 receives the CLS and holds it temporarily and does not send it to source node 138 (step 422). A copy of the CLS is sent to third port 124 and the third node (step 424). The third node replies with its own CLS which is received by the source port and sent to the source node (step 424). The source node replies with a CLS which is forwarded to the destination node (step 426). The source port and the destination and third ports then drop the front channel and back channel connections (step 428).

Dual simplex mode allows many different third nodes to deliver frames to the source node during its "conversation" (loop tenancy) with the original destination node. Dual simplex almost doubles throughput of the switch.

The Process of the Preferred Embodiment

Figure 6A:
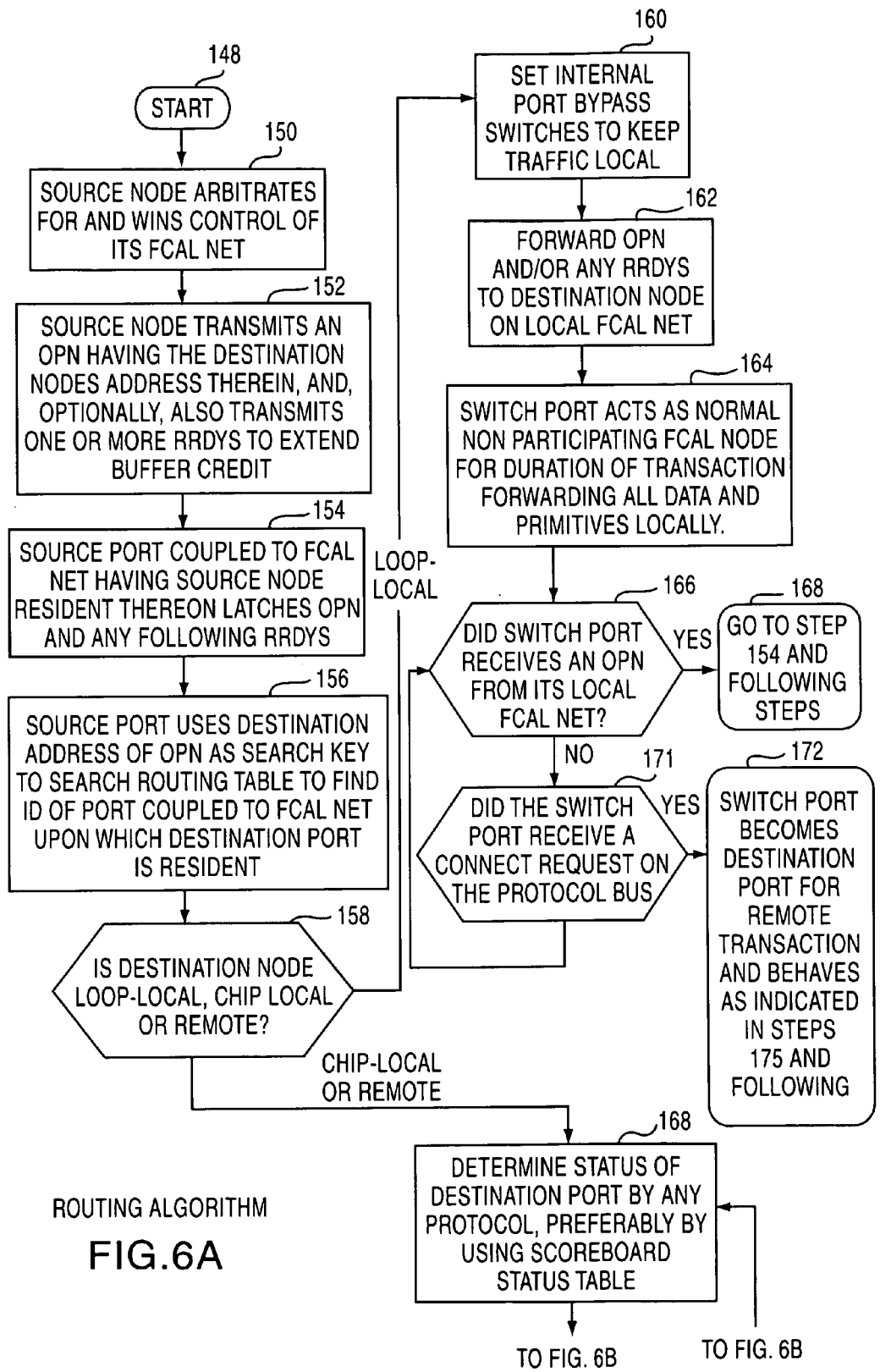
FIGS. 6A through 6C are a flow diagram of a routing algorithm for general switch mode operation (non dual simplex).
Figure 6B:
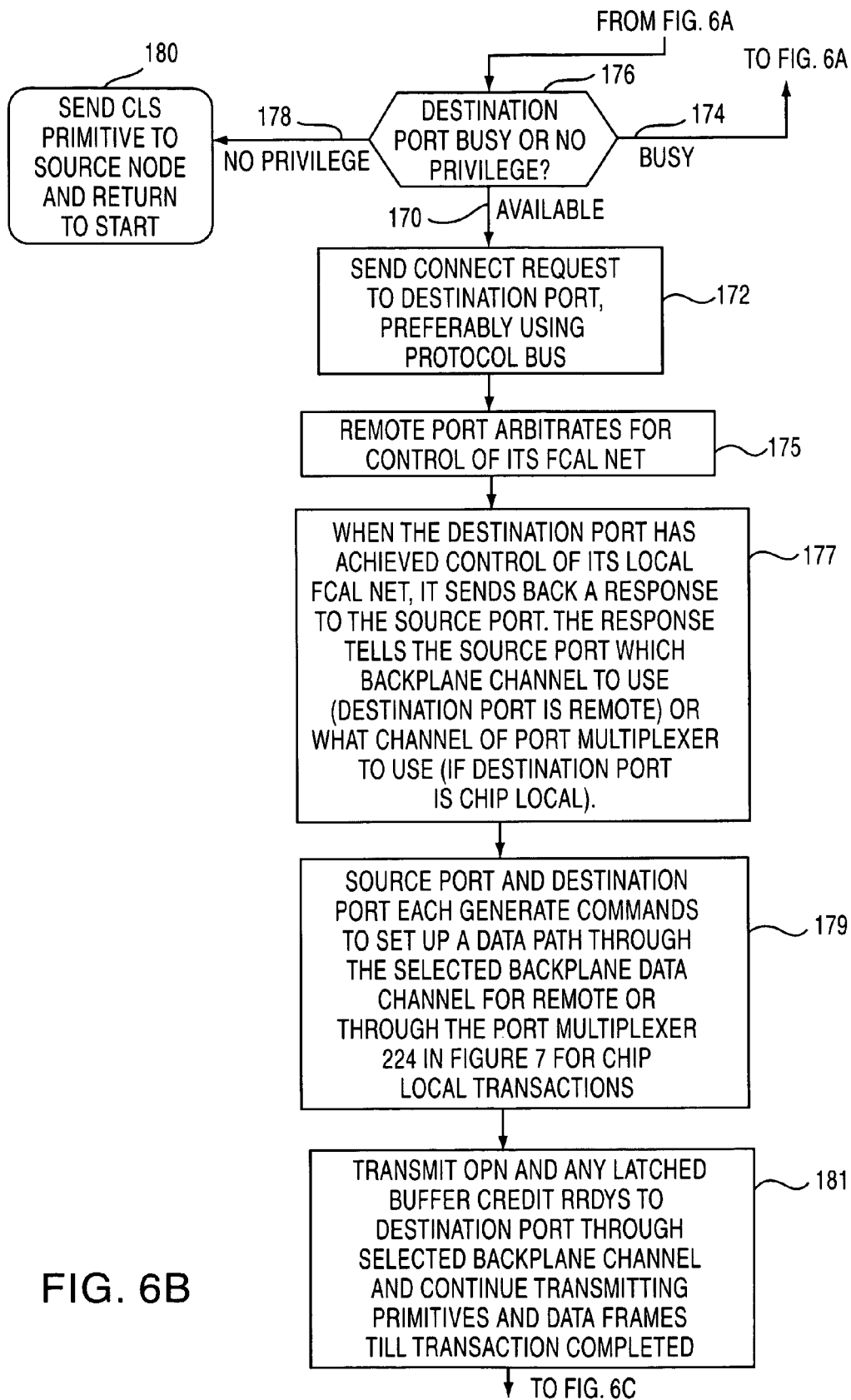
Figure 6C:
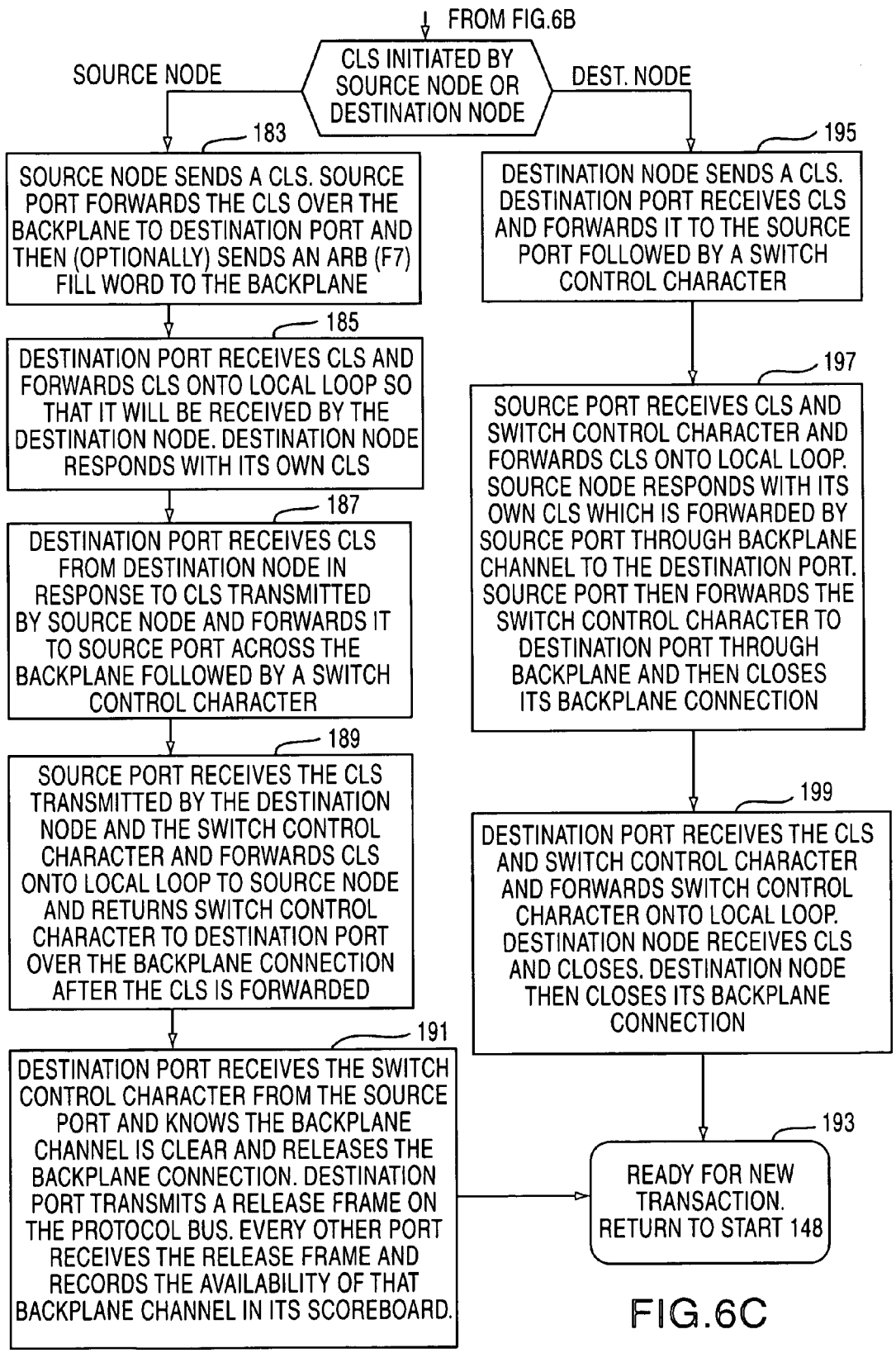
Figure 17A:
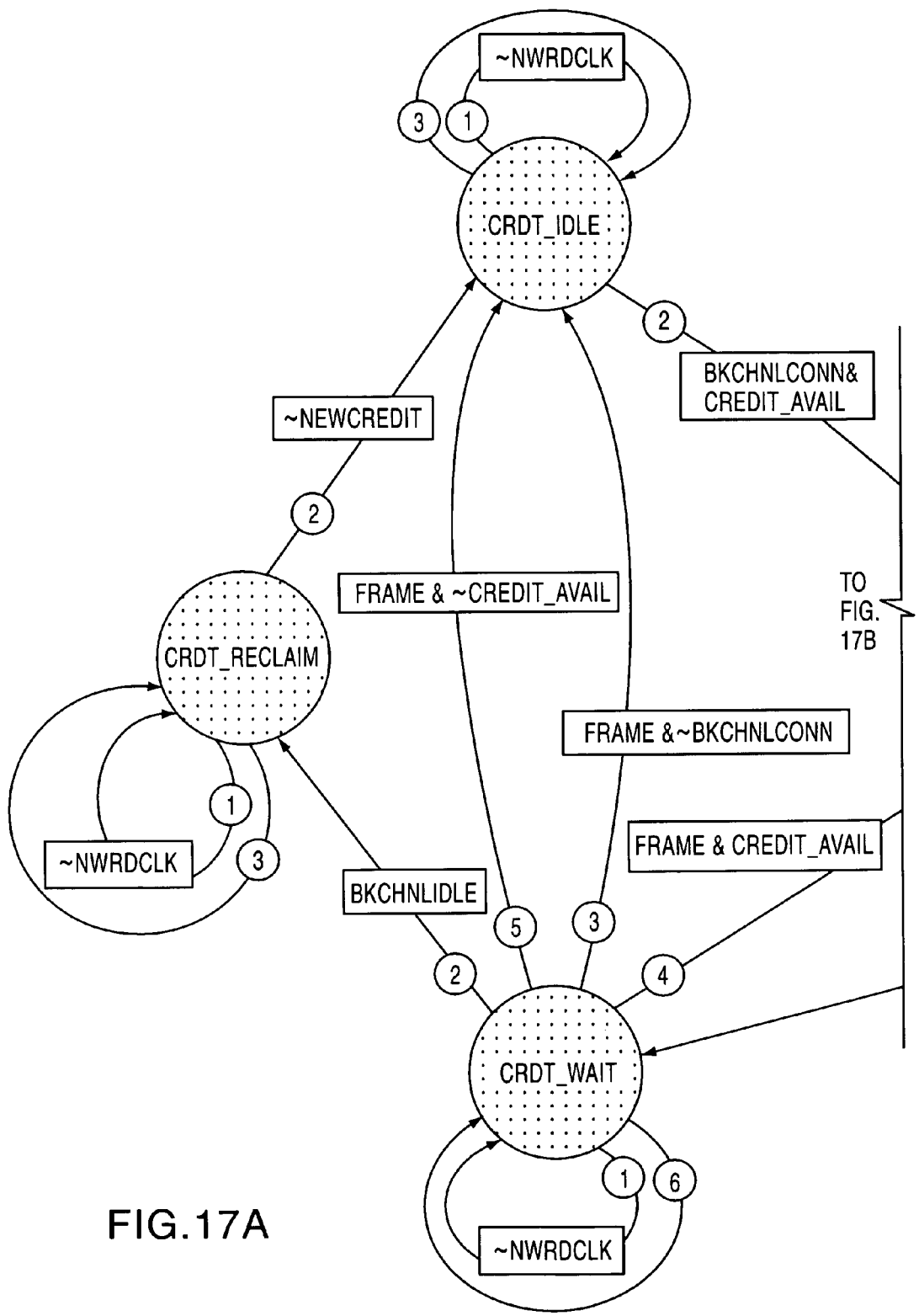
FIGS. 17 through 28 (each comprised of multiple figures, such as FIG. 17A and FIG. 17B, which should be pieced together at the cut line) are individual state diagrams for all the state machines in a single Loop Port State Machine (LPSM).
Figure 17B:
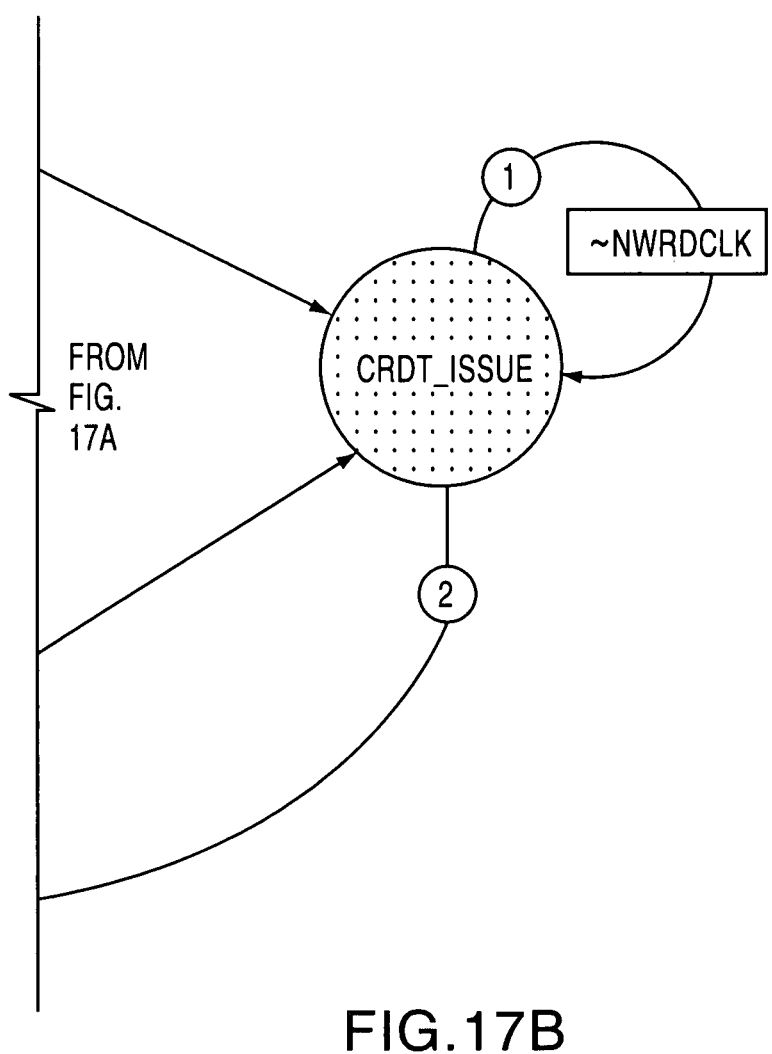
Figure 18A:
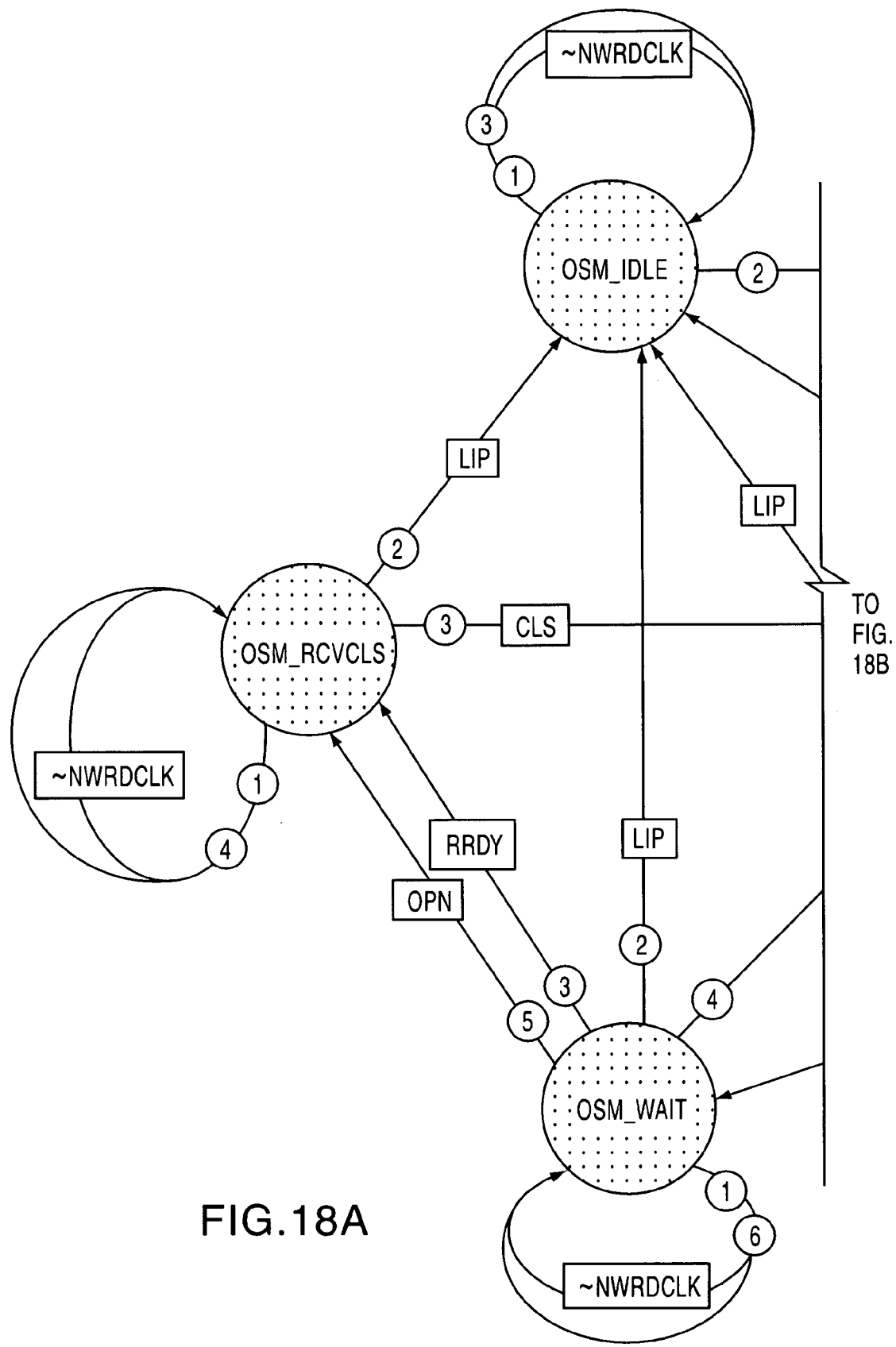
Figure 18B:
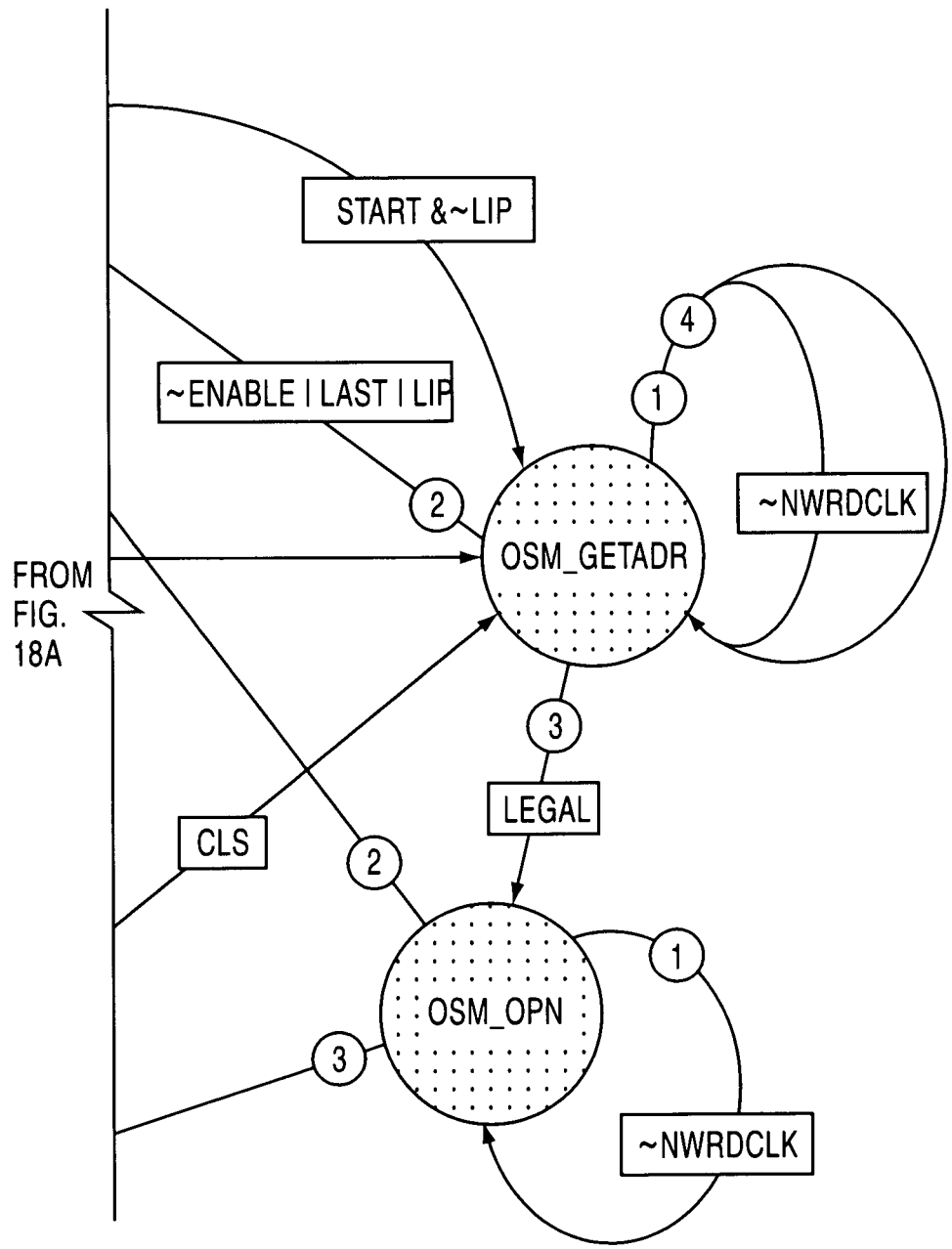
Figure 19A:
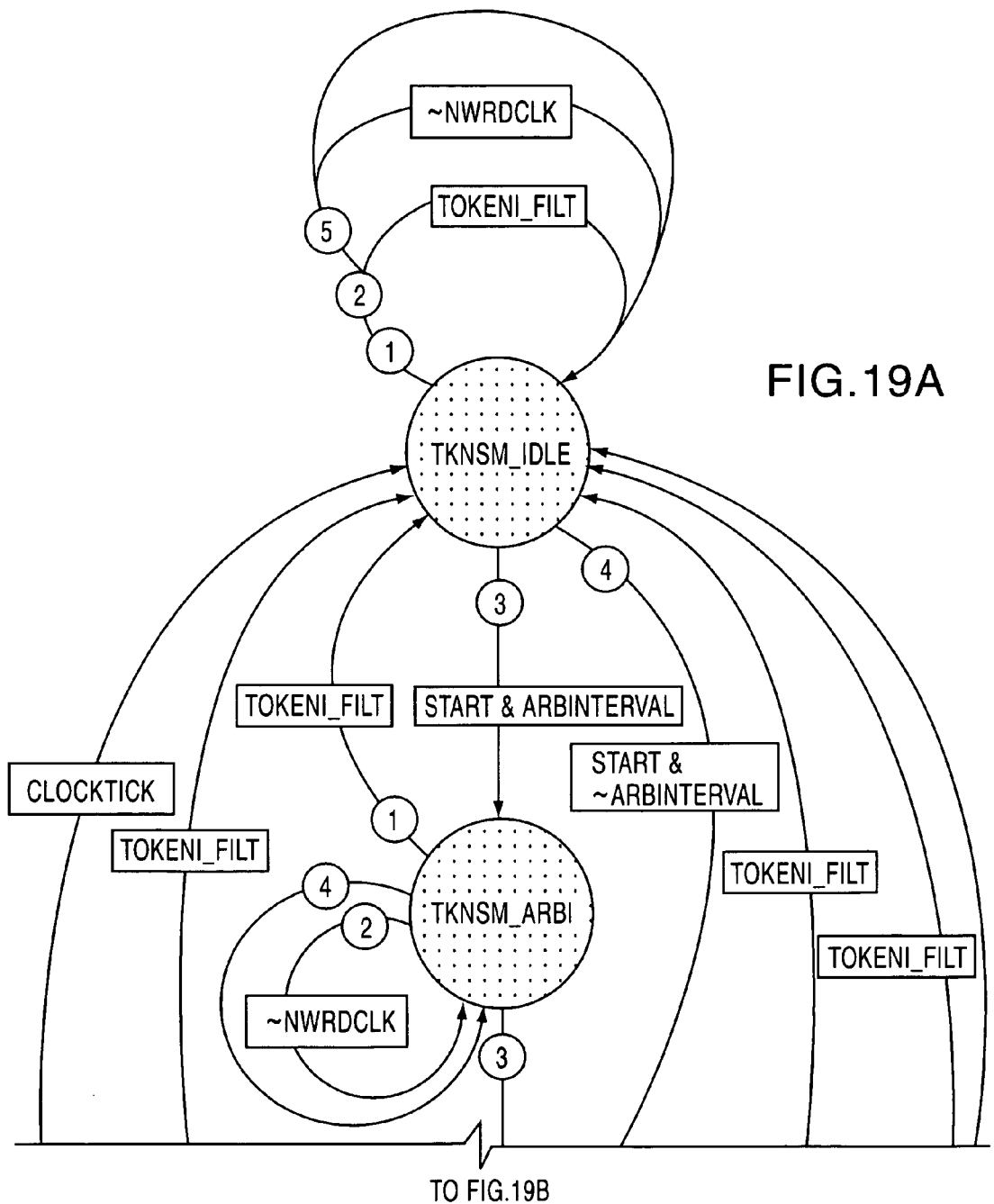
Figure 19B:
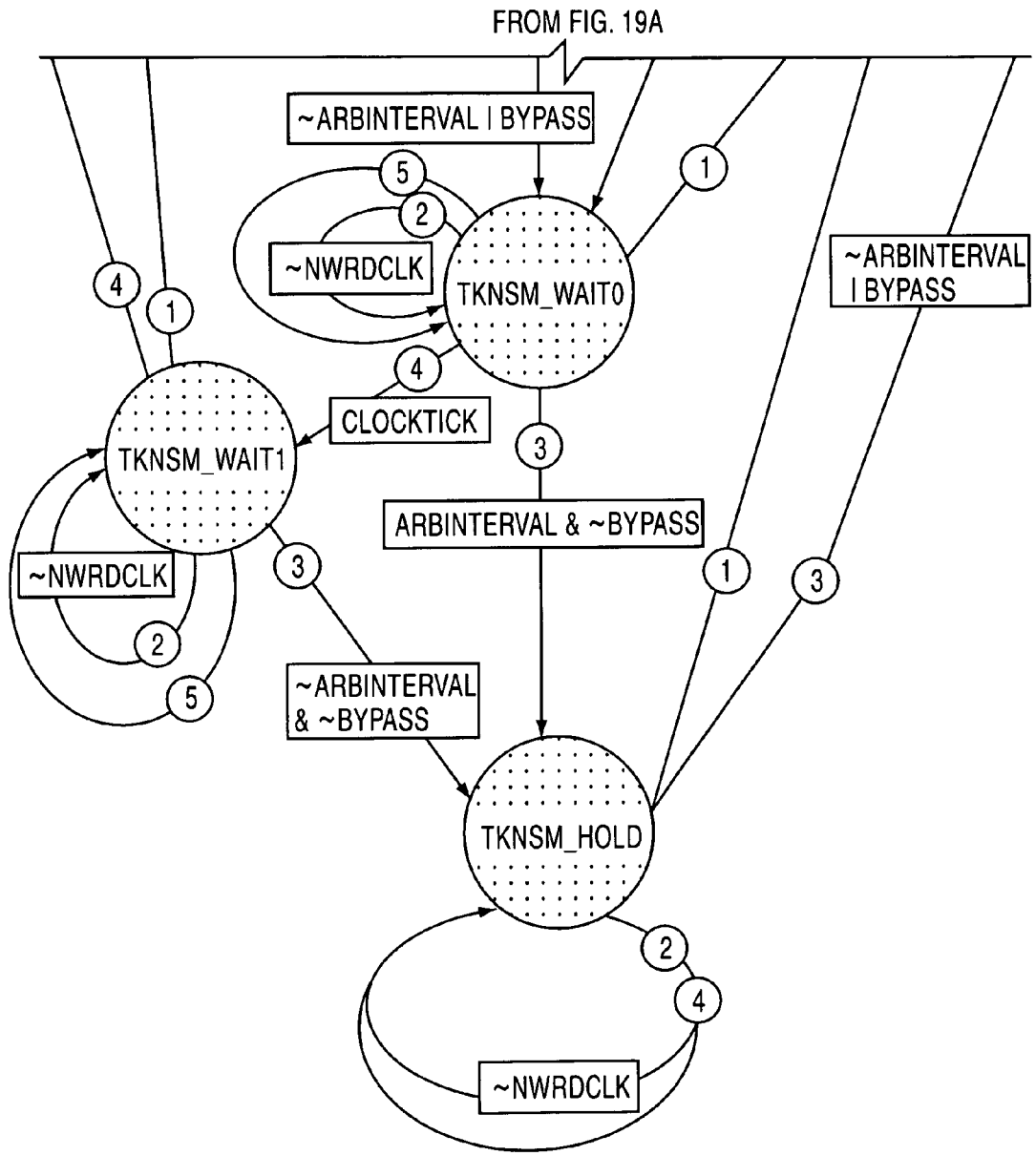
Figure 20A:
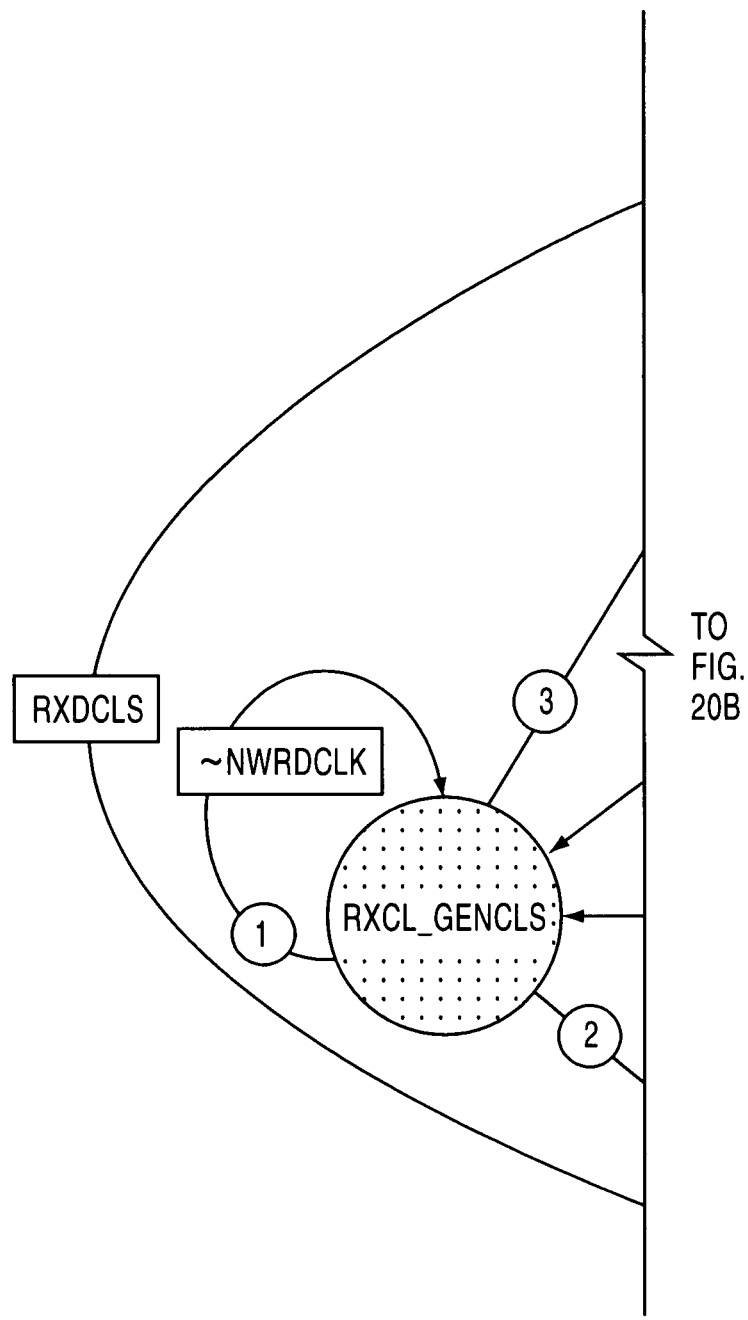
Figure 20B:
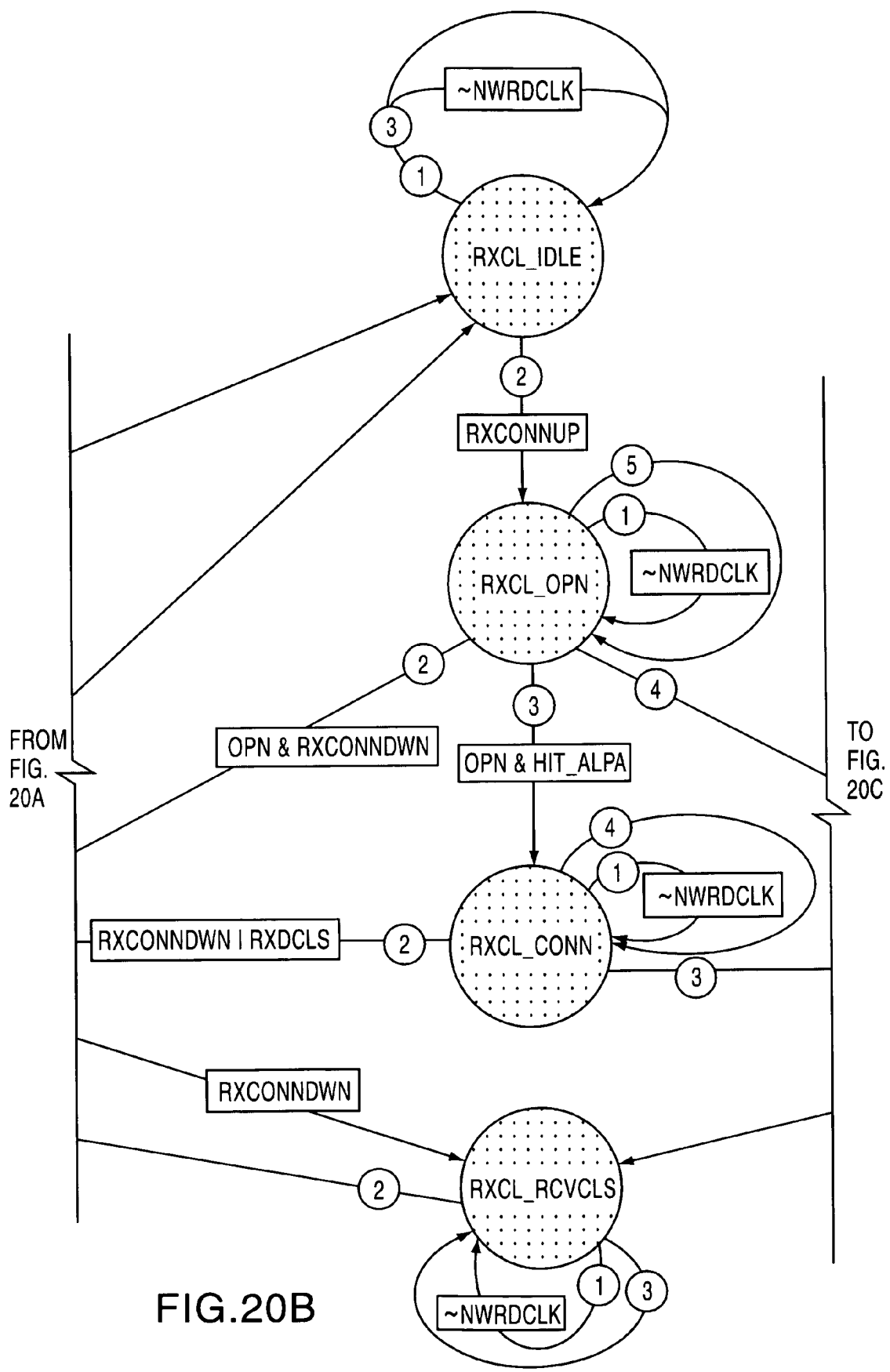
Figure 20C:
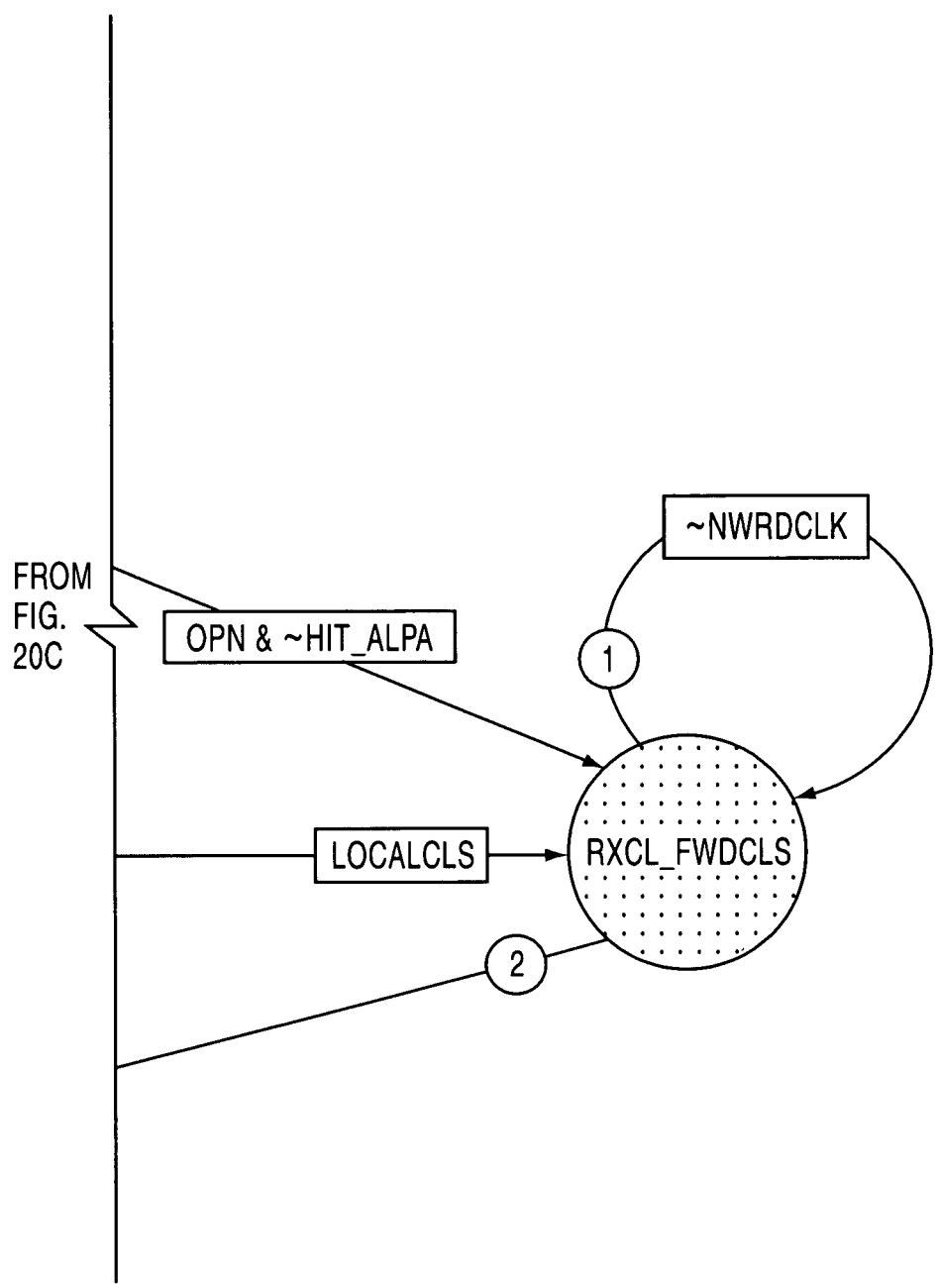
Figure 21A:
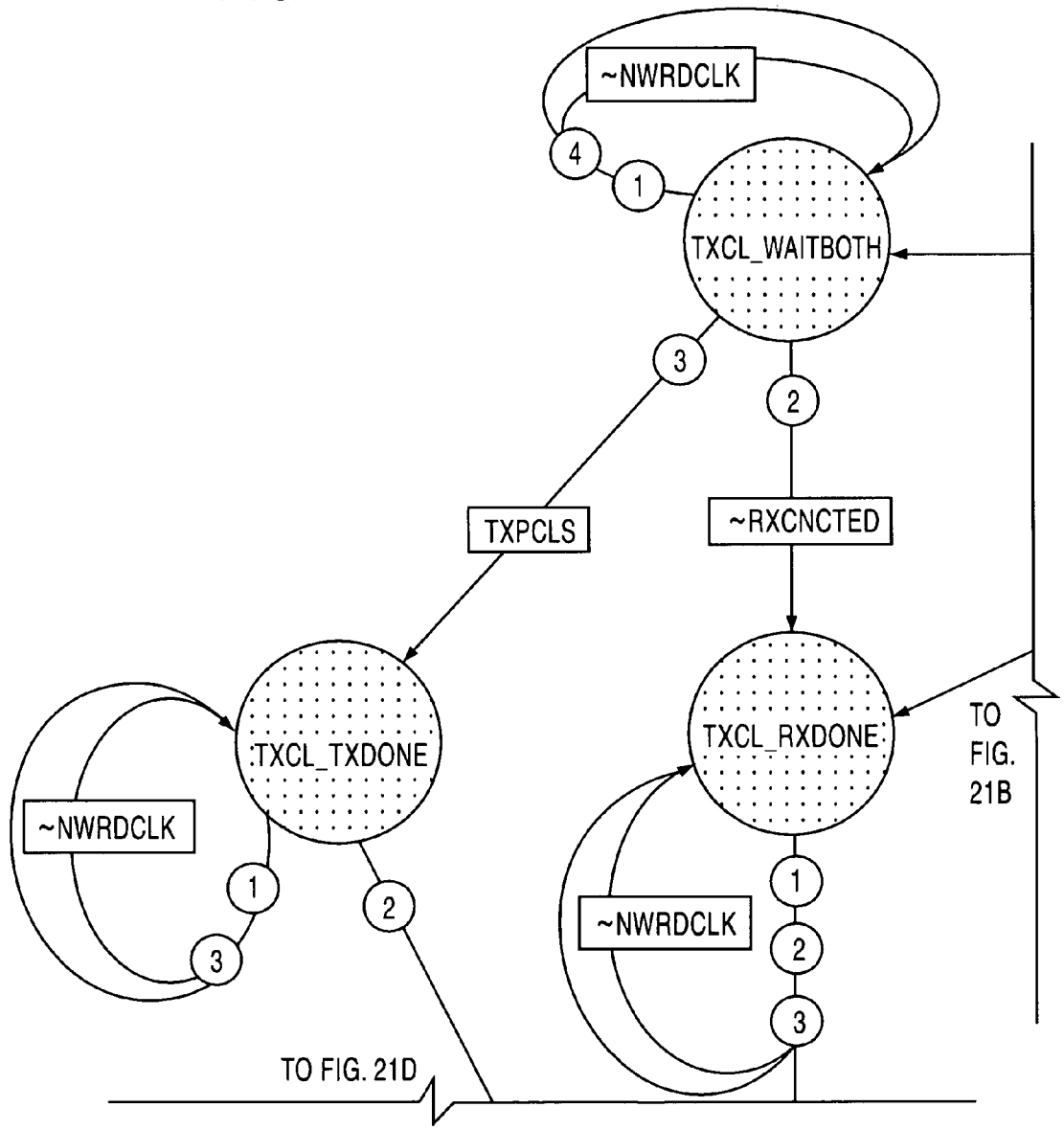
Figure 21B:
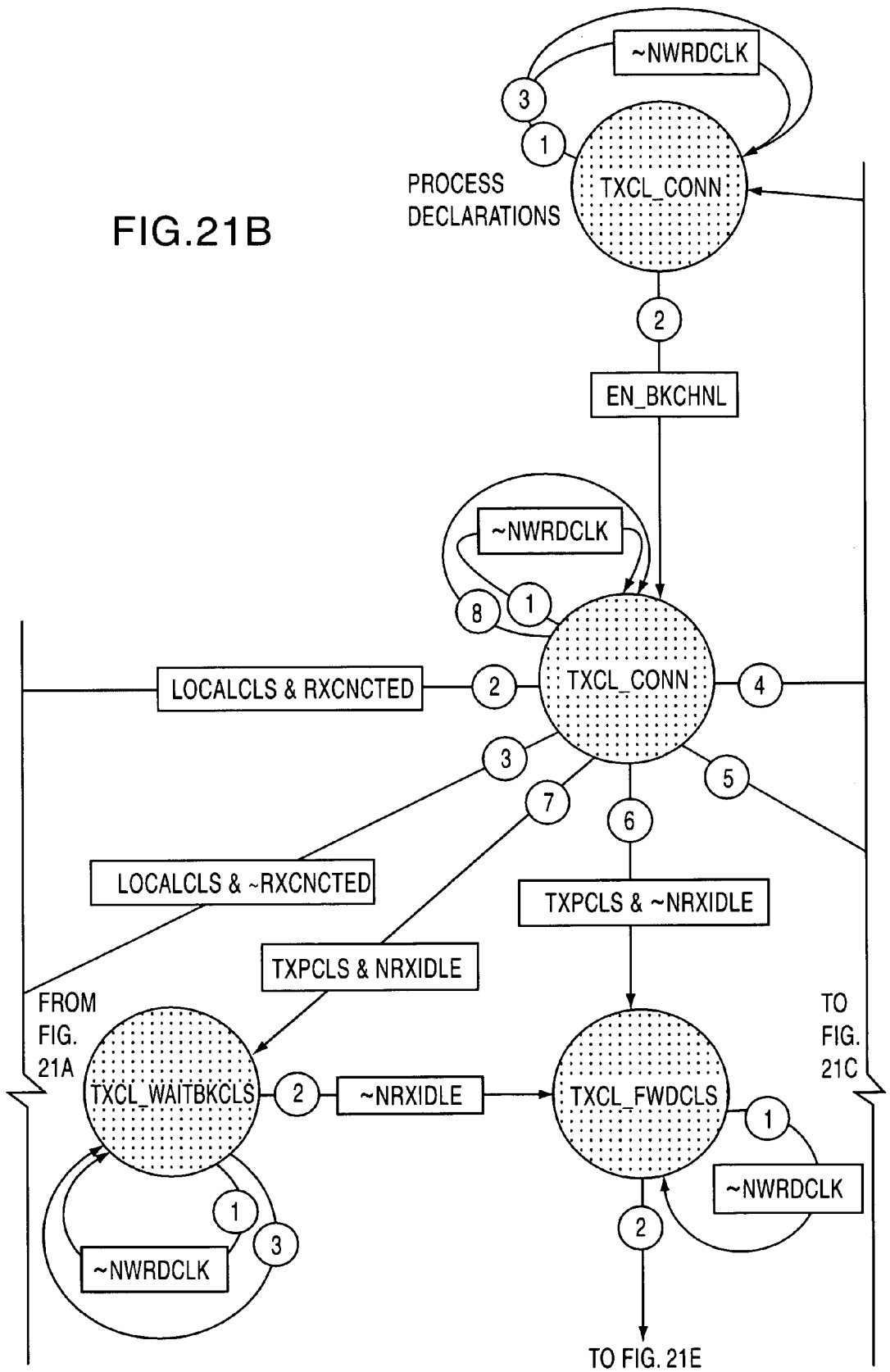
Figure 21D:
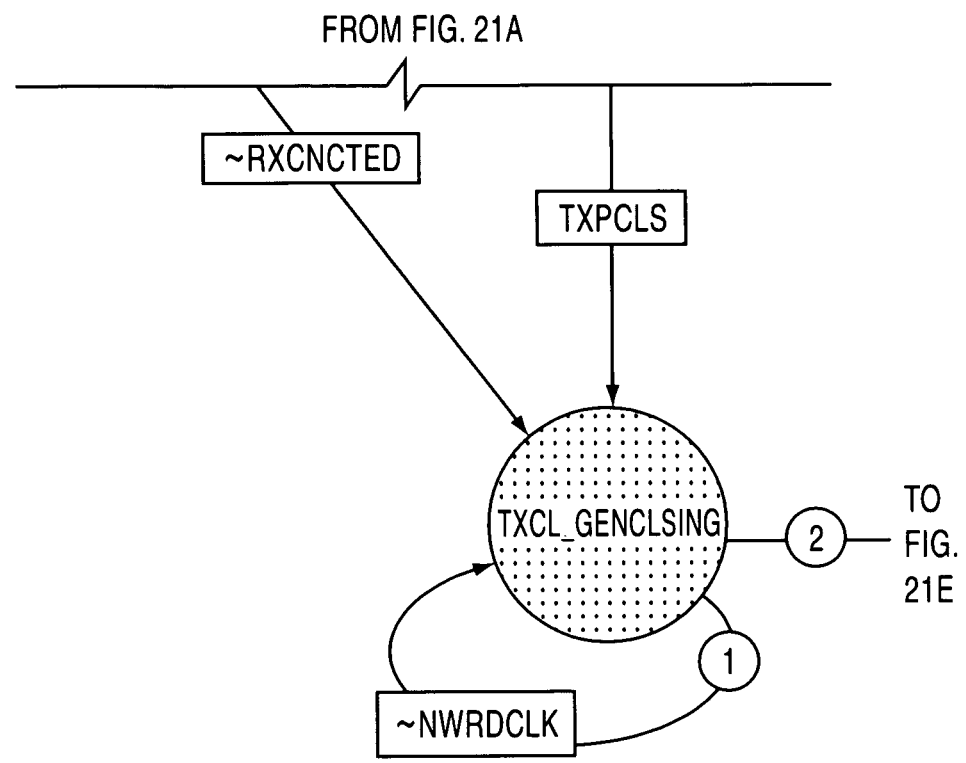
Figure 21E:
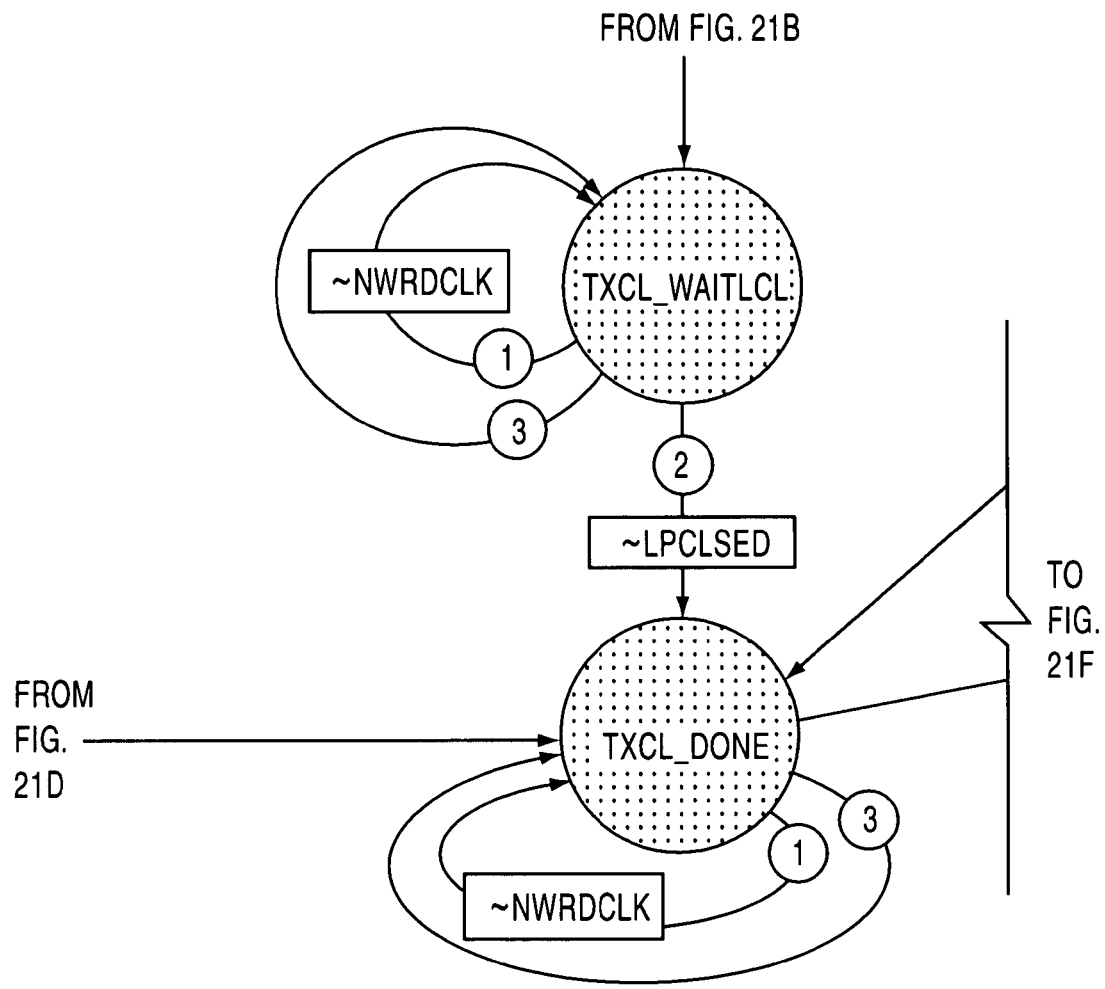
Figure 21F:
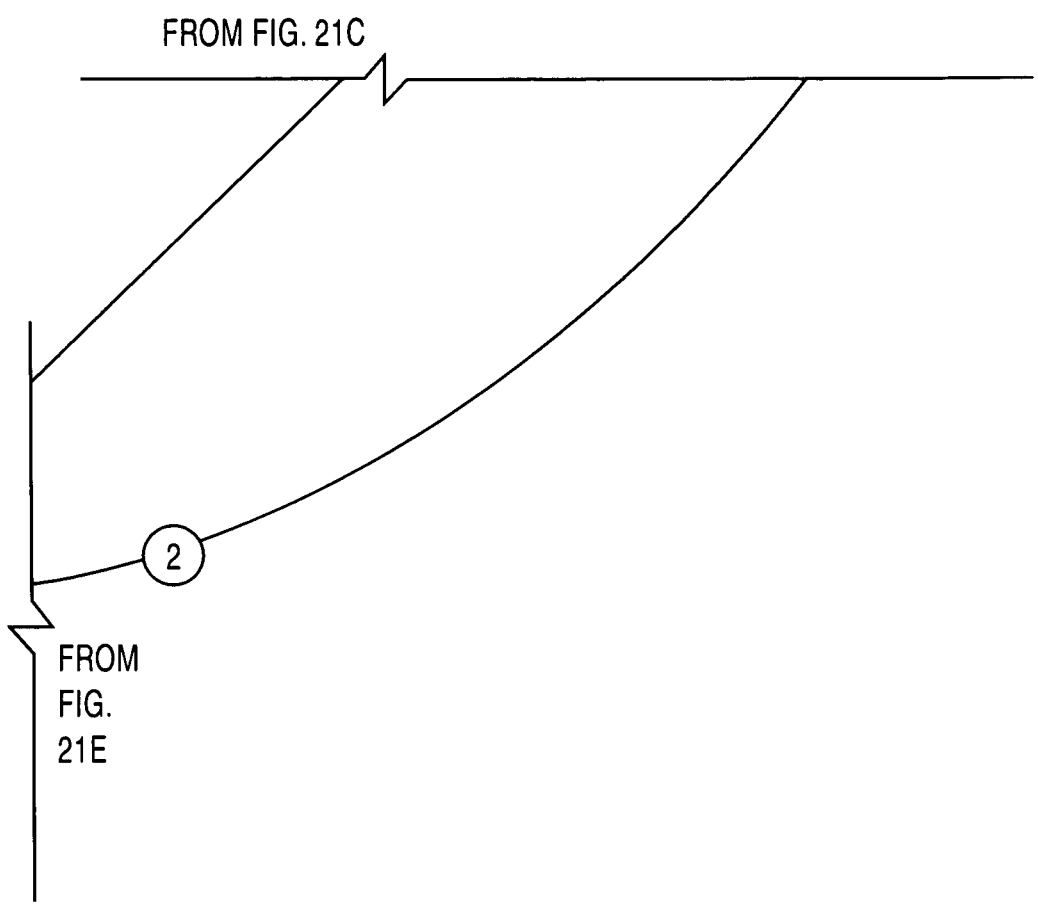
Figure 22A:
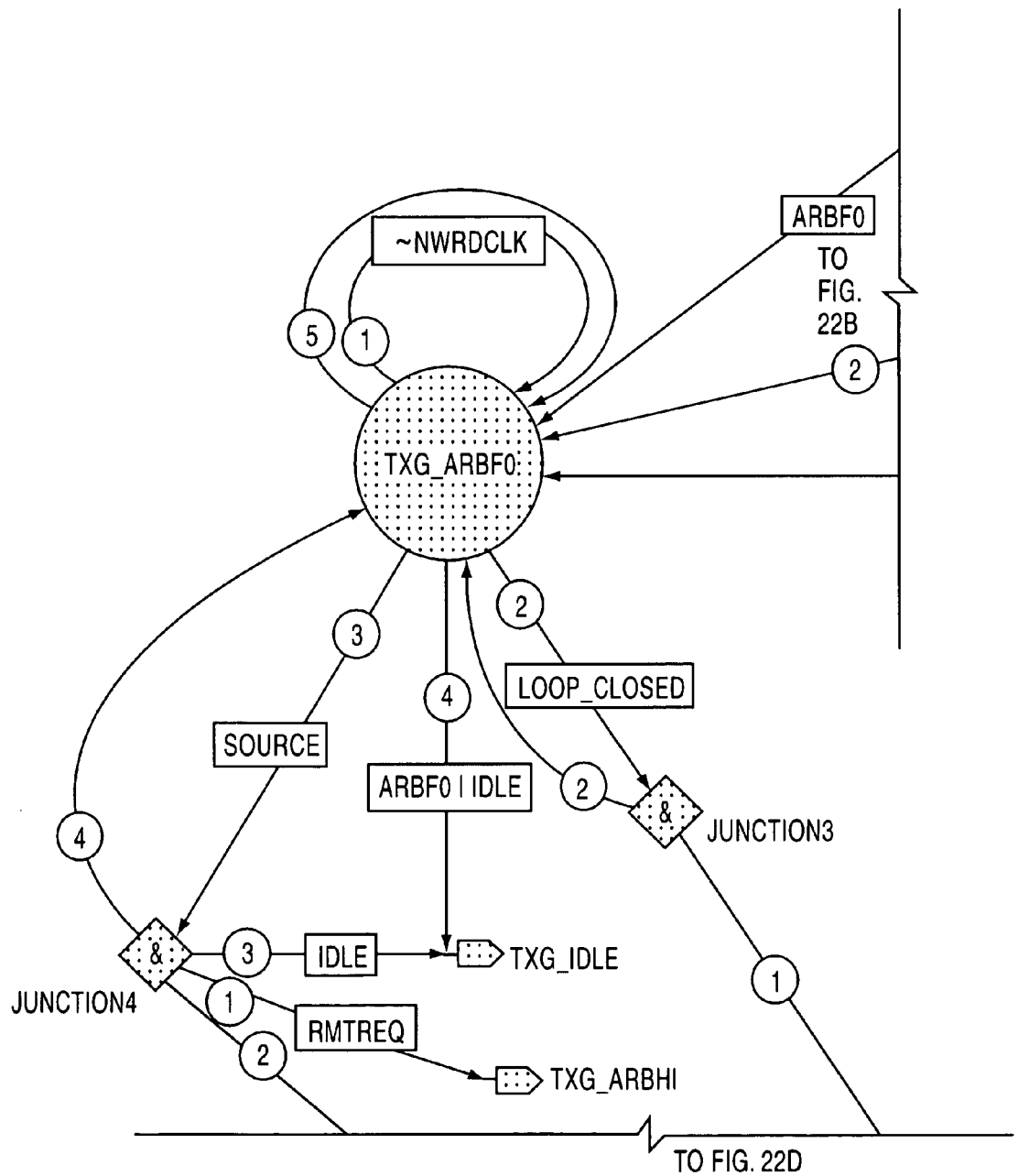
Figure 22C:
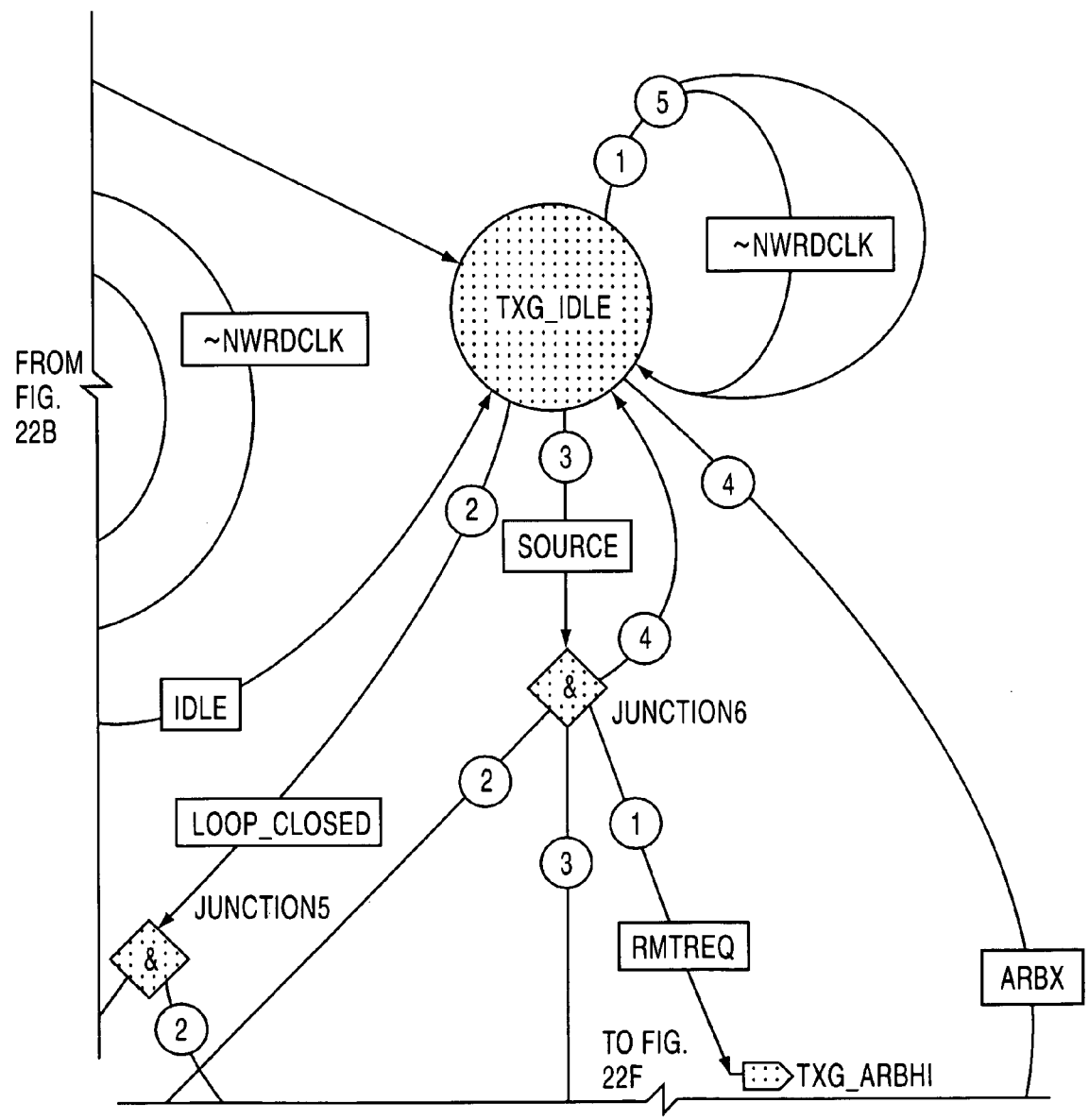
Figure 22D:
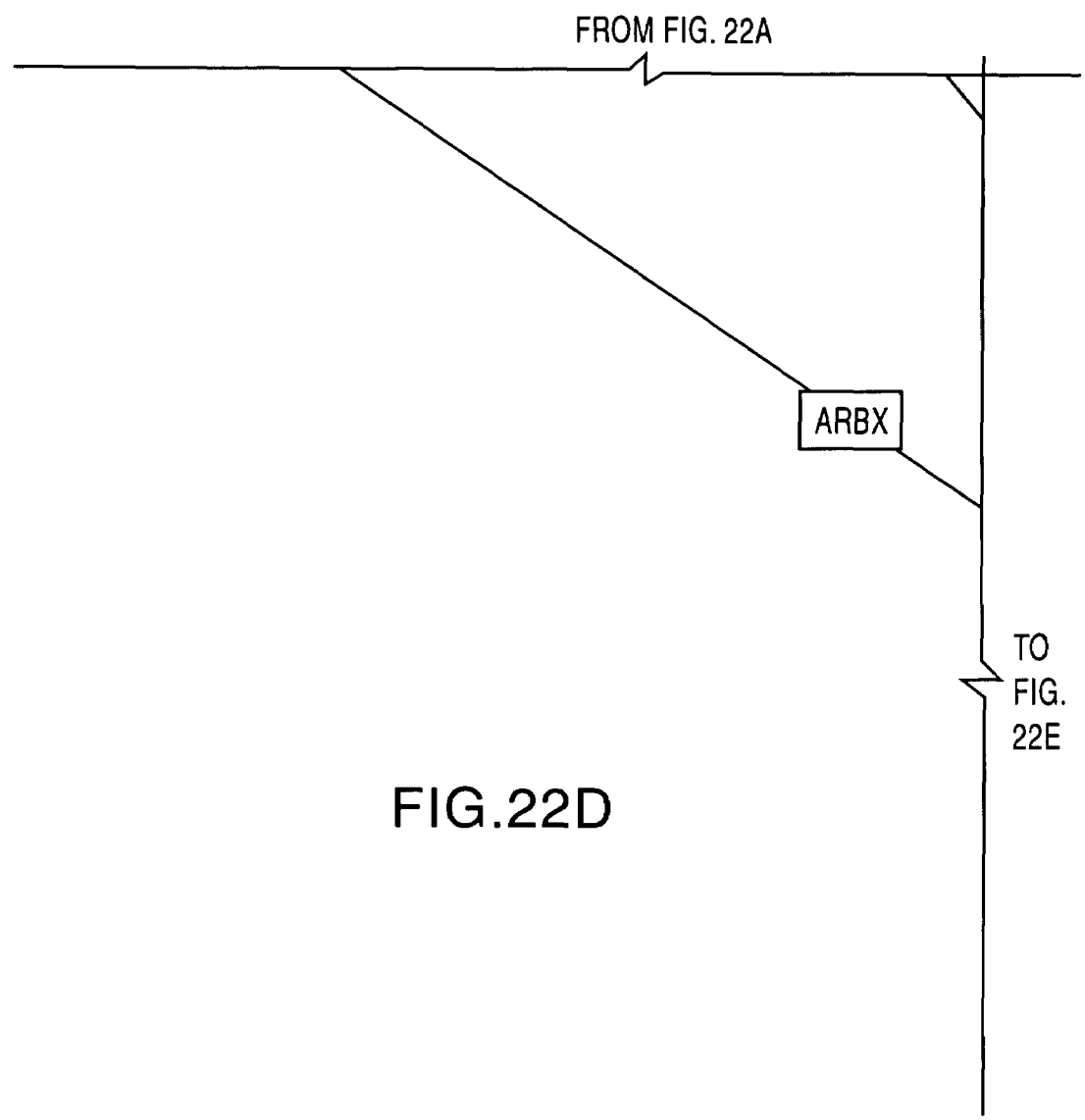
Figure 22E:
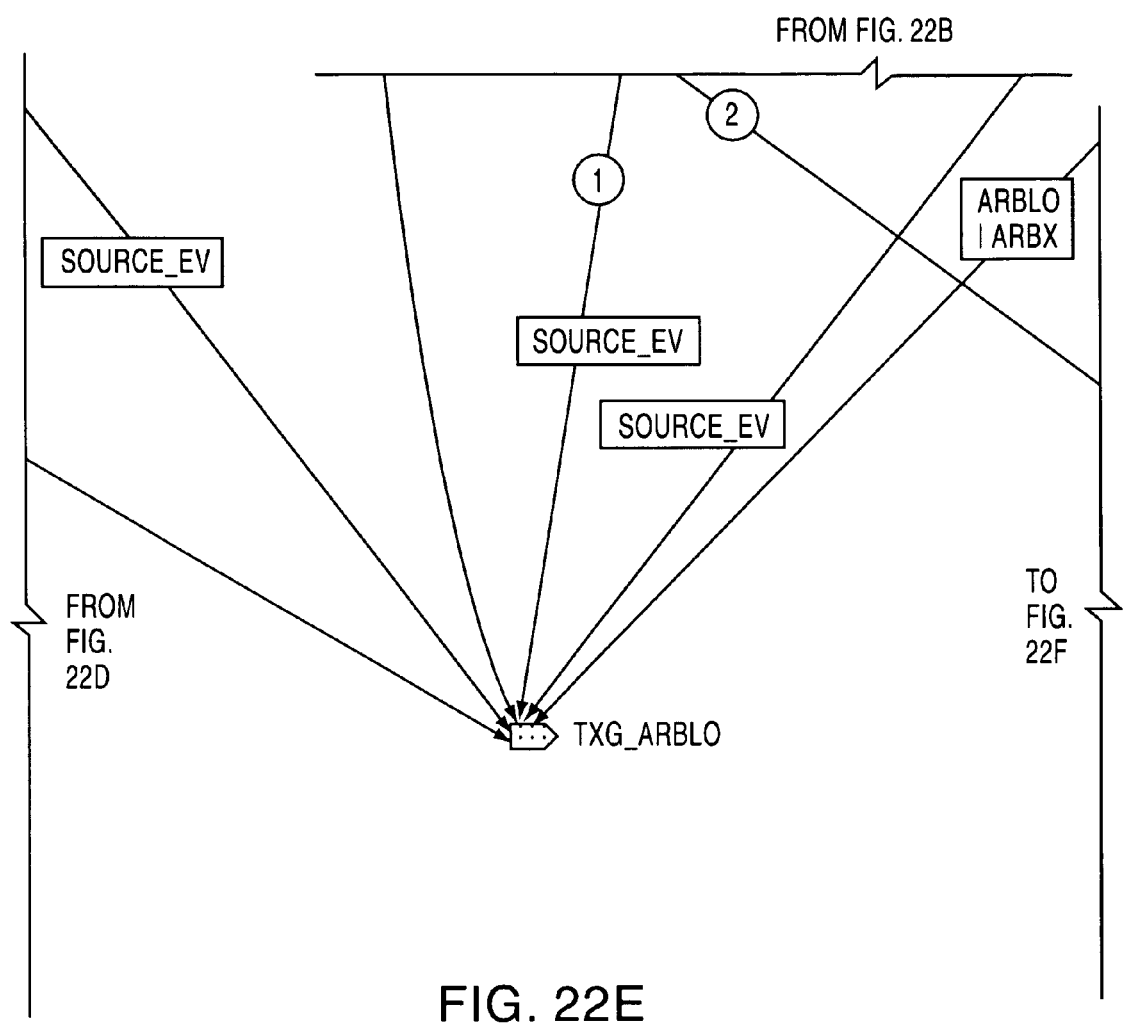
Figure 22F:
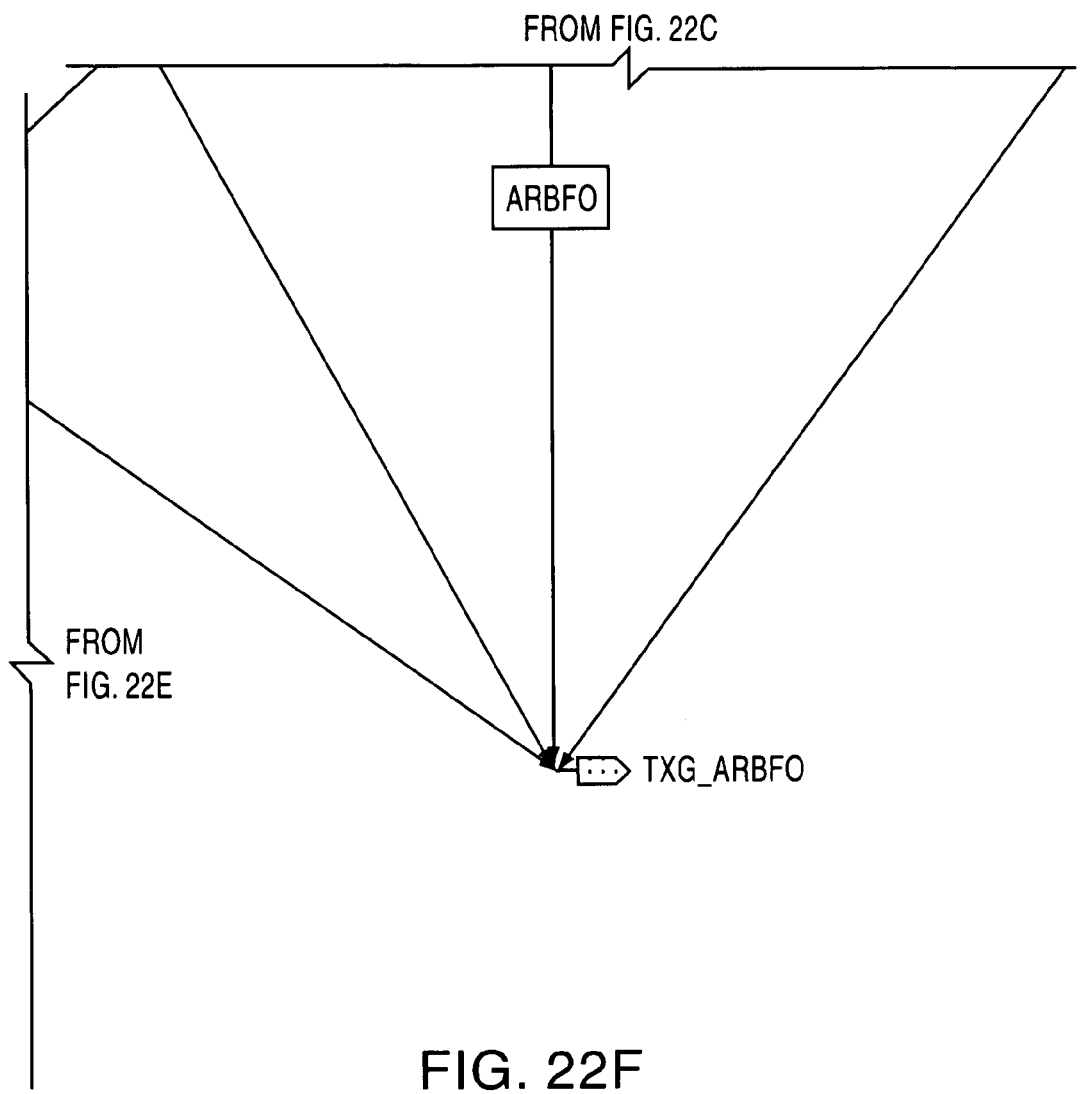
Figure 23:
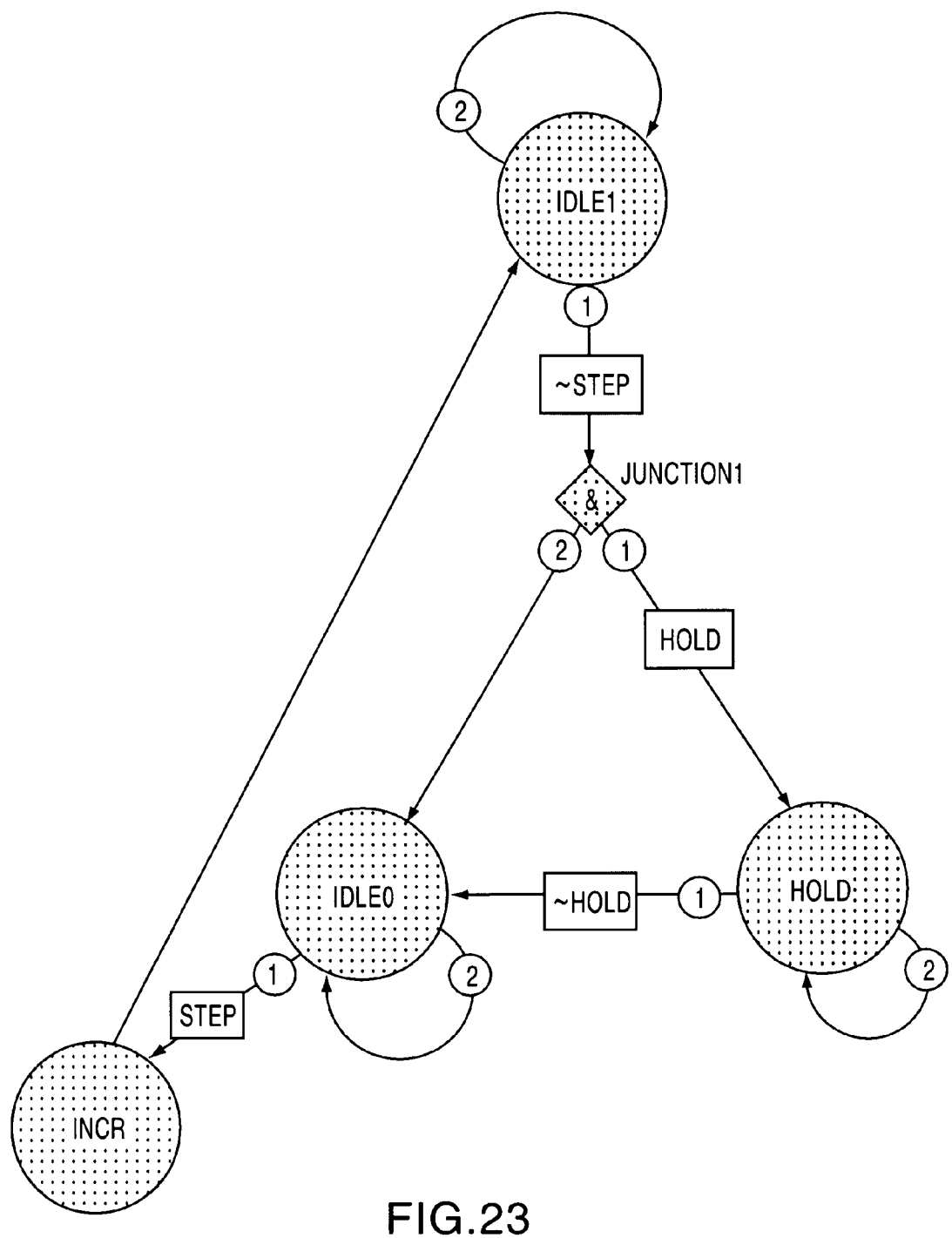
Figure 24A:
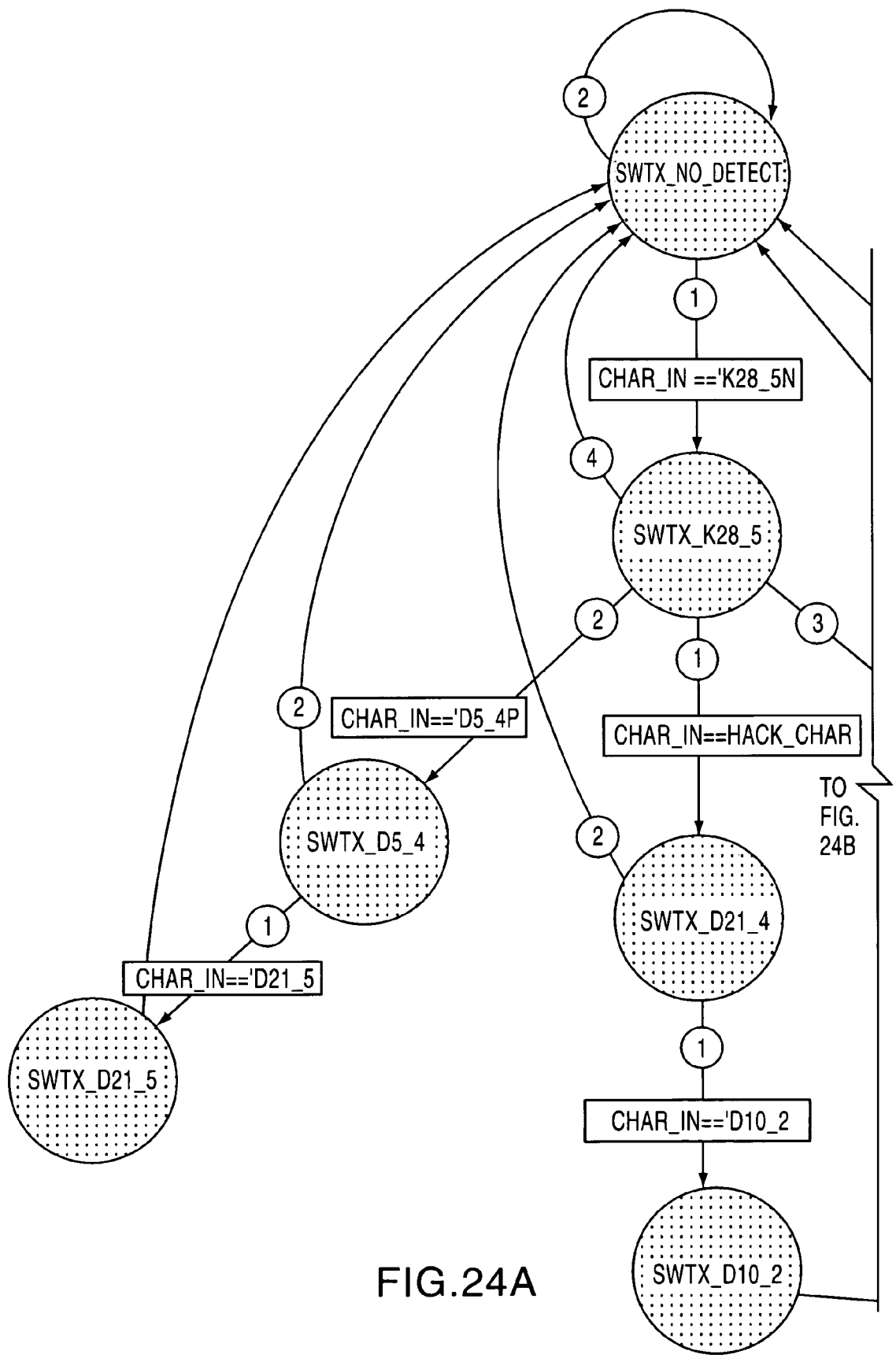
Figure 24B:
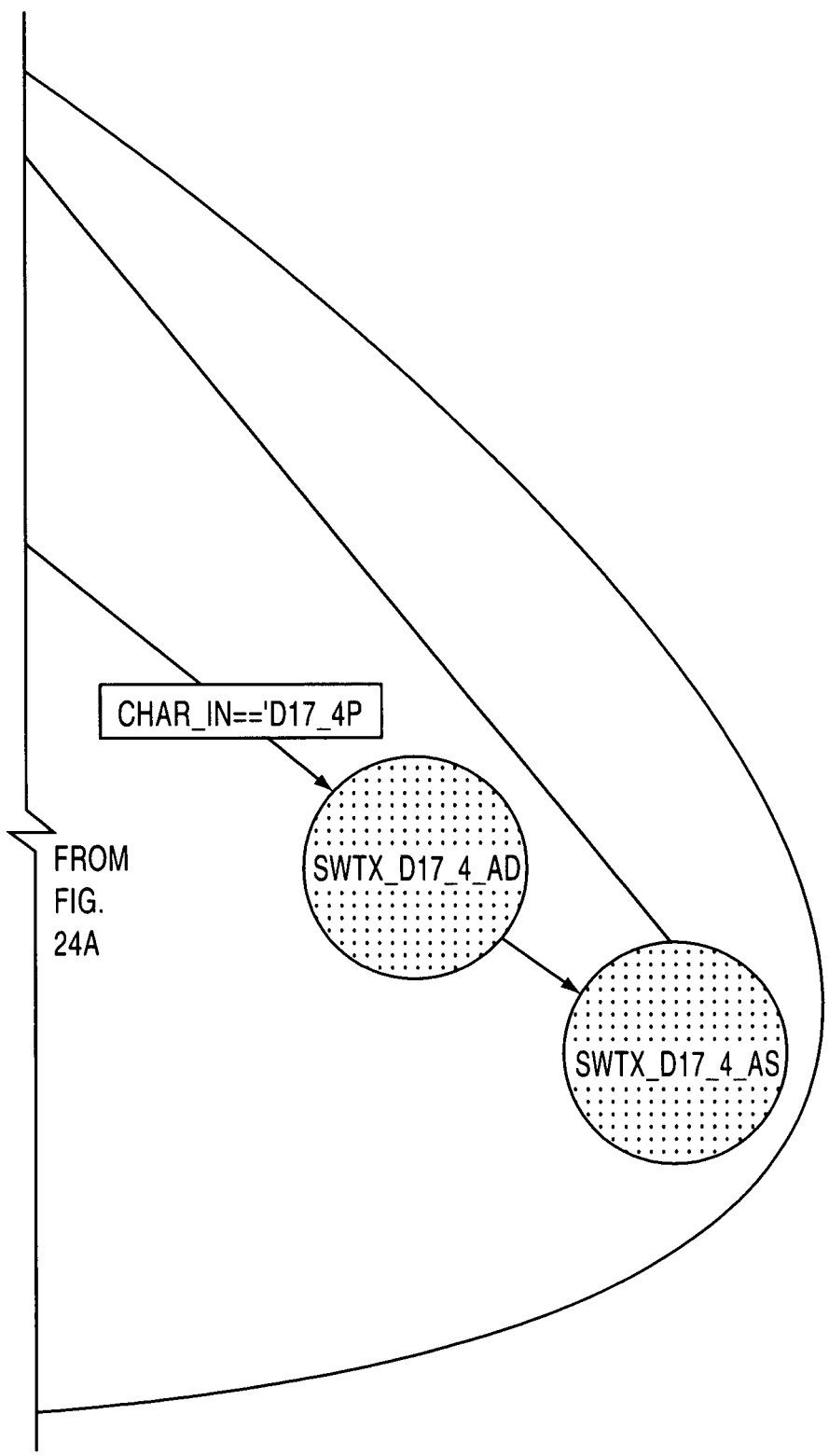
Figure 25A:
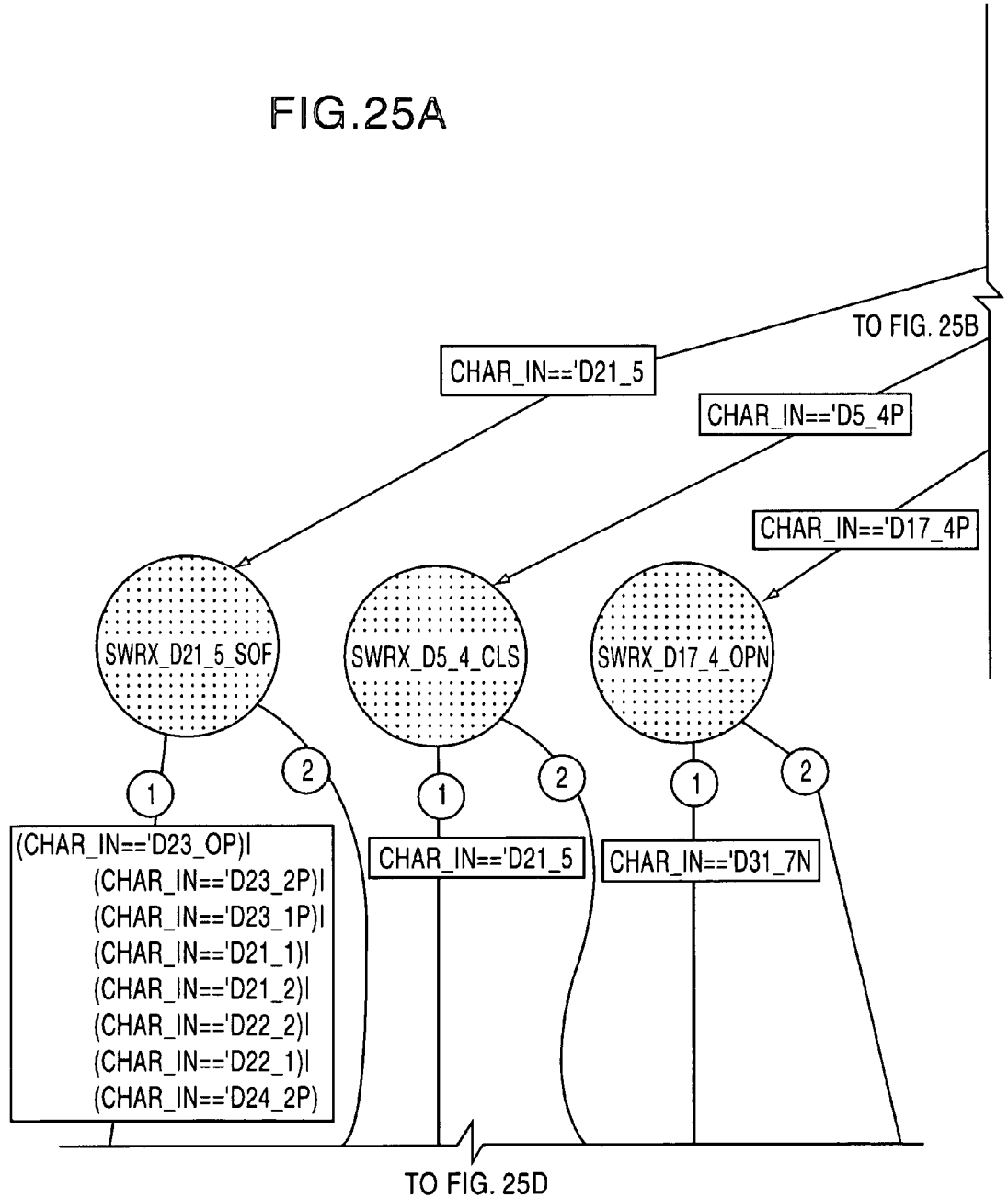
Figure 25B:
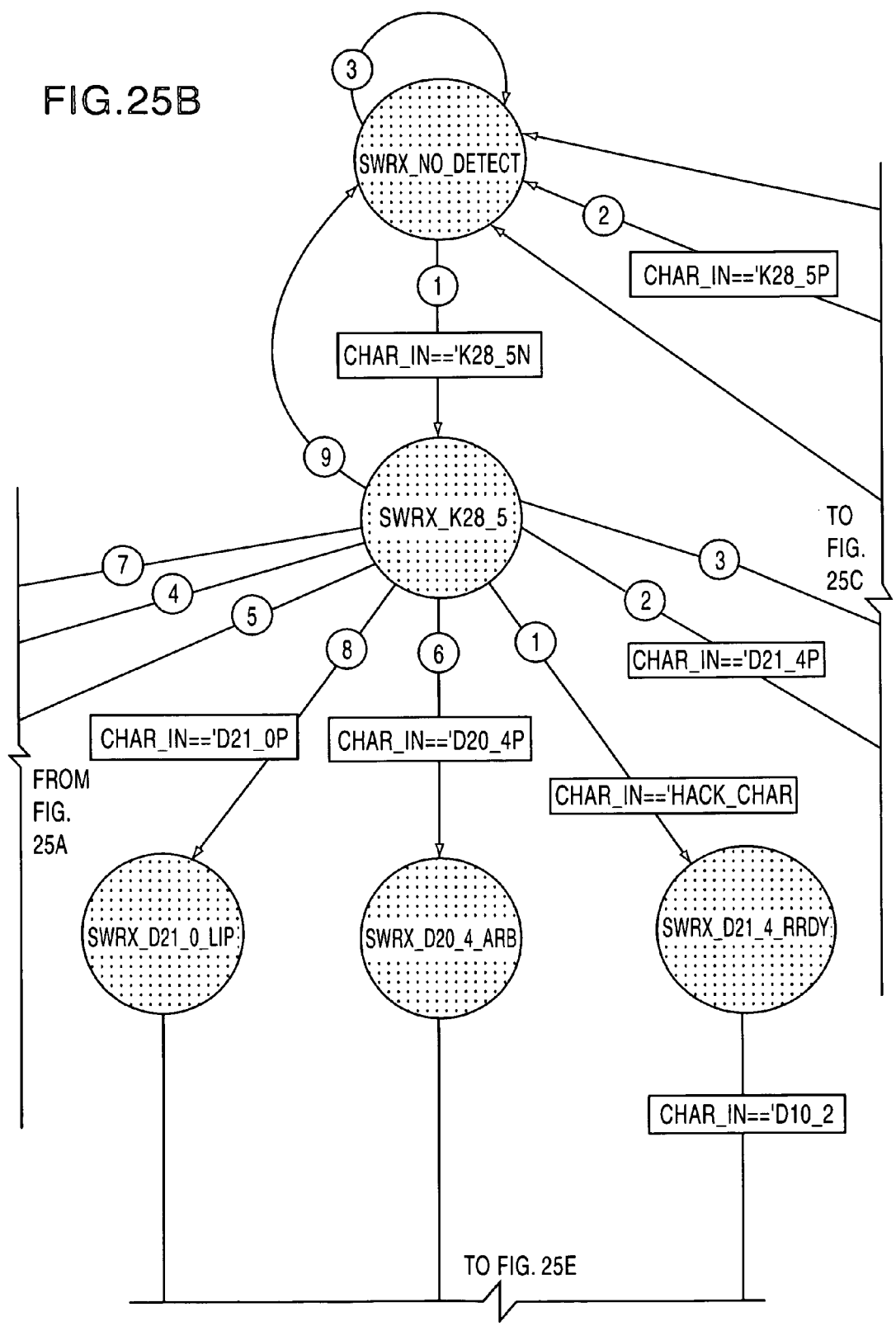
Figure 25D:
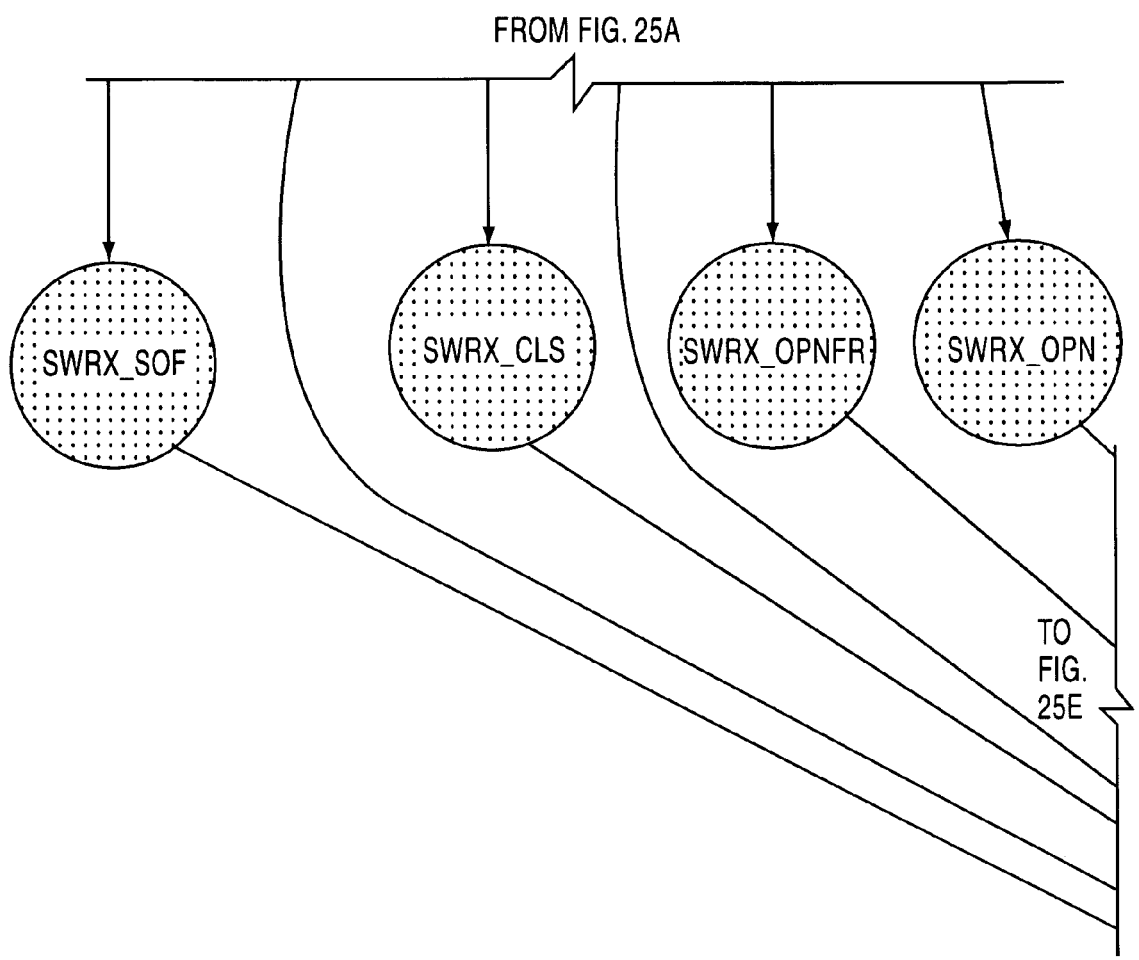
Figure 25E:
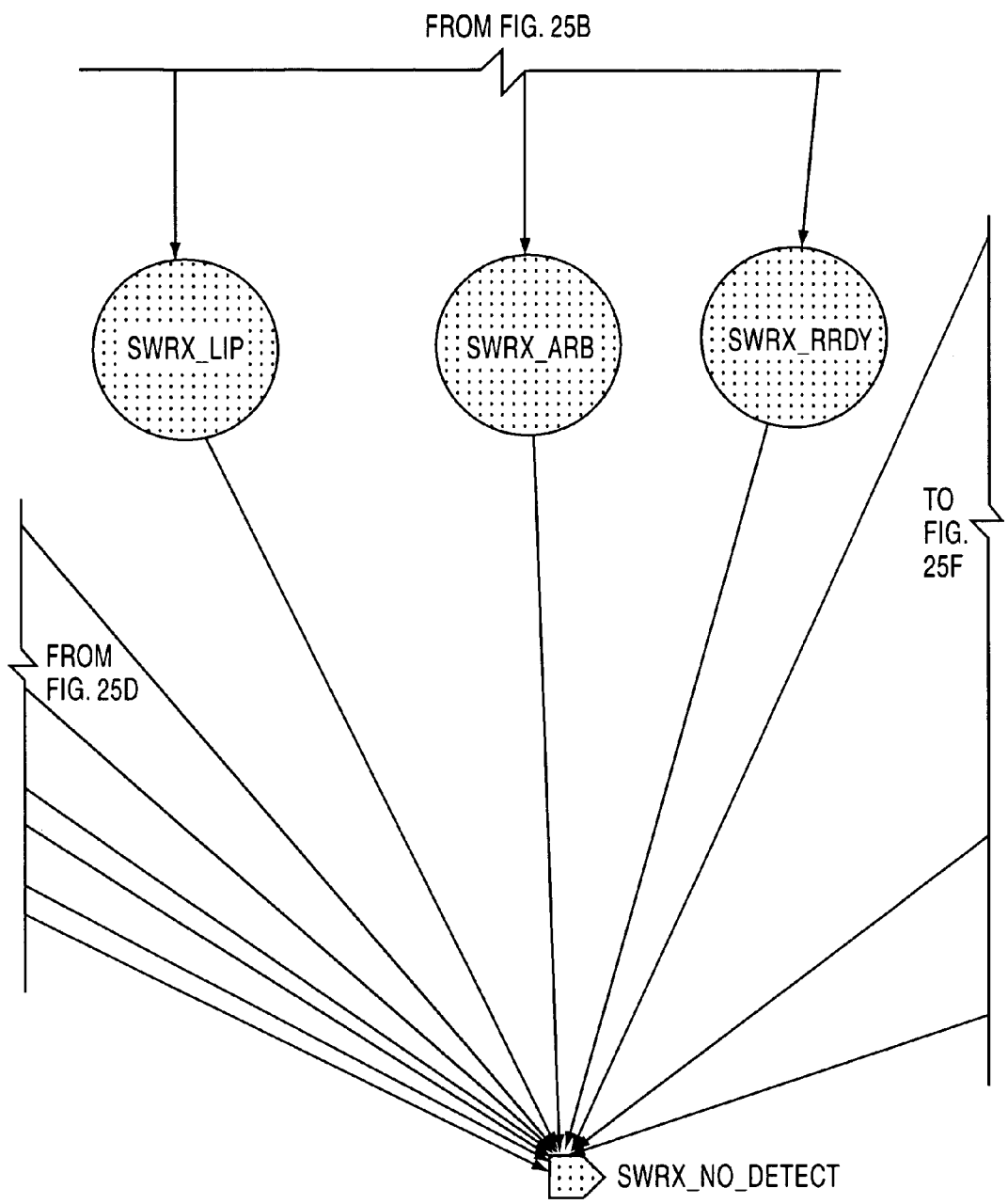
Figure 25F:
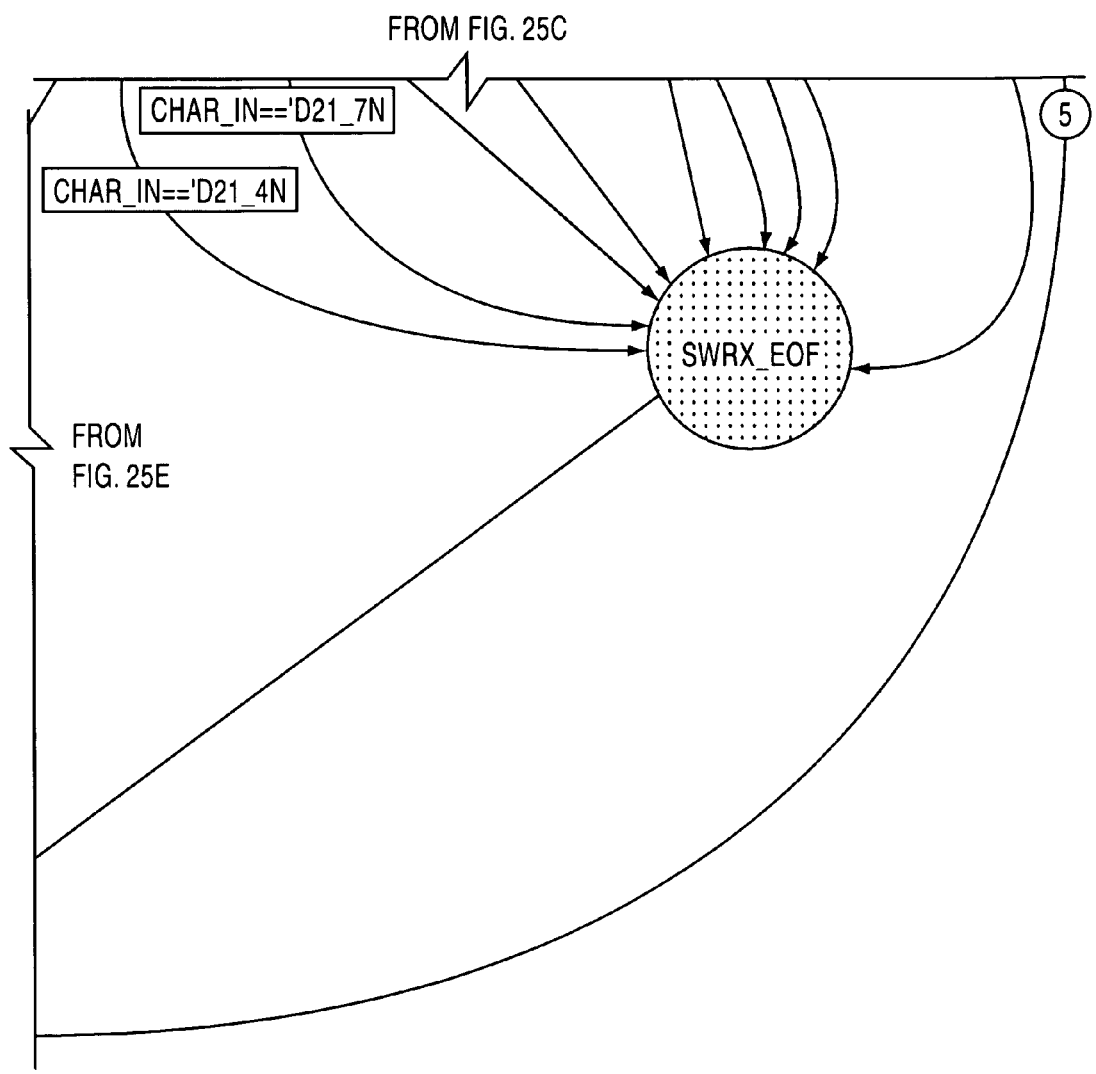
Figure 26:
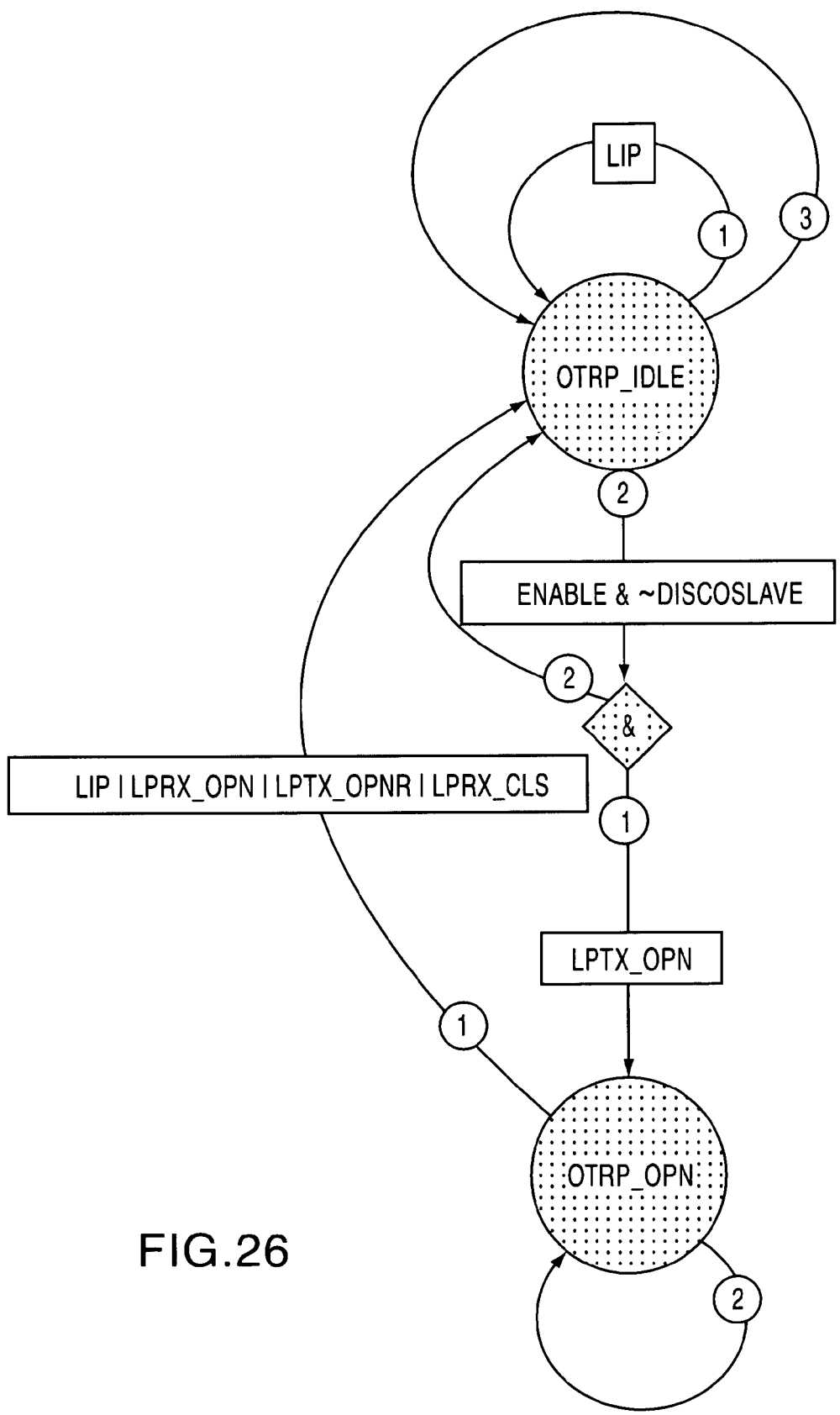
Figure 27A:
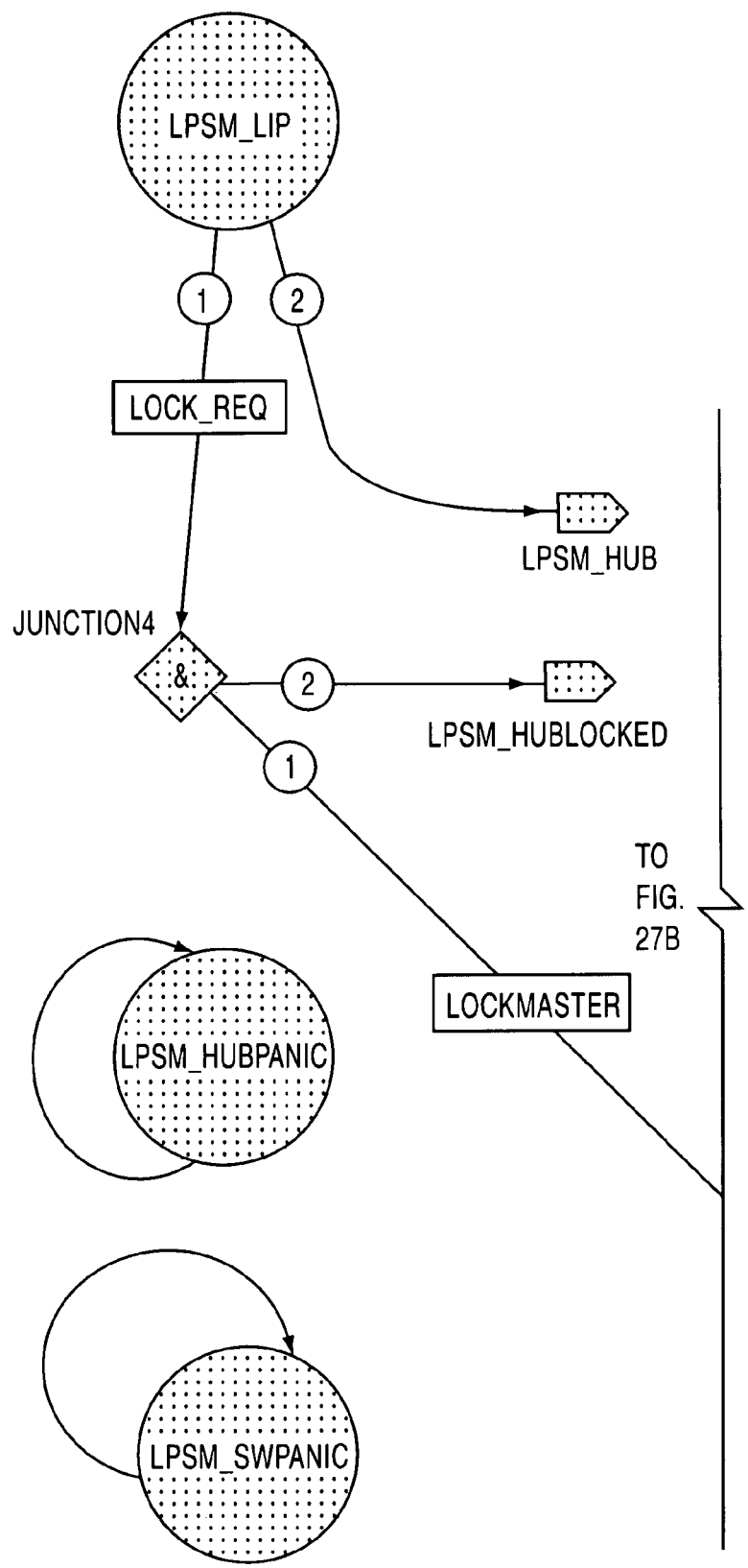
Figure 27B:
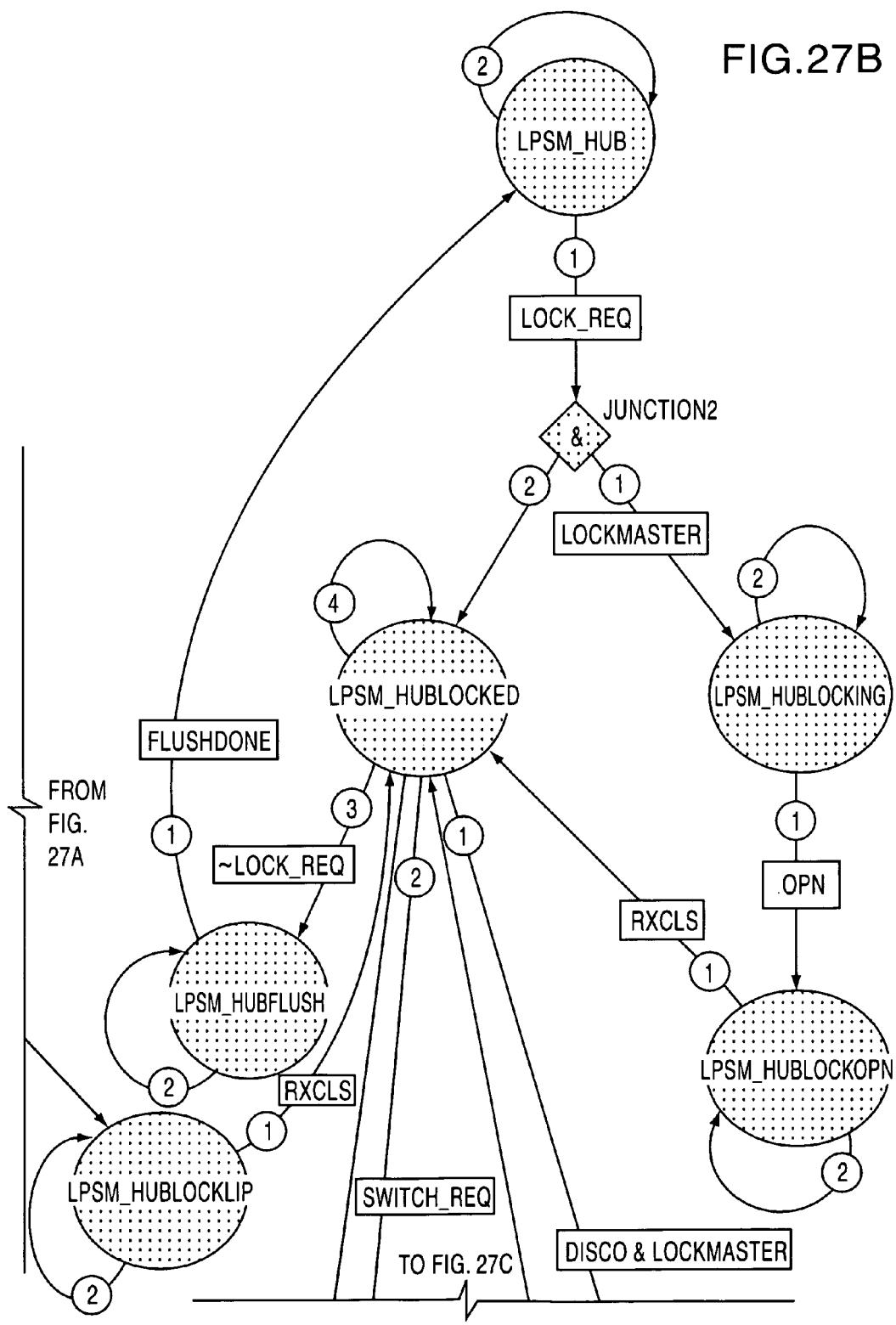
Figure 27C:
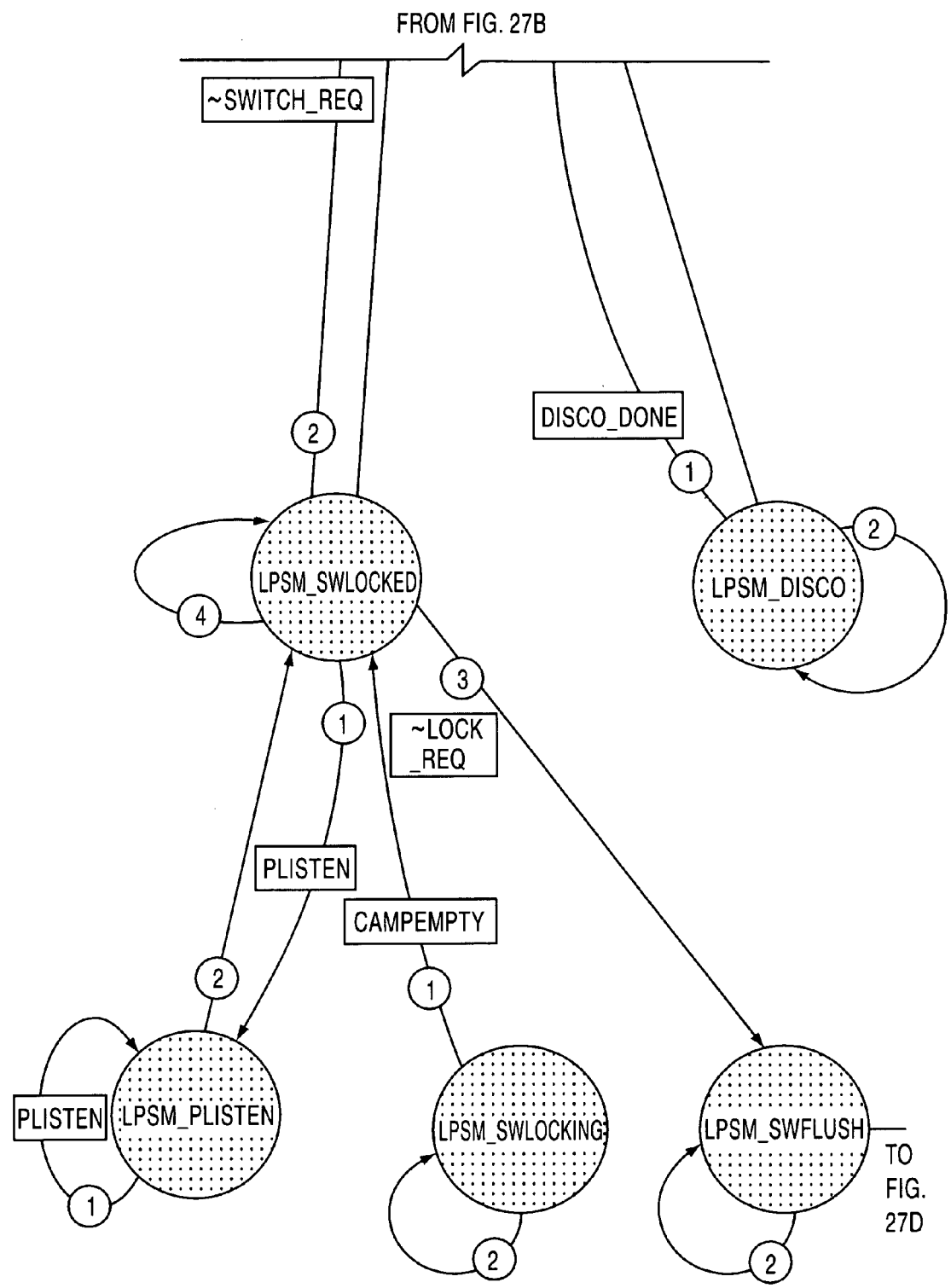
Figure 27D:
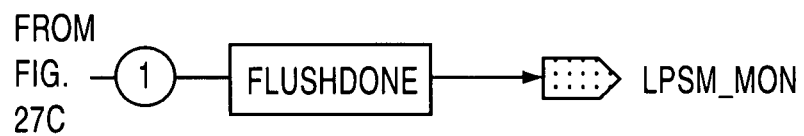
Figure 28A:
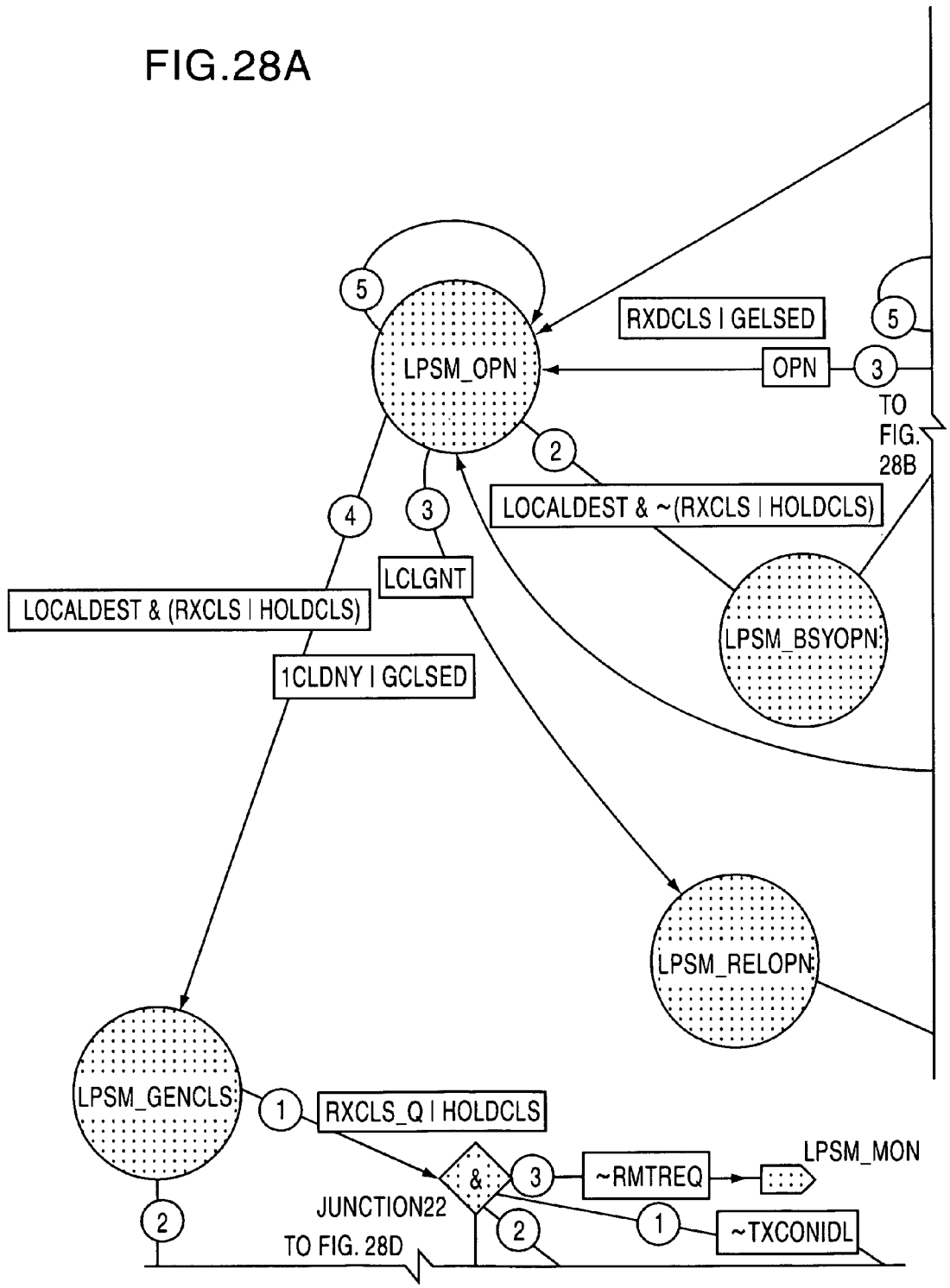
Figure 28B:
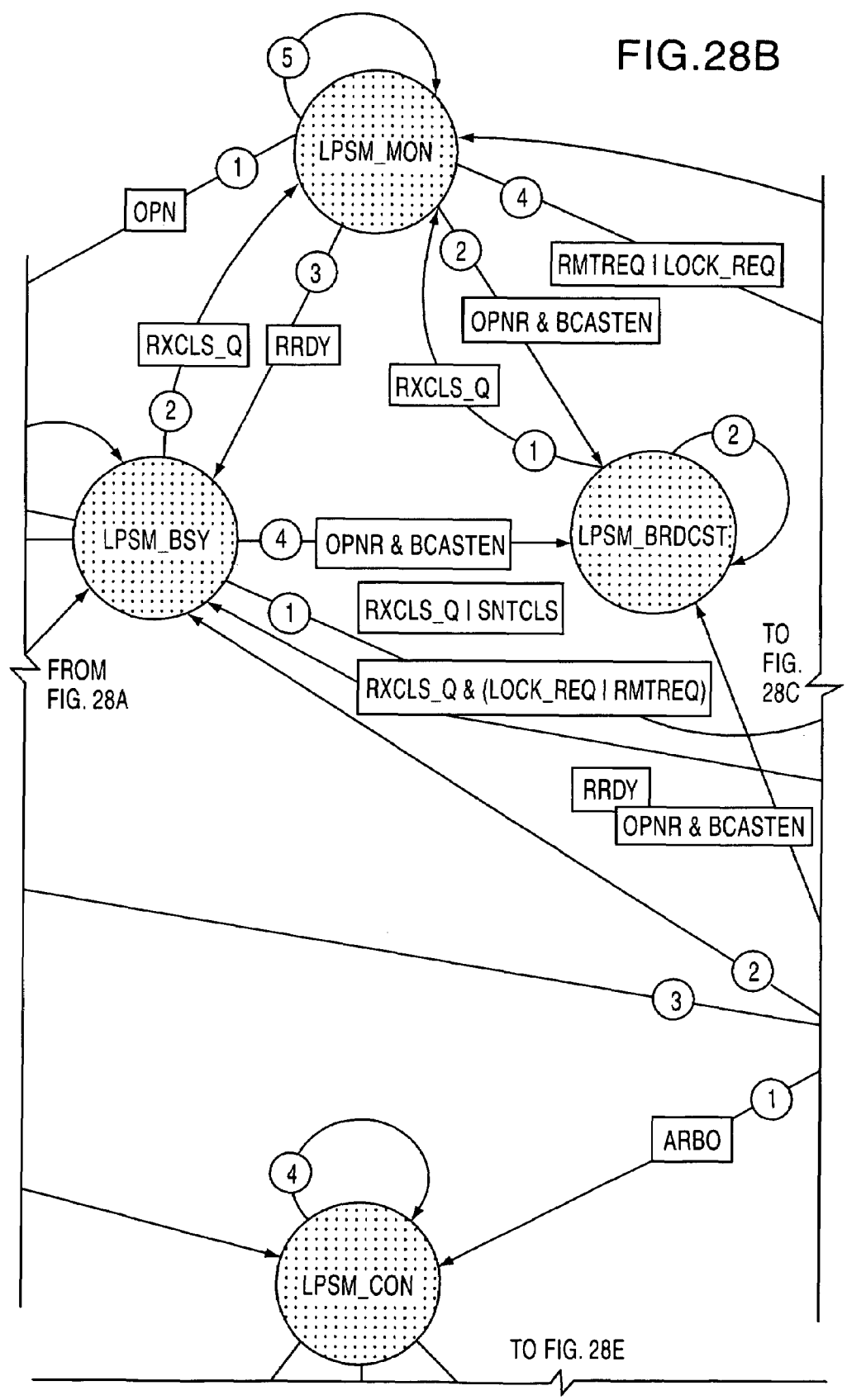
Figure 28C:
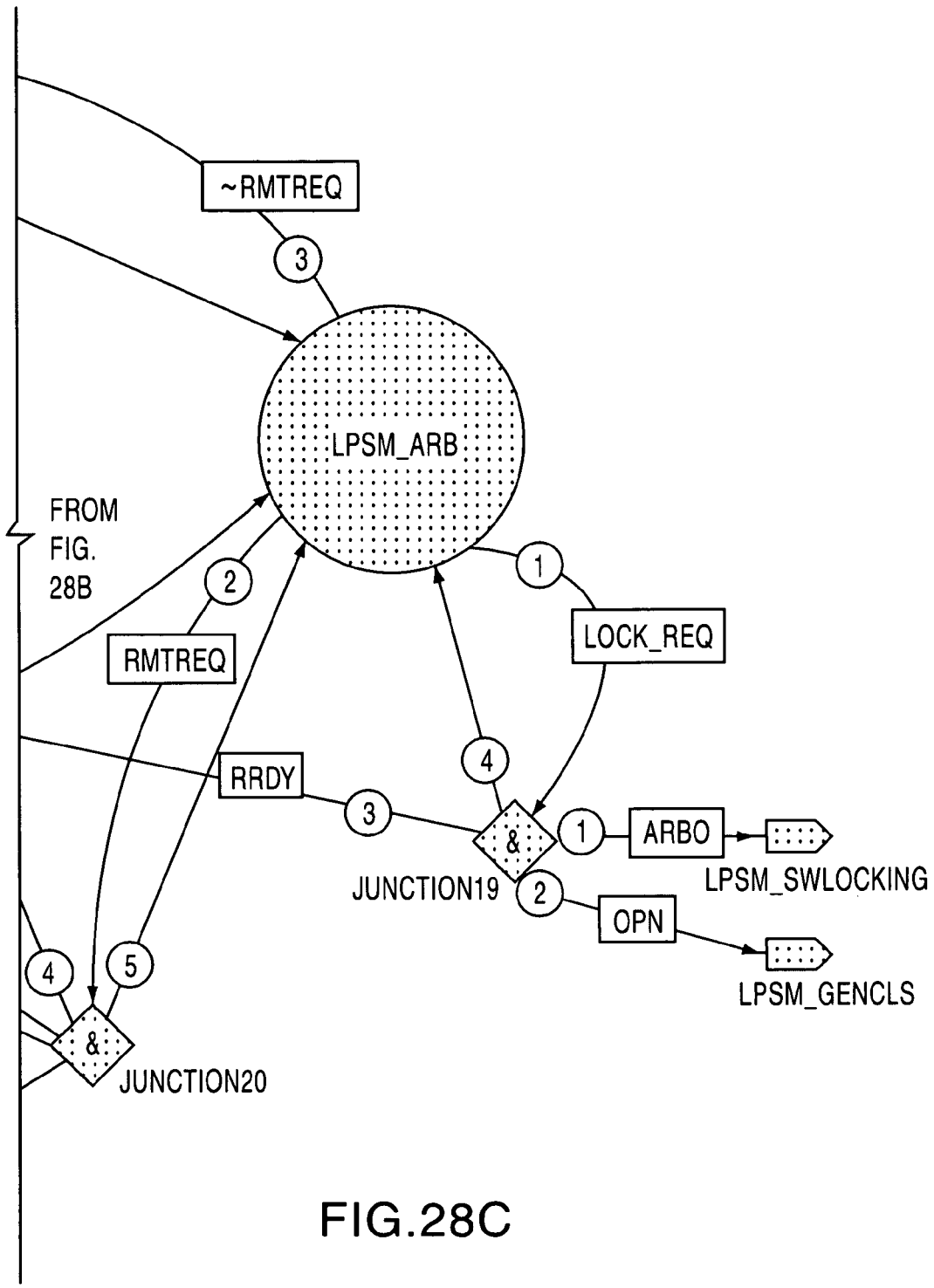
Figure 28D:
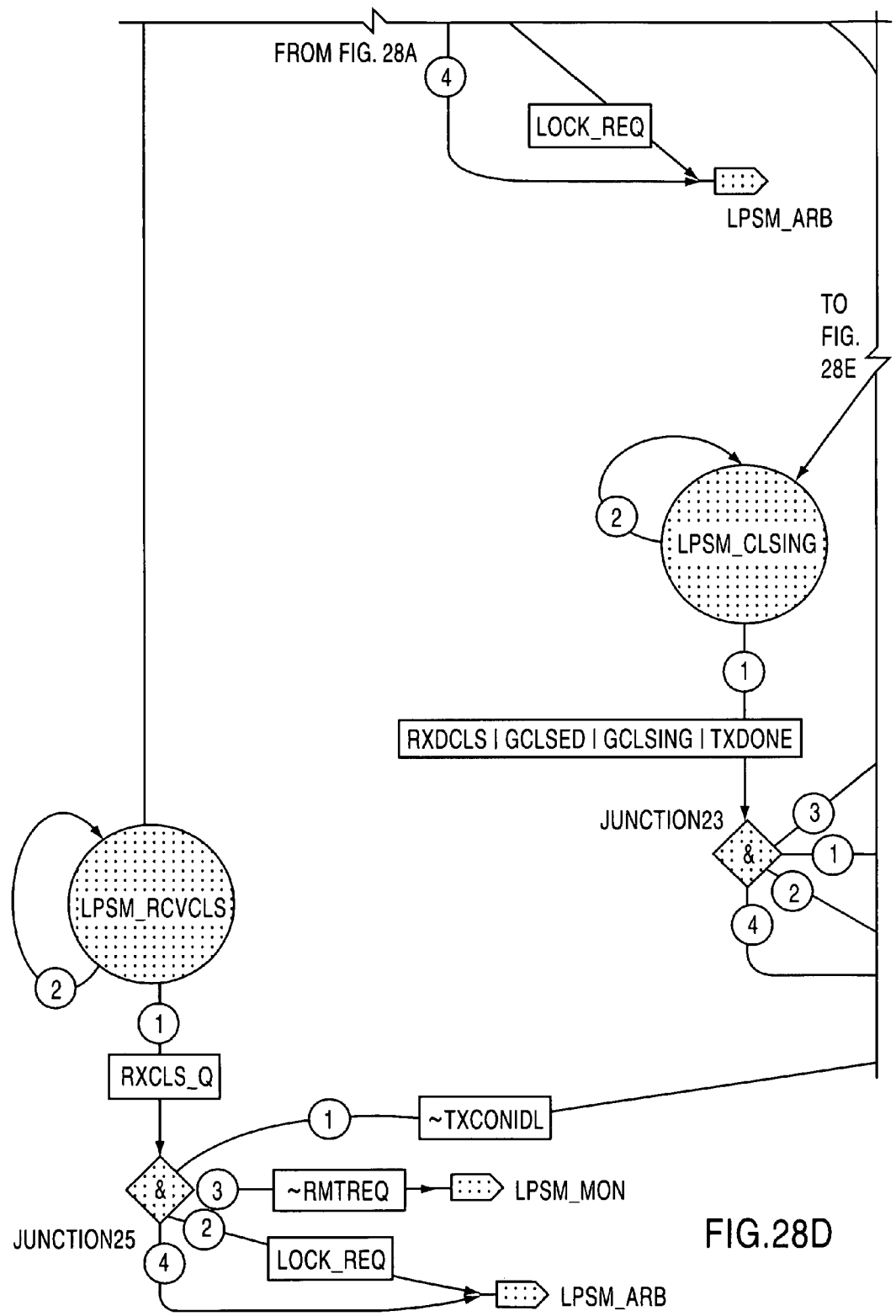
Figure 28E:
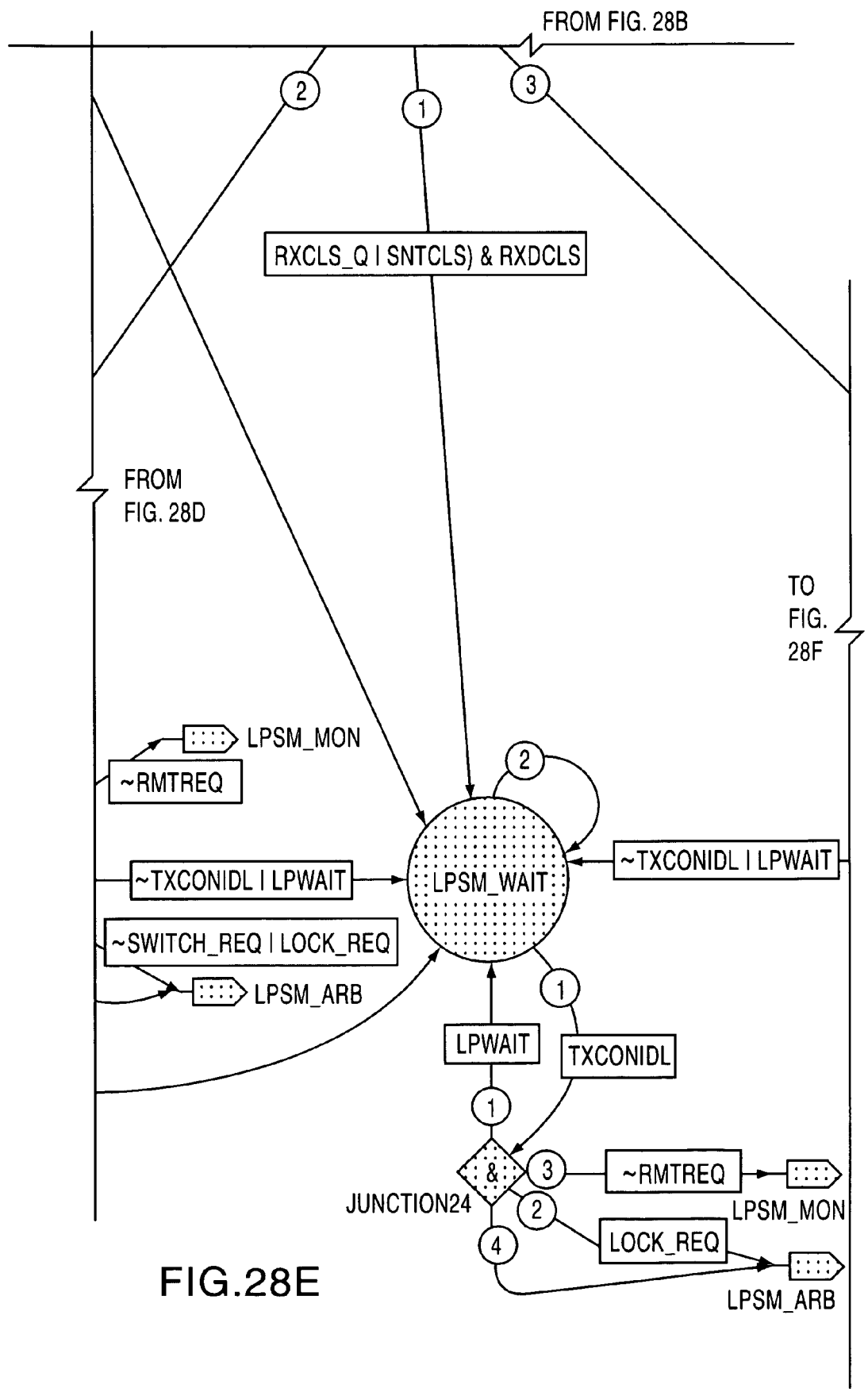
Figure 28F:
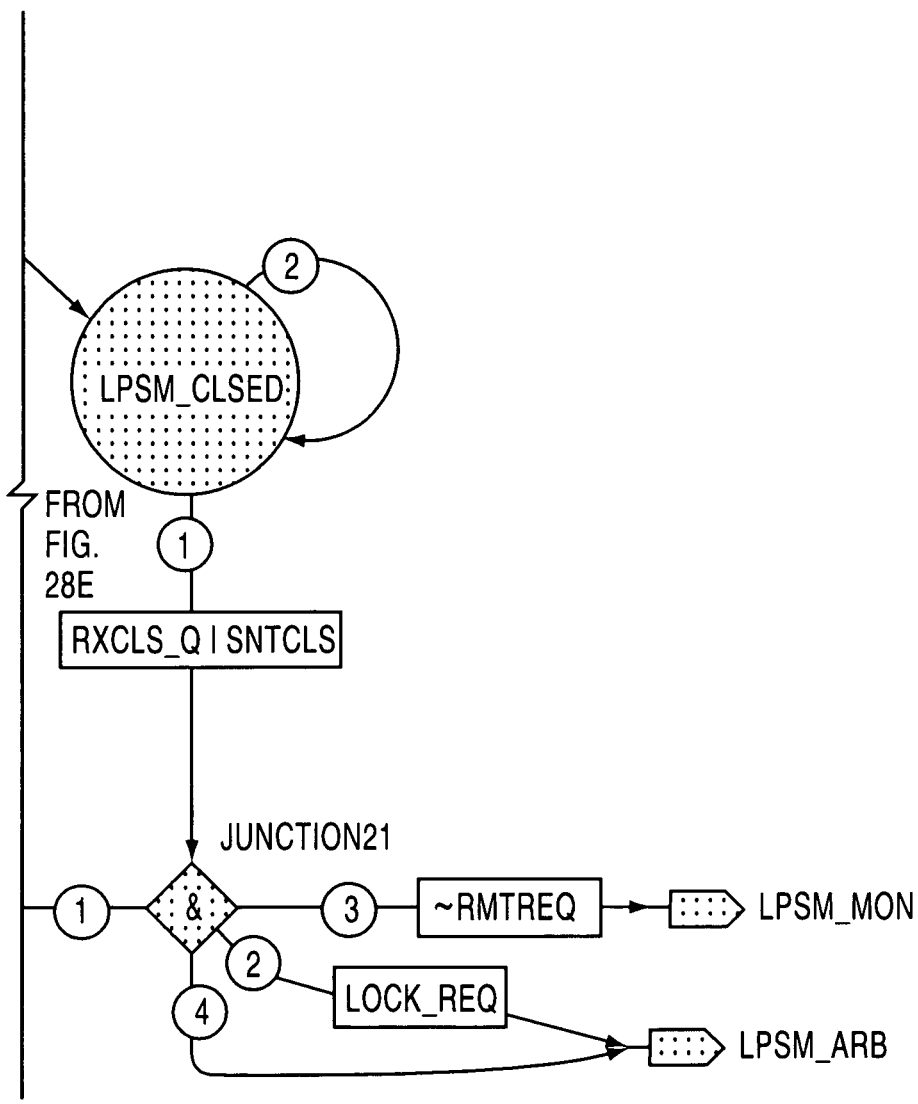

An example of normal, non dual simplex processing by the switch illustrated in FIG. 5 (or any of the alternative embodiments of non dual simplex switch operation) is illustrated by the flowchart of FIGS. 6A through 6C. This example is only a high level illustration of one path through the states of the loop port state machine of a single switch port such as loop port state machine (LPSM) 218 in FIG. 7 and is illustrative of typical processing for loop-local or chip-local or remote transactions. The LPSM in each switch port is a complex state machine which has many states and many transitions between states with the transitions between states depending upon the logical states of various input signals. Each loop port state machine is comprised of a plurality of individual component state machines which interact with each other. Some state machines generate output signals which are inputs to other state machines. This means that a large number of possible scenarios for the states of the state machine switch ports exist. To explain all these states and all the conditions for transition therebetween, would obscure the main ideas of the invention. To exactly illustrate all possible states and transitions, there is included herewith as FIGS. 17 through 28 (each comprised of multiple figures, such as FIG. 17A and FIG. 17B, which should be pieced together at the cut line) are individual state diagrams for all the state machines in a single Loop Port State Machine (LPSM). Each circle represents one state. Each line from one state to another represents a transition from one state to another. The labels in boxes on each line represent the Boolean condition that must exist between the signals identified in the box for that transition to be made. Boolean logical operators are identified by & for an AND operation, a tilde preceding a signal name means NOT and a vertical line between two signals means OR between those two signals. Each state and each signal is defined in the verilog code appended hereto as Appendix A. The state diagrams coupled with the verilog code together comprise a complete and exact description of all states and transitions between states for every possible processing scenario performed by the preferred embodiment of the switch. A description of the verilog hardware description language and how to use it to define the functionality of an integrated circuit is given in the treatise, Painitkar, "Verilog® HDL: A Guide to Digital Design and Synthesis" ISBN 0-13-451675-3 (Prentice Hall 1996) which is hereby incorporated by reference.

Local Destination Process

As a first example, suppose node 138 wishes to send data to node 140. Node 138 arbitrates for control of the FCAL net 142 comprised of data paths 142 A, B and C and nodes 138 and 140 (step 150). When control is won, source node 138 sends an OPN primitive to port 126 with the destination address of destination node 140 therein (step 152). Optionally, the source node follows the OPN with one or more RRDY primitives, each representing one frame buffer of credit which the source node has reserved for receiving frames of data from the destination node (step 152). Port 126 latches the OPN and any RRDY primitive following the OPN (step 154), and uses the destination address of the OPN as a search key to search a routing table stored in port 126 (step 156). In the preferred embodiment, a separate routing table is maintained in each port circuit. In alternative embodiments such as represented by FIG. 4, the routing table may be a single table 127 coupled to all the ports by the protocol bus 121 with each port checking the routing table contents by messages on the protocol bus. This embodiment is represented by FIG. 4. In the embodiment of FIG. 4, the contents of the routing table are updated by an active discovery process although this active discovery process may also be carried out in the preferred embodiment of FIG. 5.

The contents of the routing table are destination addresses and the identification codes (hereafter IDs) of the ports or half bridges to which those destination nodes are coupled. Each half bridge contains such a routing table. The contents of the routing table are learned by each half bridge by watching the traffic on its ports in the manner described in the parent case or by an active discovery process which will be described below.

In this particular case, the search indicates that the destination node is local to FCAL net 142, and that determination is represented by test 158 in FIG. 6A. Port 126 responds by setting an internal switch to connect an internal bypass data path to connect data path 142C to data path 142A (step 160), and sends the OPN to destination node 140 along with any RRDYs received from the source node (step 162). Node 140 responds either with one or more RRDY primitives if it has buffer capacity to receive one or more frames from the source node or a CLS primitive or one or more frames of data to be transmitted to the source node in accordance with the number of RRDY primitives received from the source node (step 164). In general, step 164 represents the process of the switch port acting as a normal non participating FCAL node for the duration of the transaction by forwarding all data and primitives received from the local loop back onto the local loop. Thus, if a primitive or data frame is output by the destination node for transmission on data path 142B to source node 138 and node 138 responds with an RRDY or data frame on path 142C, switch port 126 forwards the RRDY or data frame to the destination node via path 142A. If the destination node outputs an RRDY, source node 138 responds by transmitting an entire frame to node 140 via data paths 142C and 142A and the internal bypass data path (not shown) within half bridge switch port 126 (or a number of frames equal to the number of RRDY primitives received from the destination node may be transmitted—step 164). The frame is stored in node 140, and when it has been processed and the buffer is ready to receive another frame, another RRDY is output. If the destination node responded with a frame of data in response to an RRDY received from the source node, the source node stores it in its buffer. If the destination node responded with a CLS primitive, the source node relinquishes control of its FCAL net, and the transaction is ended according to normal FCAL close protocol. The process of exchanging RRDYs and frames of data continues until either node 140 outputs a CLS indicating it will send no more data to the source node or source node 138 outputs a CLS indicating it will send no more data to the destination node. The FCAL net 140 is then relinquished and other nodes including port 126 can arbitrate for control thereof.

Test 166 is symbolic of one event that can occur after the loop-local transaction is completed. The loop-local transaction has to be completed since no other node can win control of the local loop in arbitration so as to be able to send an OPN until the loop local transaction is over. Test 166 determines if an OPN has been received from the local loop, and, if so, vectors processing to step 154 to latch the OPN, as symbolized by step 168.

Test 170 symbolizes a test for an event which can occur regardless of whether the loop-local transaction is over or not—receiving a connect request message on the protocol bus at the switch port involved in the loop-local transaction. If this happens, the switch port becomes the destination port for a remote transaction. In such a case, the switch port behaves as indicated in step 175 and the following steps to arbitrate for control of the local loop, as symbolized by block 172. When control is won (after the loop-local transaction is over), the switch port sends back a connect response message naming the backplane channel to use. The connection is then established by the source port and the destination port and the transaction is completed as indicated in the steps following step 175.

If tests 166 and 170 do not detect either a new OPN from the local loop or a connect request on the protocol bus, the loop port state machine loops back to test 166 and stays in the state represented by tests 166 and 170 until one of the events detailed there happens.

Remote Destination Process

Now suppose node 140 has data to send to node 144 coupled to port 124. Node 140 arbitrates for FCAL net 142, and when control is won, outputs an OPN with the destination address of node 144 therein (steps 150 and 152, FIG. 6A). The source node may also output one or more RRDY primitives. The OPN and any RRDY primitives are latched in the local node (step 154), and the local node uses the destination address in the OPN to search the routing table (step 156). In this case, search of the routing table indicates that node 144 is coupled to a remote port 124, and an ID for the remote port is returned by the search (step 158). If the search indicated the destination node was on an FCAL net coupled to a switch port on the same chip as the switch port coupled to the source node, the result would be the same in that processing would be vectored in either event to step 169. Thus, path 167 is taken for either a chip-local or a remote transaction.

Step 168 represents a determination as to the status of the remote port coupled to the destination node. The combination of steps 168 and 176 represent a determination of the status of the remote port and branching to an appropriate routine depending upon the results. If the remote port status is "available" (path 170), source switch port 126 then sends a connect request message formatted as in FIG. 14A via a protocol bus 121 to the destination or chip-local switch port, as symbolized by step 172. In FIG. 14A, the requester ID is the ID of the source switch port and the responder ID is the ID of the destination switch port. Although this is the protocol of the preferred embodiment, in alternative embodiments, any protocol for determination of the status of the remote port and/or any other mechanism to establish a connection through the crossbar switch or other connection mechanism will suffice to practice the invention. In the preferred embodiment, the status determination is accomplished by checking the status entry for the destination port in a copy of a scoreboard table stored by the switch port and kept up to date with the copies of the scoreboard table in all other switch ports by monitoring messages on the protocol bus. In alternative embodiments, the local port can send a message to the remote port via the protocol bus asking it for its status or can send a message to a central scoreboard to get the status of the destination port.

If the remote port was busy, path 174 is taken from the status determination test 176 back to step 168 to read the status again and processing stays in this loop in the local port until the status changes to available or no privilege. In some embodiments, a timeout function can be included to exit the busy-wait loop path 174 and send a CLS to the source node after a timeout event to keep head end blocking from barring all communications will all nodes coupled to the local port in case the remote node is broken and that would be equivalent to the claimed invention.

If test 176 determines there is no privilege for the source node to talk to the destination node, path 178 is taken to block 180 where the local port sends a CLS to the source node. Processing then returns to Start.

Assuming the remote port was available and the connection request was received, the remote port then starts arbitrating for control of its local FCAL net (step 175, FIG. 6B). When control is won, the remote port sends back a response message informing the first port coupled to the source node to forward the OPN and any RRDY primitives it has latched, and telling the first port which backplane channel to use (step 177).

As symbolized by block 179, the response message from the remote port causes both the first port and the remote port to generate commands to the distributed crossbar switch circuitry of each port to set switches to couple the two ports to the selected backplane channel to set up an FCAL loop connection between the first port and remote port through the crossbar switch. In the example at bar, this data path couples port 126 and port 124 through the backplane data path 130 on the channel named in the reply message (step 179).

In some alternative embodiments, instead of sending a connection request to the remote port, the first port will simply establish a data path through the backplane and send the latched OPN and any following RRDYs to the remote port 124. In response, port 124 will then latch the OPN and any following RRDY primitives, arbitrate for control of the FCAL net coupled to node 144, and when control is obtained, transmit the OPN and any following RRDYs to destination node 144. If the local FCAL net is busy, the remote port will hold the OPN and any following RRDYs until the FCAL net is available, and repetitively arbitrate for control and then, when control is achieved, forward the OPN and RRDYs to the destination node.

In this alternative embodiment, the destination node will respond to the OPN (and any following RRDYs) with either an RRDY if it has enough buffer space to receive a data frame or a CLS if it does not or with one or more data frames to be transmitted to the source node corresponding to the number of RRDY primitives received from the source node if any RRDY primitives were received. The transaction then proceeds by transmitting one frame for every RRDY received from the other node until one or the other of the source or destination nodes transmits a CLS primitive. The frame or frames stream through ports 126 and 124 and backplane data path 130 without ever being stored in any buffer memory and without ever being segmented into packets that require segmentation and reassembly.

In the preferred embodiment, port 126 instead of sending the OPN and any RRDYs to port 124 to signal it to establish a connection, instead sends a connection request message via the protocol bus 121. The connection request message tells the remote port 124 to arbitrate for its local loop and to notify port 126 when control is won and expect further traffic. When the response message is received that control has been won by port 124 of its local loop and naming a channel to use on the backplane for data transfer, the OPN and any RRDY primitives which were received by the first port from the source node are sent to port 124 which then forwards these primitives to node 144 (step 181). As was the case for the alternative embodiment discussed in the paragraph above, the destination node will respond with either an RRDY if it has enough buffer space to receive a data frame or a CLS if it does not or with one or more data frames to be transmitted to the source node corresponding to the number of RRDY primitives received from the source node if any RRDY primitives were received. The transaction then proceeds by transmitting one frame for every RRDY received from the other node until one or the other of the source or destination nodes transmits a CLS primitive to complete the transaction.

The connection is closed with a handshaking type protocol that uses a switch control character to eliminate race conditions. The connection through the backplane can be closed by either the source node or the destination node sending a CLS. Test 182 represents branching to different protocols for closing depending upon whether the source node or destination node initiated the CLS. Processing branches to step 183 is the source node initiated the CLS. In step 183, the source node outputs a CLS and that CLS is received by the source port and forwarded to the destination port over the backplane connection. Optionally, the source port also sends an ARB(F7) or other innocuous fill word to the destination port. The purpose of this fill word is to send affirmative characters to the destination port to prevent any spurious characters from being transmitted to the destination port.

Step 185 represents the process of receiving the CLS at the destination port and forwarding it onto the local loop so that the destination node receives it. The destination node responds with its own CLS.

Step 187 represents the process of receiving the destination node's CLS at the destination port and forwarding it across the backplane connection to the source port followed by a switch control character (typically 20 consecutive zeroes).

Step 189 represents the process of receiving the destination node's CLS at the source port and forwarding it onto the local loop so that it will be received by the source node. The source port also loops the switch control character back through the backplane connection to the destination port.

Step 191 represents the process carried out in the destination port of receiving the switch control character transmitted by the source port and realizing the backplane channel in use is now clear. The destination port then drops the backplane connection and transmits a release frame on the protocol bus. All other ports see that release frame and update their scoreboards to indicate availability for that backplane channel. The switch ports involved in this transaction are now ready for a new transaction so processing returns to start state 148.

In the case where the destination node initiates the CLS, test 182 vectors processing to the closing sequence which starts with step 195. Step 195 represents the process of the destination node initiating a CLS. The CLS is received by the destination port and forwarded across the backplane connection to the source port followed by a switch control character (currently 20 consecutive zero bits).

Step 197 represents the process that happens at the source port when the CLS and switch control character is received by the source port. The source port forwards the CLS onto the local loop and holds the switch control character. The CLS reaches the source node, and it responds with its own CLS. This CLS is received by the source port and forwarded to the destination port across the backplane connection. After forwarding the CLS onto the backplane connection, the switch control character is sent across the backplane connection. The source port then closes its backplane connection.

Step 199 represents the process which occurs at the destination port when the CLS and switch control character are received there. The CLS is forwarded onto the local loop by the destination port. There it is received by the destination node which causes the destination node to close. The destination port then notes that it has received back the switch control character it originally sent to the source port and closes its backplane connection. The transaction is then over and the two switch ports are ready for a new transaction. Processing thus returns to a start state represented by block 148 as symbolized by step 193

Note in all of the above embodiments, the frame or frames stream through ports 126 and 124 and backplane data path 130 without ever being stored in any buffer memory and without ever being segmented into packets that require segmentation and reassembly.

The lookup table in each port circuit is slightly different than the lookup table in the bridge described in the parent described in the parent application. There, only two half bridges were coupled together, so the routing table could output only a 1 if the destination was local or a 0 if it was not, or vice versa. With the many half bridges of the switch, the routing table must store more bits for each destination address, those bits (6 ID bits plus one bit for validity of the port) define the unique ID of the particular port to which each node having a particular destination address is coupled.

The Scoreboard Table

In the preferred embodiment, a scoreboard table is used to store port status and privilege information. Whenever the local FCAL net of a port is busy, the port connected to that FCAL net sends a message to update its status in the scoreboard to "busy". When the FCAL net becomes available again, the port connected to that net sends another message to the scoreboard to update its status to "available". The scoreboard can also store privilege information to implement security rules to prevent certain ports from communicating with other ports. The status states map to the following actions by the switching circuit: "busy camp" equals wait and do not forward OPN so no RRDYs get back to source node and no data is sent; "available" equals connect and send OPN to destination; and "busy no camp" equals generate a CLS and send it back to the source node, and "no privilege" equals generate an OPN and send back—this will tell the source node that the destinat node is not available.

Summary of the Preferred Routing Algorithm Using a Scoreboard and Protocol Bus

Thus, in the local and remote destination methods described above, the preferred embodiment includes the following steps for consulting the scoreboard (this method is reflected in FIGS. 6A and 6B).

After the OPN and any following RRDYs from the source node are latched, the port that latched the OPN determines the port ID of the port coupled to the destination node by consulting the routing table as described above. After determining the ID of the remote destination port, that port ID is used as a search key to consult the scoreboard table to determine if the port is available and if there is the privilege to talk to it. If the remote ports status is "busy camp" and camping is allowed, send a connect request message and wait for the remote port to finish its current conversation, grant the connect request and send back a connect response message naming the backplane channel to use. If the remote port's status is "no privilege", generate an OPN and send it back to the source node. If the remote port's status is "available", send a connect request message to the remote port over the protocol bus. If the status if "busy no camp", return a CLS to the source node. This causes the remote port to arbitrate for and win control of its local loop. When control is won, the remote port then sends a reply message to update its scoreboard status to busy and naming the backplane channel to use. The scoreboard circuitry sees the reply message and updates the status of the port whose ID is in the reply message to busy. The reply message causes the first port to generate signals to the crossbar switch to open a connection between the two ports. The first port then sends the latched OPN and any latched RRDYs to the second remote port coupled to the destination node, and the process proceeds as described above until the transaction is completed. When the transaction is completed, both ports relinquish control of their FCAL nets and the destination port posts a message on the protocol bus that both the source and destination ports are available. The scoreboard circuitry sees this messages and automatically updates the status of each of these ports to "available".

When search of the routing table with the destination address of the OPN received at the first port from the source node indicates that the destination node is local, the scoreboard is not consulted and the bypass data path is activated. Then a message is sent by the first port to the scoreboard updating its status to "busy" to let all other ports know that the FCAL net coupled to the first port is temporarily unavailable for any other loop tenancy. Of course camping is allowed on local connection in the case of a "busy camp" status.

The status data in the scoreboard table will indicate a port is busy when the FCAL net coupled to the port is tied up in a loop tenancy.

Referring to FIG. 7, there is shown a block diagram of a typical switch chip such as those represented by blocks 124, 126 and 128 in FIG. 5. Three FCAL net ports, each having a transmit and receive terminal, are shown at 200, 202 and 204. Each port has an FCAL net interface comprised of a 1 Gbit/sec serializer/deserializer shown at 206, 208 and 210. The function of these SERDES interfaces is to transmit and receive serial data, converting the serial data stream to and from 10-bit characters used internally in the switch chip.

The received 10-bit data is re-timed in an elastic buffer, shown at 212, 214 and 216, producing a 10-bit data stream whose timing is identical to the transmitted data.

A loop port state machine (LPSM) for each port, shown at 218, 220, 222, functions to process received FCAL data and generate commands to establish the proper connection to either the local FCAL net or to a designated channel through the backplane so as to facilitate coupling of the received data on whatever data path the state machine establishes. The state machine also functions to receive data from the crossbar switch coming from a remote port and couple it onto the FCAL net local loop of that port. The state machine also functions to do the routing table searches and scoreboard table searches to determine when and FCAL transaction from the local loop must connect to the switch fabric and to post transaction messages on the protocol bus such as connection requests, reply messages, scoreboard updates etc. The switch fabric refers to the backplane data paths and switching circuitry that allows connections between different ports. The state machine also functions to arbitrate for control of the local FCAL net when a connection request is received from the switch fabric, and, when control is achieved, pick a backplane channel and generate the reply message. Another function of the state machines in every port in dual simplex mode is to store the buffer credit RRDYs output by the source node and forward these RRDYs to the third port, one RRDY at a time up to the buffer credit limit, when an OPN for a dual simplex transmission is received from a third node. Basically, all the logic and intelligence of each hub to carry out the functions described herein for the preferred or alternative embodiments resides in the states of the state machine. The particular design of the state machine is not critical, and any state machine (or programmable machine if it is fast enough such as a microprocessor) which can perform the functions defined herein will suffice to practice the invention. The novelty is not believed to be in the particular design of the state machine but in the functions it performs in each port.

Since each switching circuit such as 124 in FIG. 5 contains three ports (only one port is shown in FIG. 5), each switching circuit contains a port multiplexer, shown at 224 in FIG. 7. The port multiplexer interfaces the three state machines or LPSMs to the backplane data channels 226. The state machines control the multiplexer 224 to keep local destination traffic for each port local but to couple traffic between the port and a remote port to a channel on the backplane. The port multiplexer and the state machine jointly determine the nature of each new conversation (local or remote) by searching a routing table stored in memory 228. Preferably, memory 228 is a lookup table.

The backplane 226 comprises the datapath and control logic required to receive and transmit the backplane data between switching circuits as well as multiplexing circuitry to shunt backplane data to and from the state machines via the port multiplexer 224. Backplane connections and data channel availability are tracked by a backplane protocol circuit which manages scoreboards in each port which have their data synchronized via broadcasts over the protocol bus 121.

The state of each switch chip is monitored by a management circuit that interfaces to the system through 2-wire bus 232. JTAG circuit 234 is used for testing the switch chip.

The serializer/deserializer function (hereafter SERDES) of each port at 206, 208 and 210 is provided by the GigaBlaze SerialLink™ megafunction circuitry which is commercially available from LSI logic or any equivalent SERDES circuitry, the details of which are hereby incorporated by reference. The SERDES circuits accepts differential, 8b/10b encoded serial data at the rate of 1 Gbit/sec, demultiplexes it into aligned 10-bit characters and recovers a receive clock from the data. At the same time, the SERDES multiplexes outgoing 10-bit characters into a 1 Gbit/sec differential transmit data stream using a self-contained 10× clock multiplier. Other currently available SERDES circuits may be used also either at macros in layout of the switch port chips or as external parts.

The elastic buffers 212, 214 and 216 absorb differences between receive and transmit data rates which can vary up to 100 ppm from the nominal rate of 1.0625 Gbits/sec. The elastic buffers re-time the incoming data stream so that its timing is compatible with the transmit data. This is achieved by storing received data in a FIFO as previously stored data is removed at a rate defined by the transmit clock. If the receive and transmit rates are not equivalent, the receive and transmit pointers will eventually converge. To prevent this, logic senses an impending pointer collision, and repeats or deletes data when the FC-AL fill word data is present in the FIFO. A fill word is a Fibre Channel ordered set defined to be insertable or deletable as elasticity requirements dictate. The FIFO also contains circuitry to perform a smoothing function to repair interframe gaps that have been made too small by the FIFO by deletions from a small interframe gap so as to make it so small that it creates problems downstream. The repair of interframe gaps is done by inserting fill words into small gaps and removing fill words from large gaps. Specifications for such a FIFO are provided in the FCAL standards documents which are incorporated by reference herein.

The state machine in each port is similar to the FC-AL specification state machine but different in that it is passive and never transmits or receives frames itself. The state machines 218, 220 and 222 relay OPNs and frames to remote destinations as well as performing the other functions defined above. When a state machine receives data from the backplane, it arbitrates for control of its local FCAL net with high priority according to arbitration rules defined in the FCAL standards incorporated by reference herein. Once control is achieved, the switch port then relays the OPN and frames onto the local FCAL net.

The state machines also implement the dual simplex process described above. Dual simplex mode can be turned on or off by management commands received on bus 232. When this mode is on, the state machines convert full duplex OPNs to remote devices to half duplex OPNs to the same destination address. This leaves the source port available to receive an incoming connection from a third port.

The state machines do not need to participate in loop initialization, but rather they optionally allow initialization to occur as it would in a prior art FCAL net configuration and then change the state of the switch to allow the state machine to actively engage source and destination nodes and control data flow therebetween. Before switching from hub mode (the switch can be instructed to act as a hub instead of a switch), the state machines also function to learn the mapping between each destination node address and the port ID of the port to which that destination node is connected. This learning can be performed by either a discovery process or OPN trapping, and will be discussed below. The mappings learned in either process are written by the state machine to the routing table in memory 228.

The port multiplexer 224 selectively connects each port to each other within the switching circuit or to the backplane 226. The port multiplexer has three multiplexer blocks each of which is controlled by a portmux state machine. Local traffic connections are implemented by connecting a transmit data path and a receive data path between the two state machines in the port multiplexer 224. Remote connections are established by connecting the transmit data path and receive data path between the state machine and the backplane. Each channel through the port multiplexer actually implements two transmit and receive data paths. In full duplex operation, only one TX-RX pair is used to carry half or full duplex conversation. When a port is configured for dual-simplex operation, the outgoing conversation uses one TX-RX pair to transmit data to and receive flow control primitives from the destination node while the other pair is used to receive data from and transmit flow control to any third node in the event a third node connects to the source port.

The port multiplexer 224 also contains a camplist FIFO for each of the three ports in the switch chip. These FIFOs are used to record the IDs of remote ports that have made a priority request to the switch port but which have not been serviced yet so as to implement the fairness token highest priority to these remote ports which have not yet been serviced and prevent any starvation of a port.

The backplane 226 is a group of parallel point-to-point data paths which physically comprises 14 2-bit wide, 531.25 Mbit/sec data paths and a 265.625 MHz strobe signal implemented using differential LVDS to drive the receiving switch chip. The switch chips are connected such that the backplanes form a ring of point-to-point connections. The strobe is generated by an integrated PLL 227 and is timed with outgoing data such that it can be used to latch the data at the destination switch chip which is the next chip in the ring. Each data channel on the backplane may operate in the pass-through mode, or it may be configured to align incoming data into 20-bit words and steer data to and from a port multiplexer channel, which typically happens when a remote connection is being serviced by a port. Each port can be configured to statically listen and transmit to certain channels to support broadcast.

The backplane logic tracks the availability of each backplane channel, and can be configured to associate a data channel with a receiving port and only release it when no other channels are available. This is useful where backplane channels are underutilized to reduce latency.

The protocol bus is an 18-bit wide data bus used for broadcasting connection requests and response messages to each switch chip in the switch. The bus is arbitrated by external logic that is asynchronous with respect to the main switch chip logic and thus can operate at any speed up to the limit determined by the system design. Each switch chip monitors the protocol bus and updates the status information in its copy of the scoreboard such that every port knows the busy/available status of every other port. This allows denial of full duplex connections at the source if the destination port is busy. Dual simplex is an exception to this rule. The scoreboard also prevents loops of camped devices by denying any camping connections to a port that is already camped on another port.

The routing table in LUT memory 228 stores 6-bit mapping data between each destination address and its port ID. Each port in a switch chip must have received a unique ID assignment from external management software before the system can operate as a switch. The LUT memory has three 10-bit read address ports, one dedicated to each port on a switch chip. The LUT has one 10-bit write address port for writing associations from the state machines developed in the learning process and also has 7-bit read and write address ports used by management software which does not form part of the invention. Internal logic in the LUT converts the 10-bit AL-PA destination addresses to 7-bit addresses for the 128x8 SRAM. The output from the LUT is a 6-bit port ID that maps to the AL-PA input at the address port of the lookup table, a valid entry bit and a bit that indicates whether the destination node is local to the switch chip. When a port receives an OPN from its local loop, it uses LUT 228 to determined if the conversation will be loop-local (destination on local loop), chip-local (destination on the local loop of another port on the same chip) or remote.

The LUT is initially loaded by a learning process called OPN trapping in which each port observes OPNs on its outbound local loop port and writes a destination address to LUT if a response to the outbound OPN on the local loop is detected on the local loop inbound data path. The port then posts a message on the protocol bus that its local loop has the destination address of the outbound OPN and giving its switch port ID. All the other ports receive this message and write the mapping into their routing tables.

The contents of the LUT are cleared by a state machine and counter triggered by a management command or the rising edge of a chip reset signal. Clearing the LUT takes 128 clock cycles.

Operational Overview

The switch chips of FIG. 7 can be operated in three fundamental configurations: hub, switch and locked. Initial operation is in hub mode where each port is coupled to its neighbor ports to form one big Fibre Channel Arbitrated Loop (FC-AL). In locked mode, each port is standing by in preparation for a mode switch or broadcast. In switch mode, each port forwards data back onto its local loop until an OPN to a remote node is detected, and then a connection to the port coupled to the remote node is initiated through the backplane.

Figure 8:
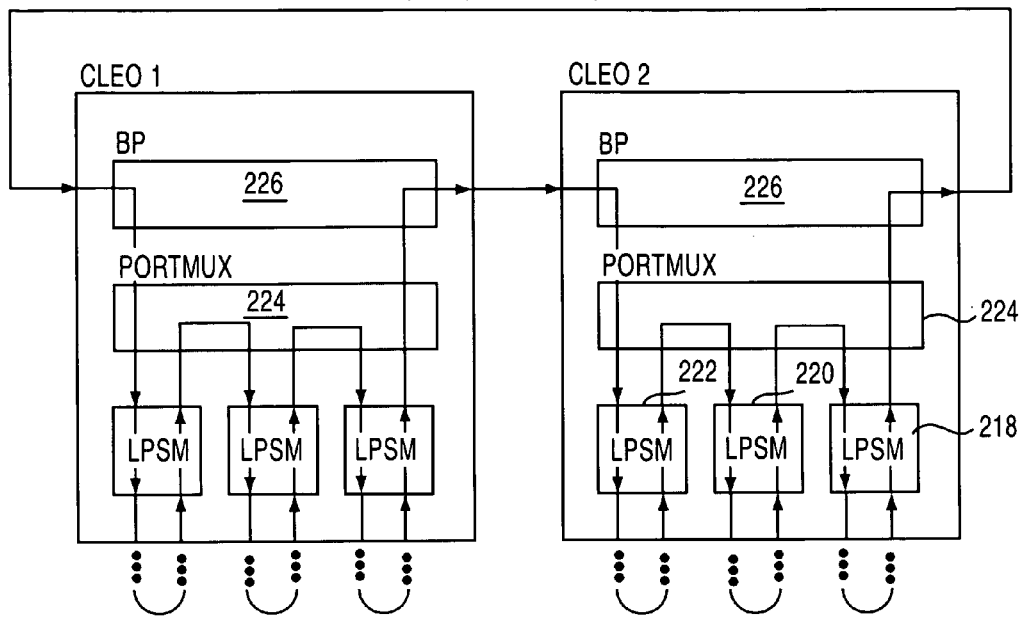
FIG. 8 is a diagram of an FCAL switch with two switch chips configured to run in hub mode.

FIG. 8 illustrates hub mode. In hub mode, the state machines of all ports cooperate to forward loop data from the receiver of one port to the transmitter of the adjacent port through the port multiplexer 224. Because each switch chip can specify to the management software through a management-programmable register which hub mode backplane channel it uses, it is possible to partition the switch into several distinct loops instead of one big one. The hub channel is selectable on a per port basis.

Figure 9:
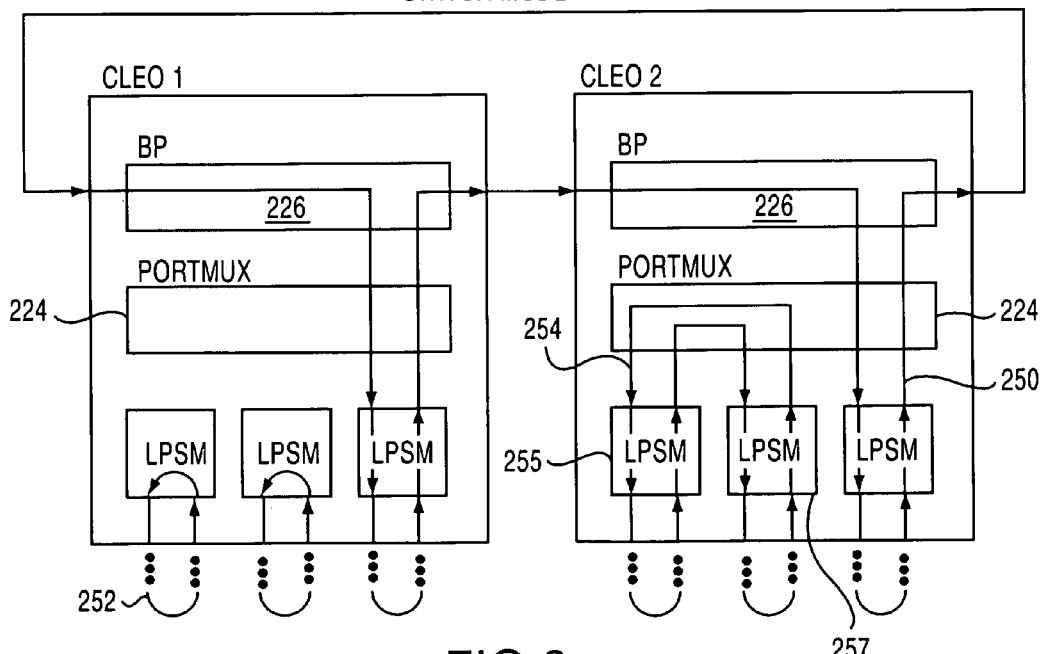
FIG. 9 is a diagram of an FCAL switch system with two switch chips configured to run in switch mode and illustrating loop-local, chip-local and remote port simultaneous loop tenancies.

Switch mode the state machine of each port monitors traffic on its local loop and forwards data from its receiver to its transmitter when an OPN designating a remote node is received on the local loop. When this happens, the state machine breaks the local loop and substitutes fill words on the local loop transmitter so that nodes on the local loop do not know the loop has been broken. The OPN is held while a connection attempt to the remote port is made. If the connection can be made, the remote port conducts unfair arbitration to win control of the remote loop, breaks that loop if it wins control and transmit and receive connections between the two loops are initiated to form a loop across the backplane between the source and destination nodes. FIG. 9 shows a typical switch connection between two ports on different chips as data path 250, a simultaneous loop-local conversation represented by data path 252 and a simultaneous chip-local conversation as data path 254.

At any time, a number of these connections may exist with the maximum number of chip to chip data paths limited by the number of backplane channels.

Transactions that are purely loop-local proceed without intervention of the state machine in the preferred embodiment with the exception that the state machine momentarily holds the OPN received while it checks the destination address in the LUT 228. If the destination is on the local loop, then the OPN is forwarded onto the local loop and the state machine transitions into the busy monitoring state.

The state machine also detects a local tenancy by monitoring the RRDY primitive, and the tenancy is terminated when a CLS is detected. At the time a CLS is detected, the state machine returns to either a monitoring state or to a remote arbitration state if a pending remote request exists in the camp on FIFO (not shown in FIG. 7).

Chip-local transactions are handled by the port multiplexer 224 by arbitrating for local resources and physically multiplexing the data for all chip-local conversations. The state machine signals the port multiplexer and forwards the destination address after receiving an OPN from the local loop naming a destination on the same chip but a different FCAL net. A hit on one of the other two ports in the chip initiates the transmit request sequence.

The transmit requests to chip-local ports must be broadcast on the protocol bus to resolve port contentions and deadlock issues. Local requests proceed normally without posting to the protocol bus as no deadlock is possible for local only transactions.

When a remote destination address is detected in an OPN from a local loop (done by the port multiplexer in some embodiments), the port multiplexer forwards the request to the protocol bus logic 121 which arbitrates for the bus and assembles a request frame. The destination or remote port receives the frame and either begins unfair arbitration for the remote loop or queues the request in a FIFO-ordered list of campers. Eventually the request is serviced, and arb on the remote loop is won. At this time, the remote port issues a response frame on the protocol bus containing both grant and backplane channel ID on which to converse. The requesting port releases the OPN once the grant is received and awaits the first valid K28.5 primitive from the chose data channel. The remote port, upon receiving the OPN primitive, releases its local traffic onto the data channel and enters the connected state. The remote tenancy is considered terminated when the state machine has detected a CLS from both the source node and the destination node.

Each state machine implements a port bypass circuit and a parallel loopback mode, and each SERDES implements a serial loopback mode. The port bypass and parallel loopback modes are also used to bypass a faulty local loop while the switch is operating.

Port Bypass, Parallel Loopback and Serial Loopback

Figure 10:
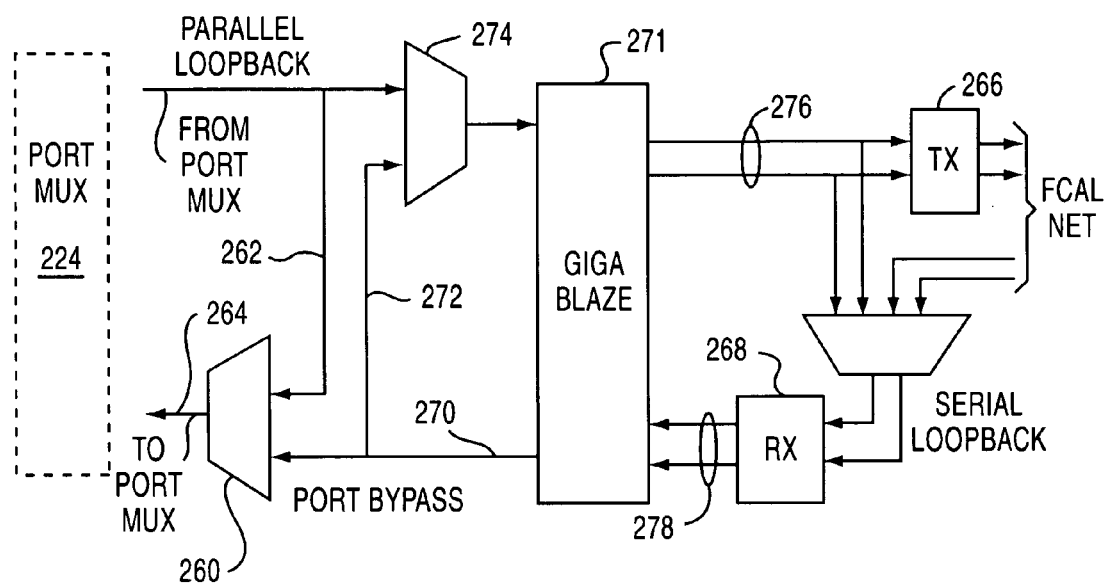
FIG. 10 is a block diagram of the multiplexer structure in each switch chip that allows port bypass mode, parallel loopback mode and serial loopback mode to be implemented.
Figure 16A:
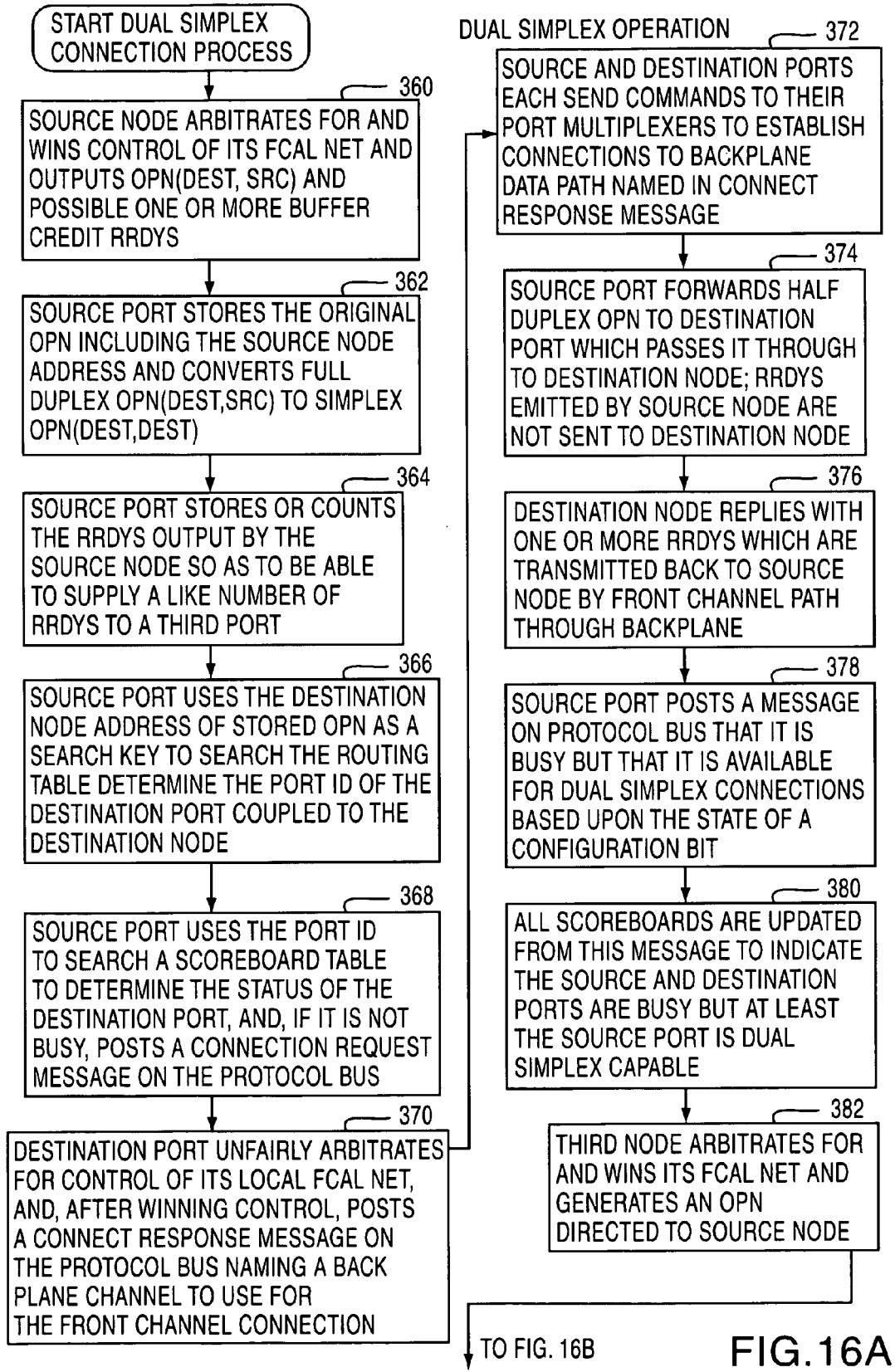
FIGS. 16A through 16D are a flow chart of the specific steps carried out by the preferred embodiment to carry out dual simplex communications.
Figure 16B:
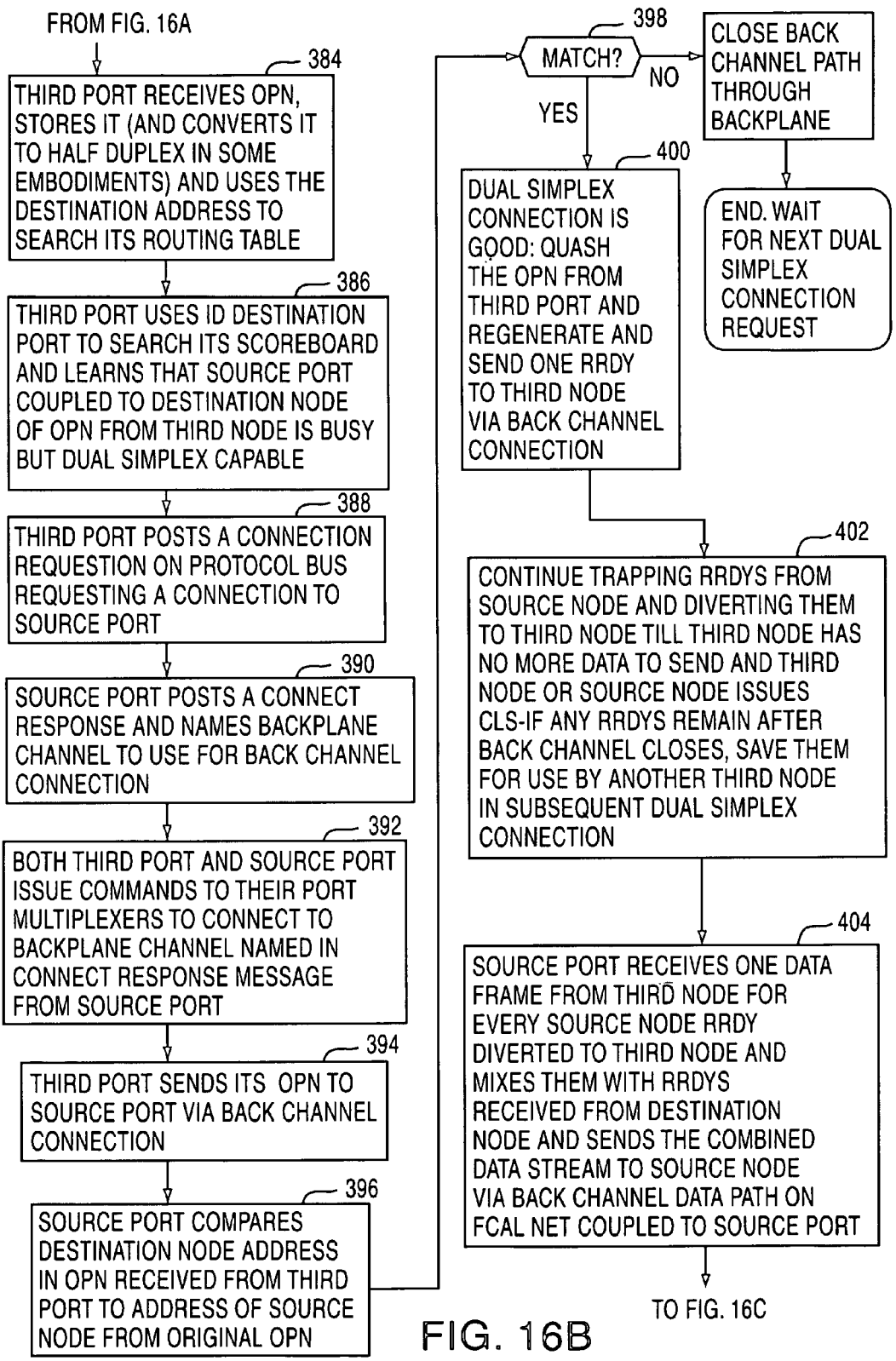
Figure 16C:
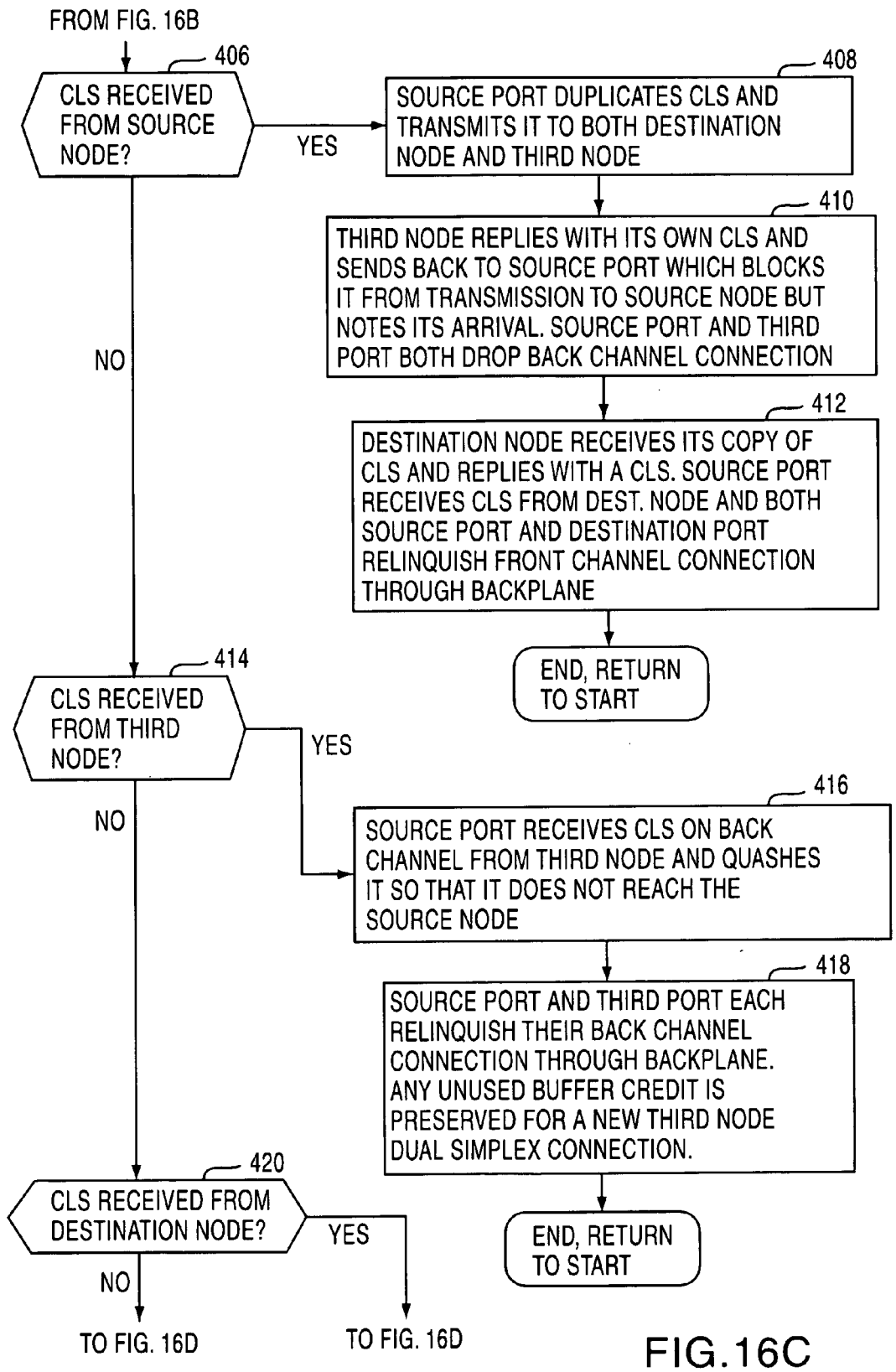
Figure 16D:
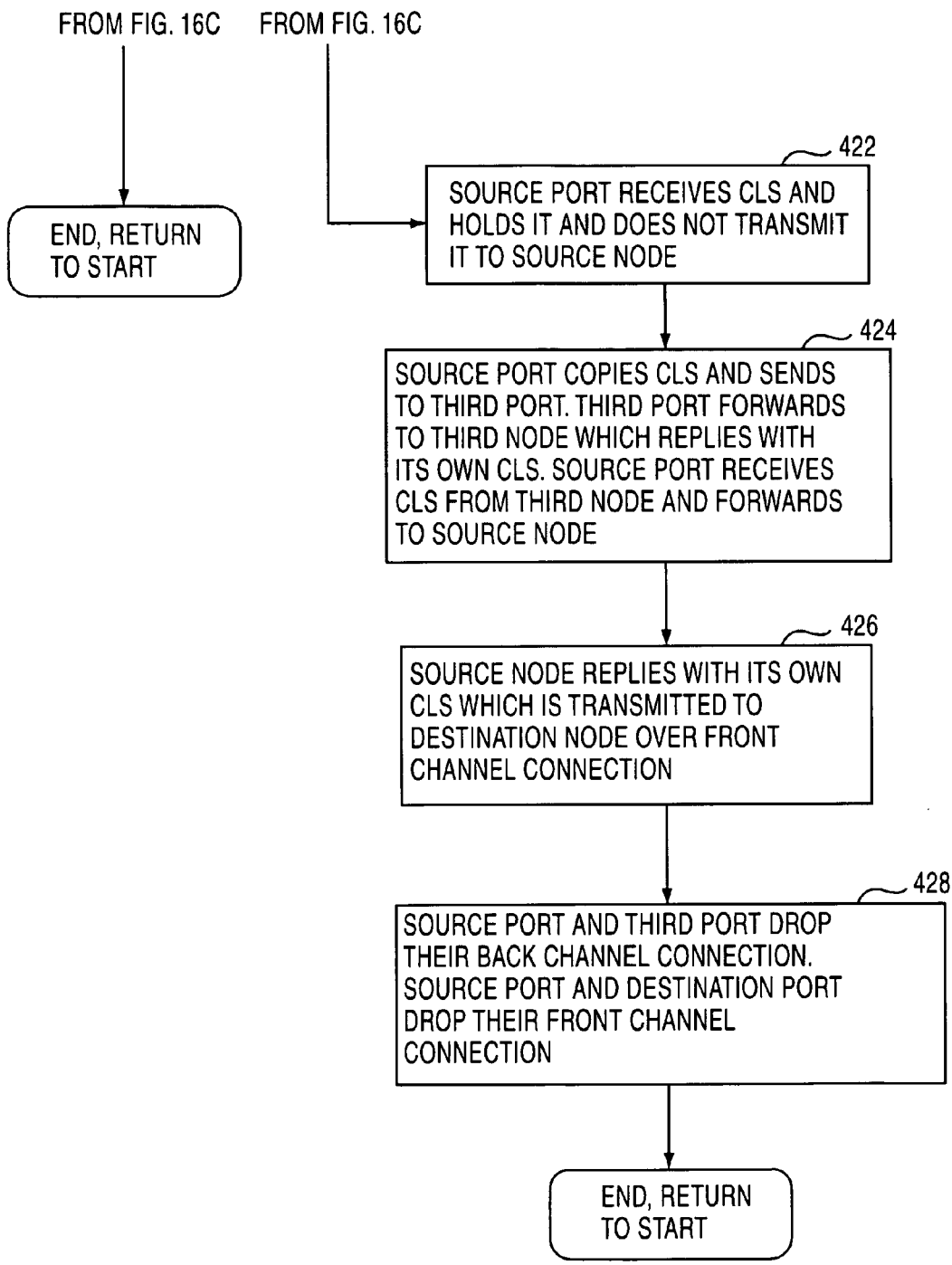

Each switch chip has three multiplexers that may be used to control the flow of data without regard to the FCAL protocol as illustrated in FIG. 10. These three multiplexers control port bypass mode, parallel loopback mode and serial loopback mode.

The port bypass circuit 260, when enabled, connects line 262 from the port multiplexer 224 in FIG. 7 back to the port multiplexer via line 264 and port bypass switch. This has the effect of forwarding data from the port multiplexer 224 back to its source without travelling across the local loop coupled to transmit interface circuit 266 and receive interface circuit 268 coupled to the inbound and outbound data paths of the local FCAL net. SerDes (serializer/deserializer) circuit 270 does the serialization and deserialization function described above. Data incoming from the local FCAL net is never sent to the port multiplexer 224 when port bypass mode is engaged. The port bypass circuit 260 may be engaged by the management software, and is automatically activated under certain error conditions. It may only be disengaged by management. In normal operation, 10-bit words generated by Giga Blaze circuit 271 on output 270 are coupled through port bypass switch 260 to the port multiplexer via line 264.

Parallel loopback mode is manually engaged and disengaged by the management software, and is qualified by the port bypass enable. That is, parallel loopback mode is always disabled when port bypass is disabled. When a switch chip is in parallel loopback mode, incoming local loop data received by Giga Blaze circuit 271 at input 278 from the receive interface circuit and output on line 270 is sent immediately to the transmit interface circuit 266 via line 272, parallel loopback switch 274, Giga Blaze circuit 271 and output 276. This happens under all circumstances when parallel loopback mode is engaged. Data from the port multiplexer 224 is never sent to the local loop while parallel loopback mode is engaged. If port bypass is enabled an parallel loopback is disabled, the loop is broken at the parallel loopback switch and ARB(F7) primitives are transmitted onto the local loop.

Serial loopback mode is primarily used for testing the data paths in the switch chip.

Priority and Camping

All chip-local and remote connections fall into one of three priority classes: none, low and high. All connection requests from a switch port default to a static priority level (which is typically no priority) which can be set my management software. Priority for requests can be escalated to low or high by a number of mechanisms.

Priority escalates from none to low after a management programmable number of consecutive denials. If management software sets 0 as the number of denials, this escalation is disabled. After the trigger level is exceeded, the priority deny count is reset and a low-priority request bit is set for exactly one arbitration interval. This arbitration interval begins after the low priority trigger value has been exceeded and an IDLE primitive has been detected on the inbound port of the state machine. All subsequent remote requests will use low priority until another IDLE is detected, ending the arbitration interval.

The management software can also directly escalate priority on a port by enabling a rotating-token scheme in which each port requests at high priority for a period of time while other ports deny requests to a port.

This mechanism guarantees each port a chance to service its local clients, at the expense of servicing any new remote requests. The token position is computed independently by each switch chip through use of a 6 bit token port ID location, a 6 bit token compare mask, a 16 bit token hold length register, and a single token priority enable bit. The token enable bit controls whether the token passing scheme is active in switch mode. If the enable bit is set to 1, the token passing scheme is enabled for the switch chip. All switch chips must set their token enable bit to the same value before transitioning to switch mode.

This mechanism allows for fairness to be maintained throughout the system. This feature is critical in congested server environments where starvation of disk access can freeze an application. The circulating fairness token prevents this from happening.

The token position counter identifies the port or port group that holds the token. A port holds the token if the port ID of the port $AND^2$-ed with the 6 bit compare mask matches the token counter value AND-ed with the compare mask. If a port holds the token, its requests are made with high priority. Ports wishing to request a port that holds the token are denied so that the camp list of the port holding the token can drain and local requests can be serviced.

The token position counter is incremented when a management-specified number of wall clock counter bits roll over to zero. The wall clock counter is a 24 bit counter which is incremented every word clock period of 40 ns, resulting in a range of approximately ⅔ of a second. The token position increment signal is computed OR-ing the lower 8 bits of the wall clock together with the bits resulting from an AND operation between the upper 16 bits of the wall clock and a 16 bit token length value, which should be set to a string of logic ones padded to the left with logic zero. When the resulting value is zero, the token counter is incremented.

The length of the string of logic ones in the token length register determines the amount of time that each port will be assigned the token. For example, if the value of the token length register is 0¥3f, the token counter will be incremented every time the lower 14 bits (8 LSB's+6 additional bits) are zero, or every $2^{14}*40$ or about every 650 usec.

Camping on a port means that a remote request waits on a busy destination port until that port becomes available. A non-camped request will simply be closed at the source if the destination port is busy. Campers are ordered in a camp list FIFO which has a depth of 8 entries.

Low and high priority are allowed to camp on a port if the camp list for that port is not currently full and the desired port is not holding the token. High priority requests differ only in that at the destination port they may be queued up to the depth of the camp list, while low priority requests queue to the low-priority camp depth set by management. All requests are serviced by a single queue with FIFO discipline. An alternative embodiment uses separate queues for high and low priority thus allowing high priority to jump to the head of the line.

Camping on a port that is already camping on another port can create a deadlock situation in which two or more camped ports form a cycle. No forward progress can be made when this occurs, resulting in a "fatal embrace". Such deadlocks are prevented by scoreboarding all ports which have outstanding requests. If the request has been observed on the protocol bus but no response has been issued by the target port, then the requestor port is marked as camped in the scoreboard. All requests to ports marked in the scoreboard as camped are immediately denied. Once the port in question has been issued a response, implying a grant and an allocated backplane channel, the formerly camped port can begin accepting campers.

One anomaly exists which involves no-priority campers. Due to implementation issues, it is easier to permit the very first request to camp regardless of priority. Thus, even a no-priority request, if issued to a port that is busy and has an empty set of camp lists, will be camped. This anomaly occurs because there are difficulties in detecting a busy port unless the port is involved in a remote conversation that can be reflected in the scoreboards.

Transitions from Hub to Switch

In order to transition the system from switch mode from hub mode, the system must first be locked. Before initiating a lock from hub mode, the management software should set all parameters necessary for switch mode transition while the system is in hub mode so that the time spent during the transition in the locked state is minimized. Since transactions cannot be initiated while the system is locked, it is possible that an NL_port could time out and LIP (initialize) if the system is locked for too long, causing the hub to switch transition to fail.

Once the system is locked, external logic asserts a signal which sets the port multiplexers such that each port is partitioned from the system. During this time, each loop is broken, and IDLEs are driven onto the local loops in order to nullify ARBs that may still be present from hub mode arbitration. Next, the locking signal is deasserted, and, after a brief delay in which IDLEs are sent to the outbound port, the switching chips transition to the monitoring state and switch mode operation commences.

If a LIP or other exceptional condition is detected during the switch mode transition, the system sets an output to a state that indicates the mode transition failed and the system is still in hub mode.

Destination Node Address Discovery Processes

The associations between node addresses (AL_PAs) and their associated ports are determined at initialization time through a learning process referred to herein as OPN trapping. An OPN primitive is said to be trapped in hub mode when it has been transmitted onto a local FCAL net and an RRDY primitive received in its place. When an OPN has been trapped, the switch chip has the destination node address (AL_PD) of the device residing on the FCAL net where the trap occurred as well as the port ID of the port servicing the loop. This information is stored in the LUT routing table 228.

Storing addresses into a single LUT is not sufficient for proper switch operation. The data in the LUT routing table of each switch chip in the system should be filled in before transitioning to switch mode. This can be achieved in two ways. The slower method, yet simpler to implement in the circuitry of the system, is to use the management interface to read every address in every LUT and build the LUT contents in software. The CAMs of every switch chip are then loaded through the management interface.

The CAMs can also be synchronized as the OPNs are trapped through communications on the protocol bus. Since the protocol bus is only utilized for scoreboarding during switch mode, every trapped OPN results in a protocol bus transaction that advertises the node address and the port ID to all switch chips.

The discovery of every utilized AL_PA through OPN trapping can be facilitated in a passive or an active manner. During hub mode, if passive OPN trapping is enabled, normal traffic will result in trapped OPNs which will eventually populate every LUT with the address-port associations of every NL_port in the system.

AL_PA active discovery is a procedure by which the switch chip learning process is accelerated by additional logic on each switch chip. Active discovery is initiated by asserting a signal on each switch chip while it is in locked state. Once active discovery is initiated, a signal BCST_BUSY is driven low, and a 10-bit counter cycles through the 1024 10-bit words. Each word is passed through an address encoder which generates a signal that is active whenever the 10-bit word corresponds to a legal AL_PA. For each such word, the discovery process is triggered for each port on the switch.

The active discovery process starts with an OPN transmitted onto the local loop using the counter word as the AL_PD or destination address. The OPN is immediately followed by an interframe gap and a CLS. This sequence will travel around the loop and return to the discoverer if a device with that particular AL_PD is not on the local loop. It the node with that destination address is on the local loop and the node is not bypassed, the node will consume the OPN and CLS and send a CLS of its own. In this case, the discovery logic will write the AL_PA to port associated into the CAM. After an OPN or CLS is received at the receive port of the port which launched the OPN onto the local loop, the active discovery state machine pauses until the counter reaches another valid AL_PA. Once all valid addresses are attempted, the entire Arbitrated Loop address space has been deterministically mapped. This causes the BCST_BUSY signal to be allowed to float to logic 1, signalling that active discovery is complete. Active discovery may be aborted by deasserting the signal which initiated it which results in immediate reset of the discovery state machine.

Loop Port State Machine Policy

The loop port state machine is not a strict implementation of a conventional FCAL loop port state machine since it must switch OPN sequences and subsequent frames to and from the backplane and post messages to and read messages from the protocol bus and update the scoreboard and carry out the learning protocols.

While the exact design of the state machine is not critical to the invention, all designs must be able to perform the functions described above for at least one embodiment and, at least in the preferred embodiment, must adhere the following rules.

1) The LPSM must preserve word alignment unless it is absolutely impossible to do so. Since bugs exist in the HP Tachyon™ design which fill the loop with nonsensical transmissions if a K28.5 is followed by a character and another K28.5, any LPSM implementation that shares the loop with a Tachyon-based device must exercise great care in aligning output words.
2) The LPSM must not disturb OPN-CLS or SOF-EOF symmetry, nor should it unintentionally disturb credit flow by removing and adding RRDYs. In dual simplex cases, the LPSM will intentionally manipulate credit by absorbing RRDYs and rerouting them to an alternate destination.
3) The LPSM must conform to the FCAL requirements regarding interframe gaps. Also, the LPSM should avoid interframe gap conditions which are FCAL legal, but cause interoperability problems with current equipment.
4) The LPSM may operate in unfair mode in order to prioritize remote connections over local connections, but it must not break arbitration by prematurely resetting the access window, or starvation may occur.
5) The LPSM must allow loop initialization to be triggered and to proceed in a reasonably normal manner.

FIG. 11 is state table describing the various LPSM states in the preferred embodiment.

Loop Port Unfairness

An LPSM always operates in unfair access mode in order to obtain the loop as soon as possible. The current arbitration window is not observed and the high priority ARB (usually ARB(0), but programmable by the management software to be any AL_PA) is used to gain control of the loop. Simply put, the loop port state machine issues ARB on the loop whenever a remote request is pending and continues to do so until the same ARB is received back at the LPSM indicating that the LPSM has won arbitration.

If the LPSM receives an OPN or RRDY primitive, then another device on the loop won arbitration. In this case, the LPSM continues to issue its ARB, and monitors the loop until arbitration is won. While arbitrating, an OPN may arrive from the loop; the AL_PD of the OPN is then used to search the LUT to determine whether the OPN is to a remote or local device. If the OPN is remote, the LPSM synthesizes a CLS in an attempt to end the tenancy of the device on the local loop which sent the OPN which is interfering with the arbitration attempt of the LPSM. Thus, remote tenancies which have already traversed the protocol bus and are present camped are heavily favored over local devices who are attempting to make a remote connection. If however the OPN received from the local loop during arbitration by the LPSM is directed to a local device, the LPSM continues to arbitrate while processing the local transaction normally.

Interframe Gaps

The ports on every switch actively participate on their loops when they are facilitating a remote tenancy. The two primitives RRDY and CLS are used according to FCAL net interframe gap policy. The specific policy that the switch chips use is that if a current primitive is a fill word and two consecutive fill words have previously been detected, then insertion of the RRDY or CLS may take place. For purposes of this policy, fill words are defined as ARB(x) and IDLE primitives.

Fill Word Insertion

Fill words are generated and inserted onto the local loop when the LPSM is not in the LPSM_MON state (hereafter the states of the LPSM will be referred to by the acronym that follows LPSM_ in FIG. 11). Rules governing fill word generation ensure that the current arbitration state of each loop is maintained independently. The problem for each switch chip when it is coupled to a source loop, i.e., the loop having the source node, is that it must send fill words that are relatively innocuous. An NL_port in an OPEN state will transmit ARB (F0) which it uses to determine if any other ports on the loop are currently participating in arbitration. If the open NL_port receives ARB(F0) in return, the NL_port has the option of retaining the loop and sets it current fill word to IDLE, thereby resetting the arbitration interval. The LPSM needs to send a management programmable low priority ARB that does not possess the potential to disturb the local loop access state like ARB(F0) does. For this purpose, the ARB(F7) is suitable, as it is only used by a non-participating port to quiesce the loop prior to sending a loop initialization primitive LIP in order to receive a valid AL_PA.

The fill word generation matrix for the source loop is given in FIG. 12, and the destination fill word generation matrix is given in FIG. 13. In the source loop LPSM, the ARB(F7) state is entered when a local OPN is received, and a minimum of 6 current fill word primitives are sent when relinquishing the loop. In the destination loop LPSM, the ARB(F0) state is entered when a remote connection request is received, and the ARB(F0) state is entered when a tenancy is established and an OPN is passed. A minimum of 6 current fill words are sent when relinquishing the loop.

Remote Data Transfer

In order to reduce the amount of decoding required to merge the data stream of a remote connection into the flow of data on the local loop, very few primitives are passed across the backplane.

Miscellaneous Primitive Handling

The most common primitives that the switch chips must deal with are: IDLE, RRDY, ARB, OPN, SOF, EOF, CLS and LIP. The other primitives that may be encountered include: NOS, OLS, LR, LRR, MRK, LPB AND DHD. The handling of these other primitives is described below.

NOS, OLS, LR and LRR Primitives

When NOS or OLS primitives are detected, on the inbound port of a loop, the OLD_PORT detect flag of the port is set so that the management software can detect the condition. LR and LRR primitives will be fed back onto the local loop, but not through the backplane.

MRK Primitive

The MRK primitive is discarded if issued during a remote tenancy in dual-simplex. Otherwise, MRK primitives are passed around the local loop and across any remote connection. However, it is unlikely that a MRK will find its destination unless it is issued inside of a tenancy in which the target is on the destination loop.

LPB and LPE Primitives

The LPB and LPE primitives are trapped and written to management software. A detection flag is set for either an LPB or an LPE, and the AL_PD and AL_PS are written to a 20-bit register that is accessible by the management software.

DHD Primitives

In dual simplex mode, all dynamic half duplex primitives are translated into CLS primitives. Otherwise, they are passed unaltered to their destination.

Protocol Bus Definition

The protocol bus is the medium by which the scoreboards for each switch chip are kept current. It also serves to communicate switch connection requests and responses between switch ports. The protocol bus is defined as an 18 bit bidirectional data bus named PBD, a request output PBREQ0 for each switch chip, a grant input named PGGRNT1 to each switch chip, a shared bus idle input signal PBIDLE1, and shared frame available input signals named PBFRM1. The protocol bus runs asynchronously with respect to the 106.25 MHz core circuitry to which it interfaces. It is only necessary to provide a clock of less than 50 MHz for the bus to function properly.

When a switch chip wishes to transmit a data frame on the protocol bus, it drives its PBREQ0 output. The PBREQ0 of each switch chip in the system is fed into external arbitration logic which prioritizes the inputs and asserts a single PBGRNT1 output in the same cycle. The chip that receives the asserted PBGRNT1 deasserts PBREQ0 and then drives the PBD bus in the next cycle. The arbiter asserts PBFRM1 in the cycle following any PBGRNT1 to notify each switch chip that a data frame is present on the protocol bus.

Once a switch chip obtains a PBGRNT1, it must not assert PBREQ0 until it sees PBIDLE1 asserted from the arbiter. The PBIDLE1 is asserted whenever no chip is requesting the bus in a cycle, indicating that the protocol bus arbitration window may be reset.

Each protocol bus data frame possesses a slightly different format. These formats are depicted in FIGS. 14A through 14E. The abbreviations BP CHNL in FIGS. 14B and 14C stand for backplane channel. The abbreviation PID in FIG. 14E stands for port ID.

The connection request data frame of FIG. 14A is sent by a port that wishes to initiate a connection to a remote destination port and has found that the destination camp list can accept a request of the desired priority, and that the destination port is not current requesting a destination for itself. When a connection request is broadcast, every switch chip marks its 64 bit requester scoreboard and increments its camp list depth scoreboard for the destination and priority.

Chip remote request frames have a 0x0 pattern in the LCL field shown at 300 in FIG. 14A while chip local requests place a 0x3 in this field. This difference in format allows switch chips to update channel allocation scoreboards only on chip remote requests. If a chip remote request hits a channel that has been placed in an age list, a channel idle scoreboard for the channel owned by the destination port is cleared; otherwise, a need counter is incremented as will be explained in the next section.

A connection response having the format of FIG. 14B is broadcast by a port that has serviced a camp list entry, and indicates that a connection may be initiated over a backplane data channel specified in field 302. A connection response results in the clearing of the requestor scoreboard for the requester ID given in field 304 of the response frame, and it also results in setting the responder scoreboard for the destination port. The port that own the allocated channel and the channel number are entered into the age list on the initial allocation of the channel. A responder port that resides on the same switch chip as the requestor, indicating a chip-local connection, must still broadcast a response frame so that the responder scoreboard is updated in all the other switch chips. This type of chip-local connect response carries an invalid channel ID code of 0xf, which indicates to receiving switch chips that the backplane usage scoreboard should not be modified.

A responder channel idle frame having the format of FIG. 14C is driven on the protocol bus when a backplane channel completes a transaction. In the default system configuration, the channel is retained by the responder until the channel is required by another responder, thus reducing setup overhead if the destination node that just finished a tenancy over the channel is a frequently accessed destination. When an idle frame is received, each switch chip updates its channel idle scoreboard to indicate the channel is available.

The no-op frame of FIG. 14D is used as a late abort of a response due to channel allocation. This may occur when a request has been queued for transmission but a conflicting request is received before the queued request can be transmitted. The queued request is checked a final time before transmission, and if a local deny must take place, the frame is converted to a no-op and sent to get it out of the queue. Any other way of purging the queue will also suffice.

The lookup table update frame of FIG. 14E is transmitted when an OPN is trapped on a local loop in hub or locked mode. The frame is then used by each switch chip to enter a node address AL_PA equal to the content of field into its LUT with a port ID mapping as specified in field 308.

Backplane Channel Allocation

The example given herein for the configuration of the backplane has 14 separate backplane data channels, three of which may be dedicated to other uses such as broadcast. Channels are allocated by destination ports and remain assigned to them for as long as possible. A channel scoreboard indicates if any channels are free and is used to hold off any pending responses from ports which are not already connected to a data channel. If this is not the case, a need counter is incremented. When this need counter exceeds the physical number of data channels, then the backplane attempts to free up a channel while the destination port attempts to obtain a connection grant response from its LPSM. All data channel connections (identified by response frames on the protocol bus) are stored in the age list which indicates the channels that have been held the longest and the port that currently own those channels. When the need counter exceeds the number of data channels, each switch chip consults its age list and selects the channel to be relinquished. Idle channels are broadcast on the protocol bus when the camp list of the port owning the channel empties completely. The oldest owned channel is freed by the switch chips that owns the channel and all switch chips update their scoreboards to reflect the new state. For every channel that is freed, the need count is decremented by one.

Channels can also be freed in blocks of size greater than one. The size of the block of channels freed is determined by management-programmable parameter. The switch chip management logic can also instruct the backplane to always free a channel when it becomes idle, rather than only freeing the channel when the need arises.

Switch Fairness

Starvation is a problem because most of the fairness policies implemented by the switch chips guarantee remote access fairness to switch ports and not to the individual NL_ports. Thus, while an NL_port is guaranteed access to its local loop and is guaranteed to win arbitration within one FCAL net access window, its tenancy will not be successful if the NL_port attempts to transmit to a remote port and is denied connection by the switch. Usually, randomness of access patterns will result in statistical fairness. However, it is not uncommon to encounter degenerate cases where this behavior can occur repeatedly on a given NL_port, resulting in starvation of the port.

To improve the fairness of access to the switch at the NL_port granularity level, it is necessary to guarantee that all NL_ports on a local loop get some fraction of the switch bandwidth. Mechanisms exist for escalating from no-priority requests to low-priority requests based on the number of consecutive denials of access issued by a remote port state machine and for rotating a fairness token among all the ports to guarantee that each port gets a turn at high priority access.

Broadcast Support

In the preferred embodiment, each switch chip's LPSM includes logic to support three possible broadcast modes: that of the broadcast sender, the broadcast server transceiver, and the broadcast receiver. For a switch chip to be able to send broadcasts, it must include logic to decode a broadcast sequence as described below, logic to determine whether the broadcast channel, if it exists, is busy, logic to forward a broadcast sequence directly to the local loop as it is received, and logic to write a preamble to the broadcast sequence and place the sequence on the broadcast channel if it is available.

To decode a broadcast sequence, each switch chip should have the following structure. Broadcast sequences are detected on the inbound port from the local loop. A broadcast sequence is defined to be the sequence of one or more broadcast OPN groups terminated by a CLS primitive. A broadcast OPN group is defined to be one or more selective or broadcast OPNs followed by data frames.

The LPSM always forwards a broadcast OPN group back to its local loop, guaranteeing that all local NL_ports see the broadcast and that the sender of the broadcast can clean up the local loop. If broadcast mode is enabled by the management software, the switch port also attempts to forward the broadcast to the predefined backplane broadcast channel. If the channel is not already busy with a broadcast that is already in flight, the switch chip will prepend a unique, identifier sequence to the broadcast sequence and transmit the prepended sequence onto the broadcast channel. During the transmission, any broadcasts on the channel but upstream from the broadcasting switch chip will be discarded. As a result, only one broadcast may reach the broadcast server. When the server receives a broadcast, it reads the broadcaster ID prepended to the sequence. This identification mechanism excludes the original broadcaster from transmitting data onto the local loop a second time. The broadcast server then sends unicast to each of the destinations on the broadcast list.

The server comprises one port of a switch chip that is configured to only listen and transmit on the broadcast channel, and a broadcast server board that is connected to the switch chip by its serial loop port. Broadcast sequences are received by the dedicated broadcast port and forwarded to the switch port connected to the broadcast server board for storage.

In order for a switch chip to be able to receive broadcasts, the LPSM must include logic that discriminates whether an incoming broadcast originated at the port or at some other port from the data in the preamble prepended to the broadcast sequence.

In order for a switch chip to be able to function as the transceiver interface to the broadcast server, a switch port must be configurable so that it only forwards data from the broadcast channel to the loop port and forwards data from the loop port back to the broadcast channel. This port should not be effected by state change requests or other exceptional conditions if it is configured as a broadcast transceiver.

Buffered FCAL Switch

Figure 29:
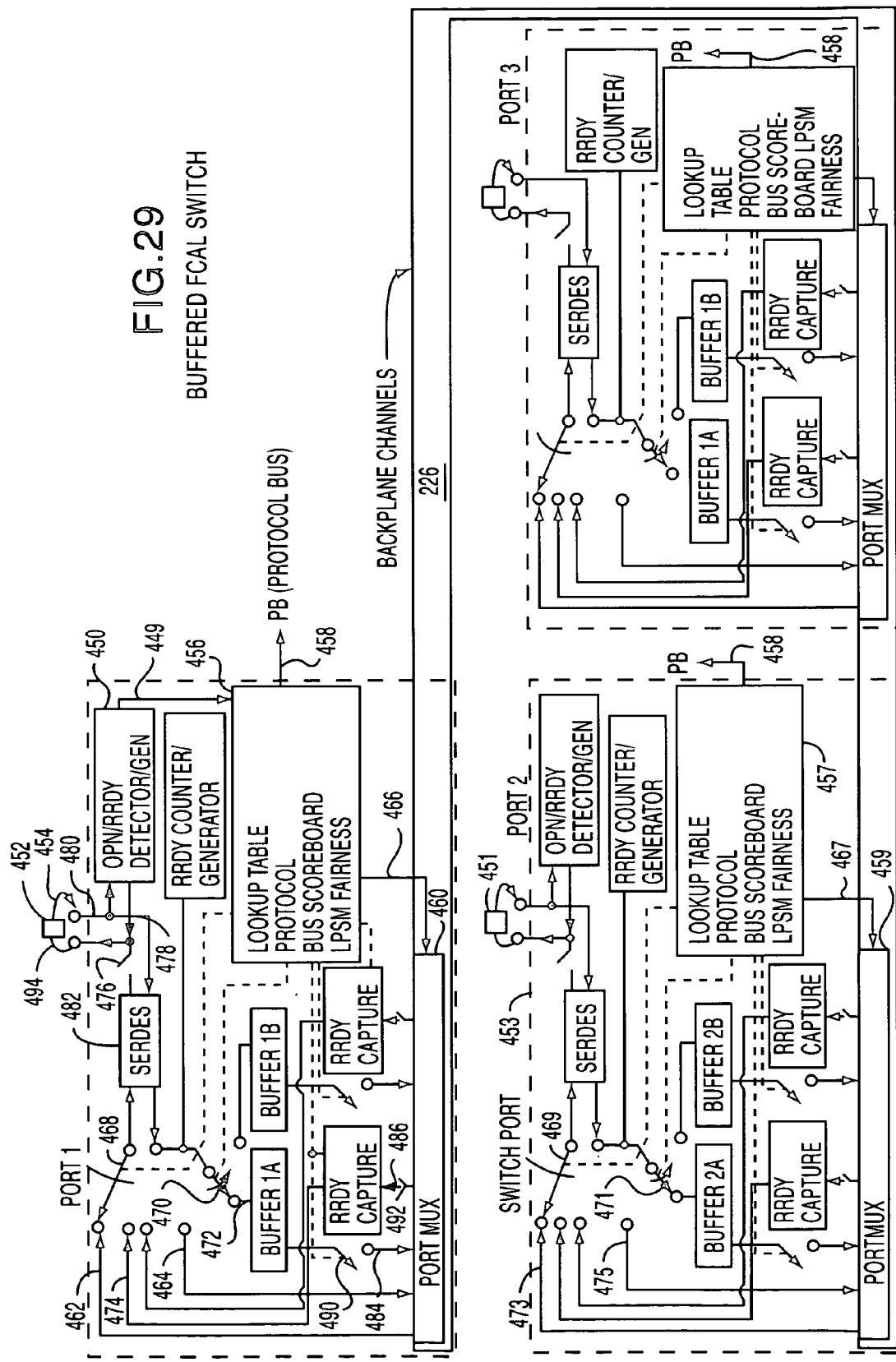
FIG. 29 is a block diagram of a species of a buffered FCAL switch which falls within a separate second genus of FCAL switches, suitable for Class 3 Fibre Channel operation only.

Referring to FIG. 29 there is shown a species of a buffered FCAL switch which falls within a separate second genus of FCAL switches, suitable for Class 3 Fibre Channel operation only. Switches in this genus still uses the destination address in the OPN to find the remote port but uses buffers instead of hold back flow control to complete the transaction to busy remote ports. Specifically, species within this genus will use the destination address of the OPN from the source node to find the location of the remote port. The destination address is used to look up the port ID of the switch port coupled to the destination address. Suppose Then the status of that port will be checked. If the status is available, a connection request will cause a connection to be set up between the source node and the destination node via a source port connected to the source node and a destination port connected to the destination node. The buffer comes into play when the destination port is busy. In this situation, in the first genus described above, the normal primitives of the FCAL protocol are used for flow control to prevent the source node from transmitting any frames of data until the destination port becomes available. In the second genus defined in this paragraph, a buffer big enough to hold one or more complete frames of data is included in the front end of each switch chip, or multiple buffers each big enough to store a frame of data are included with each switch chip front end. Each of these buffers will serve as an auxiliary switch port and have its own connection to the backplane in some species or a single shared connection to the backplane through a multiplexer can be used. The preferred species uses multiple buffers each with its own connection to the backplane in addition to a connection directly from the switch port to the backplane for direct connections without buffering. In some species, a single shared buffer or multiple shared buffers on the backplane or in some central location may be used.

In this second genus, the way the buffers are used is for the source port to generate an RRDY sua sponte when it finds from a check of the scoreboard that the destination port is busy. The RRDY is sent to the source node and causes it to output a frame of data. This frame of data is stored in the switch port's buffer. Then a message is sent to the destination port indicating that the auxiliary buffer of the switch port is holding a frame of data for the destination port. This auxiliary buffer ID is added to the camp list for the destination port. When the destination port becomes available, a message is sent back on the protocol bus indicating that the destination port is now available and naming the backplane channel to use. A connection through the backplane is then established to this channel by the auxiliary buffer connection circuitry and the destination port, and the data in the auxiliary buffer is transmitted. If the switch port has multiple auxiliary buffers, they each have their own IDs and, preferably, each has its own switching circuitry to make a connection to the backplane.

In this second genus, each auxiliary buffer has circuitry coupled to the return path to recognize RRDYs transmitted back by the destination node and to count them (or store them) and to wait for a connection between the source port and the RRDY counting circuit if the connection is not continuous such as in some cases where multiple buffers are present in each switch port. These stored RRDYs (or self generated in the case of a count only) can be transmitted to the source node in the case of full duplex or mixed with frames from a third node in the case of a dual simplex connection and transmitted to the source node. Each source port also has shared circuitry for each FCAL net which recognizes incoming RRDYs from the source node and counts them or stores them. These source node generate RRDYs can be transmitted to the destination node in the case of full duplex or transmitted to a third node in the case of dual simplex.

The operation of such a switch is now described with more specificity in connection with the species shown in FIG. 29. We first consider a full duplex transaction. In the species of FIG. 29, an OPN/RRDY detector and RRDY generator circuit 450 detects any incoming OPN or RRDY primitives coming in from the source node 452 on the local FCAL net 454. The destination address of the OPN is latched and sent to the lookup table circuitry represented by block 456 via line. The lookup table looks up the ID of the port connected to the destination node and determines its status. Suppose a first OPN with a destination address for node 451 is received from source node 452 and the status of destination node 451 and its switch port 453 is available. In this case, protocol bus interface circuitry in block 456 sends a connection request via protocol bus 458 to protocol bus interface circuitry in block 457 of switch port 453 requesting a connection. This results in a connect response message naming the backplane channel to use. The loop port state machines in blocks 456 and 457 then send commands via buses 466 and 467, respectively, to their respective port multiplexers 460 and 459 to establish connections between "straight through" data paths 462 and 464 to the designated backplane channel in backplane 465. The LPSM in block 456 also controls switches 468 and 470 to make connections to wires 462 and 464, and the LPSM in block 457 control switches 469 and 471 to make connections to "straight through lines 473 and 475. Destination node responds with an RRDY and that gets passed to source node 452 through the connection just described and the transaction proceeds normally until completed and the backplane channel is relinquished.

Now suppose switch port 453 was busy. In this scenario, the lookup process using the destination address in the OPN determines that an immediate connection is not possible. In this case, the LPSM in block 456 controls switch 470 to make an outbound connection to buffer 1A via wire 472 and controls switch 468 to make an inbound connection via wire 474. The LPSM then commands switch 476 to open long enough for an RRDY to be sent to source node 452 and commands RRDY generator circuit 450 to generate an RRDY on line 478 and send it to source node 452. The RRDY causes source node 452 to output a frame of data. This frame passes through line 480, SERDES 482, switch 470 and line 472 into buffer 1A and is stored there. The circuit 450 then generates a CLS and sends it to source node 452. Then switch 476 is closed. LPSM in block 456 then sends a message on protocol bus 458 to the protocol bus interface circuitry and LPSM in block 457 that it has a frame of data waiting for destination node 451. This message gives the ID for the buffer 1A and causes that ID to be put on a camp list for destination node 451. When destination node 451 becomes available, LPSM in block 457 sends a message back to LPSM in block 456 saying "send data in buffer 1A on backplane channel X". The LPSM in block 456 then controls port multiplexer 460 to establish a connection between wires 484 and 486 to the designated backplane channel. LPSM in block 458 controls switches 469 and 471 to establish connections to wires 473 and 475 and controls port multiplexer 459 to connect wires 473 and 475 to the designated backplane channel. The LPSM in block 456 then causes a switch 490 to close and causes Buffer 1A to output its frame of data onto the backplane channel where it gets transmitted to the destination node 451 via straight through wires 473 and 475.

In some embodiments, the circuit 450 will not send a CLS to the source node 452 after it sends a frame of data into the buffer 1A. In these embodiments, the connections will be maintained so that if there is more than one frame, it can be sent as soon as the destination node becomes free by a straight through connection. In these embodiments, the LPSM in block 456 also causes switch 492 to close for a return path and causes switch 468 to make a connection to return path wire 474 so any RRDYs output by the destination node are transmitted to the source node 452 once the destination node becomes available. The LPSM also then causes switch 470 to make a connection between outbound path 480 from source node 452 and "straight through" outbound wire 464 so subsequent frames can be sent straight through. The transaction then completes as a straight through transaction. Buffers in the switch ports such as buffers 1A and 1B may be big enough to hold more than one frame in some species to avoid having to establish a separate tenancy for each frame.

Since the preferred method in the buffered switch is to close the source node after it outputs one frame into the buffer, it is then free to generate new OPNs to other destination nodes. Those OPNs can cause either straight through or buffered connections to their destinations depending upon the status of the destination port. The LPSMs can cooperate after the table lookup using the new OPN destination address to control the switches 468 and 470 and their counterparts in the destination port to establish a straight through connection to the new destination via another backplane channel. In the meantime, the buffer 1A and its associated switches and the LPSM are cooperating to act as an independent switch port such that when the destination node for the data in the buffer becomes available and a connect response message is received, it can independently send its data to the destination node the different backplane channel assigned in the connect request message. This increases throughput since the same switch port may be simultaneously be sending data to two or more different destinations. Buffered FCAL switches such as that shown in FIG. 29 have the additional advantage in that it prevents source blocking. The source may download one or more frames into the buffer for a destination node and then move on to its next transaction thereby reducing or eliminating head end blocking.

Dual simplex is also possible to increase throughput further by using circuit 450 to count RRDYs emitted by the source node and using LPSM in block 456 to award those RRDYs to a third node. This way, the RRDYs will cause the third node to send data inbound to the source node via a separate backchannel connection with LPSM in block 456 controlling switch 468 to establish the inbound path to source node 452 via the backplane channel assigned by the third node and straight through wire 462. Outbound data from the source node to a destination node can be sent by straight through wire 464 or through one of the buffers. RRDYs emitted by the destination node are received by the destination port and sent via the protocol bus to the LPSM of the source port or a message is sent each time an RRDY is received from the destination node by the destination port informing the source port of this fact. The source port LPSM then controls circuit 450 to generate an equivalent number of RRDYs and mix them in with the data frames from the third node on the inbound path 492 to the source node 452 to keep the source node outputting data frames destined for the destination node.

The RRDY capture circuits are used in species where RRDYs are emitted by the destination node, but the switches 468 and 470 are in states such that the RRDYs cannot be immediately be sent to the destination node such as where the source port is generating multiple OPNs to different destinations and filling up all its buffers one by one. In these embodiments, the nodes will have to be non standard in that they will have to OPN a destination, download one or more frames into a buffer, receive a CLS from circuit 450, OPN a new destination, download another one or more frames into another buffer, receive another CLS from circuit 450 and continue this process until all buffers have been used. The LPSM will commutate the switches to make successive connections to the buffers and straight through connections as needed and keep cycling through these connections. The RRDY capture circuits will count the number or RRDYs received or emitted by the destination nodes, and when the switches 468 and 470 and 490 and 492 are again in position for communication with the destination node, the source node will open itself spontaneously for that destination, receive any stored RRDYs from that destination and send an appropriate number of frames to that destination either by a straight through connection or a buffered connection.

Fairness is implemented in the species within the second genus in the same way as in the species of the first genus. A fairness token is circulated, and when any switch port has the token, it assumes the highest priority. The fairness token can be circulated around the switch ports on a separate fairness token bus (not shown in FIG. 29) or via the protocol bus which is the embodiment symbolized by FIG. 29.

Although not shown for simplicity in FIG. 29, each switch port also includes a local loop bypass data path to keep purely local transactions confined to the local FCAL net. Note also that although each FCAL net is FIG. 29 is shown as having only one node, multiple nodes on each FCAL net are also possible. Note also that although FIG. 29 shows only one switch port per switch chip, multiple switch ports per switch chip are also possible similar to the structure shown in FIG. 7 but using the architecture of FIG. 29 for each switch port.

Appendix B attached is the UUencoded Verilog description of the preferred embodiment of the entire switch chip integrated circuit. At the end of Appendix B is the C language source code for the UUencoding and decoding program to enable decoding of the Verilog and documentation for using the UUencoding and decoding program.

Although the invention has been described in terms of the preferred and alternative embodiments disclosed herein, those skilled in the art will appreciate numerous modifications that can be made. All such modifications and alternatives are intended to be included within the scope of the claims appended hereto.

What is claimed is:

1. A switch for selectively coupling pairs of nodes on a plurality of fibre channel arbitrated loop (FCAL) nets to each other for one or more simultaneous conversations, comprising:

data path circuitry having a plurality of parallel point-to-point transmit/receive channels and multiplexing circuitry to selectively couple individual ones of said transmit/receive channels to transmit-receive terminals;

a protocol bus;

a plurality of ports each port for interfacing a local FCAL net to said data path circuitry, each port coupled to said protocol bus, wherein each port includes:

a serializer/deserializer circuit having terminals for coupling to an FCAL net and having demultiplexing circuitry to convert incoming differential, encoded serial data from said FCAL net to multi-bit characters and having clock recovery circuitry to recover a receive clock therefrom and having multiplexing circuitry for receiving a plurality of multi-bit characters and converting them into a differential, encoded serial data stream;

an elastic buffer to receive multi-bit characters from and send multi-bit characters to said serializer/deserializer circuit and absorb the differences in transmit and receive rate;

a routing table memory storing mappings between destination node addresses and port IDs of the port coupled to each destination node;

a scoreboard means for storing status information; and one or more state machine means coupled to said elastic buffer, said routing table memory, said scoreboard means and said protocol bus and at least to said transmit-receive terminals of said data path circuitry for using said routing table memory contents for determining whether destination nodes identified in open primitive signal (OPN) primitives received from source nodes on said local FCAL net are local or remote and using the data content of said scoreboard means to determine if connection to a destination port coupled to said destination node is permissible and transmitting a connection request on said protocol bus to said destination port requesting a connection thereto and using the contents of a connect response frame output by said state machine means of said destination port on said protocol bus for controlling said data path circuitry to implement full duplex connections between said local source and remote destination nodes or to implement full or half duplex connections to remote destination nodes, and for implementing logic and control functions to control said data path circuitry to carry out a dual simplex connections so as to send data and primitives from a source node on said local FCAL net to a remote dual simplex destination node coupled to some other port which is a source node in another half duplex loop tenancy and receive buffer credit flow control primitives back from said dual simplex destination node and to respond to each said buffer credit flow control primitive by transmitting a frame of data to said dual simplex destination node, said state machine means also structured for sending flow control primitives to a third port for transmission to a third node and receive OPN and close primitive signal (CLS) primitives and data frames from said third node when said third port has established a dual simplex connection to a source port through said data path circuitry, and transmit data frames and CLS primitives received from said third node to said source node if and only if said data frames are directed to said source node as indicated by said OPN received from said third node.

2. A switch for selectively coupling pairs of nodes on a plurality of fibre channel arbitrated loop (FCAL) nets to each other for one or more simultaneous conversations, comprising:

a plurality of state machines configured to relay open primitive signal (OPN) and frames to remote destinations;

a port multiplexer configured to interface with the plurality of state machines to a corresponding plurality of backplane data channels;

a backplane configured to shunt backplane data to and from the plurality of state machines; and at least one serializer/deserializer unit configured to accept differential encoded serial data, demultiplex the serial data into aligned 10-bit characters, and recover the receive clock from the serial data, wherein each of the plurality of state machines is configured to process received FCAL data, generate commands, and cooperate with the port multiplexer to establish a proper connection to either a local FCAL net or to a designated channel through the backplane so as to facilitate coupling of the received data on whatever data path the state machine establishes.

3. The switch according to claim 2, further comprising a plurality of FCAL net ports configured to transmit and receive serial data.

4. The switch according to claim 2, further comprising at least one elastic buffer connected to the at least one serializer/deserializer unit and configured to absorb the differences between a receive data rate and a transmit data rate, wherein the number of elastic buffers corresponds to the number of serializer/deserializer units.

5. An apparatus for selectively coupling pairs of nodes on a plurality of fibre channel arbitrated loop (FCAL) nets to each other for one or more simultaneous conversations, comprising:

a plurality of state machines means for relaying open primitive signal (OPN) and frames to remote destinations;

a port multiplexer means for interfacing with the plurality of state machines means to a corresponding plurality of backplane data channels;

a backplane means for shunting backplane data to and from the plurality of state machines means; and at least one serializer/deserializer means for accepting differential encoded serial data, demultiplexing the serial data into aligned 10-bit characters, and recovering the receive clock from the serial data, wherein each of the plurality of state machines means is configured to process received FCAL data, generate commands, and cooperate with the port multiplexer to establish a proper connection to either a local FCAL net or to a designated channel through the backplane means so as to facilitate coupling of the received data on whatever data path the state machines means establishes.

6. The apparatus according to claim 5, further comprising a plurality of FCAL net port means for transmitting and receiving serial data.

7. The apparatus according to claim 5, further comprising at least one elastic buffer means connected to the at least one serializer/deserializer means for absorbing the differences between a receive data rate and a transmit data rate, wherein the number of elastic buffers corresponds to the number of serializer/deserializer means.

8. A switch, providing Fibre Channel switching, comprising:

a plurality of state machines, each configured to process a Fibre Channel data frame, generate a Fibre Channel command, cooperate with a port multiplexer to establish a connection to either a local Fibre Channel network or to a designated channel through a backplane, and provide fairness of access to the switch to ensure a fraction of switch bandwidth is available on an individual port basis, wherein providing the fairness of access to the switch comprises allowing a source port to camp on a target port using a camp list when the target port is not available, the target port being associated with at least one of the plurality of state machines;

the port multiplexer configured to couple the plurality of state machines to the backplane; and the backplane configured to shunt backplane data to and from the plurality of state machines via one or more channels.

9. The switch of claim 8, wherein each of the plurality of state machines are connected to a respective local Fibre Channel network.

10. The switch of claim 8, wherein the one or more channels includes at least one virtual channel for the transmission of data from multiple Fibre Channel ports.

11. The switch of claim 8, wherein the Fibre Channel protocol is Fibre Channel Arbitrated Loop (FCAL).

12. The switch of claim 8, wherein one or more of state machine is configured to escalate priority requests based on a number of consecutive denials of access.

13. The switch of claim 8, wherein the port multiplexer is configured to establish a virtual channel for passing Fibre Channel data frames.

14. The switch of claim 13, wherein the virtual channels implemented through the switch allow concurrent data transfers through the switch.

15. The switch of claim 8, wherein the switch is configured to provide flow control by signaling to hold back data from being transmitted until the switch is ready to transmit the data to a destination node and by tracking buffer status.

16. The switch of claim 8, wherein the port multiplexer is configured to multiplex access to the backplane via time division multiplexing access (TDMA) comprising time slots, and wherein the plurality of state machines are informed about which time slots are in use and which timeslots are available.

17. The switch of claim 8, wherein each of the plurality of state machines is associated with a Fibre Channel switch port.

18. The switch of claim 8, wherein each of the plurality of state machines is configured to arbitrate for control of a respective local Fibre Channel network when a connection request is received from the backplane.

19. The switch of claim 8, further comprising one or more elastic buffer memories configured to store data output by a source node and to absorb differences between receive and transmit data rates for Fibre Channel data frames passing through the port multiplexer.

20. The switch of claim 8, wherein the plurality of state machines are passive and not configured to directly transmit or directly receive Fibre Channel data frames, wherein the switch further comprises a plurality of Fibre Channel switch ports, and wherein each Fibre Channel switch port is associated with each state machine and configured to, once instructed by the respective associated state machine, relay the Fibre Channel data frame to a local Fibre Channel network.

21. The switch of claim 8, wherein a fairness token is distributed among a plurality of ports that includes the source port and the target port, wherein the source port has an available Fibre Channel data frame to send to the target port, and wherein the source port is allowed to camp on the target port when the source port is holding the fairness token.

22. The switch of claim 21, wherein the source port is allowed to hold the fairness token until the target port becomes available.

23. The switch of claim 8, wherein the source port is allowed to camp on the target port until the target port becomes available.

24. The switch of claim 8, wherein providing the fairness of access to the switch comprises guaranteeing the source port access to the switch when the target port becomes available.

25. The switch of claim 24, wherein a fairness token is distributed among a plurality of ports that includes the source port and the target port, wherein the source port has an available Fibre Channel data frame to send to the target port, and wherein the source port is guaranteed access to the switch when the source port is holding the fairness token.

* * * * *